United States Patent
Sundstrom et al.

(10) Patent No.: US 12,333,083 B2
(45) Date of Patent: Jun. 17, 2025

(54) METHODS FOR MANIPULATING OBJECTS IN AN ENVIRONMENT

(71) Applicant: Apple Inc., Cupertino, CA (US)

(72) Inventors: Matthew J. Sundstrom, Campbell, CA (US); Evgenii Krivoruchko, San Francisco, CA (US); Matan Stauber, San Francisco, CA (US); Zoey C. Taylor, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 308 days.

(21) Appl. No.: 17/655,347

(22) Filed: Mar. 17, 2022

(65) Prior Publication Data

US 2022/0317776 A1 Oct. 6, 2022

Related U.S. Application Data

(60) Provisional application No. 63/261,665, filed on Sep. 25, 2021, provisional application No. 63/164,470, filed on Mar. 22, 2021.

(51) Int. Cl.
*G06F 3/01* (2006.01)
*G06F 3/04815* (2022.01)
(Continued)

(52) U.S. Cl.
CPC .............. *G06F 3/017* (2013.01); *G06F 3/013* (2013.01); *G06F 3/04815* (2013.01); *G06F 3/0482* (2013.01); *G06F 3/04845* (2013.01)

(58) Field of Classification Search
CPC ...... G06F 3/017; G06F 3/013; G06F 3/04815; G06F 3/0482; G06F 3/04845
See application file for complete search history.

(56) References Cited

U.S. PATENT DOCUMENTS 5,015,188 A    5/1991  Pellosie et al.
5,809,267 A    9/1998  Moran et al.
(Continued)

FOREIGN PATENT DOCUMENTS

CN    102298493 A   12/2011
EP    2393056 A1    12/2011
(Continued)

OTHER PUBLICATIONS

Adding Environments, Available online at: https://manual.keyshot.com/manual/environments/adding-environments/, [retrieved on Jun. 9, 2023], 2 pages.

(Continued)

*Primary Examiner* — Haoshian Shih
(74) *Attorney, Agent, or Firm* — Kubota & Basol LLP

(57) ABSTRACT

In some embodiments, while displaying a content entry user interface element and while a first content entry tool is selected, an electronic device detects a first movement of a predefined portion of a user while the predefined portion has a first shape. In some embodiments, in response to detecting the first movement, in accordance with a determination that a gaze of the user was directed toward the content entry user interface element when the first movement was detected, the electronic device enters first content, based on the first content entry tool, corresponding to the first movement into the content entry user interface element. In some embodiments, in accordance with a determination that the gaze of the user was directed toward a menu user interface element when the first movement was detected, the electronic device selects a second content entry tool for entering content into the content entry user interface element.

36 Claims, 81 Drawing Sheets

(51) Int. Cl.
*G06F 3/0482* (2013.01)
*G06F 3/04845* (2022.01)

(56) References Cited

U.S. PATENT DOCUMENTS

| | | | |
|---|---|---|---|
| 6,167,433 A | 12/2000 | Maples et al. | |
| 6,295,069 B1 | 9/2001 | Shirur | |
| 6,323,846 B1 | 11/2001 | Westerman et al. | |
| 6,426,745 B1 | 7/2002 | Isaacs et al. | |
| 6,570,557 B1 | 5/2003 | Westerman et al. | |
| 6,677,932 B1 | 1/2004 | Westerman | |
| 6,750,873 B1 | 6/2004 | Bernardini et al. | |
| 7,298,370 B1 | 11/2007 | Middler et al. | |
| 7,580,576 B2 | 8/2009 | Wang et al. | |
| 7,614,008 B2 | 11/2009 | Ording | |
| 7,633,076 B2 | 12/2009 | Huppi et al. | |
| 7,634,718 B2 | 12/2009 | Nakajima | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,721,226 B2 | 5/2010 | Barabe et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 9,214,137 B2 | 12/2015 | Bala et al. | |
| 9,245,388 B2 | 1/2016 | Poulos et al. | |
| 9,294,757 B1 | 3/2016 | Lewis et al. | |
| 9,298,334 B1 | 3/2016 | Zimmerman et al. | |
| 9,348,458 B2 | 5/2016 | Hotelling et al. | |
| 9,383,189 B2 | 7/2016 | Bridges et al. | |
| 9,396,580 B1 | 7/2016 | Nowrouzezahrai et al. | |
| 9,519,371 B2 | 12/2016 | Nishida | |
| 9,933,937 B2 | 4/2018 | Lemay et al. | |
| 10,026,209 B1 | 7/2018 | Dagley et al. | |
| 10,339,721 B1 | 7/2019 | Dascola et al. | |
| 10,373,381 B2 | 8/2019 | Nuernberger et al. | |
| 10,488,941 B2 | 11/2019 | Lam et al. | |
| 10,642,368 B2 | 5/2020 | Chen | |
| 10,664,043 B2 | 5/2020 | Ikuta et al. | |
| 10,671,241 B1 | 6/2020 | Jia et al. | |
| 10,691,216 B2 | 6/2020 | Geisner et al. | |
| 10,762,716 B1 | 9/2020 | Paul et al. | |
| 10,776,933 B2 | 9/2020 | Faulkner | |
| 10,846,864 B2 | 11/2020 | Kim et al. | |
| 11,138,798 B2 | 10/2021 | Paul et al. | |
| 11,204,678 B1 | 12/2021 | Baker et al. | |
| 11,249,556 B1 | 2/2022 | Schwarz et al. | |
| 11,262,885 B1 | 3/2022 | Burckel | |
| 11,340,756 B2 | 5/2022 | Faulkner et al. | |
| 11,347,319 B2 | 5/2022 | Goel et al. | |
| 11,380,323 B2 | 7/2022 | Shin et al. | |
| 11,409,363 B2 | 8/2022 | Chen et al. | |
| 11,416,080 B2 | 8/2022 | Heo et al. | |
| 11,531,402 B1 | 12/2022 | Stolzenberg | |
| 11,531,459 B2 | 12/2022 | Poupyrev et al. | |
| 11,557,102 B2 | 1/2023 | Palangie et al. | |
| 11,615,596 B2 | 3/2023 | Faulkner et al. | |
| 11,641,460 B1 | 5/2023 | Geusz et al. | |
| 11,669,155 B2 | 6/2023 | Bowman et al. | |
| 11,762,473 B2 | 9/2023 | Cipoletta et al. | |
| 11,768,544 B2 | 9/2023 | Schwarz et al. | |
| 11,847,748 B2 | 12/2023 | Liu et al. | |
| 11,886,643 B2 | 1/2024 | Irie et al. | |
| 11,899,845 B2 | 2/2024 | Chung et al. | |
| 11,909,453 B2 | 2/2024 | Javaudin et al. | |
| 11,914,759 B2 | 2/2024 | Klein et al. | |
| 11,928,263 B2 | 3/2024 | Jung et al. | |
| 11,983,326 B2 | 5/2024 | Lacey | |
| 11,989,965 B2 | 5/2024 | Tarighat Mehrabani | |
| 12,032,803 B2 | 7/2024 | Pastrana Vicente et al. | |
| 12,154,236 B1 | 11/2024 | Herman et al. | |
| 2002/0015024 A1 | 2/2002 | Westerman et al. | |
| 2002/0030692 A1 | 3/2002 | Griesert | |
| 2005/0062738 A1 | 3/2005 | Handley et al. | |
| 2005/0190059 A1 | 9/2005 | Wehrenberg | |
| 2005/0248299 A1 | 11/2005 | Chemel et al. | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2010/0185949 A1 | 7/2010 | Jaeger | |
| 2010/0302245 A1 | 12/2010 | Best | |
| 2011/0142321 A1 | 6/2011 | Huffman | |
| 2011/0243448 A1 | 10/2011 | Kawabuchi et al. | |
| 2011/0320969 A1 | 12/2011 | Hwang et al. | |
| 2012/0113223 A1 | 5/2012 | Hilliges et al. | |
| 2012/0170089 A1 | 7/2012 | Kim et al. | |
| 2012/0249741 A1 | 10/2012 | Maciocci et al. | |
| 2013/0222227 A1 | 8/2013 | Johansson et al. | |
| 2013/0321462 A1 | 12/2013 | Salter et al. | |
| 2013/0332890 A1 | 12/2013 | Ramic et al. | |
| 2014/0040832 A1 | 2/2014 | Regelous | |
| 2014/0071241 A1 | 3/2014 | Yang et al. | |
| 2014/0078176 A1 | 3/2014 | Kim et al. | |
| 2014/0104206 A1 | 4/2014 | Anderson | |
| 2014/0129990 A1 | 5/2014 | Xin et al. | |
| 2014/0237366 A1 | 8/2014 | Poulos et al. | |
| 2014/0333666 A1 | 11/2014 | Poulos et al. | |
| 2014/0363074 A1 | 12/2014 | Dolfing et al. | |
| 2014/0368620 A1 | 12/2014 | Li et al. | |
| 2015/0067580 A1 | 3/2015 | Um et al. | |
| 2015/0121466 A1 | 4/2015 | Brands et al. | |
| 2015/0123901 A1 | 5/2015 | Schwesinger et al. | |
| 2015/0153833 A1 | 6/2015 | Pinault et al. | |
| 2015/0317831 A1 | 11/2015 | Ebstyne et al. | |
| 2015/0331576 A1 | 11/2015 | Piya et al. | |
| 2016/0026242 A1 | 1/2016 | Burns et al. | |
| 2016/0098093 A1* | 4/2016 | Cheon | H04N 21/41265 345/156 |
| 2016/0189426 A1 | 6/2016 | Thomas et al. | |
| 2016/0225164 A1 | 8/2016 | Tomlin et al. | |
| 2016/0291922 A1 | 10/2016 | Montgomerie et al. | |
| 2016/0373647 A1 | 12/2016 | García Morate et al. | |
| 2017/0032568 A1 | 2/2017 | Gharpure et al. | |
| 2017/0052595 A1 | 2/2017 | Poulos et al. | |
| 2017/0053383 A1 | 2/2017 | Heo | |
| 2017/0178392 A1 | 6/2017 | Zuccarino et al. | |
| 2017/0213388 A1 | 7/2017 | Margolis et al. | |
| 2017/0221264 A1 | 8/2017 | Perry | |
| 2017/0243352 A1 | 8/2017 | Kutliroff et al. | |
| 2017/0251143 A1 | 8/2017 | Peruch et al. | |
| 2017/0270715 A1 | 9/2017 | Lindsay et al. | |
| 2017/0287215 A1 | 10/2017 | Lalonde et al. | |
| 2017/0287225 A1 | 10/2017 | Powderly et al. | |
| 2017/0351094 A1 | 12/2017 | Poulos et al. | |
| 2018/0005433 A1 | 1/2018 | Kohler et al. | |
| 2018/0045963 A1 | 2/2018 | Hoover et al. | |
| 2018/0088787 A1 | 3/2018 | Bereza et al. | |
| 2018/0103209 A1 | 4/2018 | Fischler et al. | |
| 2018/0122138 A1 | 5/2018 | Piya et al. | |
| 2018/0130255 A1 | 5/2018 | Hazeghi et al. | |
| 2018/0143693 A1 | 5/2018 | Calabrese et al. | |
| 2018/0173404 A1 | 6/2018 | Smith | |
| 2018/0197341 A1 | 7/2018 | Loberg et al. | |
| 2018/0300952 A1 | 10/2018 | Evans et al. | |
| 2018/0330544 A1 | 11/2018 | Corso et al. | |
| 2018/0348986 A1 | 12/2018 | Sawaki | |
| 2019/0018479 A1 | 1/2019 | Minami | |
| 2019/0018498 A1 | 1/2019 | West et al. | |
| 2019/0050062 A1 | 2/2019 | Chen et al. | |
| 2019/0096134 A1 | 3/2019 | Amacker et al. | |
| 2019/0130622 A1 | 5/2019 | Hoover et al. | |
| 2019/0155495 A1 | 5/2019 | Klein et al. | |
| 2019/0164340 A1 | 5/2019 | Pejic et al. | |
| 2019/0228589 A1 | 7/2019 | Dascola et al. | |
| 2019/0340832 A1 | 11/2019 | Srinivasan et al. | |
| 2019/0349575 A1 | 11/2019 | Knepper et al. | |
| 2019/0362557 A1* | 11/2019 | Lacey | G06F 3/013 |
| 2020/0005539 A1* | 1/2020 | Hwang | G06F 3/167 |
| 2020/0045249 A1 | 2/2020 | Francois et al. | |
| 2020/0048825 A1 | 2/2020 | Schultz et al. | |

(56) References Cited

U.S. PATENT DOCUMENTS

| | | | |
|---|---|---|---|
| 2020/0128227 | A1 | 4/2020 | Chavez et al. |
| 2020/0135141 | A1 | 4/2020 | Day et al. |
| 2020/0214682 | A1 | 7/2020 | Zaslavsky et al. |
| 2020/0218074 | A1 | 7/2020 | Hoover et al. |
| 2020/0226823 | A1 | 7/2020 | Stachniak et al. |
| 2020/0286299 | A1 | 9/2020 | Wang et al. |
| 2020/0379626 | A1 | 12/2020 | Guyomard et al. |
| 2021/0034163 | A1 | 2/2021 | Goel et al. |
| 2021/0034319 | A1 | 2/2021 | Wang et al. |
| 2021/0225043 | A1 | 7/2021 | Tang et al. |
| 2021/0241483 | A1 | 8/2021 | Dryer et al. |
| 2021/0279967 | A1 | 9/2021 | Gernoth et al. |
| 2021/0295592 | A1 | 9/2021 | Von Cramon |
| 2021/0295602 | A1 | 9/2021 | Scapel et al. |
| 2021/0374221 | A1 | 12/2021 | Markhasin et al. |
| 2021/0383097 | A1 | 12/2021 | Guerard et al. |
| 2022/0083145 | A1 | 3/2022 | Matsunaga et al. |
| 2022/0084279 | A1 | 3/2022 | Lindmeier et al. |
| 2022/0121344 | A1 | 4/2022 | Pastrana Vicente et al. |
| 2022/0130126 | A1 | 4/2022 | Delgado et al. |
| 2022/0148257 | A1 | 5/2022 | Boubekeur et al. |
| 2022/0206298 | A1 | 6/2022 | Goodman |
| 2022/0253136 | A1 | 8/2022 | Holder et al. |
| 2022/0326837 | A1 | 10/2022 | Dessero et al. |
| 2022/0335697 | A1 | 10/2022 | Harding et al. |
| 2022/0382385 | A1 | 12/2022 | Chen et al. |
| 2022/0397962 | A1 | 12/2022 | Goel et al. |
| 2022/0408164 | A1 | 12/2022 | Lee et al. |
| 2022/0413691 | A1 | 12/2022 | Becker et al. |
| 2022/0414975 | A1 | 12/2022 | Becker et al. |
| 2022/0415094 | A1 | 12/2022 | Kim et al. |
| 2023/0027040 | A1 | 1/2023 | Wang et al. |
| 2023/0030699 | A1 | 2/2023 | Zion et al. |
| 2023/0031832 | A1 | 2/2023 | Lipton et al. |
| 2023/0032771 | A1 | 2/2023 | Zion et al. |
| 2023/0076326 | A1 | 3/2023 | Xu et al. |
| 2023/0103161 | A1 | 3/2023 | Li et al. |
| 2023/0119162 | A1 | 4/2023 | Lipton et al. |
| 2023/0152935 | A1 | 5/2023 | Mckenzie et al. |
| 2023/0168745 | A1 | 6/2023 | Yoda |
| 2023/0290042 | A1 | 9/2023 | Casella et al. |
| 2023/0377259 | A1 | 11/2023 | Becker et al. |
| 2023/0377299 | A1 | 11/2023 | Becker et al. |
| 2023/0377300 | A1 | 11/2023 | Becker et al. |
| 2024/0037886 | A1 | 2/2024 | Chiu et al. |
| 2024/0103636 | A1 | 3/2024 | Lindmeier et al. |
| 2024/0104875 | A1 | 3/2024 | Couche et al. |
| 2024/0104876 | A1 | 3/2024 | Couche et al. |
| 2024/0233097 | A1 | 7/2024 | Ngo et al. |

FOREIGN PATENT DOCUMENTS

| | | | | |
|---|---|---|---|---|
| EP | 3118722 | * | 1/2017 | ............ G06F 3/011 |
| EP | 3336805 | A1 | 6/2018 | |
| EP | 3506151 | A1 | 7/2019 | |
| GB | 2540791 | A | 2/2017 | |
| KR | 10-2014-0097654 | A | 8/2014 | |
| KR | 10-2017-0027240 | A | 3/2017 | |
| KR | 10-2018-0102171 | A | 9/2018 | |
| KR | 10-2020-0110788 | A | 9/2020 | |
| KR | 10-2020-0135496 | A | 12/2020 | |
| WO | 2013/169849 | A2 | 11/2013 | |
| WO | 2014/105276 | A1 | 7/2014 | |
| WO | 2016/118344 | A1 | 7/2016 | |
| WO | 2019/172678 | A1 | 9/2019 | |
| WO | 2019/213111 | A1 | 11/2019 | |
| WO | 2022/147146 | A1 | 7/2022 | |

OTHER PUBLICATIONS

Area Light, Available online at: https://manual.keyshot.com/manual/materials/material-types/light-sources/area-light/, [retrieved on Jun. 9, 2023], 24 pages.

Artec Leo, Artec 3D [online], 2018 [retrieved on Apr. 25, 2024]. Retrieved from the Internet: <URL: https://artec3d.com/portable-3d-scanners/artec-leo>, 39 pages.

Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.

Curious Blocks Alternatives 12, progsoft [online]. 2024 [retrieved on Apr. 25, 2024]. Retrieved from the Internet: <URL: https://progsoft.net/en/software/curious-blocks>, 7 pages.

Feature Highlights, Available online at: https://manual.keyshot.com/manual/whats-new/feature-highlights/, [retrieved on Jun. 9, 2023], 28 pages.

Final Office Action received for U.S. Appl. No. 17/469,788, mailed on Nov. 16, 2023, 24 pages.

Final Office Action received for U.S. Appl. No. 17/807,226, mailed on Nov. 30, 2023, 23 pages.

Final Office Action received for U.S. Appl. No. 17/812,965, mailed on Jan. 31, 2024, 9 pages.

Final Office Action received for U.S. Appl. No. 17/814,462, mailed on Nov. 1, 2024, 44 pages.

International Search Report received for PCT Patent Application No. PCT/US2021/049520, mailed on Apr. 8, 2022, 8 pages.

International Search Report received for PCT Patent Application No. PCT/US2022/071208, mailed on Aug. 18, 2022, 9 pages.

International Search Report received for PCT Patent Application No. PCT/US2023/074955, mailed on Feb. 1, 2024, 6 pages.

Voxelization with ARKit4 and LiDAR, Kitasenju Design [online]. X, Jul. 13, 2020 [retrieved on Apr. 25, 2024]. Retrieved from the Internet: <URL: https://twitter.com/kitasenjudesign/status/1282665402812608513>, 1 page.

Light Manager, Available online at: https://manual.keyshot.com/manual/lighting/lighting-manager/, [retrieved on Jun. 9, 2023], 3 pages.

MagicaVoxel 0.99.5 Review, YouTube [online]. Jun. 6, 2020 [retrieved on Apr. 25, 2024]. Retrieved from the Internet: <URL: https://www.youtube.com/watch?v=WPPFnHQWwFk>, 2 pages.

Non-Final Office Action received for U.S. Appl. No. 17/469,788, mailed on Mar. 2, 2023, 22 pages.

Non-Final Office Action received for U.S. Appl. No. 17/469,788, mailed on Mar. 21, 2024, 24 pages.

Non-Final Office Action received for U.S. Appl. No. 17/807,226, mailed on Jun. 26, 2023, 21 pages.

Non-Final Office Action received for U.S. Appl. No. 17/812,965, mailed on Jun. 8, 2023, 8 pages.

Non-Final Office Action received for U.S. Appl. No. 17/814,455, mailed on Feb. 16, 2024, 24 pages.

Non-Final Office Action received for U.S. Appl. No. 17/814,462, mailed on Feb. 1, 2024, 30 pages.

Non-Final Office Action received for U.S. Appl. No. 17/905,483, mailed on Mar. 27, 2024, 16 pages.

Non-Final Office Action received for U.S. Appl. No. 18/317,893, mailed on Apr. 25, 2024, 18 pages.

Notice of Allowance received for U.S. Appl. No. 17/469,788, mailed on Oct. 15, 2024, 7 pages.

Notice of Allowance received for U.S. Appl. No. 17/807,226, mailed on Jul. 3, 2024, 9 pages.

Notice of Allowance received for U.S. Appl. No. 17/807,236, mailed on Feb. 5, 2024, 13 pages.

Notice of Allowance received for U.S. Appl. No. 17/807,236, mailed on Jul. 10, 2024, 9 pages.

Notice of Allowance received for U.S. Appl. No. 17/812,965, mailed on Jul. 26, 2024, 6 pages.

Notice of Allowance received for U.S. Appl. No. 17/812,965, mailed on Nov. 15, 2024, 6 pages.

Notice of Allowance received for U.S. Appl. No. 17/814,455, mailed on Oct. 7, 2024, 10 pages.

Notice of Allowance received for U.S. Appl. No. 18/317,893, mailed on Mar. 6, 2024, 8 pages.

Notice of Allowance received for U.S. Appl. No. 18/317,893, mailed on Nov. 22, 2023, 9 pages.

Notice of Allowance received for U.S. Appl. No. 18/473,180, mailed on Aug. 22, 2024, 13 pages.

(56) References Cited

OTHER PUBLICATIONS

Open Source Voxel Editor for Windows, Mac, Linux, iOS, and Android, GOXEL [online]. 2019 [retrieved on Apr. 25, 2024]. Retrieved from the Internet: <URL: https://goxel.xyz/>, 3 pages.
Revopoint POP 2: Handheld 3D Scanner, REVOPOINT [online]. 2022 [retrieved on Apr. 25, 2024]. Retrieved from the Internet: <URL: https://global.revopoint3d.com/products/face-3d-scanner-pop2?_ga=2.182721893.277596832.1650264227-586470518.1640327512&ref=dh0L07OOzRuqo&utm_campaign=pop2_banner&utm_medium=referral&utm_source=Official_Website>, 16 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
ShareVOX—Create Voxel Art Together in AR | with Google, PHORIA [online]. 2018 [retrieved on Apr. 25, 2024]. Retrieved from the Internet: <URL: https://www.phoria.com.au/projects/sharevox/>, 2 pages.
VoxEdit Beta Tutorial—Introduction And How To Animate Voxel Creations, YouTube [online]. Jan. 15, 2021 [retrieved on Apr. 25, 2024]. Retrieved from the Internet: <URL: https://www.youtube.com/watch?v=fqcArJWtyqM>, 2 pages.
Voxel World Lens, Snapchat [online]. [retrieved on Apr. 25, 2024]. Retrieved from the Internet: <URL: https://www.snapchat.com/lens/689751dd6a7d446280d903d15d79f104?locale=en-US>, 1 page.
Rossiev, Denis. "Voxelize: making a real-time AR voxel scanner with export on Snapchat", Denis Rossiev [online]. Jan. 31, 2023 [retrieved on Apr. 25, 2024]. Retrieved from the Internet: <URL: https://www.rossiev.pro/voxelize/>, 16 pages.
CAS and Chary XR, Oculus Go & Your Phone As 2nd Controller !! —An Inexpensive Way To Play PC VR Games, posted on Mar. 8, 2019, https://www.youtube.com/watch?v=i_iRVa0kemw, 2019, 4 pages.
Gamedbharat, I Want to Rotate a Object on Double Tap, Can Any One Help Me With This?, posted on Jul. 26, 2017, https://discussions.unity.com/t/i-want-to-rotate-a-object-on-double-tap-can-any-one-help-me-with-this/192010, 2017, 3 pages.
Locher, et al., Mobile Phone and Cloud—a Dream Team for 3D Reconstruction, 2016 IEEE Winter Conference on Applications of Computer Vision (WACV), 2016, pp. 1-8.
Qi, et al. "PointNet++: Deep Hierarchical Feature Learning on Point Sets in a Metric Space", Stanford University, Jun. 7, 2017. Retrieved from the Internet: <URL: https://arxiv.org/abs/1706.02413>, 14 pages.
Ro, et al., AR Pointer: Advanced Ray-Casting Interface Using Laser Pointer Metaphor for Object Manipulation in 3D Augmented Reality Environment, Applied Sciences, vol. 9, No. 3078, [retrieved on Jul. 27, 2020], Jul. 30, 2019, 18 pages.
Slambekova, Dana, Gaze and Gesture Based Object Interaction in Virtual World, [retrieved on Dec. 17, 2015]. Retrieved from the Internet: <URL:https://www.cs.rit.edu/~dxs4659/Report.pdf>, May 31, 2012, 54 pages.
Strand, Robin. "Surface skeletons in grids with non-cubic voxels", Proceedings of the 17th International Conference on Pattern Recognition, 2004, vol. 1, pp. 548-551. Retrieved from the Internet: <URL: https://www.researchgate.net/publication/4090277_Surface_skeletons_in_grids_with_non-cubic_voxels> <DOI: 10.1109/ICPR.2004.1334195>, 5 pages.
Corrected Notice of Allowance received for U.S. Appl. No. 18/119,219, mailed on Sep. 11, 2024, 2 pages.
Final Office Action received for U.S. Appl. No. 17/905,483, mailed on Jan. 8, 2025, 19 pages.
Non-Final Office Action received for U.S. Appl. No. 18/119,219, mailed on Mar. 28, 2024, 15 pages.
Notice of Allowability received for U.S. Appl. No. 17/814,455, mailed on Jan. 13, 2025, 7 pages.
Notice of Allowance received for U.S. Appl. No. 18/119,219, mailed on Jul. 22, 2024, 7 pages.
Notice of Allowance received for U.S. Appl. No. 18/317,893, mailed on Jan. 13, 2025, 11 pages.
Notice of Allowance received for U.S. Appl. No. 18/473,180, mailed on Jan. 2, 2025, 12 pages.

* cited by examiner

1200

```
┌─────────────────────────────────────────────────────────────────┐
│  Display, via a display generation component, a first user     │─── 1202
│  interface object in a three-dimensional environment, wherein   │
│  the first user interface object changes in appearance as a     │
│  viewpoint of a user changes relative to a location of the      │
│  first user interface object in the three-dimensional           │
│  environment                                                    │
└─────────────────────────────────────────────────────────────────┘
                              │
                              ▼
┌─────────────────────────────────────────────────────────────────┐
│  While displaying the first user interface object in the        │─── 1204
│  three-dimensional environment, detect, via the one or more     │
│  input devices, a first input corresponding to a marking input  │
│  associated with the first user interface object                │
└─────────────────────────────────────────────────────────────────┘
                              │
                              ▼
┌─────────────────────────────────────────────────────────────────┐
│  In response to detecting the first input, display, via the     │─── 1206
│  display generation component, a respective set of marks        │
│  corresponding to the first input, wherein:                     │
│   ┌───────────────────────────────────────────────────────┐    │
│   │ In accordance with a determination that the first     │─── 1208
│   │ input is made in a first context, the respective set  │    │
│   │ of marks is contained within a first plane associated │    │
│   │ with the first user interface object                  │    │
│   └───────────────────────────────────────────────────────┘    │
│   ┌───────────────────────────────────────────────────────┐    │
│   │ In accordance with a determination that the first     │─── 1210
│   │ input is made in a second context, the respective set │    │
│   │ of marks extends out of the first plane associated    │    │
│   │ with the first user interface object                  │    │
│   └───────────────────────────────────────────────────────┘    │
└─────────────────────────────────────────────────────────────────┘
                              │
                              ▼
                             (A)
```

FIG. 12A

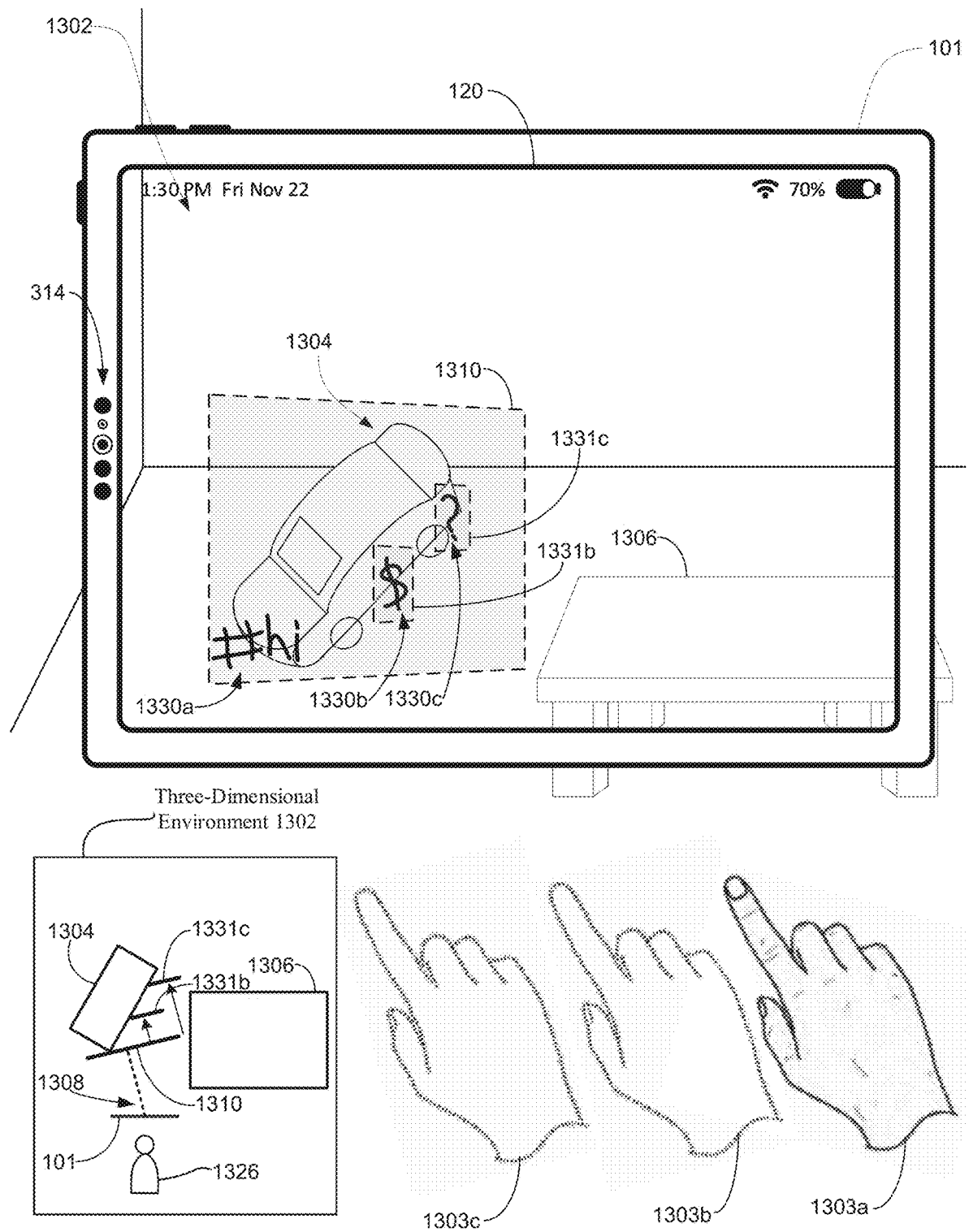

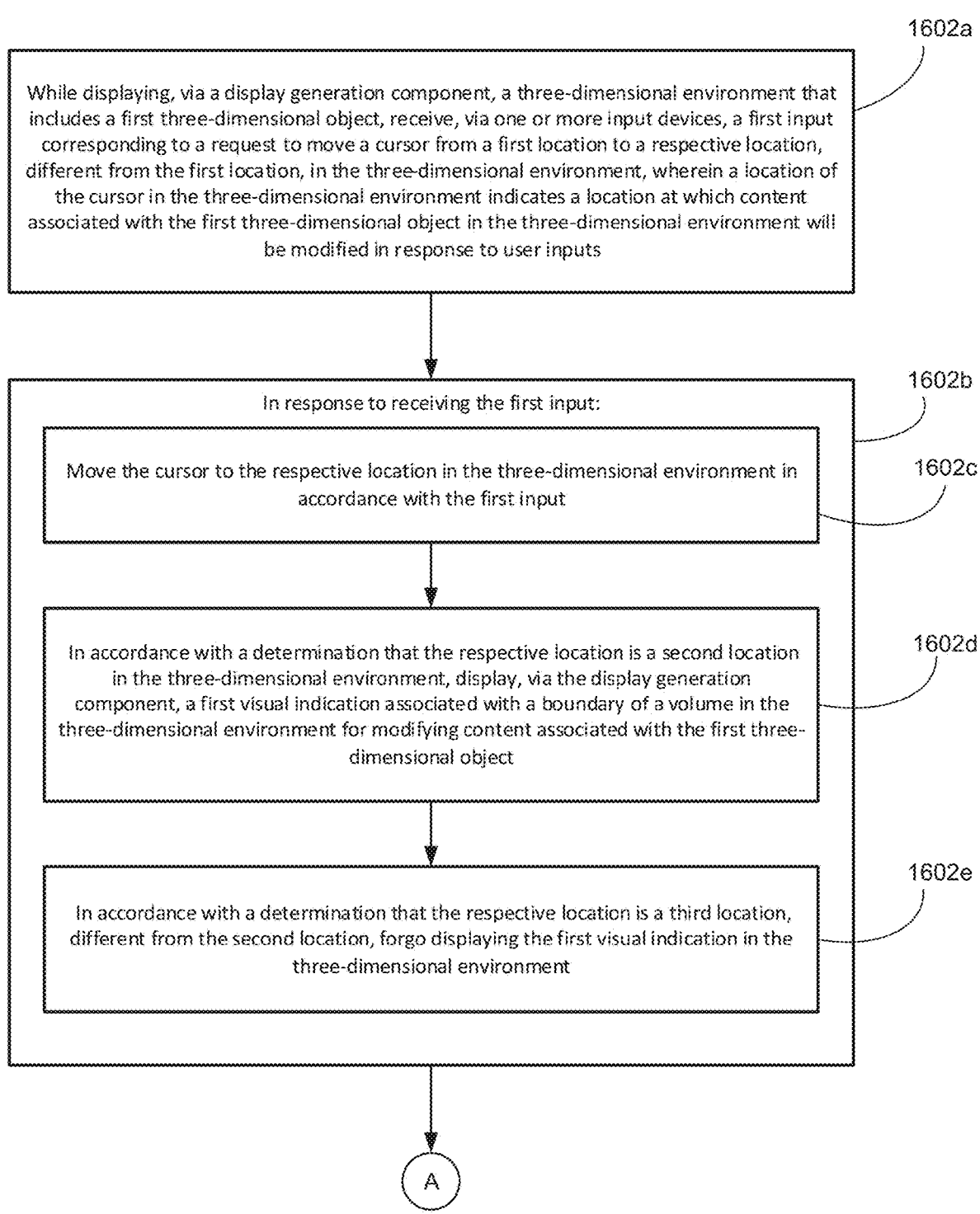

METHODS FOR MANIPULATING OBJECTS IN AN ENVIRONMENT

CROSS-REFERENCE TO RELATED APPLICATIONS

This application claims the benefit of U.S. Provisional Application No. 63/164,470, filed Mar. 22, 2021, and U.S. Provisional Application No. 63/261,665, filed Sep. 25, 2021, the contents of which are incorporated herein by reference in their entireties for all purposes.

TECHNICAL FIELD

This relates generally to computer systems with a display generation component and one or more input devices that present graphical user interfaces, including but not limited to electronic devices that present three-dimensional environments, via the display generation component, that include virtual objects.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for interacting with objects in a three-dimensional environment. Such methods and interfaces may complement or replace conventional methods for interacting with objects in a three-dimensional environment. Such methods and interfaces reduce the number, extent, and/or the nature of the inputs from a user and produce a more efficient human-machine interface.

In some embodiments, an electronic device displays virtual objects on a user interface element. In some embodiments, an electronic device displays indications of a content entry tool. In some embodiments, an electronic device provides for interactions with virtual objects in a three-dimensional environment. In some embodiments, an electronic device facilitates marking input associated with a three-dimensional object. In some embodiments, electronic device indicates a boundary of a marking canvas or volume for creating marks associated with an object in a three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 12A-12M is a flowchart illustrating a method for providing for interactions with virtual objects in a three-dimensional environment in accordance with some embodiments.

FIGS. 13A-13D illustrate examples of an electronic device facilitating marking input associated with a three-dimensional object in accordance with some embodiments.

FIGS. 16A-16G is a flowchart illustrating a method for indicating a boundary of a marking canvas or volume for creating marks associated with an object in a three-dimensional environment in accordance with some embodiments.

DESCRIPTION OF EMBODIMENTS

Figure 1:
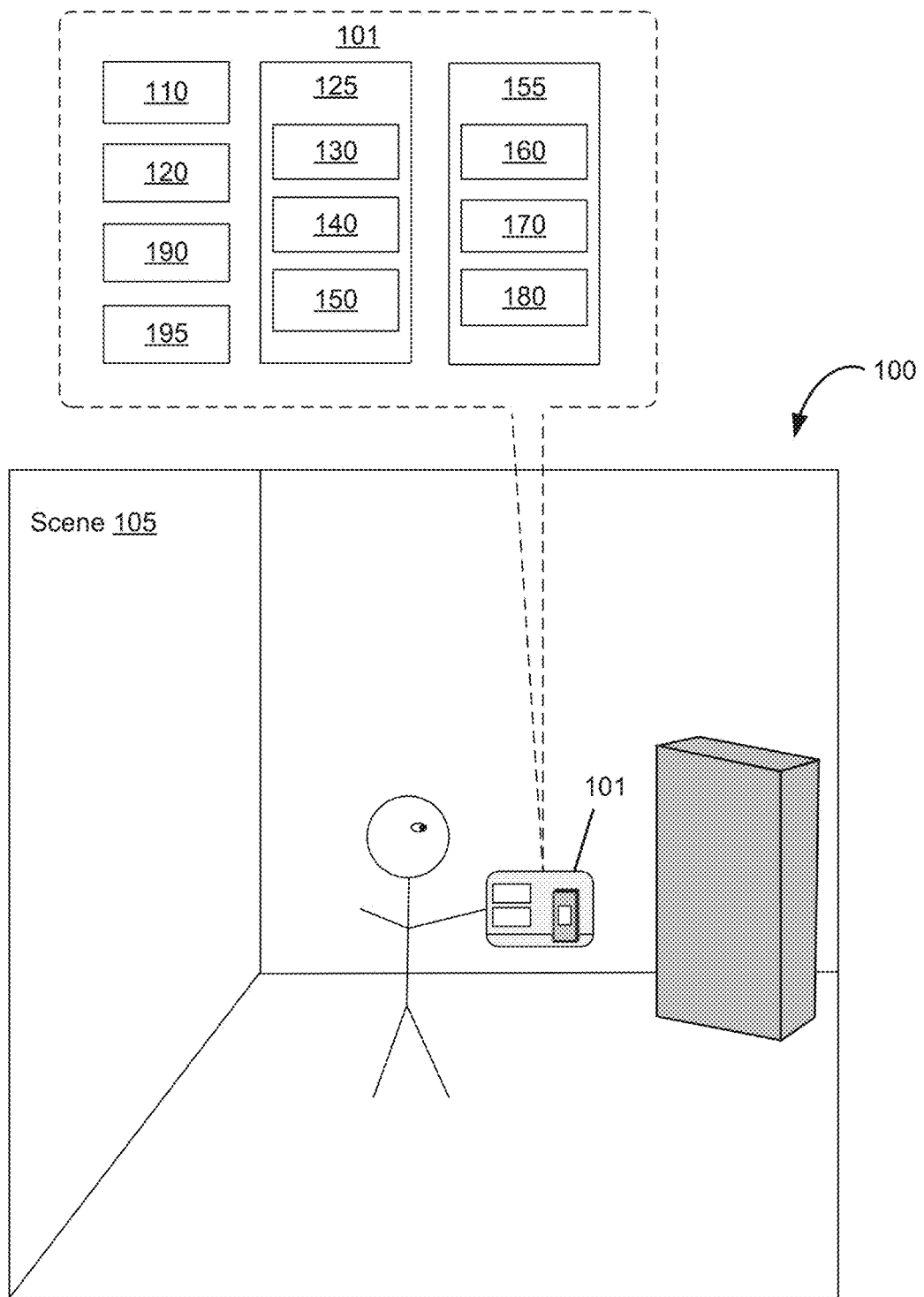
FIG. 1 is a block diagram illustrating an operating environment of a computer system for providing CGR experiences in accordance with some embodiments.

The present disclosure relates to user interfaces for providing a computer generated reality (CGR) or extended reality (XR) experience to a user, in accordance with some embodiments.

The systems, methods, and GUIs described herein provide improved ways for an electronic device to interact with and manipulate objects in a three-dimensional environment.

In some embodiments, an electronic device displays virtual objects on a user interface element. In some embodiments, one or more virtual objects are able to be placed on the user interface element. In some embodiments, virtual objects on the user interface element are able to be interacted with, manipulated, and/or removed from the user interface element.

In some embodiments, an electronic device displays indications of a content entry tool. In some embodiments, the content entry tool is displayed near the representation of the hand of the user. In some embodiments, the content entry tool indicates the currently active content entry tool that controls the visual characteristics of marks and/or drawings drawn by the user. In some embodiments, a content entry indication is displayed at the location where marks will be inserted in response to a content entry user input. In some embodiments, a plurality of content entry tools are displayed in a three-dimensional environment, which are selectable to change the currently active content entry tool to the selected content entry tool.

In some embodiments, an electronic device provides for interactions with virtual objects in a three-dimensional environment. In some embodiments, a user is able to draw marks (e.g., annotate) directed to objects in a three-dimensional object. In some embodiments, if the marks are drawn in a first context, the marks are drawn in the three-dimensional environment based on the three-dimensional position of the hand of the user. In some embodiments, if the marks are drawn in a second context, the marks are constrained to a plane that is located between the viewpoint of the user and the object to which the marks are directed.

In some embodiments, an electronic device displays a three-dimensional object in a three-dimensional environment. In some embodiments, a user is able to draw marks that are directed to the three-dimensional object. In some embodiments, the electronic device displays those marks in different regions of the three-dimensional environment depending on features of the three-dimensional object. In some embodiments, those regions are planes that are based on the viewpoint of the user when the marks are being created.

In some embodiments, an electronic device displays a three-dimensional object in a three-dimensional environment. In some embodiments, a user is able to draw marks that are directed to the three-dimensional object. In some embodiments, marks for an object can only be made within a canvas (e.g., two-dimensional or three-dimensional canvas). In some embodiments, the electronic device displays indications of one or more boundaries of the canvas based on the distance of a marking cursor from those boundaries.

FIGS. 1-6 provide a description of example computer systems for providing CGR experiences to users (such as described below with respect to methods 800, 1000, 1200, 1400 and 1600). The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) or computer-generated reality (CGR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
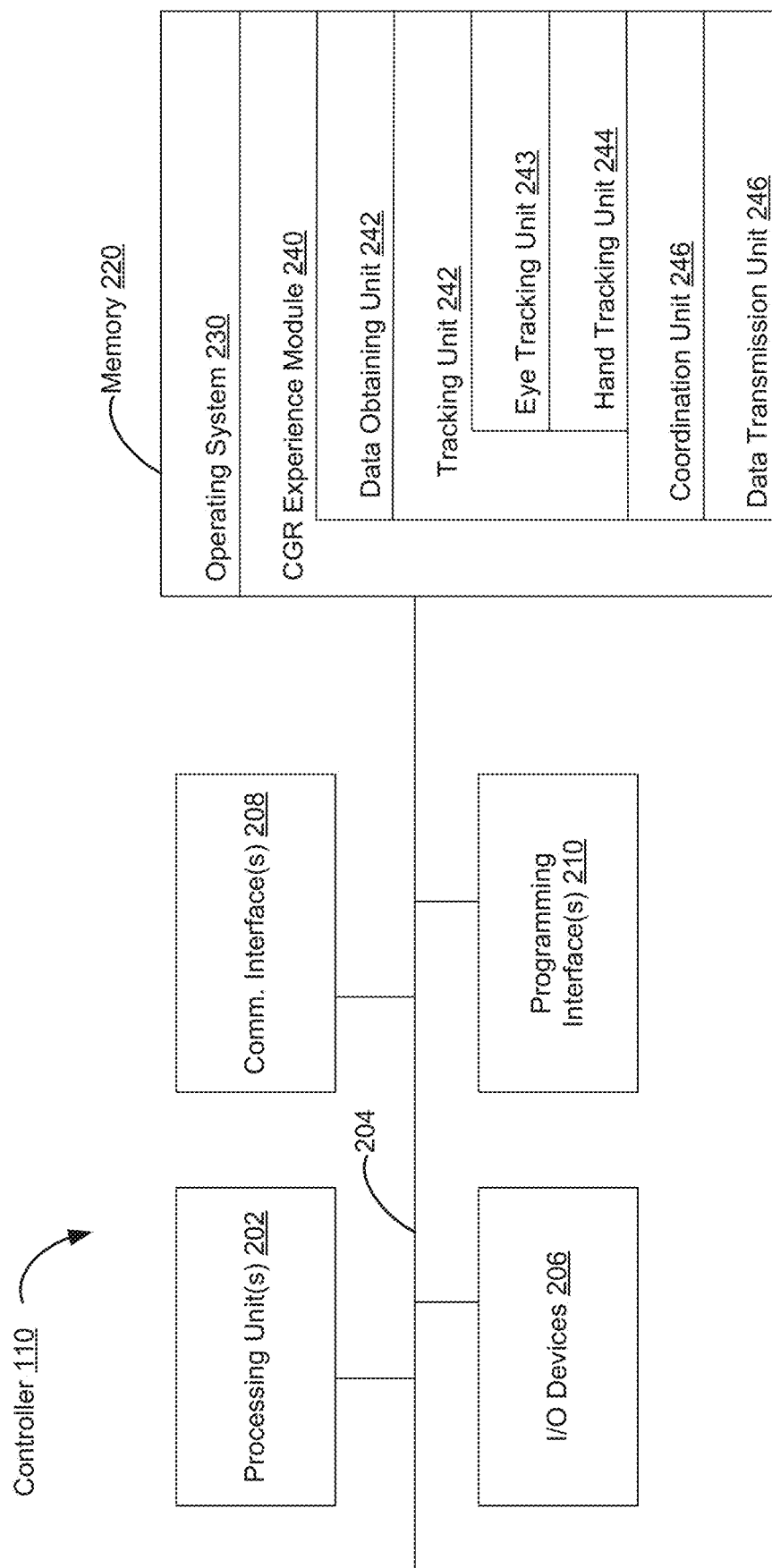
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
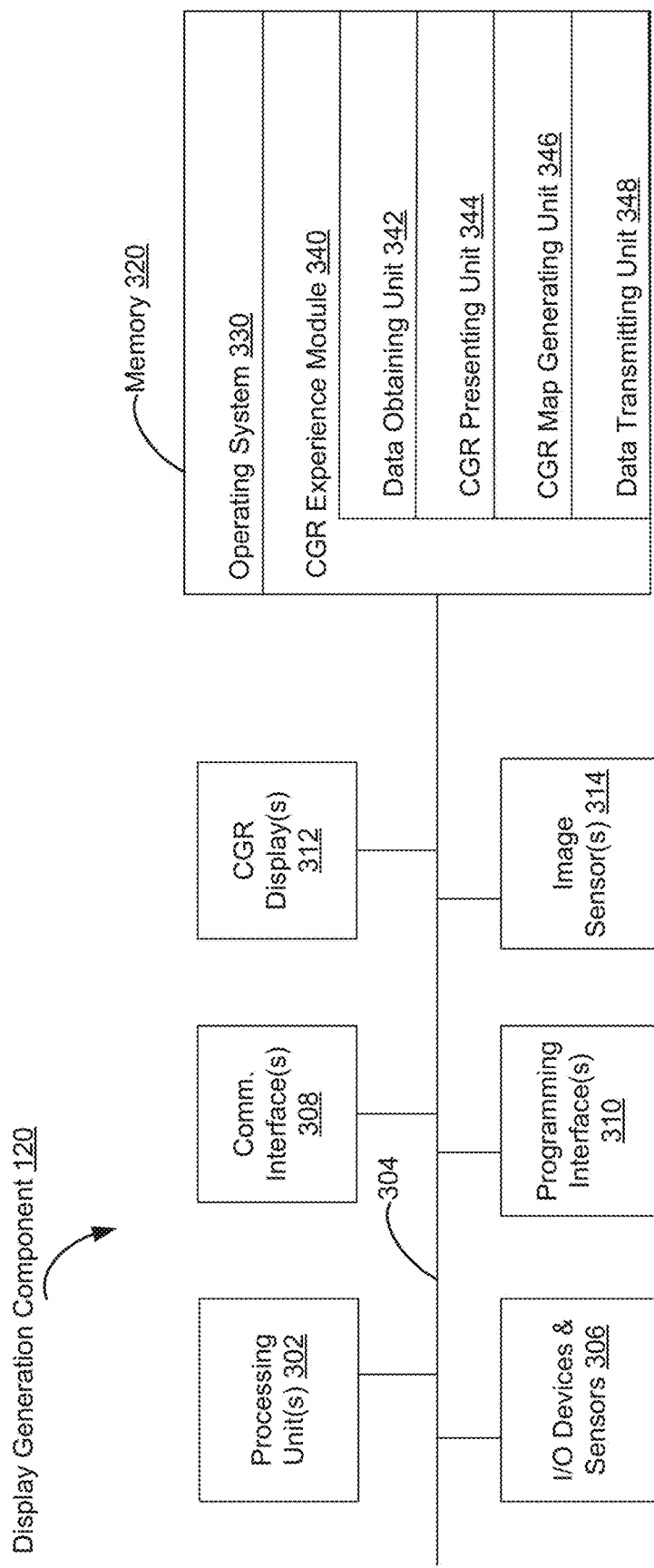
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
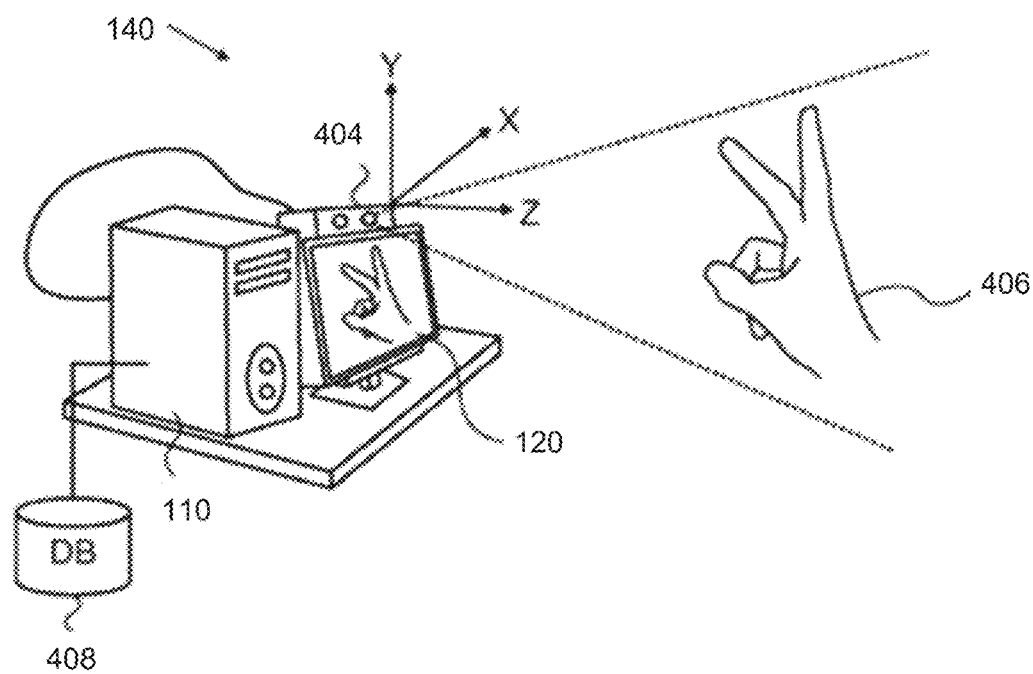
FIG. 4 is a block diagram illustrating a hand tracking unit of a computer system that is configured to capture gesture inputs of the user in accordance with some embodiments.
Figure 4:
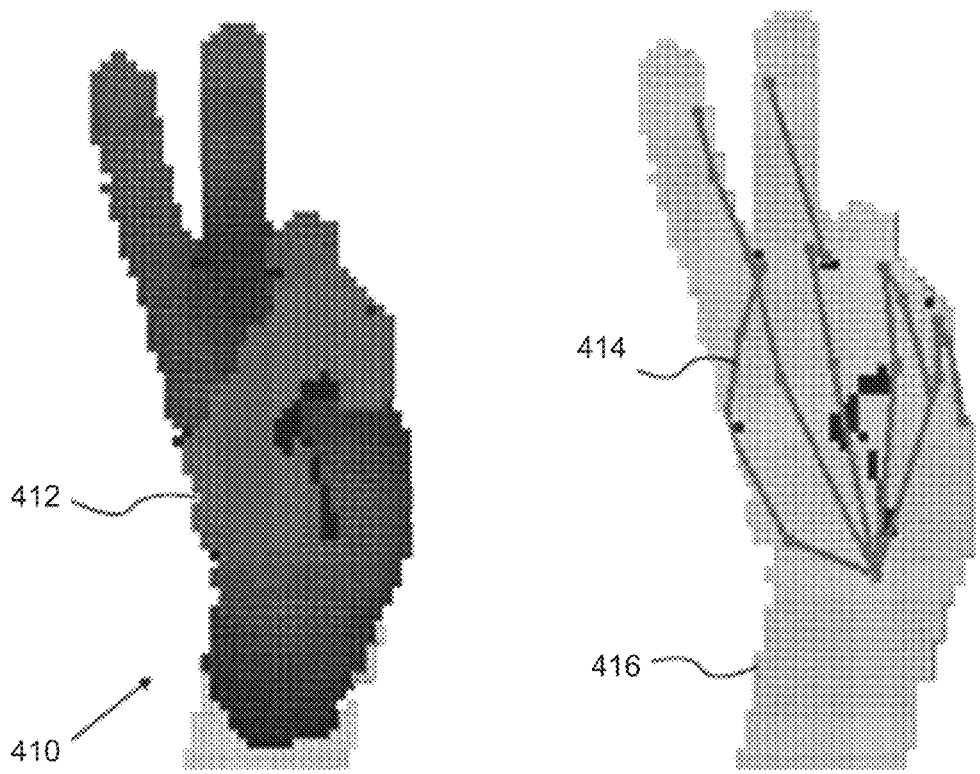

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a pre-defined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
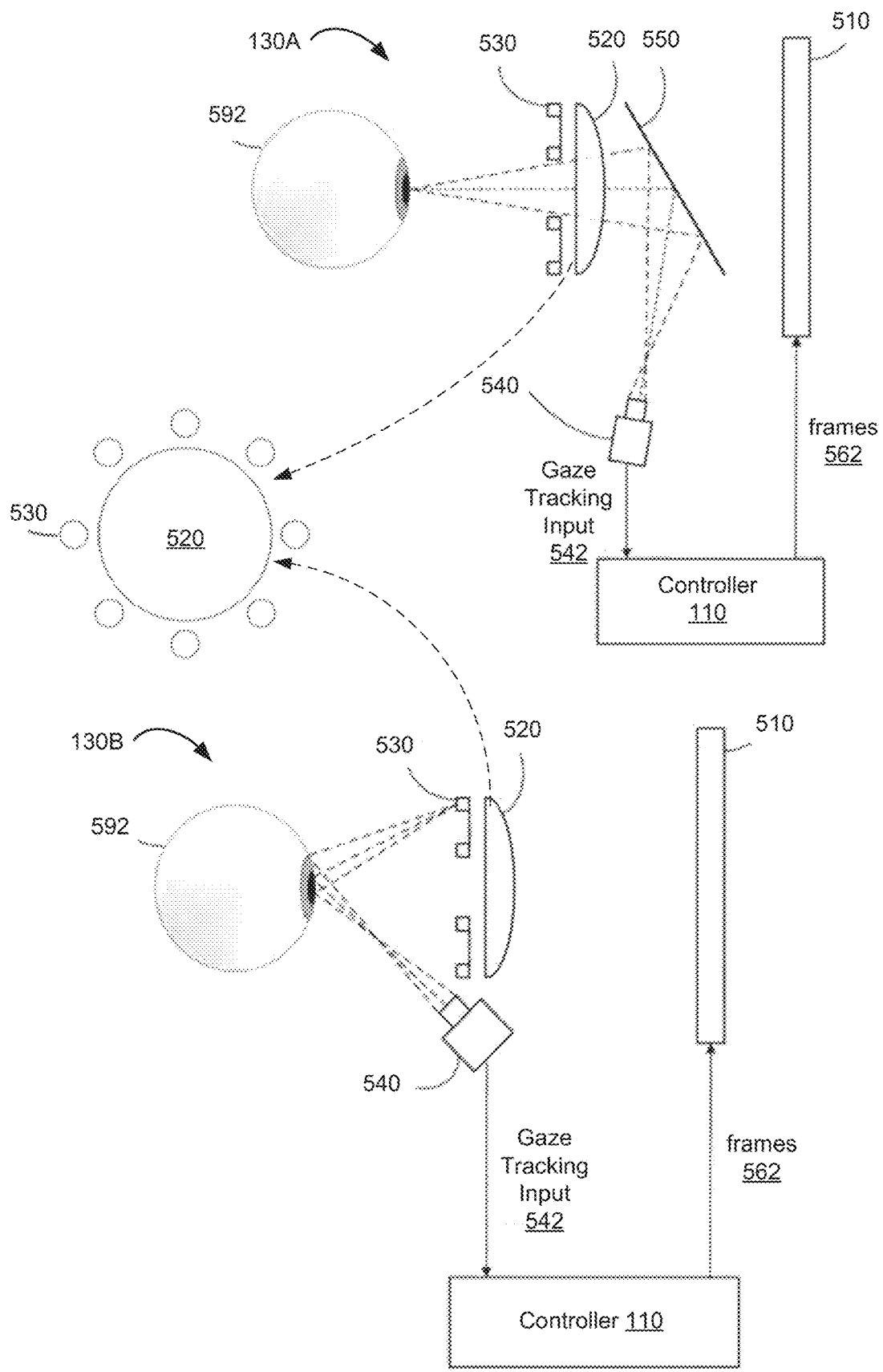
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6A:
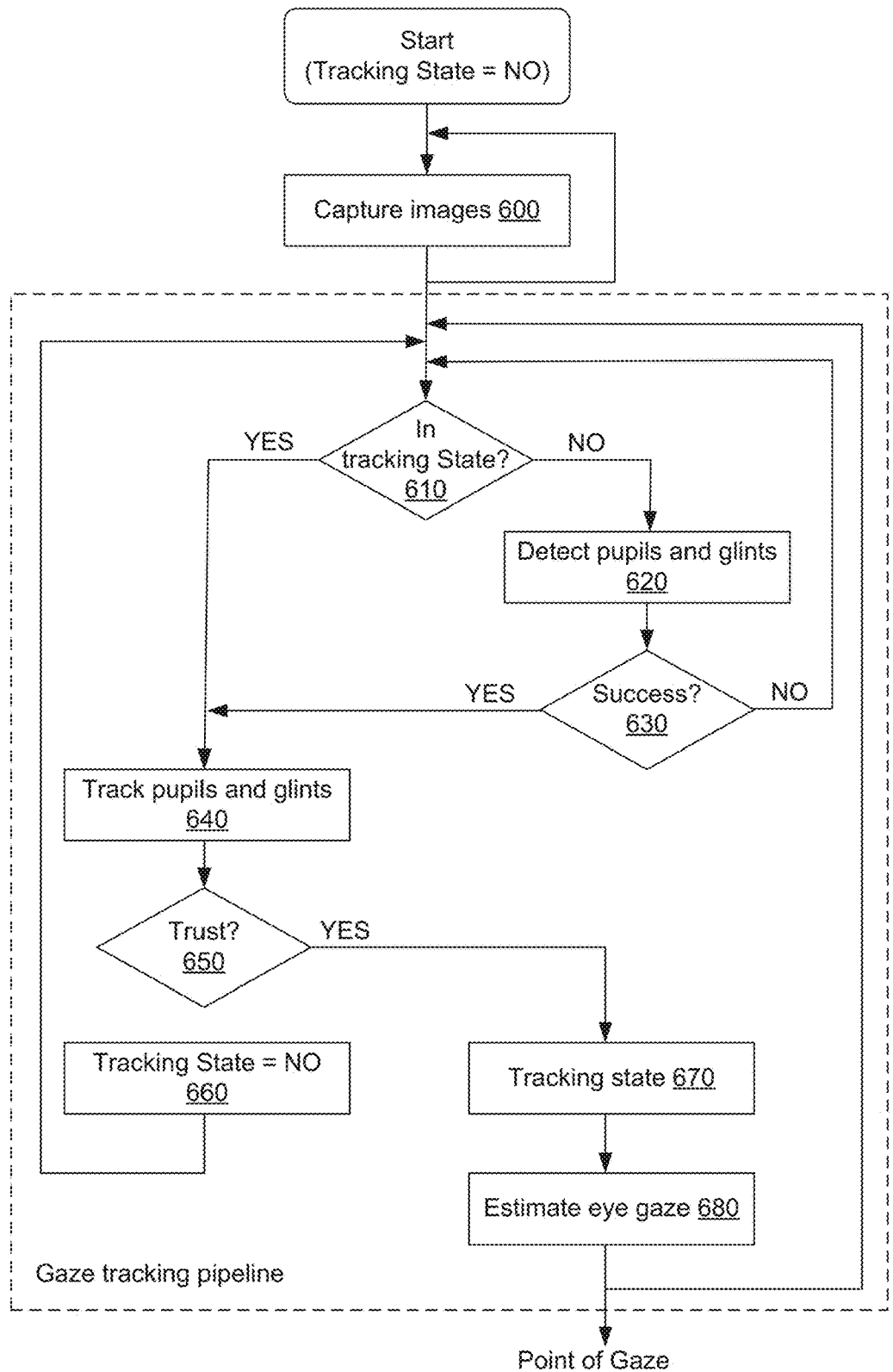
FIG. 6A is a flowchart illustrating a glint-assisted gaze tracking pipeline in accordance with some embodiments.

FIG. 6A illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6A, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6A is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Figure 6B:
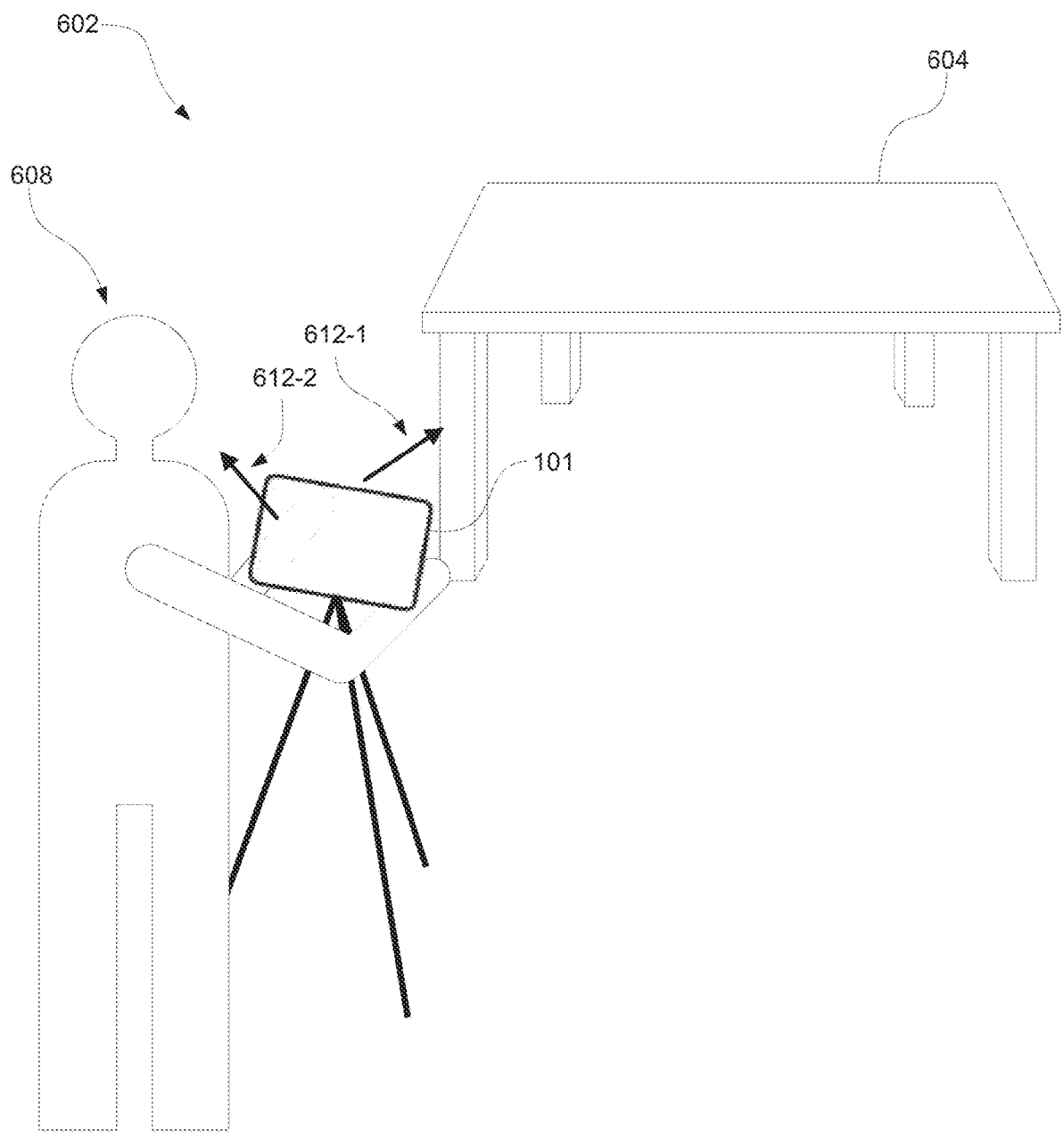
FIG. 6B illustrates an exemplary environment of an electronic device providing a CGR experience in accordance with some embodiments.

FIG. 6B illustrates an exemplary environment of an electronic device 101 providing a XR experience in accordance with some embodiments. In FIG. 6B, real world environment 602 includes electronic device 101, user 608, and a real world object (e.g., table 604). As shown in FIG. 6B, electronic device 101 is optionally mounted on a tripod or otherwise secured in real world environment 602 such that one or more hands of user 608 are free (e.g., user 608 is optionally not holding device 101 with one or more hands). As described above, device 101 optionally has one or more groups of sensors positioned on different sides of device 101. For example, device 101 optionally includes sensor group 612-1 and sensor group 612-2 located on the "back" and "front" sides of device 101, respectively (e.g., which are able to capture information from the respective sides of device 101). As used herein, the front side of device 101 is the side that is facing user 608, and the back side of device 101 is the side facing away from user 608.

In some embodiments, sensor group 612-2 includes an eye tracking unit (e.g., eye tracking unit 245 described above with reference to FIG. 2) that includes one or more sensors for tracking the eyes and/or gaze of the user such that the eye tracking unit is able to "look" at user 608 and track the eye(s) of user 608 in the manners previously described. In some embodiments, the eye tracking unit of device 101 is able to capture the movements, orientation, and/or gaze of the eyes of user 608 and treat the movements, orientation, and/or gaze as inputs.

In some embodiments, sensor group 612-1 includes a hand tracking unit (e.g., hand tracking unit 243 described above with reference to FIG. 2) that is able to track one or more hands of user 608 that are held on the "back" side of device 101, as shown in FIG. 6B. In some embodiments, the hand tracking unit is optionally included in sensor group 612-2 such that user 608 is able to additionally or alternatively hold one or more hands on the "front" side of device 101 while device 101 tracks the position of the one or more hands. As described above, the hand tracking unit of device 101 is able to capture the movements, positions, and/or gestures of the one or more hands of user 608 and treat the movements, positions, and/or gestures as inputs.

In some embodiments, sensor group 612-1 optionally includes one or more sensors configured to capture images of real world environment 602, including table 604 (e.g., such as image sensors 404 described above with reference to FIG. 4). As described above, device 101 is able to capture images of portions (e.g., some or all) of real world environment 602 and present the captured portions of real world environment 602 to the user via one or more display generation components of device 101 (e.g., the display of device 101, which is optionally located on the side of device 101 that is facing the user, opposite of the side of device 101 that is facing the captured portions of real world environment 602).

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7D illustrate examples of displaying virtual objects on a user interface element in accordance with some embodiments.

Figure 7A:
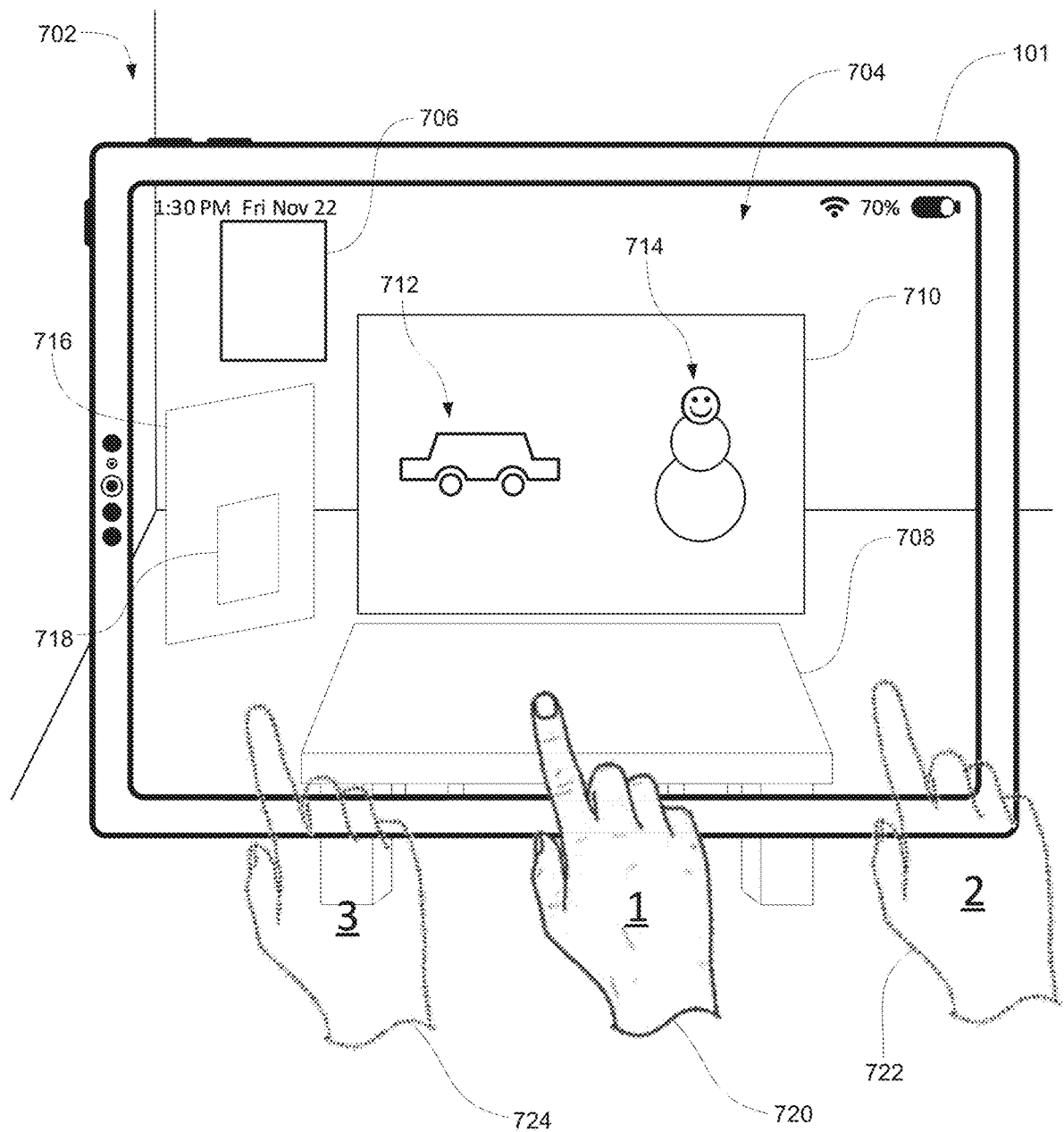
FIGS. 7A-7D illustrate examples of displaying virtual objects on a user interface element in accordance with some embodiments.

FIG. 7A illustrates an electronic device 101 displaying, via a display generation component (e.g., display generation component 120 of FIG. 1), a three-dimensional environment 704 on a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 7A, device 101 captures one or more images of the real world environment 702 around device 101 (e.g., operating environment 100), including one or more objects in the real world environment 702 around device 101. In some embodiments, device 101 displays representations of the real world environment in three-dimensional environment 704. For example, three-dimensional environment 704 includes a back corner of a room, a representation of table 708 and a representation of picture frame 706 on the back wall of the room. As shown in FIG. 7A, table 708 and picture frame 706 are real objects in real world environment 702 which have been captured by the one or more sensors of device 101, representations of which are included in three-dimensional environment 704 (e.g., photorealistic representation, simplified representation, cartoon, caricature, etc.). In some embodiments, three-dimensional environment 704 includes one or more representations of one or more hands of the user detected (e.g., captured) by the sensors of device 101.

In FIG. 7A, three-dimensional environment 704 includes visual clipboard 710 and user interface 716. In some embodiments, visual clipboard 710 and user interface 716 are virtual elements that exist in three-dimensional environment but are not physical objects in real world environment 702 (e.g., are not physical objects that are captured by the sensors of device 101 and reproduced in three-dimensional environment 704). In some embodiments, visual clipboard 710 is a user interface element on which one or more virtual objects are able to be placed, such as a virtual bulletin board, and exhibits behaviors similar to a physical bulletin board. For example, a user is able to place a virtual object onto visual clipboard 710 by dragging and dropping the virtual object onto visual clipboard 710, such as by performing a selection input (e.g., a pinch by a hand of the user directed at the virtual object) and while maintaining the selection input, moving the hand to within a threshold distance of visual clipboard 710 (e.g., pinch and drag to within 1 inch, 3 inches, 10 inches, etc. of visual clipboard 710) and releasing the selection input (e.g., releasing the pinch gesture).

In some embodiments, virtual objects on visual clipboard 710 are displayed as two-dimensional objects. For example, if a respective virtual object is a three-dimensional object (e.g., is not merely a planar object), then upon placing the respective virtual object onto visual clipboard 710, the respective virtual object is converted into a two-dimensional object (e.g., and is optionally converted back into a three-dimensional object when removed from visual clipboard 710, as will be described in further detail below).

In FIG. 7A, visual clipboard 710 includes representation 712 of a car and representation 714 of a snowman. As described above, representation 712 and representation 714 are virtual objects and have been attached to (e.g., are displayed on) visual clipboard 710 at their respective positions. As shown in FIG. 7A, representation 712 and representation 714 are planar objects attached to the front side of visual clipboard 710. In some embodiments, when representation 712 and representation 714 were attached to visual clipboard 710, representation 712 and representation 714 were automatically resized to fit onto visual clipboard 710. For example, the virtual car on which representation 712 is based was optionally an "actual size" virtual car in three-dimensional environment 704 before being attached to virtual clipboard 710. In some embodiments, in response to moving the virtual car onto and attaching the virtual car to virtual clipboard 710, the virtual car was resized to fit onto virtual clipboard 710 (e.g., resulting in representation 712 as shown in FIG. 7A). In some embodiments, while representations 712 and 714 are attached to virtual clipboard 710, representations 712 and 714 are able to be resized. For example, a user is able to select representation 712 using two hands (e.g., via a pinch gesture performed by both hands directed at representation 712) and while maintaining the selection input, moving one or both hands to increase to decrease the space between two hands to cause representation 712 to be expanded or compressed, respectively, in accordance with the change in distance between the two hands. Similarly, a user is able to rotate representation 712 by selecting representation 712 using two hands and moving one or both hands in a rotational manner (e.g., around each other, or around a central location).

In some embodiments, user interface 716 is a user interface of an application that is running on device 101 (e.g., a photos application, a browser application, etc.). In some embodiments, user interface 716 includes content and/or one or more virtual elements and/or virtual objects, such as virtual element 718. For example, a browser application optionally displays a browser user interface that is navigated to a respective web page that includes virtual elements such as text blocks, images, hyperlinks, etc. In another example, a photo application optionally displays a plurality of photos.

FIG. 7A illustrates first hand 720, second hand 722, and third hand 724 of the user interacting with device 101. In some embodiments, first hand 720, second hand 722, and third hand 724 interact with device 101 at different times. In some embodiments, first hand 720, second hand 722, and/or third hand 724 interact with device 101 at the same time (e.g., concurrently). In some embodiments, device 101 detects the interactions of the user's hand via one or more sensors of device 101. For example, a visible light camera and/or a depth sensor (e.g., alone or in combination) are able to detect the position, movement, gesture, pose, etc. of one or both hands of the user of the electronic device. In some embodiments, the device is able to determine whether the user is interacting with a physical object in real world environment 702 or with a virtual object in three-dimensional environment 704. For example, as described above, if a hand of the user reaches out and pinches (e.g., performs a gesture corresponding to a selection input) on a location in real world environment 702 that corresponds to the location of a virtual object in three-dimensional environment 704 (e.g., a virtual object is at a location in the three-dimensional environment 704 that maps to a location in real world environment 702 on which the user pinched), device 101 determines that the user is interacting with the virtual object (e.g., a direct manipulation interaction). In some embodiments, device 100 determines that the user is interacting with a virtual object if a hand of the user performs a pinch gesture while the gaze of the user is directed to the virtual object (e.g., optionally without the hand of the user pinching on a location associated with the virtual object) (e.g., an indirect manipulation interaction).

In FIG. 7A, first hand 720 is performing a selection input directed at representation 712. As discussed above, a selection input directed to representation 712 optionally includes a pinch gesture performed by first hand 720 while first hand 720 is within a threshold distance from representation 712 (e.g., within 0.1 inches, 0.5 inches, 1 inch, 5 inches, 10 inches, etc.) or optionally includes a pinch gesture performed by first hand 720 while the gaze of the user is directed to representation 712 (e.g., without requiring first hand 720 be within the threshold distance from representation 712). In FIG. 7A, second hand 722 is performing a selection input directed at representation 714 and third hand 724 is performing a selection input directed at virtual element 718. As described above, a user is able to interact with multiple items concurrently, for example, by using two hands and performing direct manipulation selection inputs on two objects (e.g., selecting one object with one hand and a second object with a second hand) and/or performing a first indirect manipulation selection input on one object with one hand (e.g., pinch) and while maintaining the selection input (e.g., pinch), performing a second indirect manipulation selection input on a second object with a second hand.

Figure 7B:
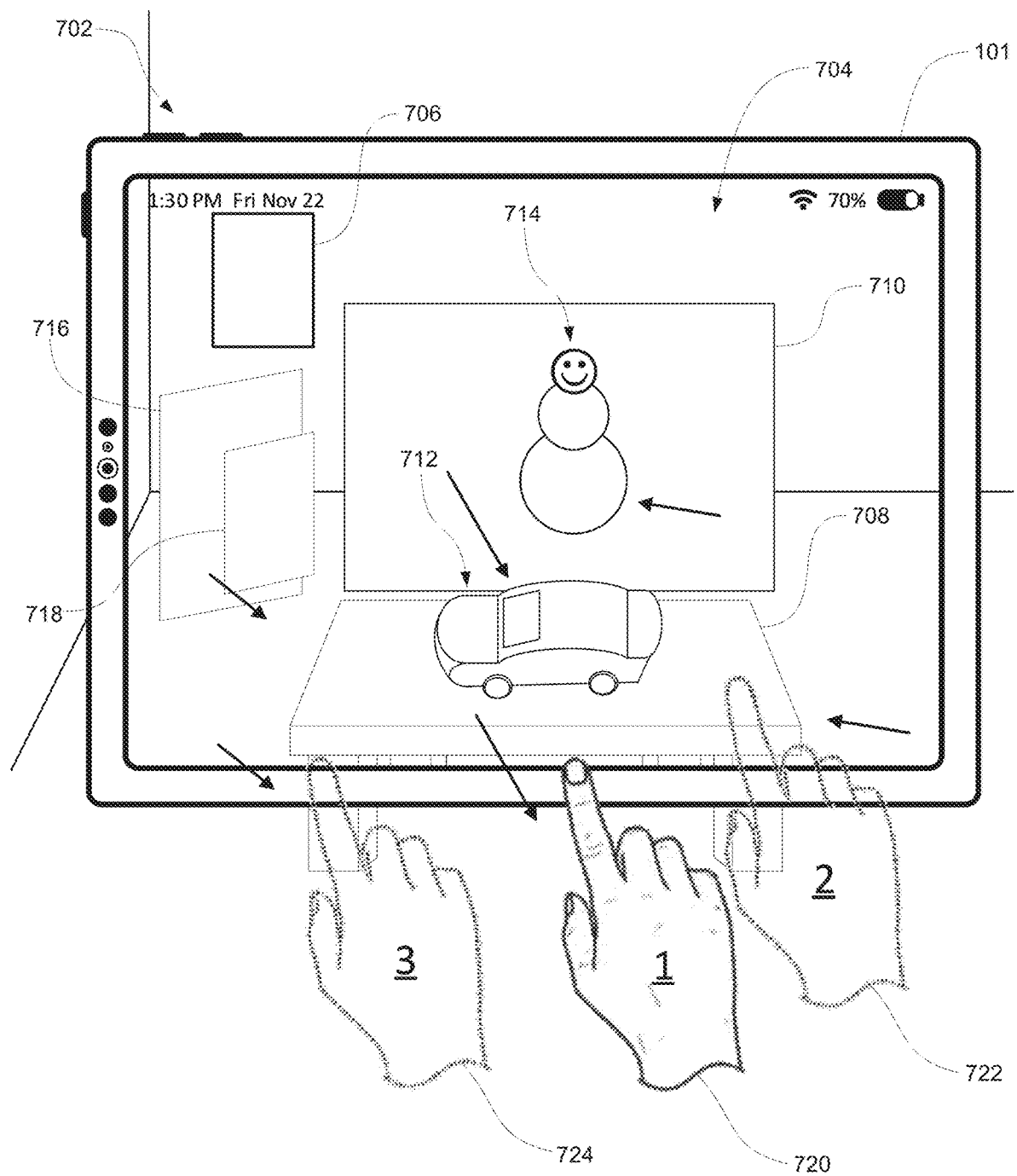

FIG. 7B illustrates the manipulation of the virtual objects in three-dimensional environment 704. For example, while maintaining the selection input (e.g., pinch gesture), first hand 720 moves outwards from visual clipboard 710 (e.g., perpendicularly outwards from the plane of visual clipboard 710 or in a direction with a movement component that is perpendicular from the plane of visual clipboard 710). In some embodiments, in response to detecting the movement of first hand 720, representation 712 of the car moves outwards from the plane of visual clipboard 710 in accordance with the movement of first hand 720. If representation 712 moves outwards from the plane of visual clipboard 710 by more than a threshold amount (e.g., more than 0.1 inches, 0.5 inches, 1 inch, 5 inches, 10 inches, etc.), then representation 712 is optionally detached (e.g., disassociated, removed, etc.) from visual clipboard 710, as shown in FIG. 7B. In some embodiments, detaching representation 712 from visual clipboard 710 allows representation 712 to be moved around three-dimensional environment 704 separate from visual clipboard 710 and allows representation 712 to be placed at locations in three-dimensional environment 704 other than on the surface of visual clipboard 710. In some embodiments, if representation 712 is a representation of a three-dimensional object, then in response to detaching representation 712 from visual clipboard 710, representation 712 is converted from a two-dimensional object to a three-dimensional object. For example, while representation 712 is attached to visual clipboard 710, representation 712 is optionally displayed as a two-dimensional (e.g., planar) object, but while representation 712 is detached from visual clipboard 710, representation 712 is optionally displayed as a three-dimensional object. In some embodiments, if representation 712 is a representation of a two-dimensional (e.g., planar) object (e.g., instead of a three-dimensional object), then representation 712 remains as a two-dimensional object when removed from visual clipboard 710.

In some embodiments, while representation 712 is detached from visual clipboard 710, representation 712 is able to be snapped to objects (e.g., representation of objects in real world environment 702 or virtual objects). For example, in FIG. 7B, in accordance with a determination that representation 712 has moved to within a threshold distance from table 708 (e.g., within 0.1 inches, 0.5 inches, 1 inch, 5 inches, 10 inches, etc.) or within a threshold distance from the top surface of table 708, representation 712 snaps to table 708, optionally in response to detecting the termination of the selection input (e.g., in response to detecting the release of the pinch gesture by first hand 720) or optionally while hand 720 is maintaining the selection input.

In some embodiments, when representation 712 is detached from visual clipboard 710, representation 712 optionally returns to the size that it had when it was added to visual clipboard 710. In some embodiments, when representation 712 is detached from visual clipboard 710, representation 712 is displayed at a 1:1 scale size (e.g., "actual" size). In some embodiments, the size of representation 712 within three-dimensional environment 704 is not necessarily the size/area of the display generation component (e.g., display screen) encompassed by representation 712. For example, representation 712 has a respective size in three-dimensional environment 704 such that it appears the same as if representation 712 were a physical car having the respective size in the user's real world environment 702. Thus, in some embodiments, the area of the display generation component encompassed by representation 712 is based on the size of representation 712 and the distance of representation 712 from the viewpoint of the user (e.g., based on the perspective effect).

In some embodiments, when representation 712 is detached from visual clipboard 710, one or more affordances are displayed in three-dimensional environment 704 that are selectable to change the size of representation 712. For example, device 101 displays an affordance to display representation 712 at a 1:1 scale (e.g., "actual" size), an affordance to display representation 712 at a 1:2 scale, an affordance to display representation 712 at a 1:4 scale, etc.

Figure 7C:
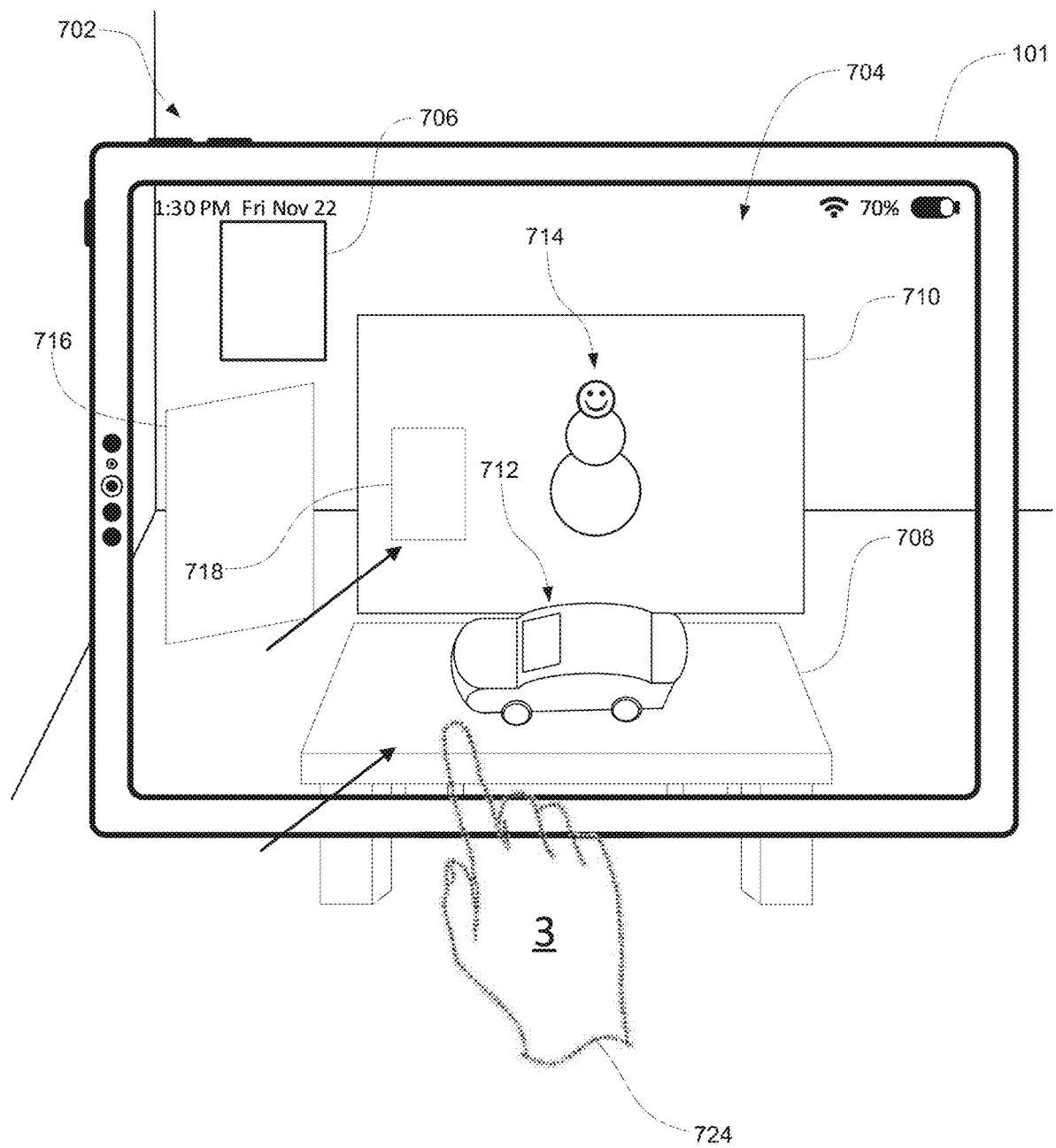

In FIG. 7B, while maintaining the selection input (e.g., pinch gesture), second hand 722 moves leftwards without moving outwards from visual clipboard 710 by the threshold amount (e.g., in a direction parallel to the plane of visual clipboard 710). In some embodiments, in response to the movement of second hand 722, representation 714 moves leftwards in accordance with the movement of second hand 722 without detaching representation 714 from visual clipboard 710. In some embodiments, in response to the selection input by second hand 722 directed at representation 714, representation 714 moves slightly outwards from the surface of visual clipboard 710 (e.g., by 0.1 inches, 0.5 inches, 1 inch, 3 inches, 10 inches, etc.) and/or is increased in size (e.g., by 10%, 20%, 50%, etc.) to indicate that representation 714 has been selected, is being moved, and/or is able to be moved in response to the movement of second hand 722. In some embodiments, representation 714 moves leftwards along the surface (e.g., parallel to the plane) of visual clipboard 710 (e.g., because representation 714 has not been detached from visual clipboard 710). In some embodiments, in response to detecting a termination of the selection gesture by hand 722, representation 714 is placed at its new location on visual clipboard 710 (e.g., the location that it had when the termination of the selection gesture was detected) and representation 714 is optionally returned to its original size (e.g., as shown in FIG. 7C). In some embodiments, the interactions with the virtual objects on visual clipboard 710 apply to objects on other user interfaces, for example, virtual element 718 on user interface 716.

In FIG. 7B, while maintaining the selection input (e.g., pinch gesture), third hand 724 moves outwards from user interface 716. As shown in FIG. 7B, user interface 716 has an orientation that is not parallel with visual clipboard 710. As a result, virtual element 718 optionally also has an orientation that is not parallel with visual clipboard 710. In response to detecting the movement of third hand 724 outwards from user interface 716, virtual element 718 moves outwards from user interface 716 in accordance with the movement of third hand 724. In some embodiments, virtual element 718 maintains the same orientation as user interface 716 when moved outwards from user interface 716, as shown in FIG. 7B.

In FIG. 7C, while maintaining the selection input (e.g., pinch gesture), third hand 724 moves towards visual clipboard 710, moving virtual element 718 to within a threshold distance from visual clipboard 710 (e.g., within 0.1 inches, 0.5 inches, 1 inch, 5 inches, 10 inches, etc.). In some embodiments, the threshold distance is the distance within which, in response to detecting the termination of the selection input, virtual element 718 is placed onto (e.g., associated with) visual clipboard 710. In some embodiments, in response to virtual element 718 moving within the threshold distance from visual clipboard 710, virtual element 718 is reoriented such that virtual element 718 is parallel (e.g., planar) with visual clipboard 710, as shown in FIG. 7C. In some embodiments, when added to visual clipboard 710, virtual element 718 displays the same or similar behavior as the virtual objects described above (e.g., representation 712 and/or representation 714). Thus, as shown in FIG. 7C, objects are able to be dragged and dropped and added to visual clipboard 710 from user interfaces of other applications. In some embodiments, representations of real world objects are able to be added to visual clipboard 710. In some embodiments, a user is able to generate a virtual object based on a real world object (e.g., for which a representation exists in three-dimensional environment 704) and add the virtual object to visual clipboard 710. For example, a user is able to select table 708 and add table 708 to visual clipboard 710, thus creating a virtual object based on table 708 and add the virtual object to visual clipboard 710. In some embodiments, the virtual object is a photorealistic model of table 708 and has a size, shape, color, and/or texture that is the same or similar to table 708. In some embodiments, as described above, upon adding the virtual object to visual clipboard 710, the virtual object is resized (e.g., scaled) to fit onto visual clipboard 710.

Figure 7D:
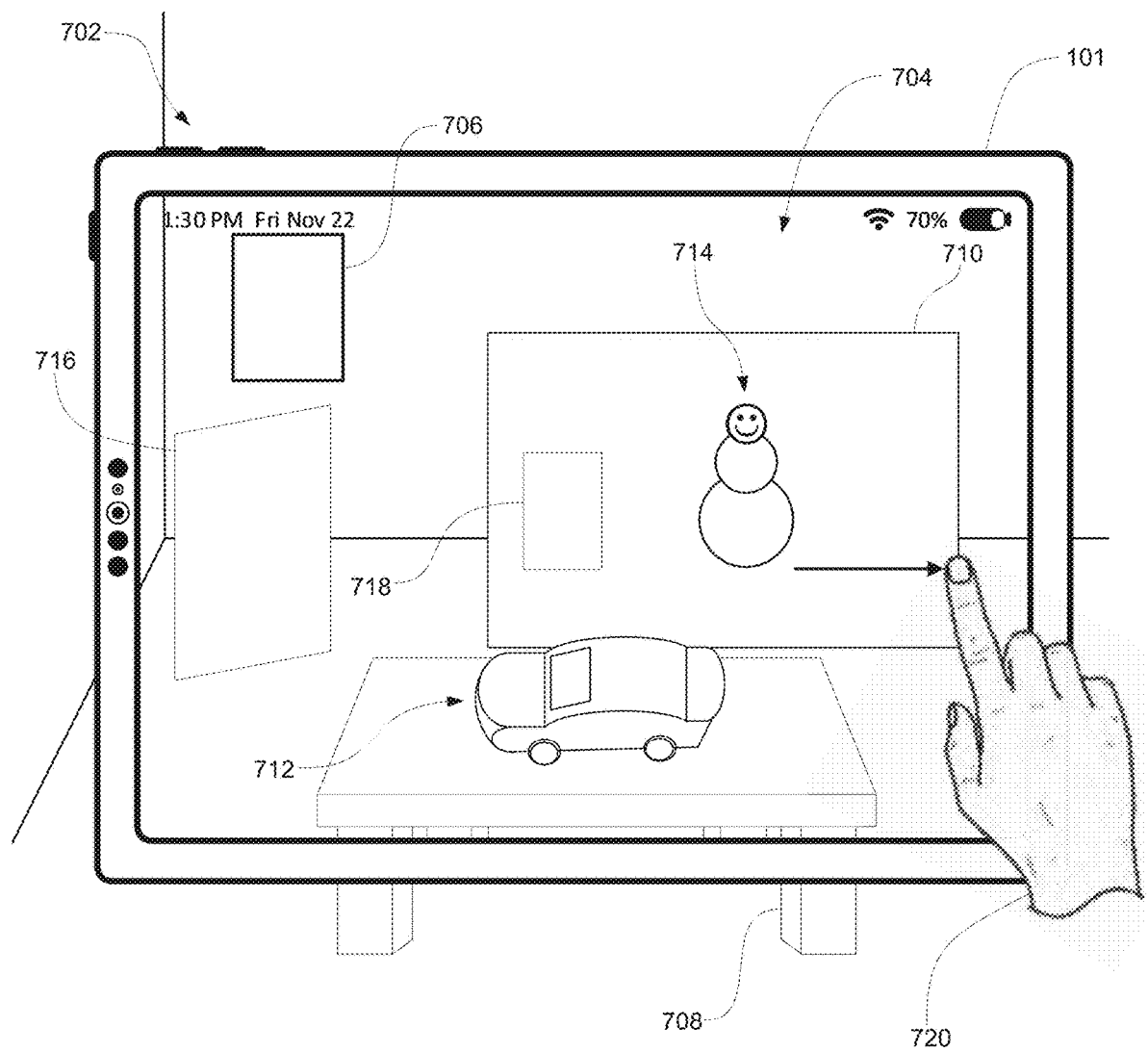
Figure 8A:
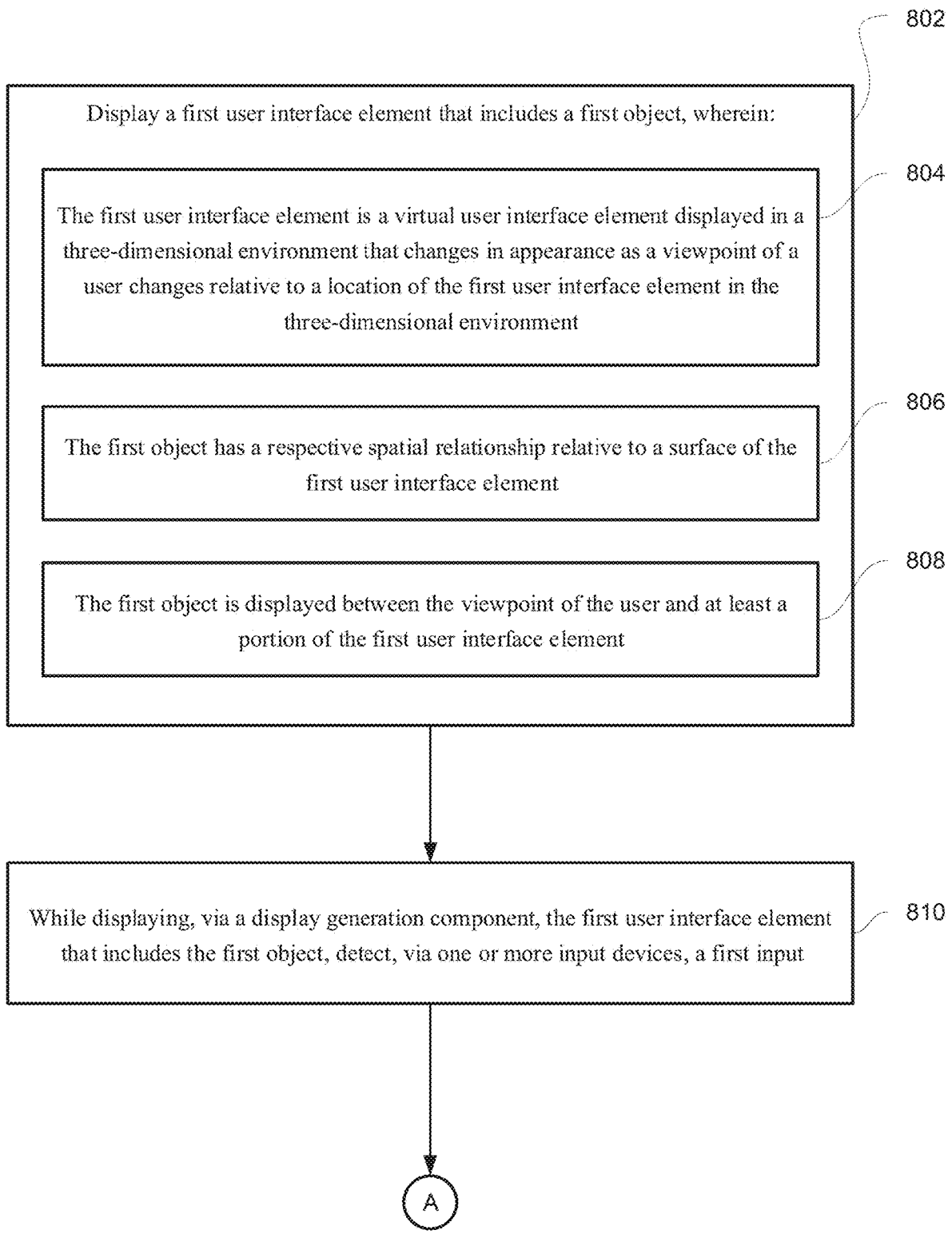
FIGS. 8A-8I and 8K-8M is a flowchart illustrating a method of displaying virtual objects on a user interface element in accordance with some embodiments.
Figure 8B:
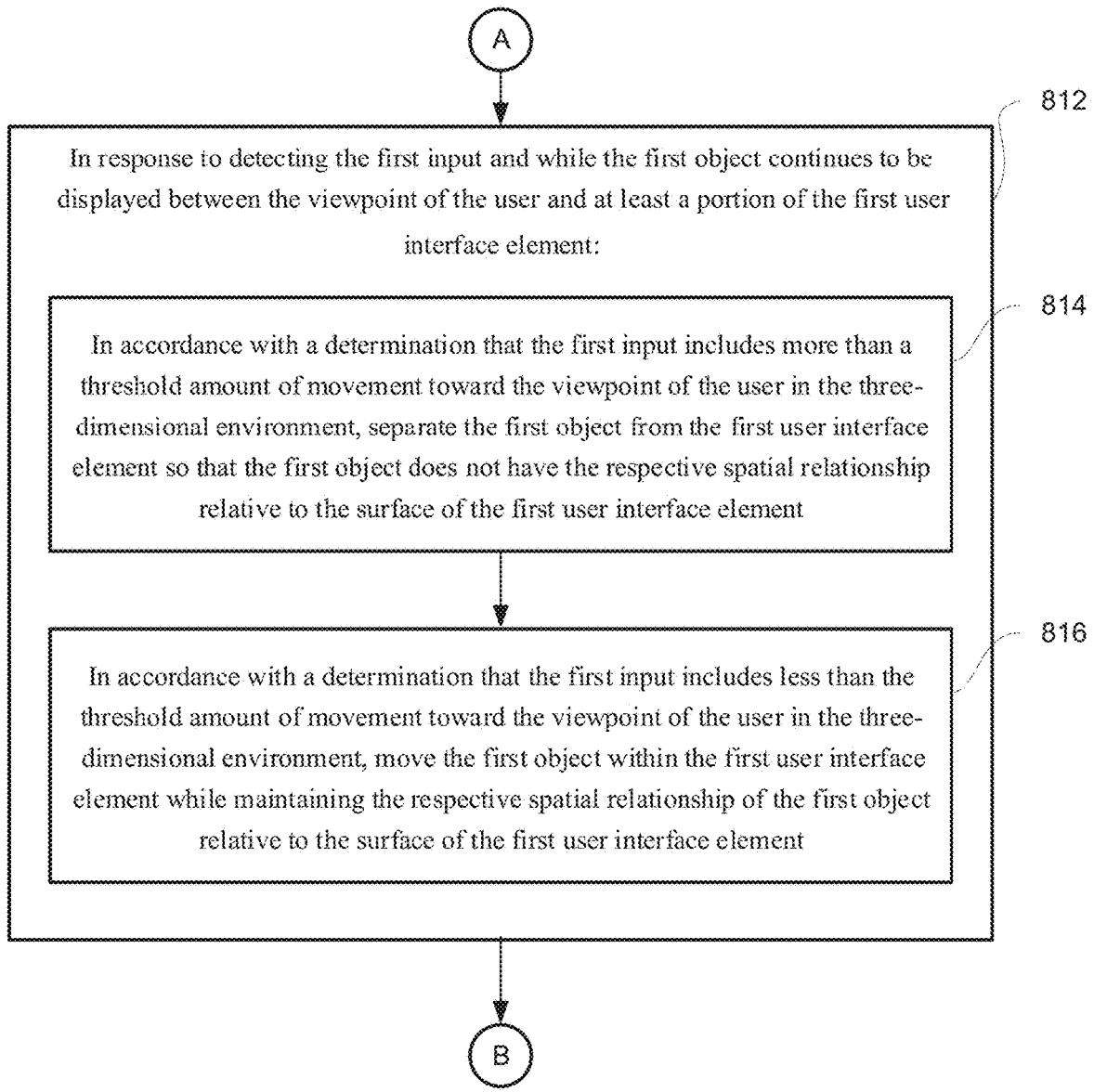
Figure 8C:
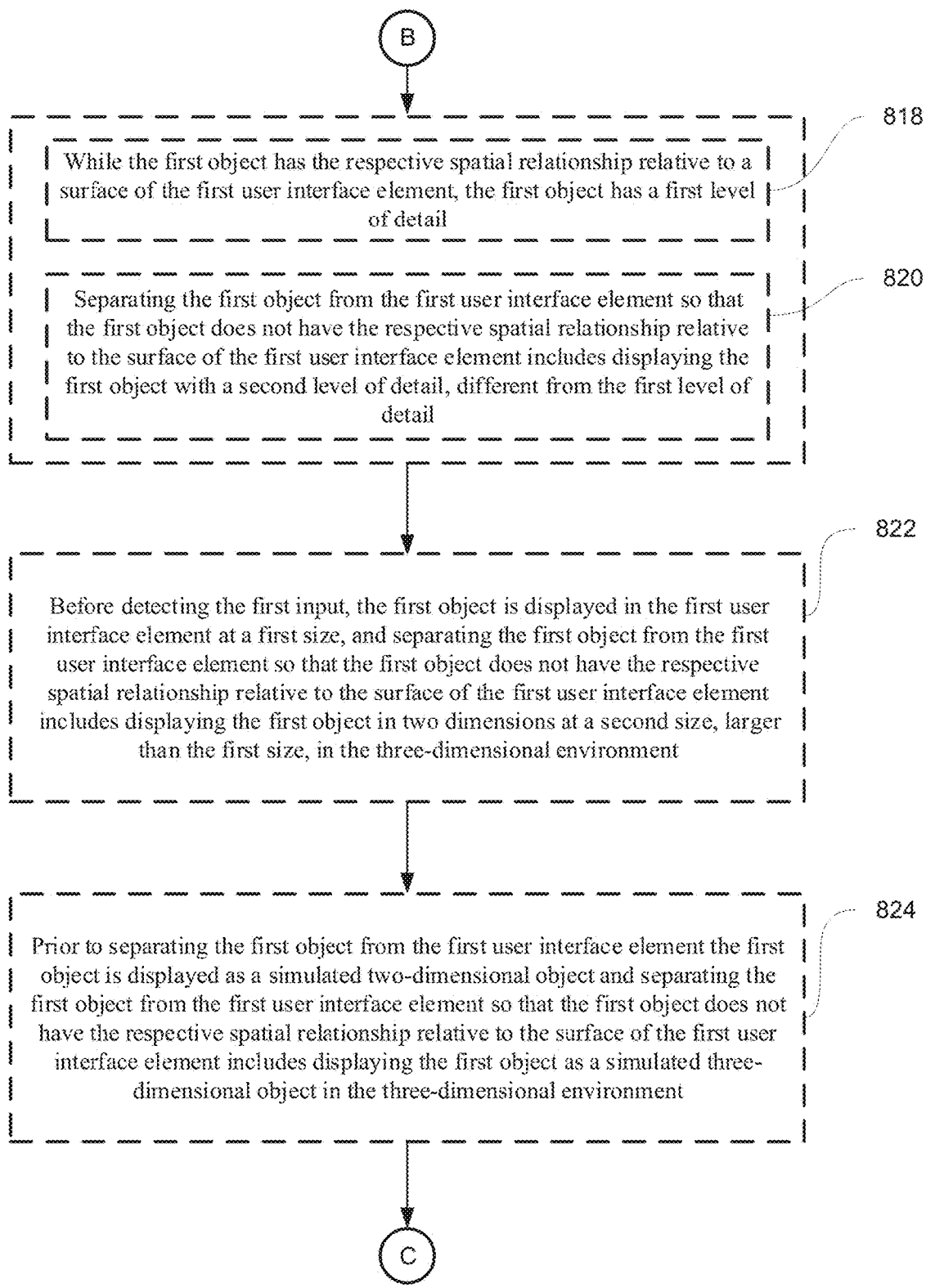
Figure 8D:
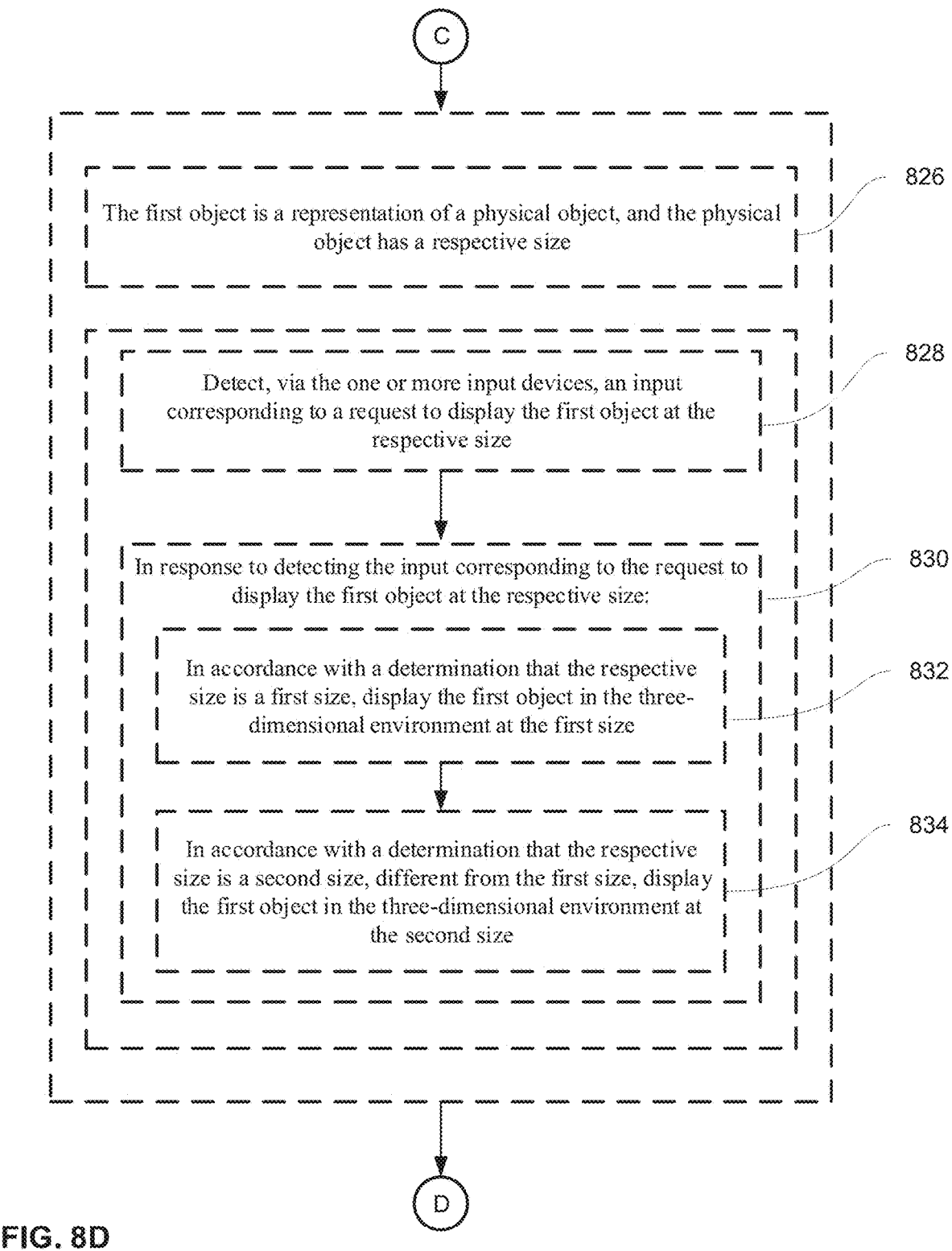
Figure 8E:
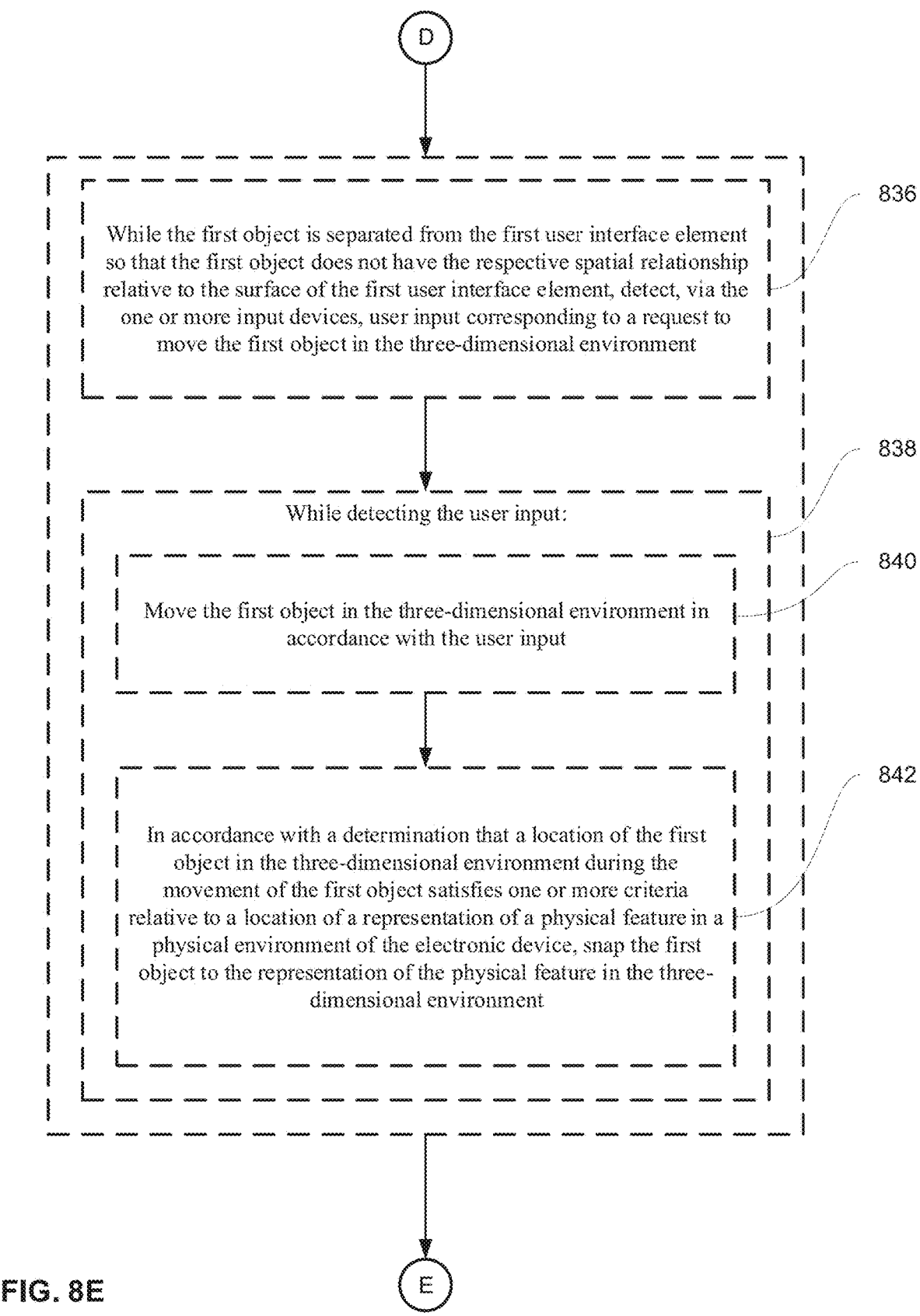
Figure 8F:
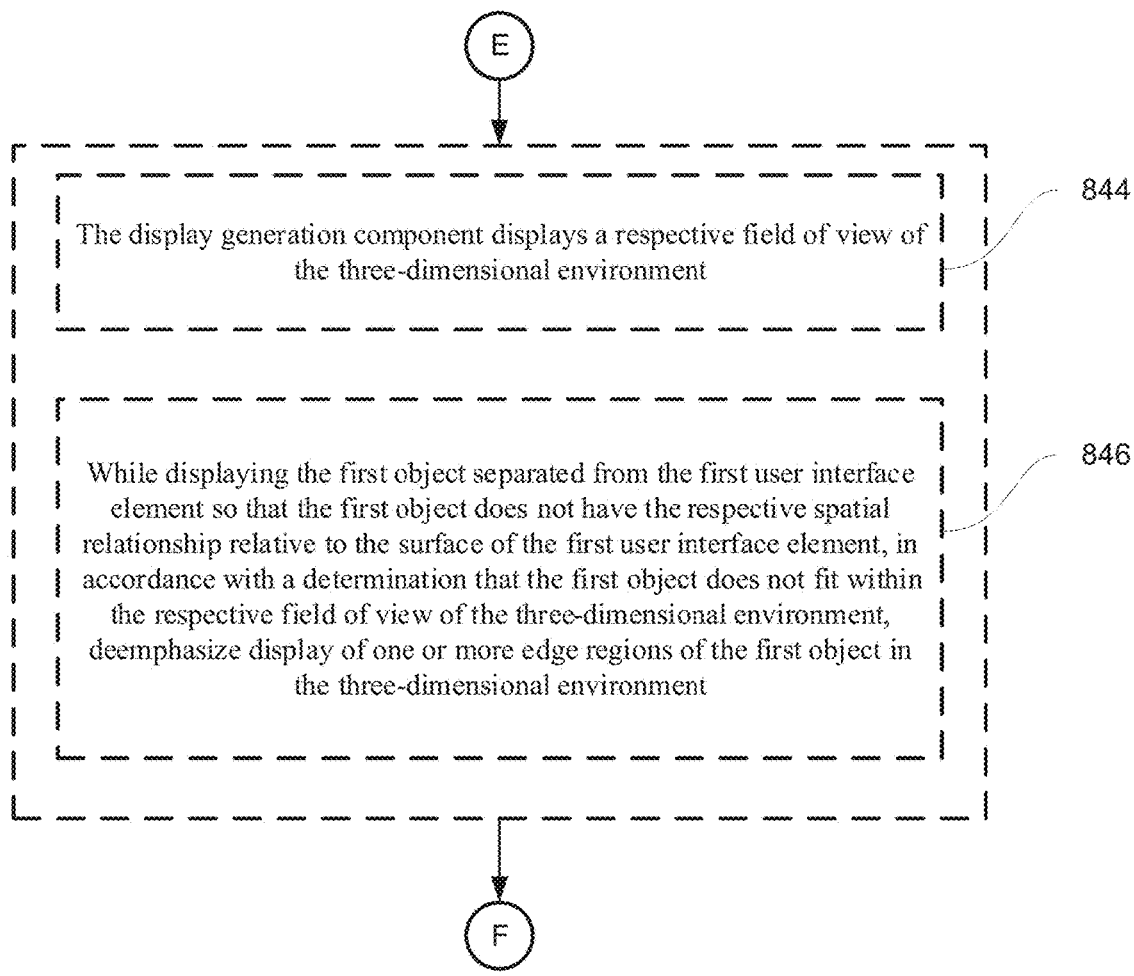
Figure 8G:
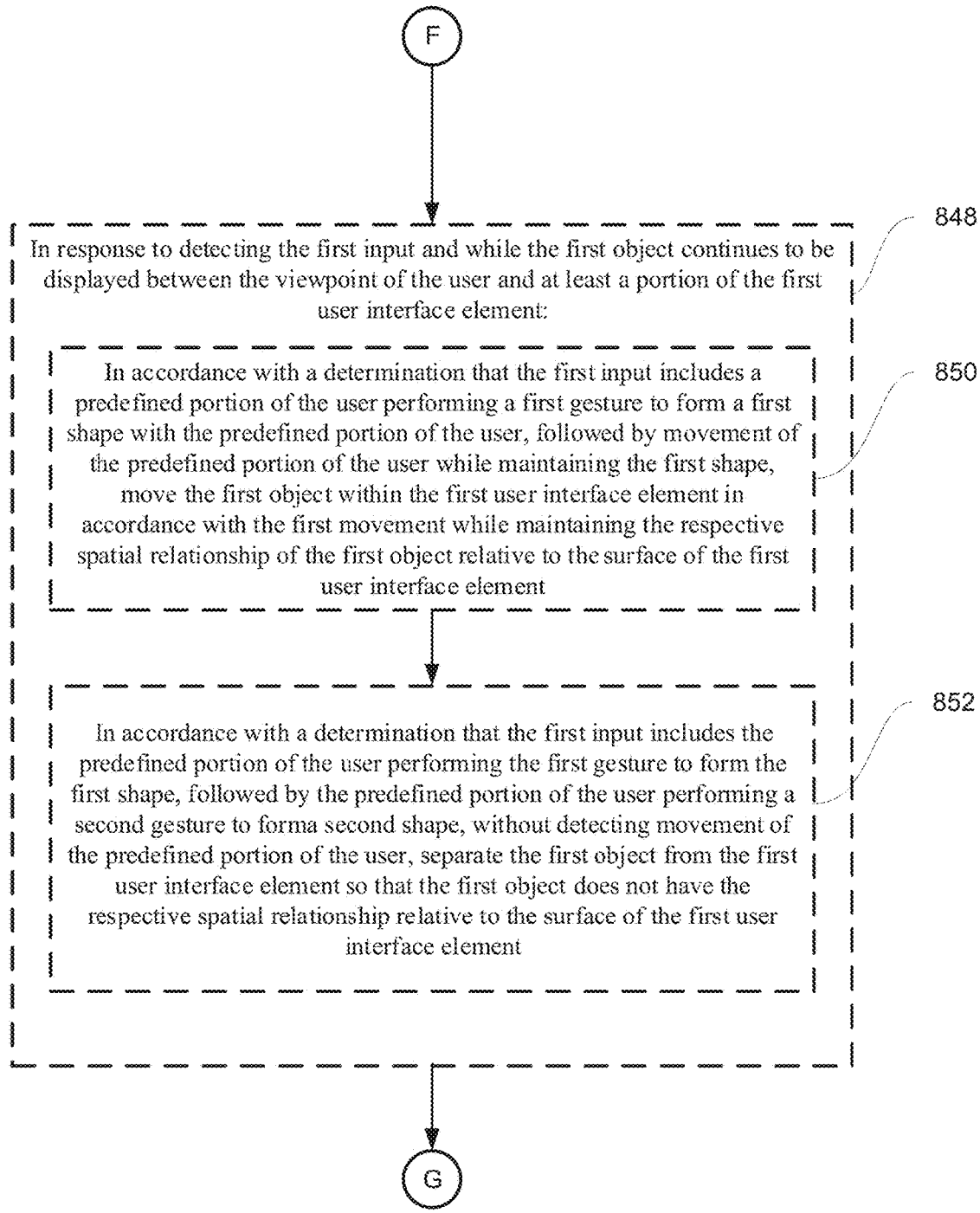
Figure 8H:
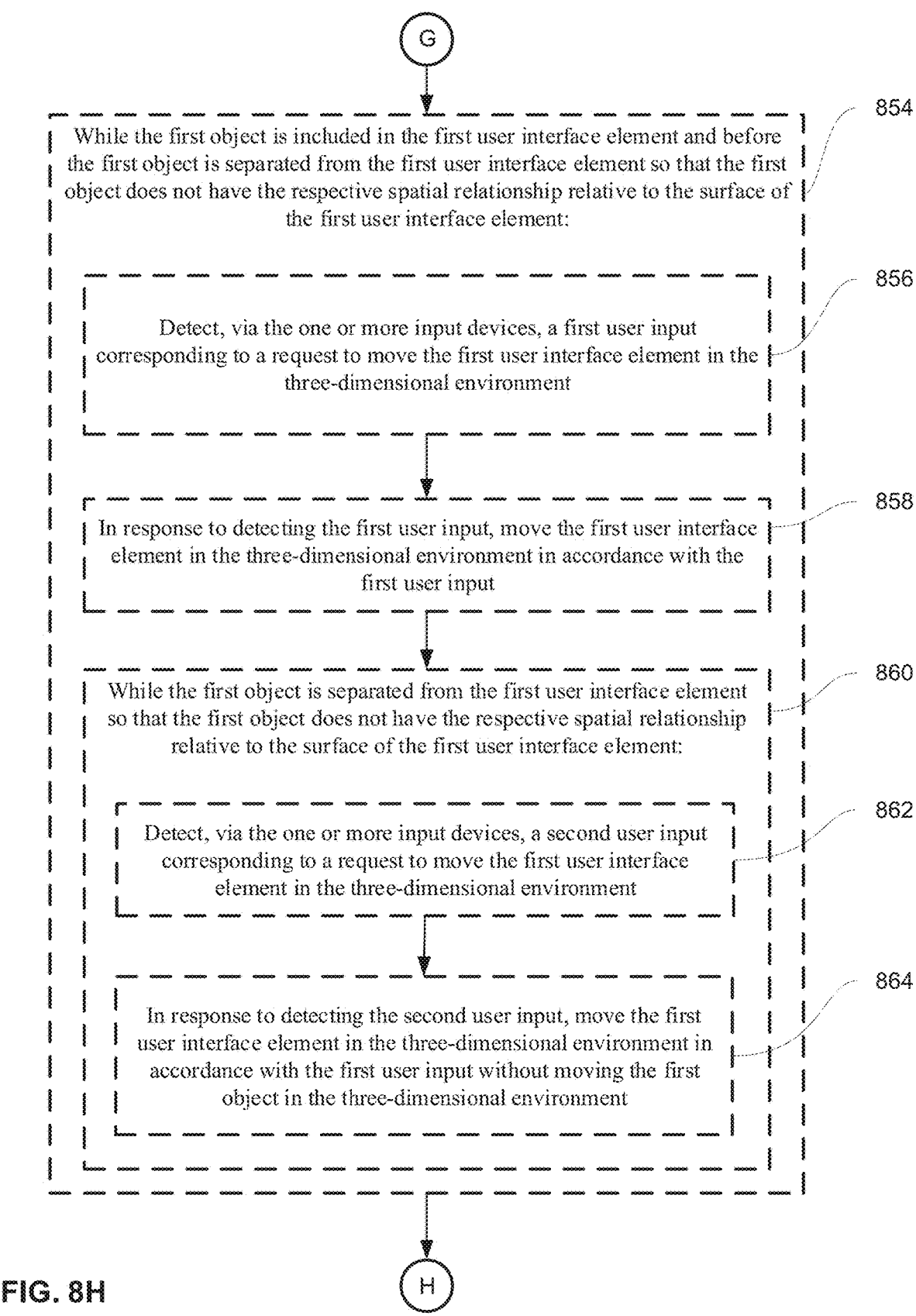
Figure 8I:
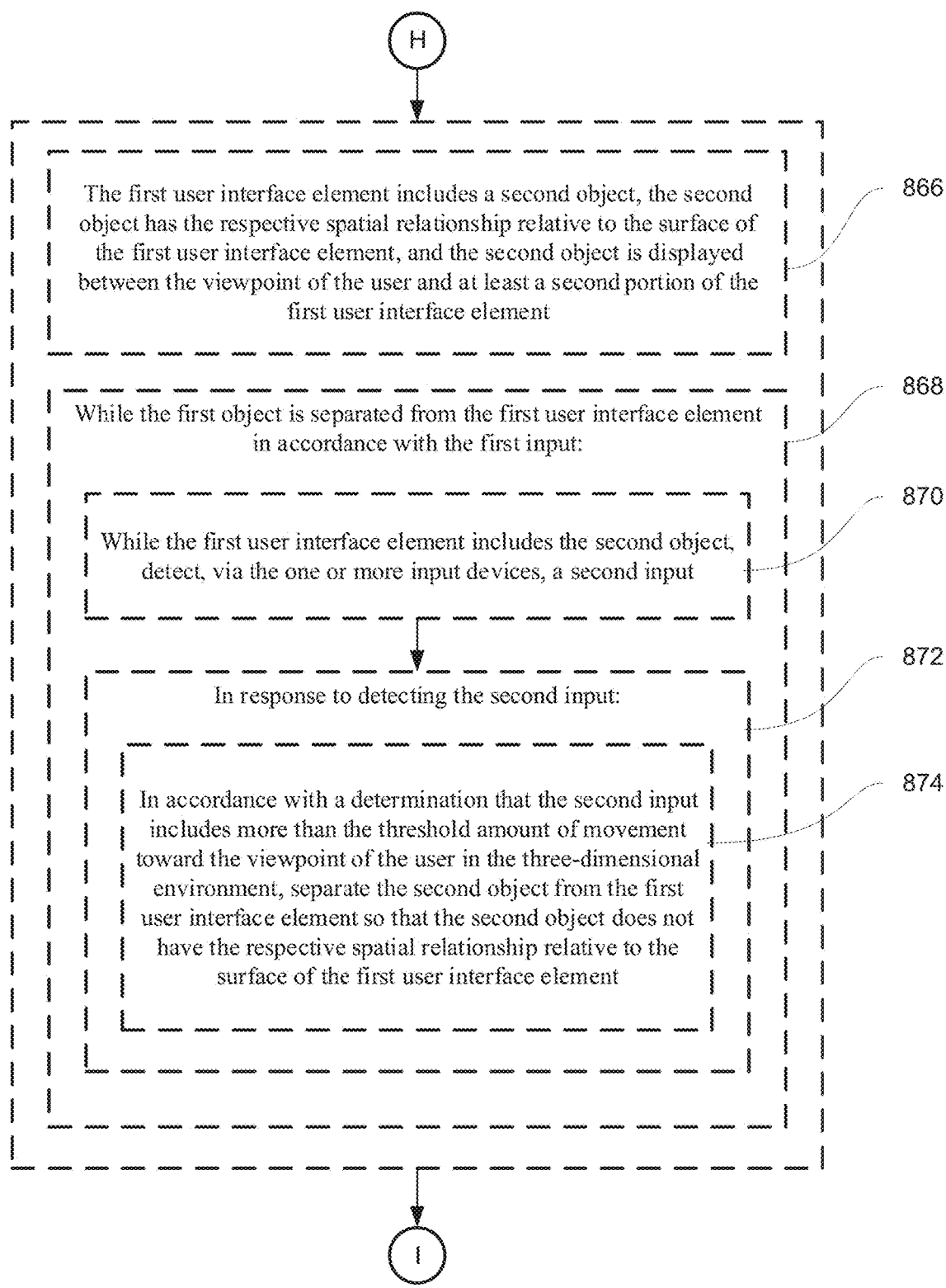
Figure 8K:
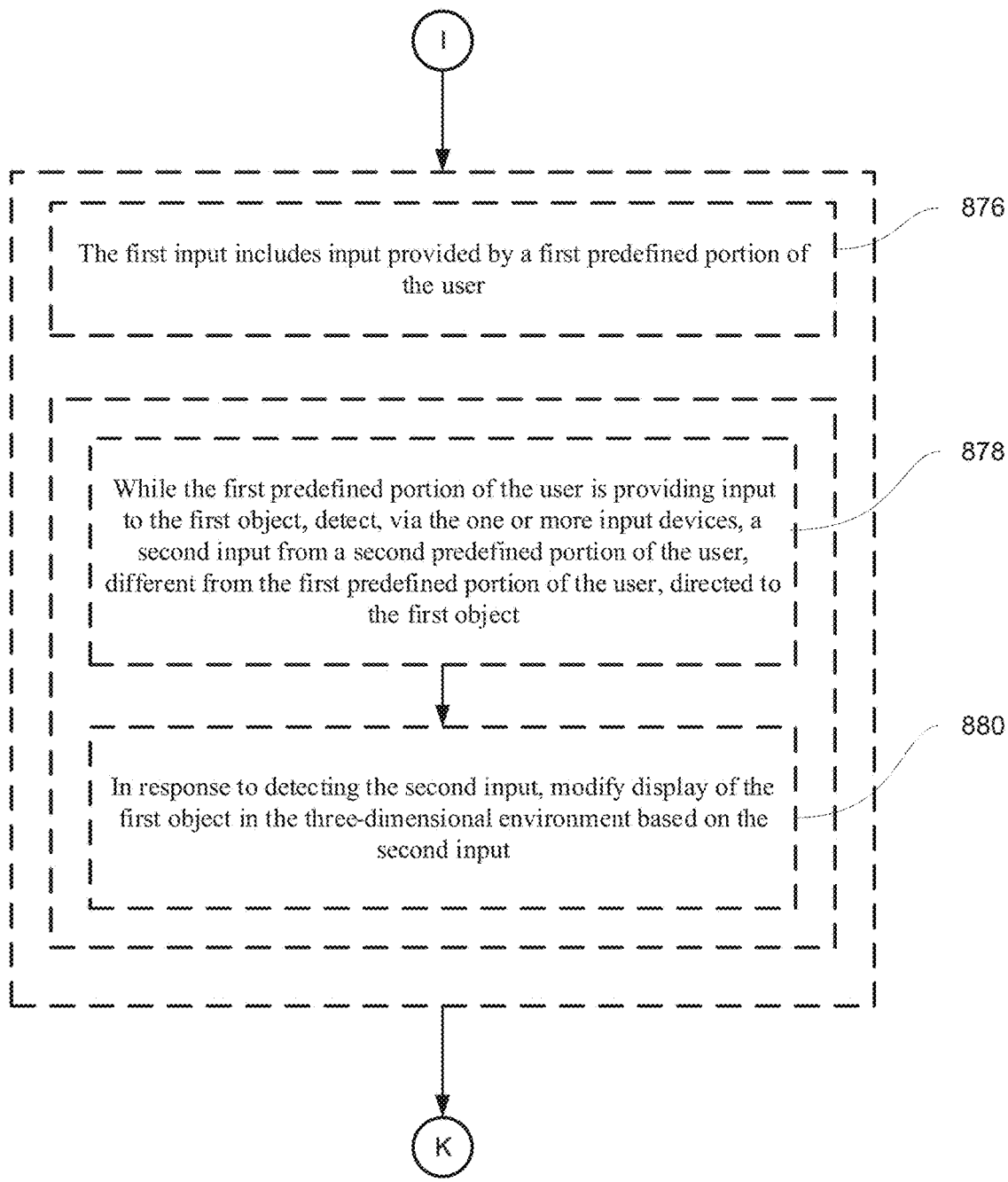
Figure 8L:
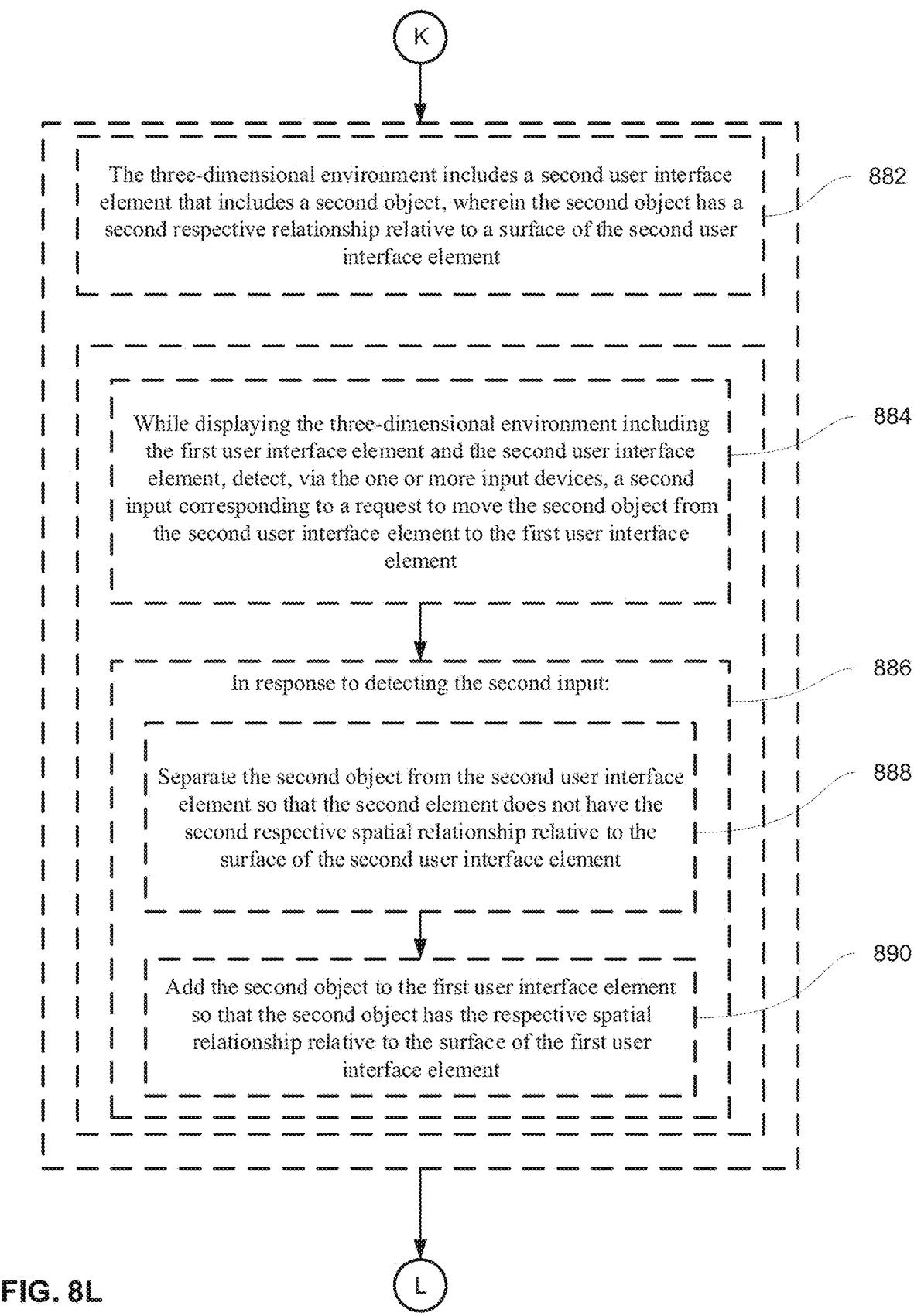
Figure 8M:
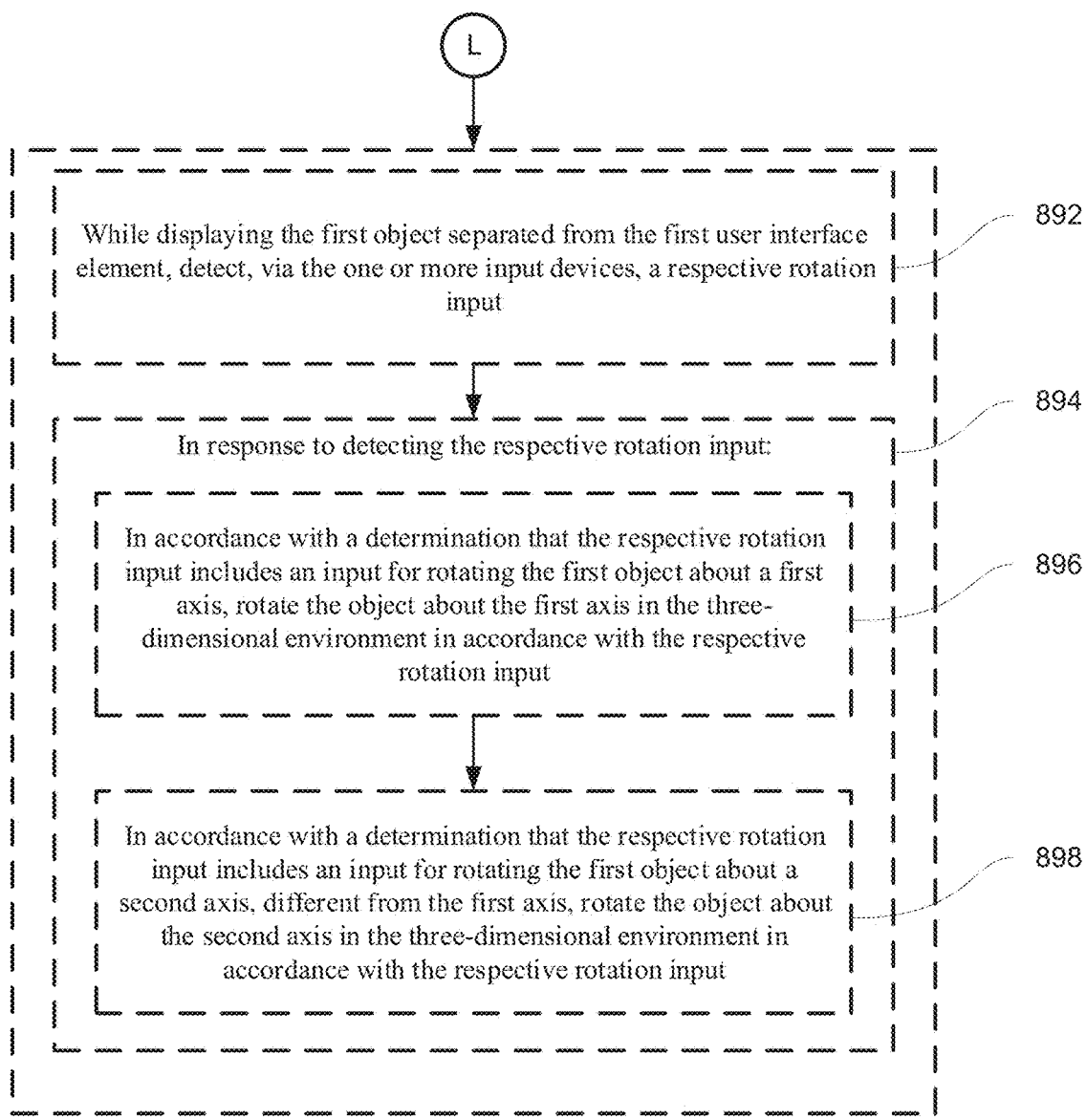

In FIG. 7D, a user input is detected moving visual clipboard 710 rightwards. In some embodiments, the user input includes a selection input directed at visual clipboard 710 by hand 720 (e.g., a pinch gesture directed at a portion of visual clipboard 710 not occupied by a virtual object, directed at a menu bar of visual clipboard 710, directed at a movement affordance for visual clipboard 710, etc.) and a rightward movement of hand 720 while maintaining the selection input. In some embodiments, in response to the user input, visual clipboard 710 moves rightwards in three-dimensional environment 704 in accordance with the movement of hand 720. In some embodiments, moving visual clipboard 710 includes moving the virtual elements that are attached to visual clipboard 710 without moving virtual elements that are no longer attached to visual clipboard 710. For example, in FIG. 7D, virtual element 718 and representation 714 of the snowman move rightwards with the movement of visual clipboard 710 (e.g., virtual element 718 and representation 714 move rightwards such as to maintain the same relative position on visual clipboard 710 as before moving rightwards), but representation 712 of the car does not move rightwards with the movement of visual clipboard 710 (e.g., remains on the surface of table 708).

FIGS. 8A-8I and 8K-8M is a flowchart illustrating a method 800 of displaying virtual objects on a user interface element in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In the method 800, in some embodiments, an electronic device (e.g., computer system 101 in FIG. 1) in communication with a display generation component and one or more input devices (e.g., a mobile device (e.g., a tablet, a smartphone, a media player, or a wearable device), or a computer) displays (802) a first user interface element that includes a first object, such as visual clipboard 710 that includes representation 712 and representation 714 in FIG. 7A.

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor and/or a motion sensor (e.g., a hand tracking sensor, a hand motion sensor), etc.

In some embodiments, the first user interface element is a virtual user interface element displayed in a three-dimensional environment that changes in appearance as a viewpoint of a user changes relative to a location of the first user interface element in the three-dimensional environment (804), such as visual clipboard 710 in FIG. 7A (e.g., the first user interface element is a visual element that is displayed in a three-dimensional environment, and on which a plurality of content is able to be attached).

In some embodiments, the first user interface element is displayed in a three-dimensional environment (e.g., the user interface element is the three-dimensional environment and/or is displayed within a three-dimensional environment) that is generated, displayed, or otherwise caused to be viewable by the device (e.g., a computer-generated reality (CGR) environment such as a virtual reality (VR) environment, a mixed reality (MR) environment, or an augmented reality (AR) environment, etc.). In some embodiments, the first user interface is a planar object (optionally facing the user, perpendicular to the user, etc.), similar to a whiteboard, blackboard, dry erase board, chalk board, cork board, etc. In some embodiments, the first user interface element is a sandbox area. In some embodiments, the sandbox is configured to be able to "host" a number of different types of content, such as pictures, images, drawings, websites, two-dimensional virtual objects, three-dimensional virtual objects, etc. In some embodiments, objects on the first user interface element are able to be moved around, resized, edited, drawn on, or removed from the first user interface element.

In some embodiments, the first object has a respective spatial relationship relative to a surface of the first user interface element (806), such as representation 712 being attached to the surface of visual clipboard 710 in FIG. 7A (e.g., the first user interface element includes a first object). In some embodiments, the first object is a two-dimensional virtual object, a three-dimensional virtual object, an image, a website, etc.

In some embodiments, the first object is displayed between the viewpoint of the user and at least a portion of the first user interface element (808), such as representation 712 in FIG. 7A being attached to the surface of the side of visual clipboard 710 that is closer to the viewpoint of the user (e.g., the first object is placed on the first user interface element such that the first object obscures a part of the first user interface element at which the first object is placed). In some embodiments, the first object is a flat (e.g., two dimensional) object and is planar with the first user interface element. In some embodiments, the first object is a flat object and is just in front of the first user interface element (e.g., as if taped or glued to the first user interface element).

In some embodiments, while displaying, via the display generation component, the first user interface element that includes the first object, the electronic device detects (810), via the one or more input devices, a first input, such as a selection input by first hand 720 and/or second hand 722 in FIG. 7A (e.g., an input interacting with the first object). In some embodiments, the first input is a gesture performed by one or more hands of the user, a movement of the one or more hands of the user, a gaze by the user at a respective location or object, a voice command, etc. In some embodiments, the first input is detected by one or more sensors of the device, such as a hand tracking sensor, a gaze tracking sensor, a depth sensor, a microphone, etc.

In some embodiments, in response to detecting the first input and while the first object continues to be displayed between the viewpoint of the user and at least a portion of the first user interface element (812), in accordance with a determination that the first input includes more than a threshold amount of movement toward the viewpoint of the user in the three-dimensional environment (e.g., if the first input includes a movement of the hand of the user away from the first user interface element and toward the electronic device (and/or toward the user) by more than a threshold amount (e.g., moving away from the first user interface by more than 3 inches, 6 inches, 12 inches, 24 inches, etc.)), the electronic device separates (814) the first object from the first user interface element so that the first object does not have the respective spatial relationship relative to the surface of the first user interface element, such as first hand 720 moving toward the viewpoint of the user by more than the threshold amount in FIG. 7B, causing representation 712 to be removed from visual clipboard 710 (e.g., removing the first object from the first user interface element).

For example, pulling the first object off the whiteboard using the user's hand. In some embodiments separating the first object from the first user interface causes the first object to no longer be spatially associated with the first user interface element, such that moving the first object does not cause the first user interface element to move and moving the first user interface element does not cause the first object to move (e.g., whereas when the first object is not separated from the first user interface element, the first object optionally moves with the movement of the first user interface element).

In some embodiments, in accordance with a determination that the first input includes less than the threshold amount of movement toward the viewpoint of the user in the three-dimensional environment, the electronic device moves (816) the first object within the first user interface element while maintaining the respective spatial relationship of the first object relative to the surface of the first user interface element, such as second hand 720 not moving toward the viewpoint of the user by more than the threshold amount in FIG. 7B, causing representation 714 to remain attached to the surface of visual clipboard 710 (e.g., if the first input does not include a movement away from the first user interface element more than the threshold amount, then the first object is not removed from the first user interface element (e.g., not pulled off the first user interface element)).

In some embodiments, although the first object is not removed from the first user interface element, the first object moves and optionally is relocated to a new location on the first user interface element in accordance with the movement of the first input. For example, a hand is able to drag-and-drop the first object to a new location on the first user interface element by selecting the first object and, without pulling the first object more than the threshold amount, moving the first object to a new location.

The above-described manner of interacting with objects on a first user interface element (e.g., by removing objects from the first user interface element if the input selecting the object moves away from the first user interface element by more than a threshold amount, but maintaining the objects on the first user interface element if the input does not move away from the first user interface element by more than the threshold amount) provides for a quick and efficient method of maintaining a sandbox of objects, which simplifies the interaction between the user and the electronic device and enhances the operability of the electronic device and makes the user-device interface more efficient (e.g., by providing a mechanism by which objects can be stored on a first user interface element, relocated, and removed from the first user interface element), which additionally reduces power usage and improves battery life of the electronic device by enabling the user to use the electronic device more quickly and efficiency, while reducing errors in usage.

In some embodiments, while the first object has the respective spatial relationship relative to a surface of the first user interface element, the first object has a first level of detail (818), such as representation 712 being a two-dimensional object in FIG. 7A (e.g., displaying the first object as a two-dimensional object (e.g., if, for example, the first object is able to be displayed as a three-dimensional object)). In some embodiments, displaying the first object at a first level of detail includes displaying the first object as a simplified representation or caricature of the first object and/or displaying the first object with a lower resolution. In some embodiments, displaying the first object at a first level of detail includes forgoing displaying accompanying information with the first object (e.g., textual descriptions, callouts, etc.).

In some embodiments, separating the first object from the first user interface element so that the first object does not have the respective spatial relationship relative to the surface of the first user interface element includes displaying the first object with a second level of detail, different from the first level of detail (820), such as representation 712 being a three-dimensional object in FIG. 7B (e.g., bringing the first object out of the first user interface element causes the first object to switch into an inspection mode in which the first object is displayed with a second, higher level of detail).

In some embodiments, displaying the first object in an inspection mode allows the user to manipulate the first object in six dimensions (e.g., six degrees of freedom, for example, the ability to move along the three principal axes, the ability to rotate about the three principal axes, etc.) and inspect the different sides of the first object. In some embodiments, the first object is temporarily displayed in inspection mode and in response to a respective user input, the first object is returned to its original position on the first user interface element and optionally returned to its original level of detail (e.g., the first level of detail). In some embodiments, while the first object is in inspection mode, the user is able to move the first object to another location in the environment. In some embodiments, while the first object is in inspection mode, the user is able to edit or otherwise manipulate the first object before, for example, returning the first object to the first user interface element (e.g., with the edits and/or manipulations). In some embodiments, displaying the first object at a second level of detail includes displaying the first object at a higher resolution, at a higher quality, and/or with more information, and/or enabling more manipulation features. In some embodiments, displaying the first object at the second level of detail includes displaying the first object as a three-dimensional object (e.g., if, for example, the first object was displayed as a two-dimensional object when on the first user interface element). In some embodiments, if the first input does not satisfy the one or more first criteria (e.g., the first input does not pull the first object out of the first user interface element by more than the threshold amount), the first object is not removed from the first user interface element and/or the first object is not displayed at the second level of detail (e.g., optionally the first object is maintained displayed at the first level of detail). In some embodiments, if the first input does not satisfy the one or more first criteria, the first object remains attached and/or associated with the first user interface element, and the first object optionally is moved to a different location on the first user interface element.

The above-described manner of displaying objects (e.g., at a first level of detail when on the board and a second level of detail when removed from the board) provides for a quick and efficient method of displaying objects of interest from an element and/or first user interface element in more detail, which simplifies the interaction between the user and the electronic device and enhances the operability of the electronic device and makes the user-device interface more efficient (e.g., by providing a mechanism by which objects can be stored on and/or in an element and/or first user interface element in a simplified form, optionally enabling more objects to be placed in the first user interface element, while providing a simple mechanism for displaying the objects in less simplified form without the need to display user interface elements for doing so), which additionally reduces power usage and improves battery life of the electronic device by enabling the user to use the electronic device more quickly and efficiency, while reducing errors in usage.

In some embodiments, before detecting the first input, the first object is displayed (e.g., in two dimensions) in the first user interface element at a first size (e.g., the first object has a respective size when attached to the first user interface element), and separating the first object from the first user interface element so that the first object does not have the respective spatial relationship relative to the surface of the first user interface element includes displaying the first object in two dimensions at a second size, larger than the first size, in the three-dimensional environment (822) (e.g., the first object is increased in size (or optionally decreased in size) when separated from the first user interface element).

In some embodiments, the size is adjustable by the user in response to a resizing input (e.g., using two hands). In some embodiments, when the first object is attached to the first user interface element, the first object is automatically resized based on the size of the first user interface element (e.g., automatically scaled to fit the first user interface element).

In some embodiments, the first object increases in size due to being moved to a location closer to the viewpoint of the user (e.g., due to the perspective effect). In some embodiments, the first object is displayed at the size that it had before it was attached to the first user interface element (e.g., its non-scaled size). In some embodiments, the first object increases in absolute size with respect to the three-dimensional environment (e.g., not only is the object displayed at a larger size, but the object has a larger size). For example, if the object is 2 inches by 2 inches when attached to the first user interface element (e.g., which optionally is different than the amount of display area that is consumed by the object), then in response to the first input, the object is increased to 2.5 inches by 2.5 inches (e.g., which is also optionally different than the amount of display area that is consumed by the object). In some embodiments, the first object is displayed at an "actual" size (e.g., at 100% scale).

The above-described manner of displaying objects (e.g., at a first size when on the board and a second size when removed from the board) provides for a quick and efficient method of displaying objects of interest from an element and/or first user interface element in more detail, which simplifies the interaction between the user and the electronic device and enhances the operability of the electronic device and makes the user-device interface more efficient (e.g., by providing a mechanism by which objects can be stored on and/or in an element and/or first user interface element in a simplified form, optionally enabling more objects to be placed in the first user interface element, while providing a simple mechanism for displaying the objects in less simplified form without the need to display user interface elements for doing so), which additionally reduces power usage and improves battery life of the electronic device by enabling the user to use the electronic device more quickly and efficiency, while reducing errors in usage.

In some embodiments, prior to separating the first object from the first user interface element, the first object is displayed as a simulated two-dimensional object and separating the first object from the first user interface element so that the first object does not have the respective spatial relationship relative to the surface of the first user interface element includes displaying the first object as a simulated three-dimensional object in the three-dimensional environment (824), such as representation 712 being a two-dimensional object in FIG. 7A and being a three-dimensional object in FIG. 7B (e.g., when the first object is attached to the first user interface element, it is displayed as a two-dimensional object (e.g., a flat object attached to the flat first user interface element surface) and when the first object is unattached from the first user interface element, it is expanded back to a three-dimensional object).

In some embodiments, if the first object is not a three-dimensional object (e.g., is originally a two dimensional object), then removing it from the first user interface element does not cause it to become a three-dimensional object (e.g., the first object optionally stays as a two dimensional object). For example, while on the first user interface element, the first object is optionally displayed as a circle (e.g., a two-dimensional circular object), but when removed from the first user interface element, the first object is optionally a sphere (e.g., a three-dimensional circular object). In another example, the first object is optionally a car object and while on the first user interface element, the first object is a flat two-dimensional car but when removed from the first user interface element, the first object is a three-dimensional model of the car.

The above-described manner of displaying objects (e.g., two dimensionally when on the board and three dimensionally when removed from the board) provides for a quick and efficient method of displaying objects of interest from an element and/or first user interface element in more detail, which simplifies the interaction between the user and the electronic device and enhances the operability of the electronic device and makes the user-device interface more efficient (e.g., by providing a mechanism by which objects can be stored on and/or in an element and/or first user interface element in a simplified form, optionally enabling more objects to be placed in the first user interface element, while providing a simple mechanism for displaying the objects in less simplified form without the need to display user interface elements for doing so), which additionally reduces power usage and improves battery life of the electronic device by enabling the user to use the electronic device more quickly and efficiency, while reducing errors in usage.

In some embodiments, the first object is a representation of a physical object, and the physical object has a respective size (826), such as representation 712 in FIG. 7B being a representation of a car having a respective size (e.g., the first object is a virtual representation of a physical object in the real world of a particular size, such as a building, a mountain, a car, etc.). In some embodiments, the electronic device detects (828), via the one or more input devices, an input corresponding to a request to display the first object at the respective size, such as the selection of an affordance to display representation 712 at its "actual" size (e.g., a selection of a selectable option or affordance to display the first object at a respective size).

In some embodiments, the input corresponding to a request to display the first object at the respective size is the first input separating the first object from the first user interface element (e.g., a pinch or drag gesture pulling the first object out of the first user interface element causes the object to be displayed at the respective size). In some embodiments, the respective size is a 1:1 scale (e.g., "actual" size). In some embodiments, the respective size is a 1:2 scale (e.g., half size). In some embodiments, a plurality of selectable options associated with a plurality of sizes and/or scales are displayed. In some embodiments, the single selectable option or the plurality of selectable options, depending on the implementation, are displayed in response to removing the first object from the first user interface element (e.g., and optionally are not displayed when the first object is attached to the first user interface element).

In some embodiments, in response to detecting the input corresponding to the request to display the first object at the respective size (830), in accordance with a determination that the respective size is a first size, the electronic device displays (832) the first object in the three-dimensional environment at the first size, such as if representation 712 were displayed at its "actual" size (e.g., relative to the three-dimensional environment). In some embodiments, if the physical object on which the first object is based has a respective dimension and/or size, then the first object is resized to have the respective dimension and/or size. For example, if the first object is a chair and the chair is 3 feet wide by 3 feet long and 4 feet tall, then in response to the input, the first object is resized to be 3 feet wide by 3 feet long and 4 feet tall. In some embodiments, displaying the first object at the first size includes displaying the first object with a respective size as if the first object were the first size relative to the objects in the three-dimensional environment. For example, if the object is four feet tall, then the first object is displayed with a size corresponding to four feet tall based on the location of the object in the three-dimensional environment (e.g., based on how a four-foot tall object would be displayed when located the respective distance away from the viewpoint of the user in the three-dimensional environment).

In some embodiments, in accordance with a determination that the respective size is a second size, different from the first size, the electronic device displays (834) the first object in the three-dimensional environment at the second size (e.g., relative to the three-dimensional environment). For example, if the first object is a chair that is 2 feet wide by 2 feet long and 3 feet tall, then in response to the input, the first object is resized to be 2 feet wide by 2 feet long and 3 feet tall (e.g., based on how an object of the second size would look when located at the respective distance away from the user). In some embodiments, when the first object is displayed according to "actual" size, an indication is displayed indicating that the first object is at an actual size.

The above-described manner of resizing objects provides for a quick and efficient method of displaying objects of interest in more detail (e.g., by increasing the size of the object in response to a request to increase the size of the object) provides for a quick and efficient method of displaying objects of interest in more detail, which simplifies the interaction between the user and the electronic device and enhances the operability of the electronic device and makes the user-device interface more efficient (e.g., by providing a mechanism by which objects can be displayed at their "real life" sizes), which additionally reduces power usage and improves battery life of the electronic device by enabling the user to use the electronic device more quickly and efficiency, while reducing errors in usage.

In some embodiments, while the first object is separated from the first user interface element so that the first object does not have the respective spatial relationship relative to the surface of the first user interface element, the electronic device detects (836), via the one or more input devices, user input corresponding to a request to move the first object in the three-dimensional environment, such as the movement of first hand 720 in FIG. 7B corresponding to a request to move representation 712 (e.g., while the first object is not attached to the first user interface element, receiving a user that moves the first object within the three-dimensional environment). In some embodiments, the user input includes a pinch gesture by a hand of the user (e.g., a continuance of the pinch gesture used to remove the first object from the first user interface element, or another pinch gesture directed to the first object when the first object is not attached to the first user interface element) and a movement of the hand of the user while maintaining the pinch gesture.

In some embodiments, while detecting the user input (838), the electronic device moves (840) the first object in the three-dimensional environment in accordance with the user input, such as the movement of representation 712 in accordance with the movement of first hand 720 (e.g., moving the first object in a direction based on the direction of the movement of the user input) and in accordance with a determination that a location of the first object in the three-dimensional environment during the movement of the first object satisfies one or more criteria relative to a location of a representation of a physical feature in a physical environment of the electronic device, the electronic device snaps (842) the first object to the representation of the physical feature in the three-dimensional environment, such as snapping representation 712 to the surface of table 708 (e.g., if the first object is moved to within a threshold distance (e.g., 1 inch, 3 inches, 6 inches, 12 inches, etc.) from a respective surface (e.g., optionally in response to detecting a termination of the pinch gesture or optionally while the first object is being moved around the three-dimensional environment by the user input), the first object is snapped to the respective surface).

In some embodiments, the speed of the movement of the first object is based on the speed of the movement of the user's hand (e.g., the same speed, a scaled speed, etc.). In some embodiments, the respective surface is optionally a planar surface (e.g., either a virtual surface or a representation of a physical surface in the physical environment of the electronic device), such as a wall, a table top, the floor, etc. In some embodiments, in response to and/or when the first object is snapped to the respective surface, the electronic device generates a sound (e.g., audible tone) and/or a haptic indicating the snapping. In some embodiments, when a first object has snapped to a respective surface, a threshold amount of input is required to remove the first object from the respective surface (e.g., more than 0.5 inches of movement input, 1 inch, 3 inches, 10 inches, etc.). In some embodiments, the threshold amount of input required to remove the first object is the same as the distance within which the first object becomes snapped to the respective surface (e.g., the first object has to be moved beyond the "snap" radius of the respective surface to be removed from the respective surface).

The above-described manner of attaching an object to a surface (e.g., by moving the object to within a threshold distance of the surface and releasing the selection gesture), provides for a quick and efficient method of placing virtual objects around the three-dimensional environment, which simplifies the interaction between the user and the electronic device and enhances the operability of the electronic device and makes the user-device interface more efficient (e.g., by providing a mechanism by which objects can be quickly and easily placed at different locations in the environment, without requiring the user to perform additional inputs to ensure that the first object is placed perfectly), which additionally reduces power usage and improves battery life of the electronic device by enabling the user to use the electronic device more quickly and efficiency, while reducing errors in usage.

In some embodiments, the display generation component displays a respective field of view of the three-dimensional environment (844). In some embodiments, while displaying the first object separated from the first user interface element so that the first object does not have the respective spatial relationship relative to the surface of the first user interface element, in accordance with a determination that the first object does not fit within the respective field of view of the three-dimensional environment, the electronic device deemphasizes (846) display of one or more edge regions of the first object in the three-dimensional environment, such as if representation 712 in FIG. 7B has a size that is larger than the field of view of device 101, then portions of representation 712 near the edge of the field of view of device 101 is faded (e.g., if at least a portion of the first object extends beyond the visible area of the three-dimensional environment (e.g., a portion of the first object is beyond the edge of the display area), then the portion that extends towards and beyond the visible area is faded out).

In some embodiments, fading the edges of the object that extend beyond the visible area avoids a harsh boundary on the first object. In some embodiments, fading the edges includes increasing the transparency of the edge region of the object. In some embodiments, fading the edges includes blending the edge region of the object. In some embodiments, portions of the three-dimensional environment are visible through the edges of the object that are faded, which optionally include representations of the physical environment around the device.

The above-described manner of displaying an object in the three-dimensional environment (e.g., by fading out or feathering portions of the object that extend beyond the displayed or currently viewable portions of the three-dimensional environment), provides for a quick and efficient method of displaying virtual objects around the environment, which simplifies the interaction between the user and the electronic device and enhances the operability of the electronic device and makes the user-device interface more efficient (e.g., by smoothing out the edges of the first object and avoiding a harsh edge or boundary) and additionally maintains visibility of portions of the three-dimensional environment that may pose a safety concern if not visible (e.g., if the user were to move around the environment) and helps the user maintain some context of the three-dimensional environment that is behind the first object, which additionally reduces power usage and improves battery life of the electronic device by enabling the user to use the electronic device more quickly and efficiency, while reducing errors in usage.

In some embodiments, in response to detecting the first input and while the first object continues to be displayed between the viewpoint of the user and at least a portion of the first user interface element (848), in accordance with a determination that the first input includes a predefined portion of the user performing a first gesture to form a first shape with the predefined portion of the user, followed by movement of the predefined portion of the user while maintaining the first shape (e.g., if one or more hands of the user performs a pinch gesture using two or more fingers followed by a movement of the hand(s) that is performing the pinch gesture while maintaining the pinch hand shape), the electronic device moves (850) the first object within the first user interface element in accordance with the first movement while maintaining the respective spatial relationship of the first object relative to the surface of the first user interface element, such as second hand 722 performing a pinch gesture directed to representation 714 and moving leftwards while maintaining the pinch gesture, representation 714 remains attached to the surface of visual clipboard 710 and moves leftwards in accordance with the movement of second hand 722 (e.g., moving the first object along the first user interface element without removing the first object from the first user interface element).

In some embodiments, the pinch gesture is directed at the first object. In some embodiments, a pinch gesture directed at the first object includes pinching on a location associated with the first object (e.g., reaching out and pinching the first object or near the first object) or performing the pinch gesture while the gaze of the user is directed at the first object.

In some embodiments, while the hand is maintaining the pinch gesture, the first object is displayed as if slightly moved outwards/separated from the first user interface element (e.g., moved outwards by 0.1 inches, 0.5 inches, 1 inch, 5 inches, 10 inches, etc.) to indicate that the first object is selected and is able to be moved to a new location. In some embodiments, the first object is moved along the first user interface element in the same direction and/or at the same speed as the movement of the hand that is performing the pinch gesture. In some embodiments, while the first object is moving along the first user interface element, the orientation of the first object relative to the first user interface element is maintained (e.g., is not rotated, even if the user input would otherwise have caused a rotation if the first object were not attached to the first user interface element). In some embodiments, in response to detecting a termination of the pinch gesture, the movement of the first object is completed and the first object is placed at the new location (e.g., and optionally the first object returns to the size it had before the pinch gesture was received).

In some embodiments, in accordance with a determination that the first input includes the predefined portion of the user performing the first gesture to form the first shape, followed by the predefined portion of the user performing a second gesture to form a second shape, without detecting movement of the predefined portion of the user (e.g., if one or more hands of the user performs a pinch gesture using two or more fingers followed by a release of the pinch gesture within a threshold amount of time (e.g., within 0.25 seconds, 0.5 seconds, 1 second, 3 seconds) and/or without detecting a movement of the hand by more than a threshold distance (e.g., 0.1 inches, 0.5 inches, 1 inch, 3 inches, etc.) before detecting the release of the pinch gesture (e.g., a pinch-and-release gesture)), the electronic device separates (852) the first object from the first user interface element so that the first object does not have the respective spatial relationship relative to the surface of the first user interface element, such as if first hand 720 performed a pinch-and-release gesture directed to representation 712, causing representation 712 to be removed from visual clipboard 710 in FIG. 7B (e.g., removing the first object from the first user interface element).

In some embodiments, the first object moves towards the user's viewpoint in depth and/or away from the first user interface element by a predefined amount (e.g., moves out of the first user interface element by 0.1 inches, 1 inch, 3 inches, 10 inches, etc., optionally while maintaining the same x- and y-position). In some embodiments, the first object is displayed as a three-dimensional object, as described above. In some embodiments, the first object optionally obscures portions of the first user interface element and/or objects on the first user interface element (e.g., due to being at a location that is closer to the viewpoint of the user than objects on the first user interface element). In some embodiments, while the first object is not attached to the first user interface element, the first object is able to be moved to different locations in the three-dimensional environment in response to a selection gesture directed at the first object (e.g., pinch) and a movement of the hand while maintaining the selection gesture. In some embodiments, while the first object is not attached to the first user interface, the first object is able to be rotated to have a different orientation, for example, based on the change of the orientation of the hand of the user while maintaining a selection gesture directed at the first object (e.g., the orientation of the first object is not locked to the orientation of the first user interface element).

The above-described manner of removing an object from the first user interface element (e.g., in response to a pinch-and-release gesture), provides for a quick and efficient method of either moving an object within the first user interface element or remove the object from the first user interface element (e.g., based on whether the user input includes a pinch-and-drag or a pinch-and-release gesture), which simplifies the interaction between the user and the electronic device and enhances the operability of the electronic device and makes the user-device interface more efficient (e.g., by performing different functions based on the gesture performed by the user, without requiring the user to perform additional inputs to switch modes from either moving the object within the first user interface element or removing the object from the first user interface element), which additionally reduces power usage and improves battery life of the electronic device by enabling the user to use the electronic device more quickly and efficiency, while reducing errors in usage.

In some embodiments, while the first object is included in the first user interface element and before the first object is separated from the first user interface element so that the first object does not have the respective spatial relationship relative to the surface of the first user interface element (854), the electronic device detects (856), via the one or more input devices, a first user input corresponding to a request to move the first user interface element in the three-dimensional environment, such as first hand 720 in FIG. 7D performing an input to move visual clipboard 710 (e.g., a selection input directed at the first user interface element (e.g., and not directed to a particular one or more of the objects on the first user interface element)) and/or a movement affordance associated with the first user interface element, and a movement while maintaining the selection input (e.g., a pinch gesture and a movement by the hand while maintaining the pinch gesture)).

In some embodiments, in response to detecting the first user input, the electronic device moves (858) the first user interface element in the three-dimensional environment in accordance with the first user input, such as visual clipboard 710 moving in accordance with the movement of first hand 720 in FIG. 7D (e.g., moving the first user interface element in the same direction and optionally at the same speed as the movement of the hand of the user). In some embodiments, the objects on the first user interface element maintain their relative positions within the first user interface element and thus move with the movement of the first user interface element.

In some embodiments, while the first object is separated from the first user interface element so that the first object does not have the respective spatial relationship relative to the surface of the first user interface element (860), the electronic device detects (862), via the one or more input devices, a second user input corresponding to a request to move the first user interface element in the three-dimensional environment, such as first hand 720 in FIG. 7D performing an input to move visual clipboard 710 (e.g., a selection input directed at the first user interface element (e.g., and not directed to a particular one or more of the objects on the first user interface element) and/or a movement affordance associated with the first user interface element, and a movement while maintaining the selection input (e.g., a pinch gesture and a movement by the hand while maintaining the pinch gesture).

In some embodiments, the second user input is the same input and/or a continuation of the first user input. For example, while moving the first user interface element using a first hand, a second hand can be used to remove the first object from the first user interface element while the first hand continues to move the first user interface element.

In some embodiments, in response to detecting the second user input, the electronic device moves (864) the first user interface element in the three-dimensional environment in accordance with the first user input without moving the first object in the three-dimensional environment, such as visual clipboard 710 moving in accordance with the movement of first hand 710 in FIG. 7D, but not moving representation 712 in accordance with the movement of first hand 710 (e.g., moving the first user interface element, but not moving the first object). In some embodiments, the first object remains at its same absolute location in the three-dimensional environment, without regard to the movement of the first user interface element.

The above-described manner of moving a first user interface element (e.g., by moving objects on the first user interface element with the first user interface element, but not objects that are not on the first user interface element), provides for a quick and efficient method of moving the first user interface element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the first user interface element includes a second object, the second object has the respective spatial relationship relative to the surface of the first user interface element, and the second object is displayed between the viewpoint of the user and at least a second portion of the first user interface element (866), such as representation 714 in FIG. 7A (e.g., the first user interface element concurrently includes the first object and the second object).

In some embodiments, while the first object is separated from the first user interface element in accordance with the first input (868) (e.g., while using one hand to perform the first input to remove the first object from the first user interface element (e.g., a pinch gesture directed to the first object and a movement of the hand while maintaining the pinch gesture)) and while the first user interface element includes the second object, the electronic device detects (870), via the one or more input devices, a second input (e.g., detecting an input from a hand other than the hand that is interacting with the first object).

In some embodiments, in response to detecting the second input (872), in accordance with a determination that the second input includes more than the threshold amount of movement toward the viewpoint of the user in the three-dimensional environment, the electronic device separates (874) the second object from the first user interface element so that the second object does not have the respective spatial relationship relative to the surface of the first user interface element, such as if second hand 722 moved outwards away from visual clipboard 710 in FIG. 7B by more than a threshold amount causing representation 714 to be separated from visual clipboard 710 (e.g., the second hand is used to remove the second object from the first user interface element (e.g., if the second input satisfies the criteria required to remove the second object from the first user interface element, in a manner similar to how the first object is removed from the first user interface element) while the first hand is being used to interact with the first object).

Thus, a user is able to use one hand to interact with one object while using another hand to interact with another object at the same time. In some embodiments, the first object is moved in response to and based on the movement of a first hand that is interacting with the first object (e.g., independently of the second hand), and the second object is moved in response to and based on the movement of the second hand that is interacting with the second object (e.g., independently of the first hand).

The above-described manner of interacting with objects on a first user interface element (e.g., by using one hand to interact with one object while simultaneously using a second hand to interact with a second object), provides for a quick and efficient method of interacting with the first user interface element (e.g., by enabling the user to interact with multiple objects at the same time), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the first input includes input provided by a first predefined portion of the user (876) (e.g., the first input is performed by a first hand of the user). In some embodiments, while the first predefined portion of the user is providing input to the first object, the electronic device detects (878), via the one or more input devices, a second input from a second predefined portion of the user, different from the first predefined portion of the user, directed to the first object, such as detecting an input from first hand 720 and second hand 722 concurrently in FIG. 7A (e.g., while the first hand is performing the first input, detecting a second input being performed by the second hand of the user). In some embodiments, the second input includes a pinch gesture directed at the first object, such as a pinch at a location corresponding to the first object and/or a pinch while the gaze of the user is directed at the first object.

In some embodiments, in response to detecting the second input, the electronic device modifies (880) display of the first object in the three-dimensional environment based on the second input, such as performing a resizing or rotation function on representation 712 instead of a movement function (e.g., the second input performed by the second hand causes the function being performed on the first object to change based on the second input).

For example, without the second input, the first input optionally corresponds to a movement of the first object, but with the second input, the set of inputs corresponds to a request to either rotate or resize the first object (e.g., while the location of the object remains fixed in the three-dimensional environment, even though the first hand continues moving). For example, rotating or resizing the first object is optionally a two-handed operation. For example, pinching with both hands and extending the distance between the two hands while maintaining the pinch input causes the first object to be enlarged (e.g., and reducing the distance between the two hands causes the first object to be reduced in size). In some embodiments, pinching with both hands and moving one hand rotationally around the other hand (or moving both hands rotationally around a central vertex) causes the first object to be rotated. Thus, receiving a pinch gesture from the second hand while the first hand is performing a pinch gesture directed at the first object optionally causes the function to be performed on the first object to change from movement to rotation and/or resize (e.g., while the location of the object remains fixed).

The above-described manner of rotating or resizing a virtual object (e.g., by using a second hand to begin rotating or resizing the object), provides for a quick and efficient method of performing different functions using one or more hands (e.g., without requiring the user to perform additional inputs to switch from movement mode to rotation or resizing mode), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the three-dimensional environment includes a second user interface element that includes a second object, wherein the second object has a second respective relationship relative to a surface of the second user interface element (882), such as user interface 716 including virtual element 718 in FIG. 7A (e.g., the three-dimensional environment includes another user interface element similar to the first user interface element or the three-dimensional environment includes a user interface for an application).

In some embodiments, the other user interface element or user interface includes one or more elements or objects (e.g., similar to the first object). For example, the user interface is a user interface of a browser application and the user interface includes elements from a website (e.g., images, text, links, etc.). In some embodiments, the second user interface element has a different orientation than the first user interface element. For example, the first user interface element is facing forward, towards the viewpoint of the user (e.g., 0 degree angle, 5 degrees to the left or right, 10 degrees, 30 degrees, etc.) while the second user interface element is facing forwards and rightwards relative to the viewpoint of the user (e.g., 10 degrees to the left or right, 15 degrees to the left or right, 30 degrees, 45 degrees, etc.), optionally because the second user interface element is to the left of the first user interface element.

In some embodiments, while displaying the three-dimensional environment including the first user interface element and the second user interface element, the electronic device detects (884), via the one or more input devices, a second input corresponding to a request to move the second object from the second user interface element to the first user interface element, such as the user input by third hand 724 in FIG. 7A (e.g., a selection of the second object from the second user interface element and while maintaining the selection input, a movement moving the second object away from the second user interface element (e.g., towards the viewpoint of the user and/or in a direction normal to the surface of the second user interface element)).

In some embodiments, the second input includes a movement component that is sufficient to remove the second object from the second user interface element (e.g., a movement by more than a threshold amount, such as 0.1 inches, 1 inch, 3 inches, 10 inches, etc.). In some embodiments, the second input includes a movement element moving the second object to within a threshold distance from the first user interface element (e.g., 0.1 inches, 1 inch, 3 inches, 10 inches, etc.) corresponding to a request to add the second object to the first user interface element.

In some embodiments, in response to detecting the second input (886), the electronic device separates (888) the second object from the second user interface element so that the second element does not have the second respective spatial relationship relative to the surface of the second user interface element, such as in FIG. 7B (e.g., disassociating the second object from the second user interface element and/or removing the second object from the second user interface element) and adds (890) the second object to the first user interface element so that the second object has the respective spatial relationship relative to the surface of the first user interface element, such as in FIG. 7C (e.g., associating the second object with the first user interface element and/or adding the second object to the first user interface element).

In some embodiments, when the second object is removed from the second user interface element, the second object has an orientation that is the same or similar to the orientation of the second user interface element. For example, the second object is parallel to the second user interface element when the second object is on the second user interface element and in response to removing the second object from the second user interface element, the second object maintains remains parallel to the second user interface element (e.g., optionally becoming a three-dimensional environment). In some embodiments, the second object changes from being a two-dimensional object to a three-dimensional object when the second object is separated from the second user interface element.

In some embodiments, the second object is re-oriented to align with the orientation of the first user interface element (e.g., as opposed to being aligned with the second user interface element). For example, the second object becomes parallel to the first user interface element when the second object is attached to the first user interface element. In some embodiments, if the second object is a three-dimensional object before being added to the first user interface element, the second object is changed into a two-dimensional object when added to the first user interface element (e.g., the same as or similar to the two-dimensional version of the second object when the second object was attached to the second user interface element).

The above-described manner of moving objects from another user interface to the first user interface element (e.g., by removing the object from the other user interface and adding it to the first user interface element), provides for a quick and efficient method of adding objects to the first user interface element (e.g., by allowing the user to add objects that already exist and are elements of other user interfaces, without recreating the object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while displaying the first object separated from the first user interface element, the electronic device detects (892), via the one or more input devices, a respective rotation input, such as if first hand 720 performed a rotation motion in FIG. 7A (e.g., an input from a hand of the user selecting the first object (e.g., with a pinch gesture), and while maintaining the selection, rotating the hand). In some embodiments, in response to detecting the respective rotation input (894), in accordance with a determination that the respective rotation input includes an input for rotating the first object about a first axis, the electronic device rotates (896) the first object about the first axis in the three-dimensional environment in accordance with the respective rotation input, such as if representation 712 rotated in accordance with the rotation of first hand 720 (e.g., rotating the first object in the same direction and in the same orientation as the rotation of the hand).

For example, if the hand rotated about the y axis, the first object rotates about the y axis. If the hand rotated about the z axis, the first object optionally rotates about the z-axis. If the hand rotates around an axis other than the principal axes, the first object optionally rotates about the same axis. In some embodiments, additionally or alternatively to rotating the first object along the first axis, the first object is displayed as a three-dimensional object (e.g., and optionally rotated as a three-dimensional object). In some embodiments, the first object is displayed as a three-dimensional object while receiving the user input. For example, in response to detecting a termination of the first user input, the first object is returned to its two dimensionality on the first user interface element.

In some embodiments, in accordance with a determination that the respective rotation input includes an input for rotating the first object about a second axis, different from the first axis, the electronic device rotates (898) the object about the second axis in the three-dimensional environment in accordance with the respective rotation input (e.g., if the rotation of the hand is along a second axis, then the first object is rotated along the second axis). In some embodiments, if the rotation of the hand is along both the first and second axis (e.g., the rotation of the hand has a component that rotates about the first axis and a component that rotates about the second axis), then the first object rotates about both the first and second axis in accordance with the rotation of the hand along the first and second axis, respectively.

The above-described manner of displaying a preview of the first object as a three dimensional object (e.g., in response to receiving a rotational input directed at the first object), provides for a quick and efficient method of displaying a three dimensional preview of the first object (e.g., without requiring the user to remove the first object from the first user interface element to view the first object as a three-dimensional object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

FIGS. 9A-9E illustrate examples of displaying indications of a content entry tool in accordance with some embodiments.

Figure 9A:
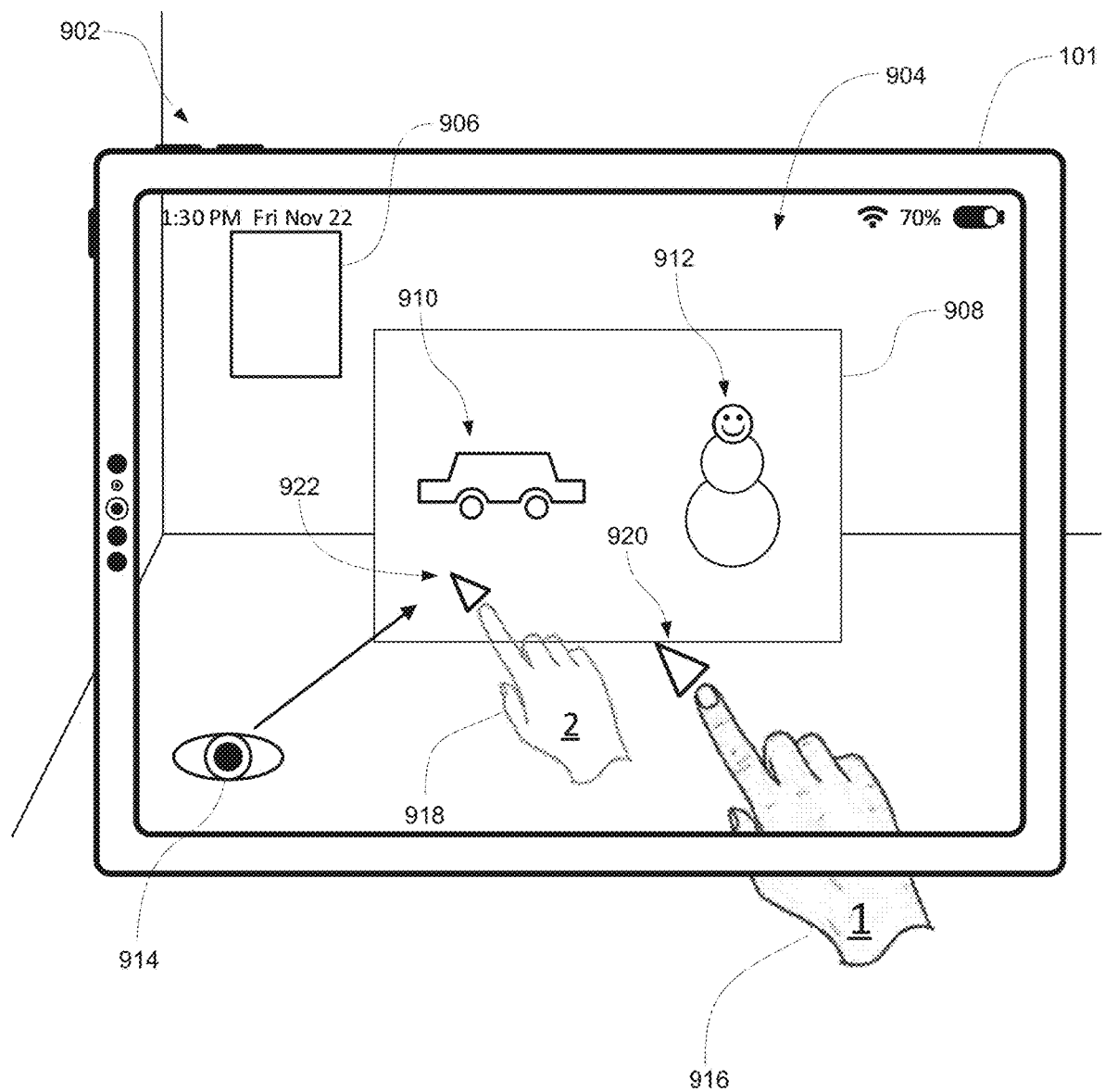
FIGS. 9A-9E illustrate examples of displaying indications of a content entry tool in accordance with some embodiments.

FIG. 9A illustrates an electronic device 101 displaying, via a display generation component (e.g., display generation component 120 of FIG. 1), a three-dimensional environment 904 on a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 9A, device 101 captures one or more images of the real world environment 902 around device 101 (e.g., operating environment 100), including one or more objects in the real world environment 902 around device 101. In some embodiments, device 101 displays representations of the real world environment in three-dimensional environment 904. For example, three-dimensional environment 904 includes a back corner of a room and a representation of picture frame 906 on the back wall of the room. As shown in FIG. 9A, picture frame 906 is a real object in real world environment 902 which has been captured by the one or more sensors of device 101, a representation of which is included in three-dimensional environment 904 (e.g., photorealistic representation, simplified representation, cartoon, caricature, etc.). In some embodiments, three-dimensional environment 904 includes one or more representations of one or more hands of the user detected (e.g., captured) by the sensors of device 101, such as first hand 916 and second hand 918, which will be described in further detail below.

In FIG. 9A, three-dimensional environment 904 includes visual clipboard 908, which has the same or similar behaviors as visual clipboard 710 described above with respect to FIGS. 7A-7D. Visual clipboard 908 optionally includes representation 910 of a car and representation 912 of a snowman. In some embodiments, representation 910 and representation 912 are virtual objects and have been attached to (e.g., are displayed on) visual clipboard 908 at their respective positions.

In FIG. 9A, device 101 is in a content entry mode in which the user is able to draw content on (e.g., annotate) objects or representations of objects in three-dimensional environment 904, including objects on visual clipboard 908. In some embodiments, device 904 entered into the content entry mode in response to a user input selecting an affordance to initiate the content entry mode (e.g., a drawing mode button, an annotation mode button) and/or in response to a user input selecting a content entry tool (e.g., a pencil tool, a pen tool, a highlighter tool, etc.) from a displayed content entry palette. In some embodiments, inserting content, drawing, and/or annotating has characteristics similar to that described below with respect to method 1200.

In some embodiments, while in content entry mode, a representation of the currently active content entry tool is displayed at or near the representation of the hand of the user. For example, in FIG. 9A, representation 920 is a representation of the currently active content entry tool and is displayed between the fingers of first hand 916. For example, representation 920 is optionally an image of a pencil or an image of a pencil tip (e.g., if the currently active content entry tool is the pencil tool) and is optionally displayed such that it appears as if first hand 916 is holding representation 920 (e.g., holding the pencil, holding the pencil tip, etc.) or such that representation 920 is positioned just in front of a potential pinch location of first hand 916. In FIG. 9A, first hand 916 is located farther than a threshold distance from visual clipboard 908 (e.g., farther than 0.1 inch, 0.5 inches, 1 inch, 5 inches, 10 inches, etc.). In some embodiments, because first hand 916 is farther than a threshold distance from visual clipboard 908, inputs performed by first hand 916 are interpreted as indirect manipulation inputs in which gaze 914 of the user is a factor in determining the object to which the input is directed. For example, if gaze 914 is directed at a respective location on visual clipboard 908 when a selection input is detected by first hand 916, then the selection input is directed at the respective location and/or an object located at the respective location (e.g., optionally without regard to the lateral position (e.g., x or y position) of first hand 916 when the selection input was detected).

In FIG. 9A, second hand 918 is located closer than the threshold distance from visual clipboard 908 and thus inputs from second hand 918 are interpreted as direct manipulation inputs in which gaze 914 is optionally not a factor in determining the object to which the input is directed. In some embodiments, the object to which the input is directed is determined based on the position of second hand 918. For example, if second hand 918 is positioned such that representation 922 (e.g., of the currently active content entry tool) is making contact or within a threshold distance from a respective object (e.g., within 0.1 inches, 0.5 inches, 1 inch, 3 inches, etc.), then the respective object is the object to which the user input is directed.

Figure 9B:
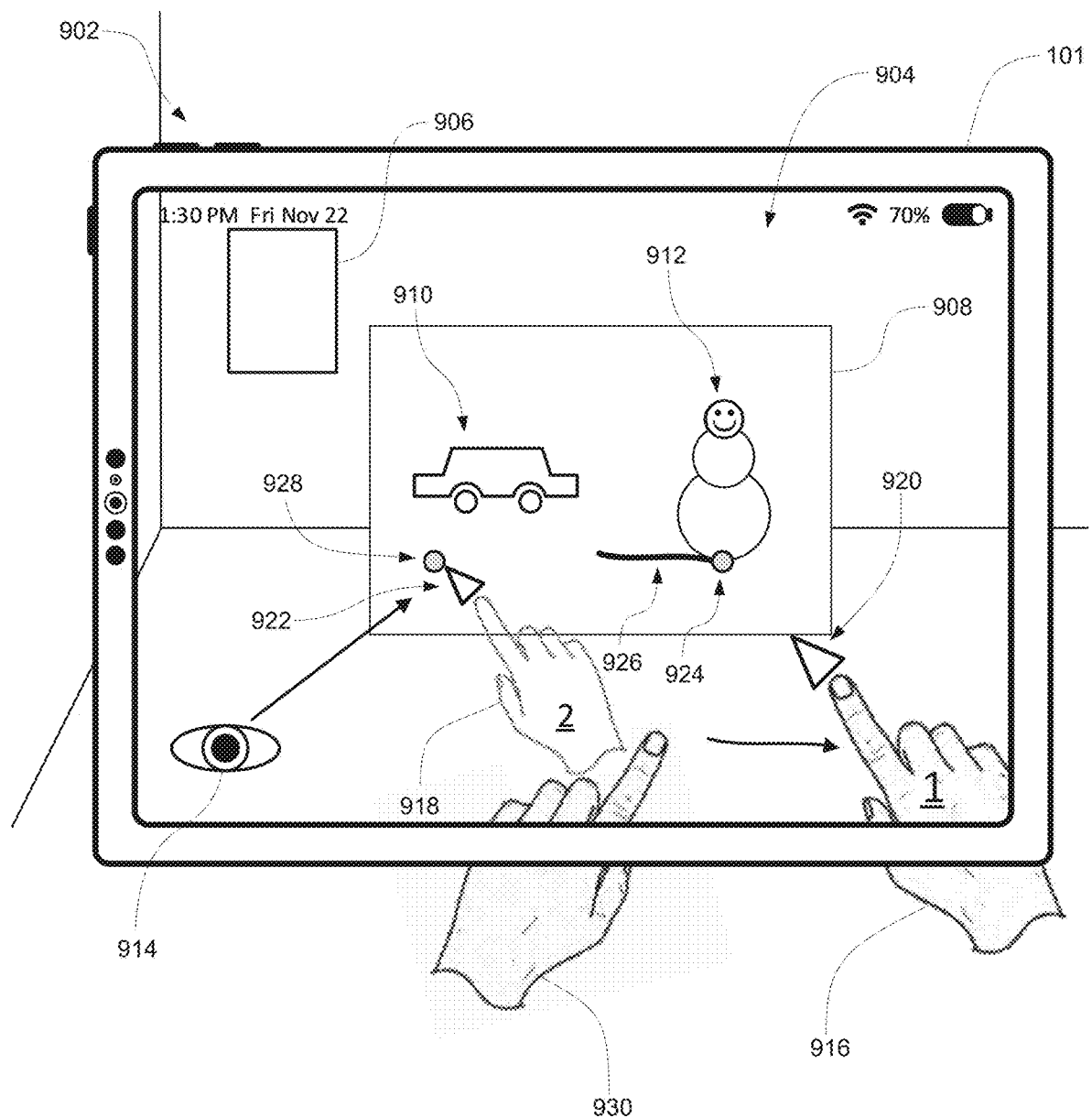

In FIG. 9B, while gaze 914 is directed at a respective location on visual clipboard 908, device 101 detects a selection input performed by first hand 916. In some embodiments, a selection input includes a pinch gesture performed by two or more fingers of first hand 916 (e.g., a pinch by a thumb and forefinger of first hand 916). In some embodiments, in response to detecting the selection input, content 926 is entered onto (e.g., drawn on) visual clipboard 908. In some embodiments, in response to detecting the movement of first hand 916 while maintaining the selection input, content 926 has a shape/profile based on the shape/profile of the movement of first hand 916. For example, in FIG. 9B, content 926 is a line having a shape based on the rightward movement of first hand 916 while maintaining the pinch hand shape.

In FIG. 9B, device 101 is displaying content entry indicator 924 that indicates the location at which content will be entered in response to a selection input by first hand 916. In some embodiments, content entry indicator 924 is displayed in response to detecting the selection input by first hand 916. In some embodiments, content entry indicator 924 is displayed in response to detecting a pre-selection shape (e.g., a pre-pinch shape, such as before the thumb and forefinger make contact to form a pinch). In some embodiments, while displaying content entry indicator 924, if device 101 detects a pinch (e.g., the pre-pinch shape becomes a shape), then content entry indicator 924 optionally continues to be displayed (e.g., until detection of a termination of the pre-pinch shape and/or pinch shape). In some embodiments, because first hand 916 is performing an indirect manipulation input, content entry indicator 924 is displayed on the surface of visual clipboard 908 (e.g., rather than near or attached to hand 916) indicating that a selection input will cause content to be drawn onto visual clipboard 908.

In some embodiments, if the input is a direct manipulation input, a content entry indicator is displayed at a location based on (e.g., near or attached to) the location of the hand performing the input (e.g., not necessarily on the surface of visual clipboard 908). For example, in FIG. 9B, second hand 918 is within direct manipulation distance from visual clipboard 908 and as a result, content entry indicator 928 is displayed at a location in three-dimensional environment 904 near second hand 918, such as directly in front of the tip of representation 922 of the active content entry tool, indicating that a selection input will cause content to be drawn just in front of the tip of representation 922. In some embodiments, because second hand 918 is within direct manipulation distance from visual clipboard 908, the location at which content will be inserted is based on the location of second hand 918 (e.g., the x-, y-, and z-positions). For example, if second hand 918 is at a location such that representation 922 is floating above visual clipboard 908, then content entry indicator 928 is also floating above visual clipboard 908 and content is entered at a location floating above visual clipboard 908, but if second hand 918 is at a location such that representation 922 is contacting visual clipboard 908 (e.g., or within a threshold margin of error of visual clipboard 908 such as 0.1 inches, 0.5 inches, 1 inch, etc.), then content entry indicator 928 is displayed on the surface of visual clipboard 908 and content is entered onto the surface of visual clipboard 908.

In some embodiments, while performing an input with one hand, a user is able to modify the function to be/being performed by that one hand by (e.g., concurrently) performing an input with a second hand. For example, in FIG. 9B, while first hand 916 is performing a selection input drawing on visual clipboard 908, if device 101 detects that third hand 930 has performed a selection input, then device 101 optionally stops inserting content and performs a function other than inserting content. For example, if gaze 914 is directed at representation 912 when the selection input is performed by third hand 930, then device 101 optionally changes to performing a resizing and/or rotation function directed at representation 912. For example, while first hand 916 and third hand 930 are both maintaining the selection input, if one or both of first hand 916 and third hand 930 move such that the distance between the two hands increases, then representation 912 increases in size based on the increase in the distance between the two hands (e.g., if the distance increases by 10%, representation 912 increases by 10%, etc.). In some embodiments, if first hand 916 and third hand 930 move a manner such that first hand 916 rotates around third hand 930 (e.g., first hand 916 rotates around third hand 930 while third hand 930 remains fixed, third hand 930 rotates around first hand 916 while first hand 916 remains fixed, and/or first hand 916 and third hand 930 rotate around a central pivot location), then representation 912 is optionally rotated in accordance with the rotation of first hand 916 and third hand 930.

Figure 9C:
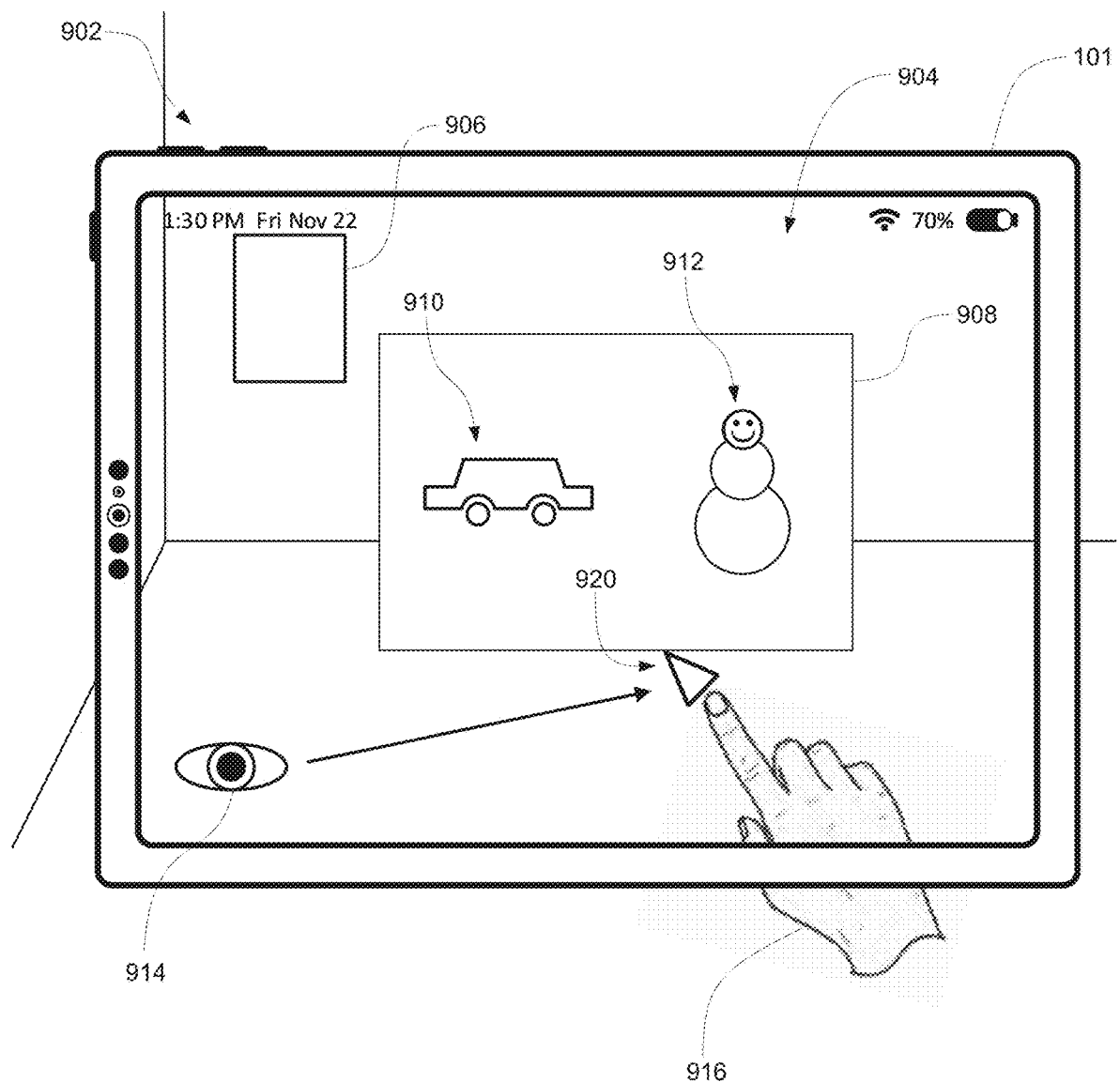
Figure 9D:
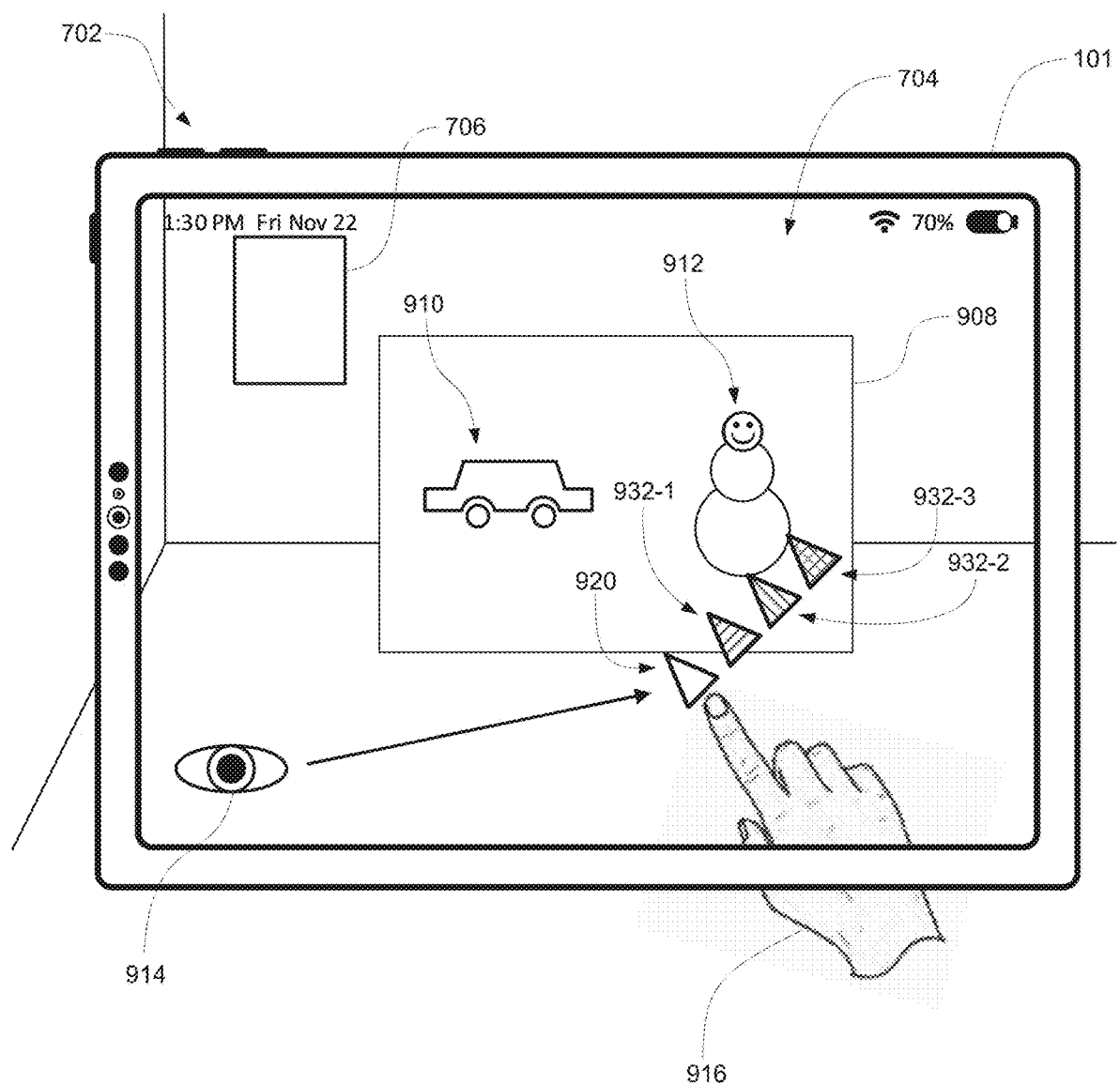

FIGS. 9C-9D illustrate embodiments in which a selection input is performed while gaze 914 is directed to representation 920. In FIG. 9C, while gaze 914 is directed at representation 920 and/or directed at hand 916, device 101 detects a selection input performed by hand 916. In some embodiments, in response to detecting the selection input while gaze 914 is directed at representation 920 and/or hand 916, a plurality of representations of content entry tools are displayed, as shown in FIG. 9D. In FIG. 9D, device 101 displays representation 932-1 corresponding to a first content entry tool, representation 932-2 corresponding to a second content entry tool, and representation 932-3 corresponding to a third content entry tool (e.g., each of which are different content entry tools than the currently active tool represented by representation 920), optionally concurrently with representation 920 (e.g., the currently active tool). In some embodiments, any number of content entry tools can be displayed. In some embodiments, the most commonly used content entry tools are displayed (e.g., top 2, top 3, top 5 most commonly used tools, etc.). In some embodiments, the most recently used content entry tools are displayed (e.g., most recent 2, 3, 5, etc. content entry tools). Similarly to representation 920, representations 932-1 to 932-3 are optionally images of content entry tools (e.g., pen tool, highlighter tool, marker tool, etc. or the tips thereof). In some embodiments, the plurality of representations of content entry tools are displayed in response to the selection input if gaze 914 is directed to a content entry menu, an affordance on a menu associated with content entry (e.g., a drawing mode button, an annotation mode button, a button for causing display of a content entry palette), etc.

Figure 9E:
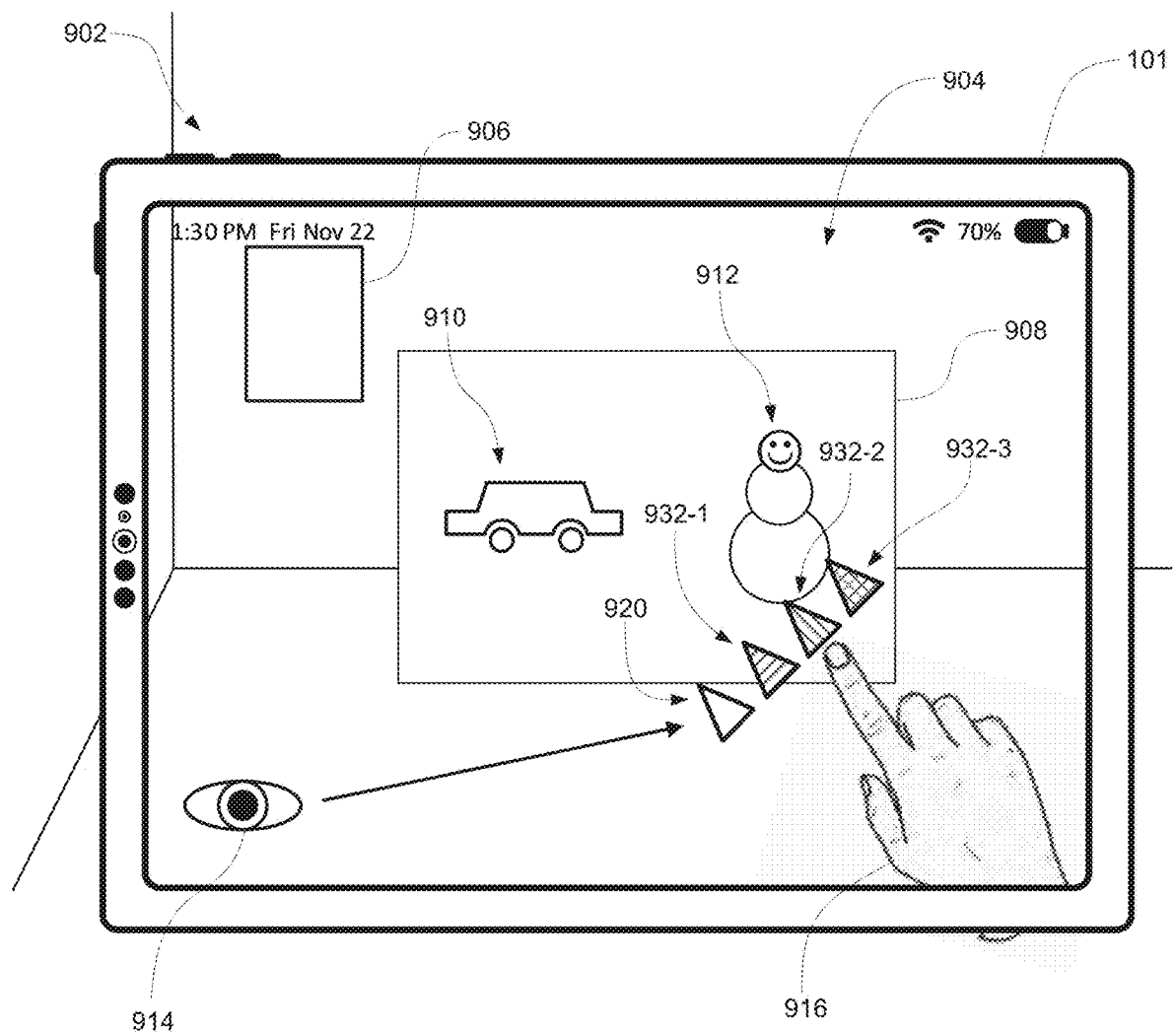
Figure 10A:
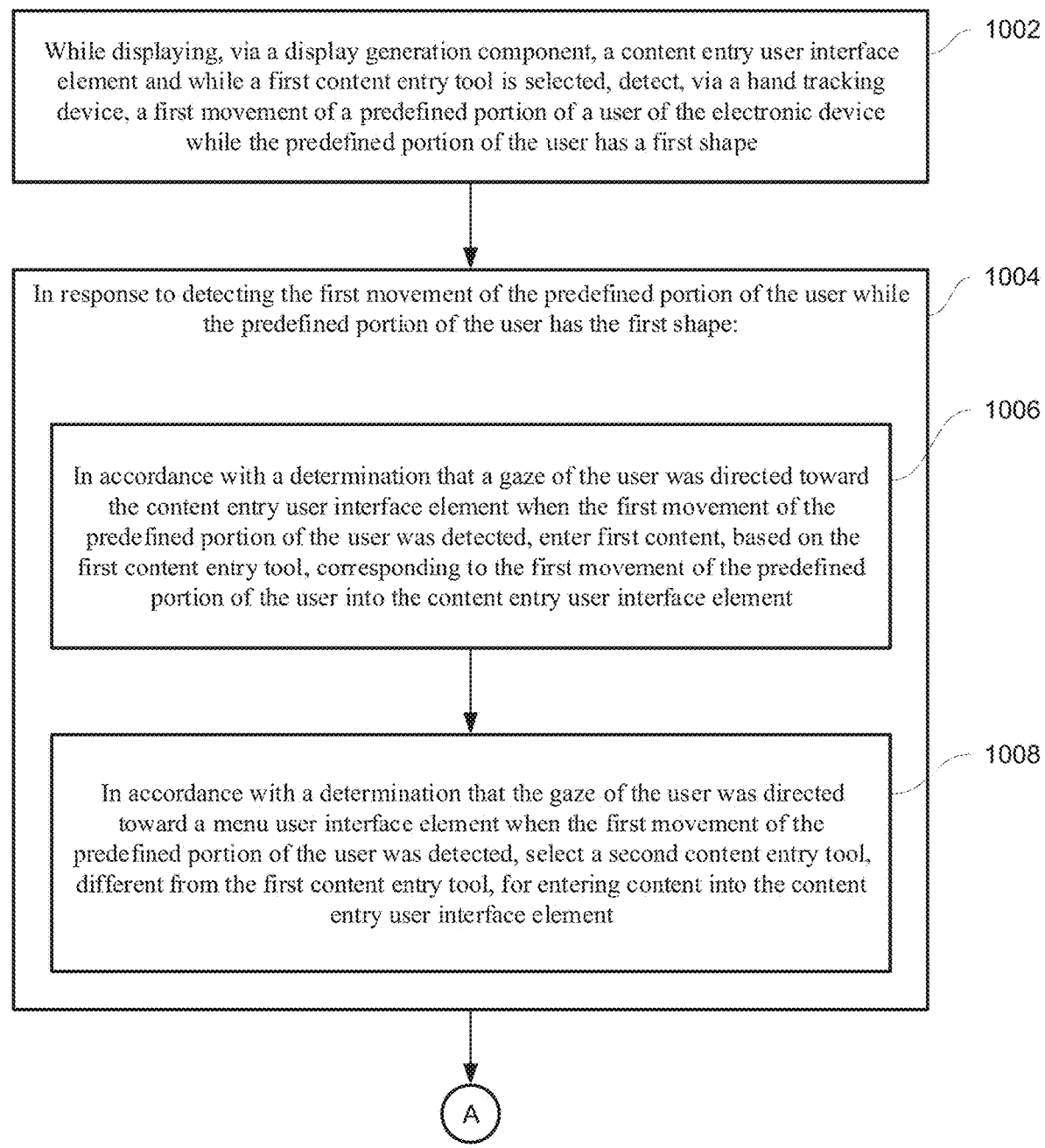
FIGS. 10A-10J is a flowchart illustrating a method of displaying indications of a content entry tool in accordance with some embodiments.
Figure 10B:
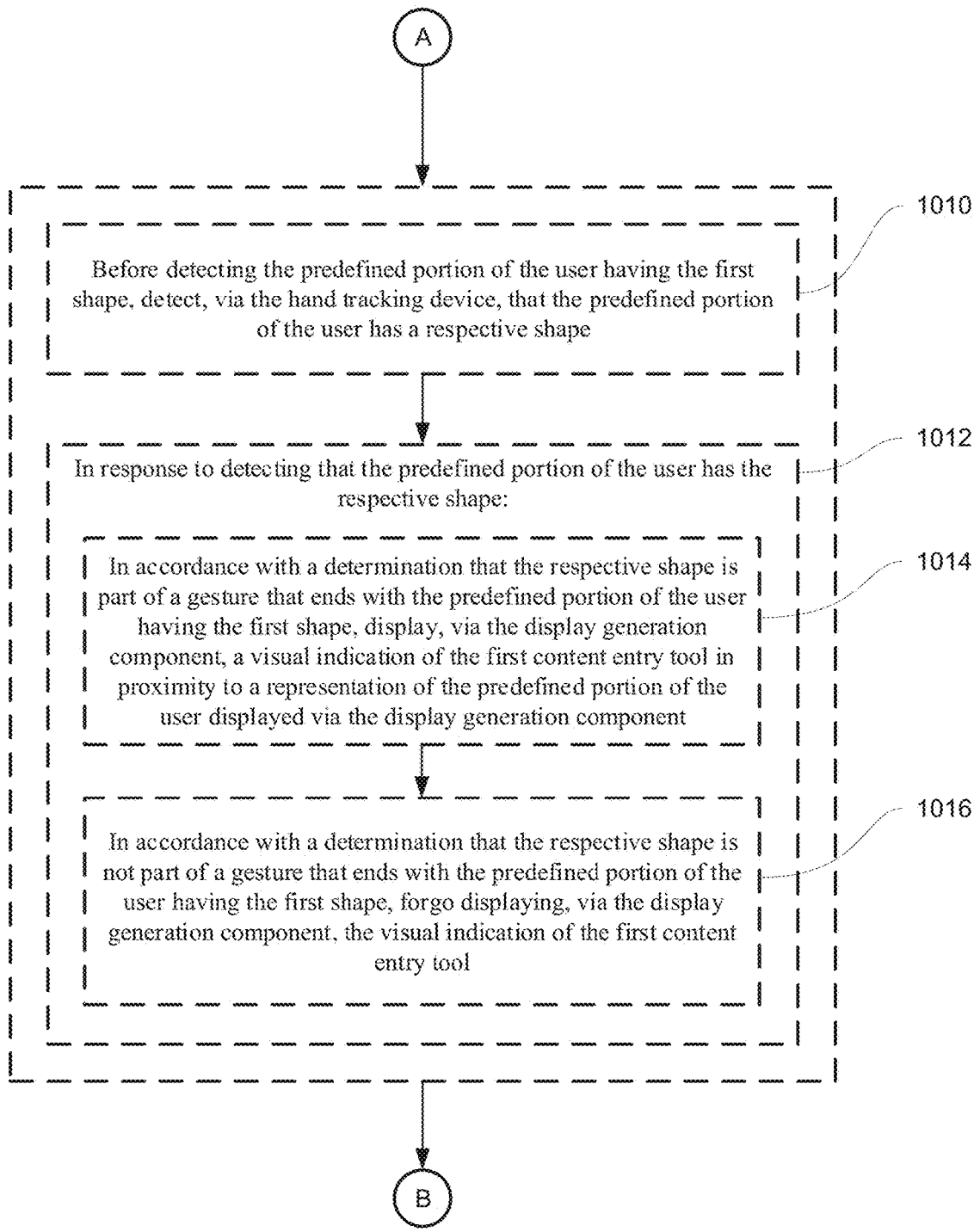
Figure 10C:
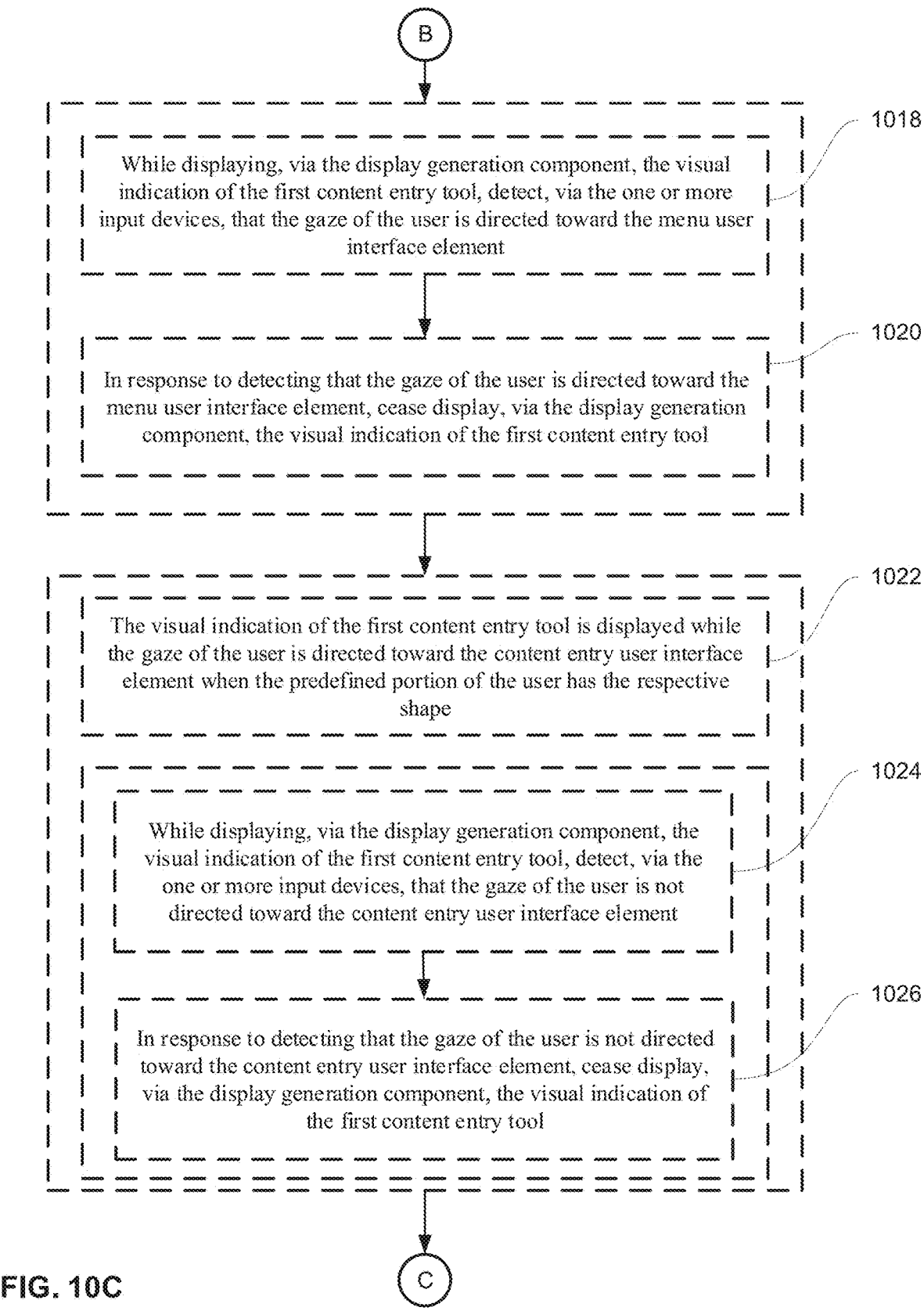
Figure 10D:
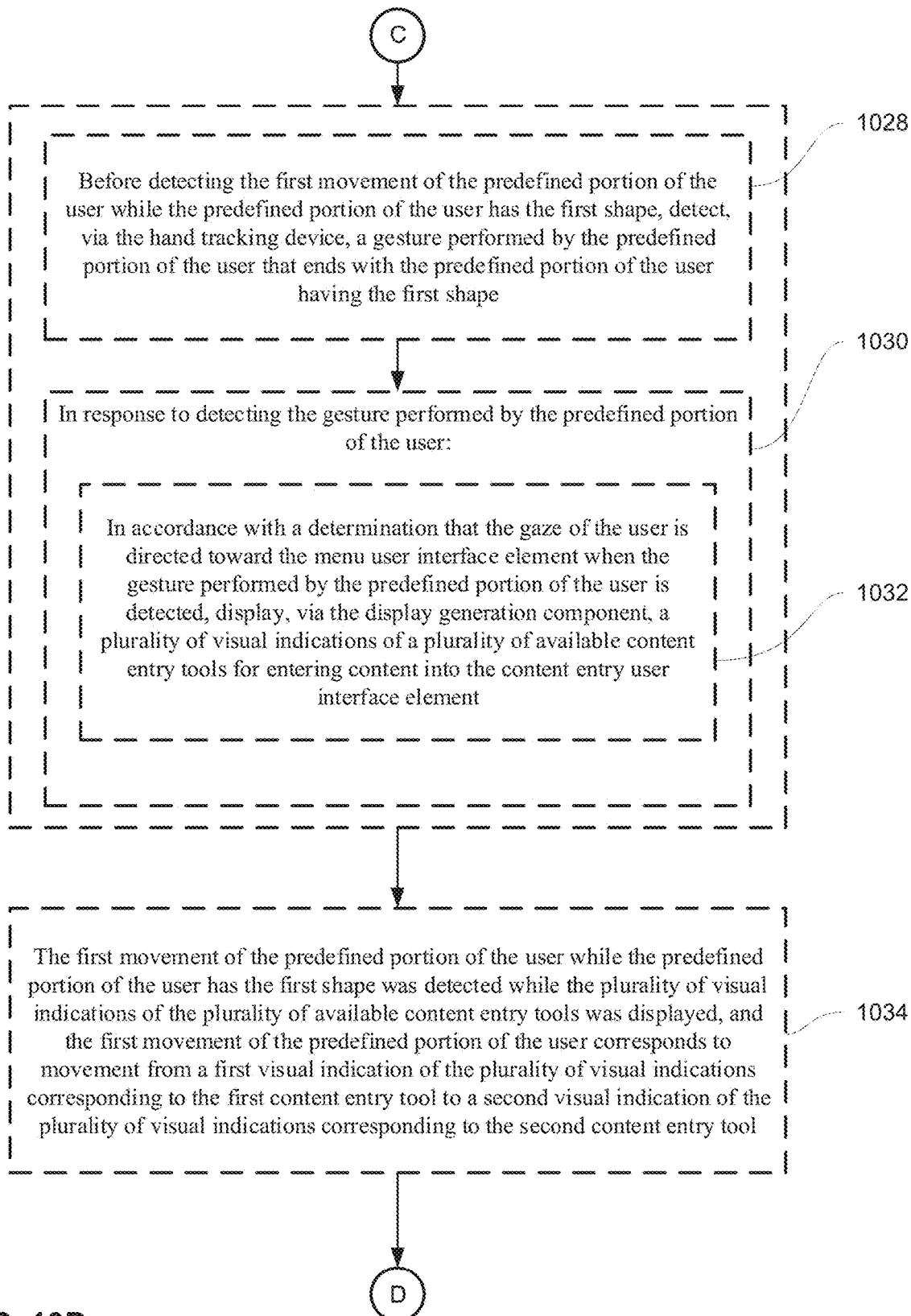
Figure 10E:
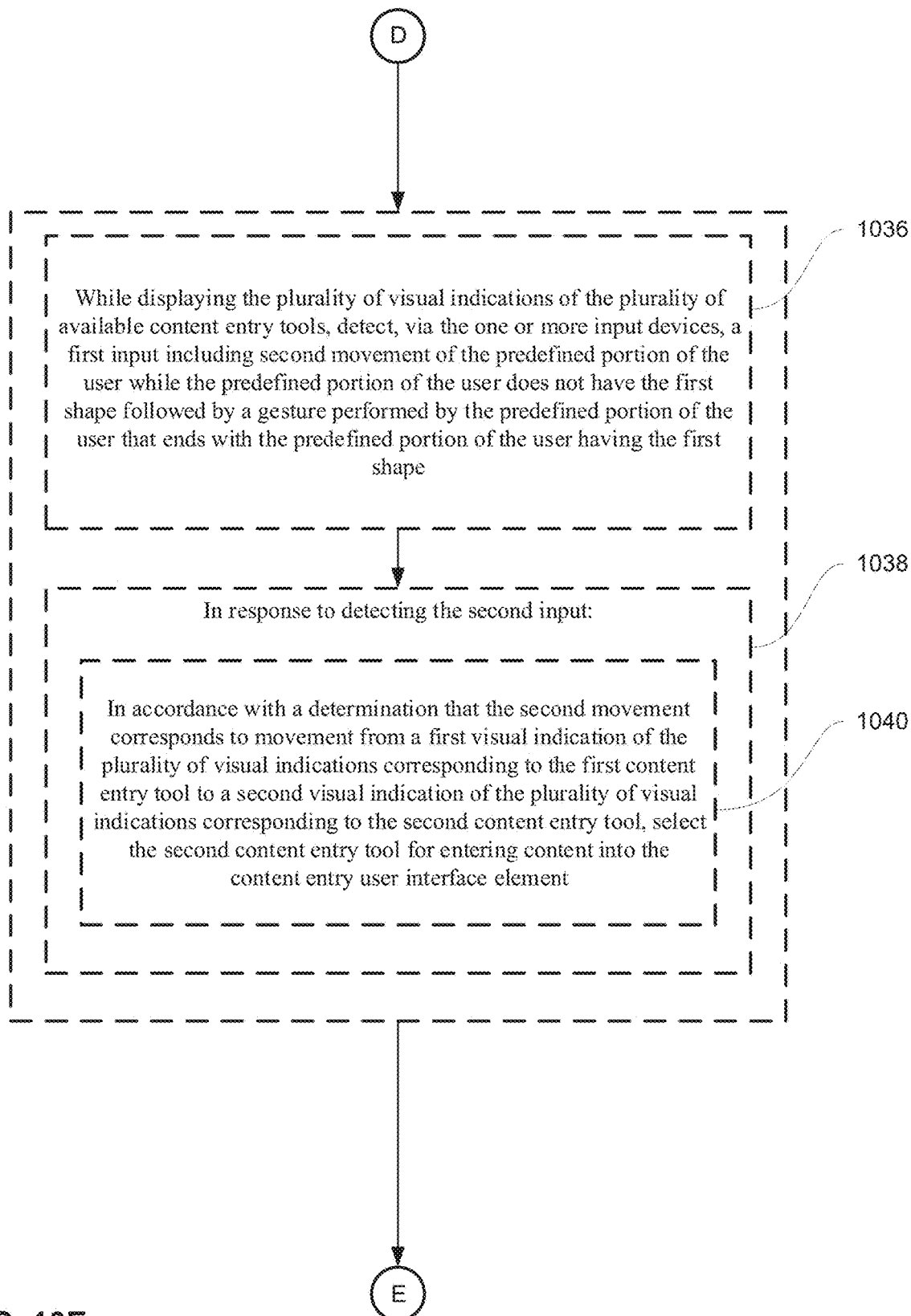
Figure 10F:
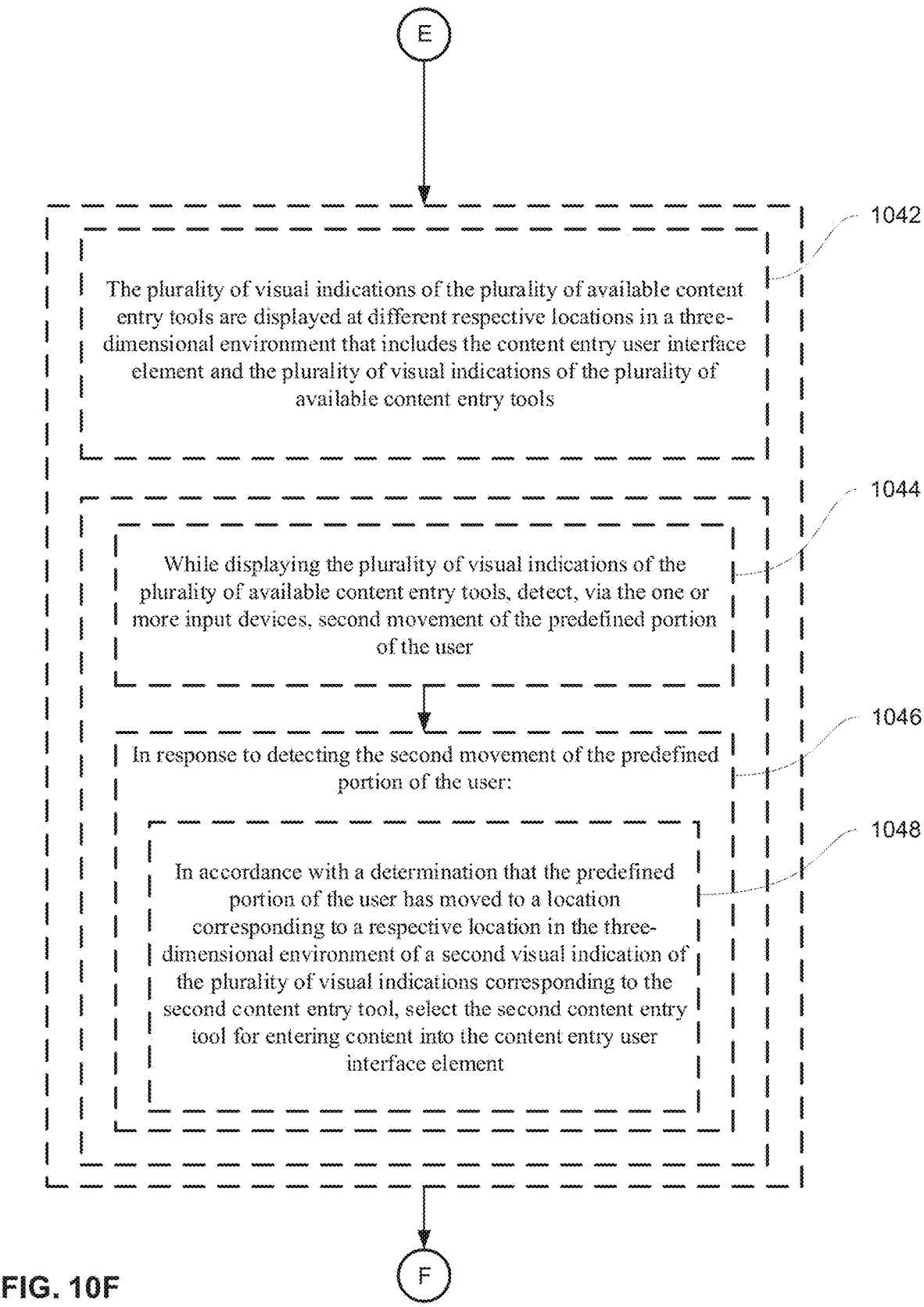
Figure 10G:
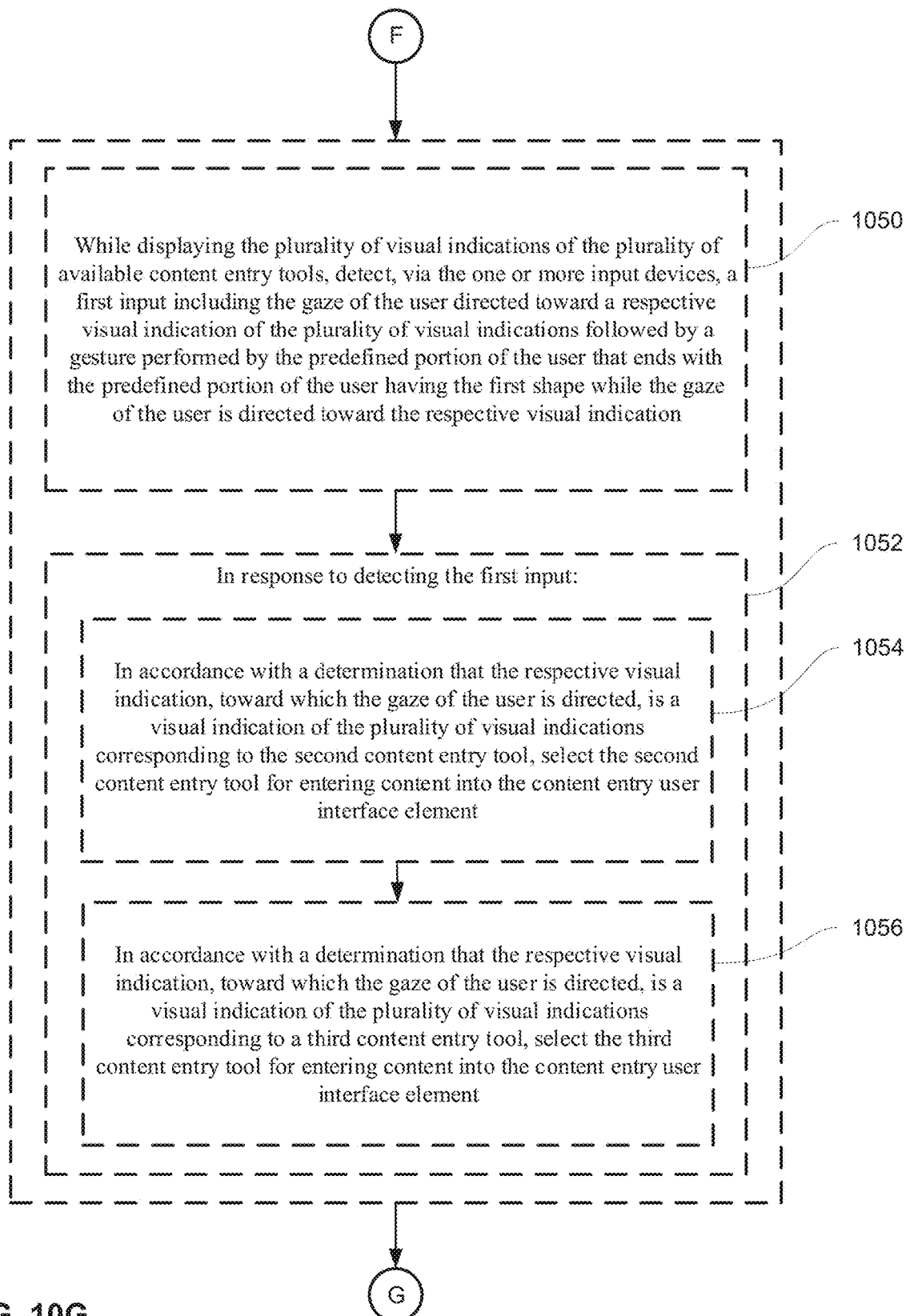
Figure 10H:
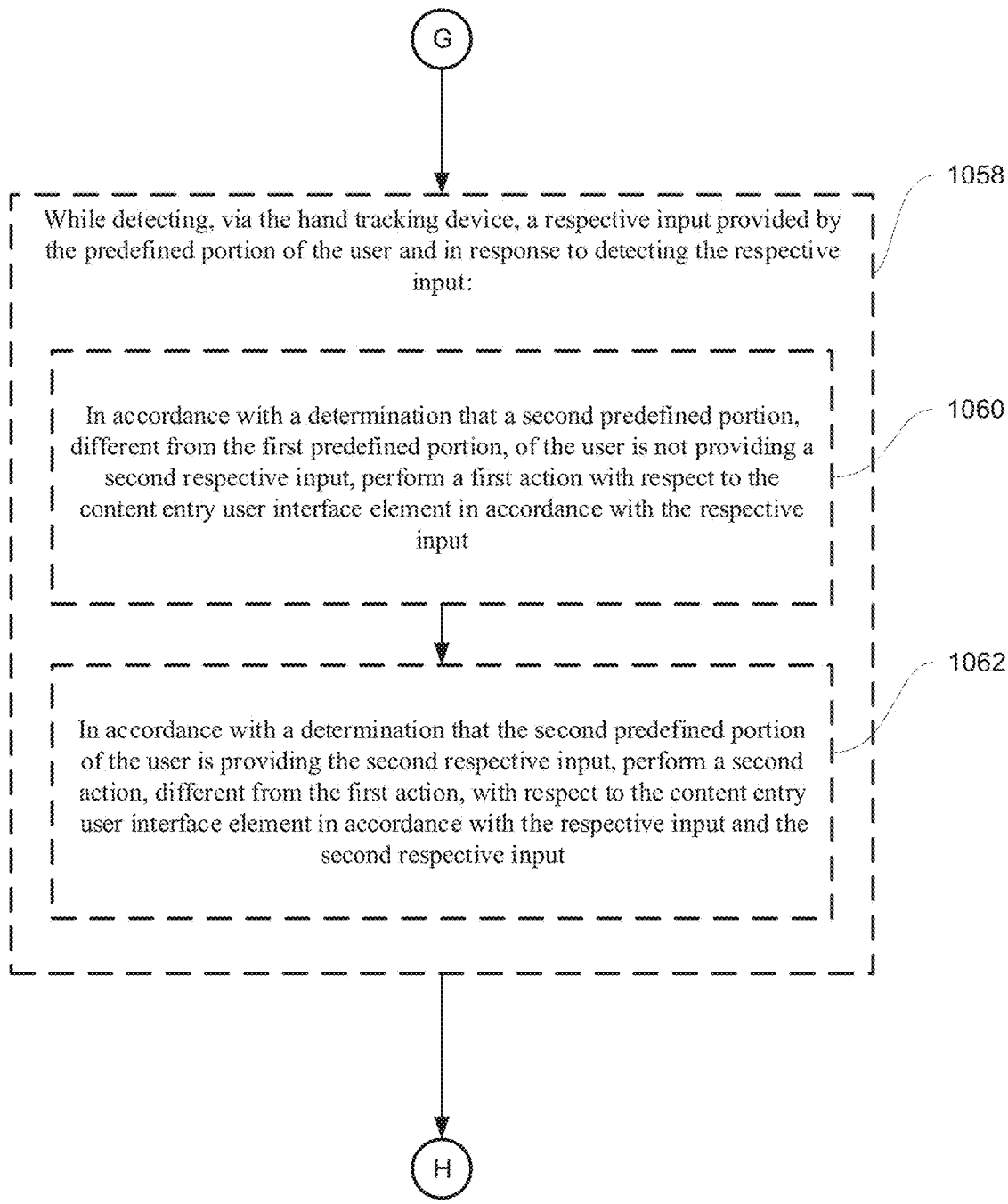
Figure 10I:
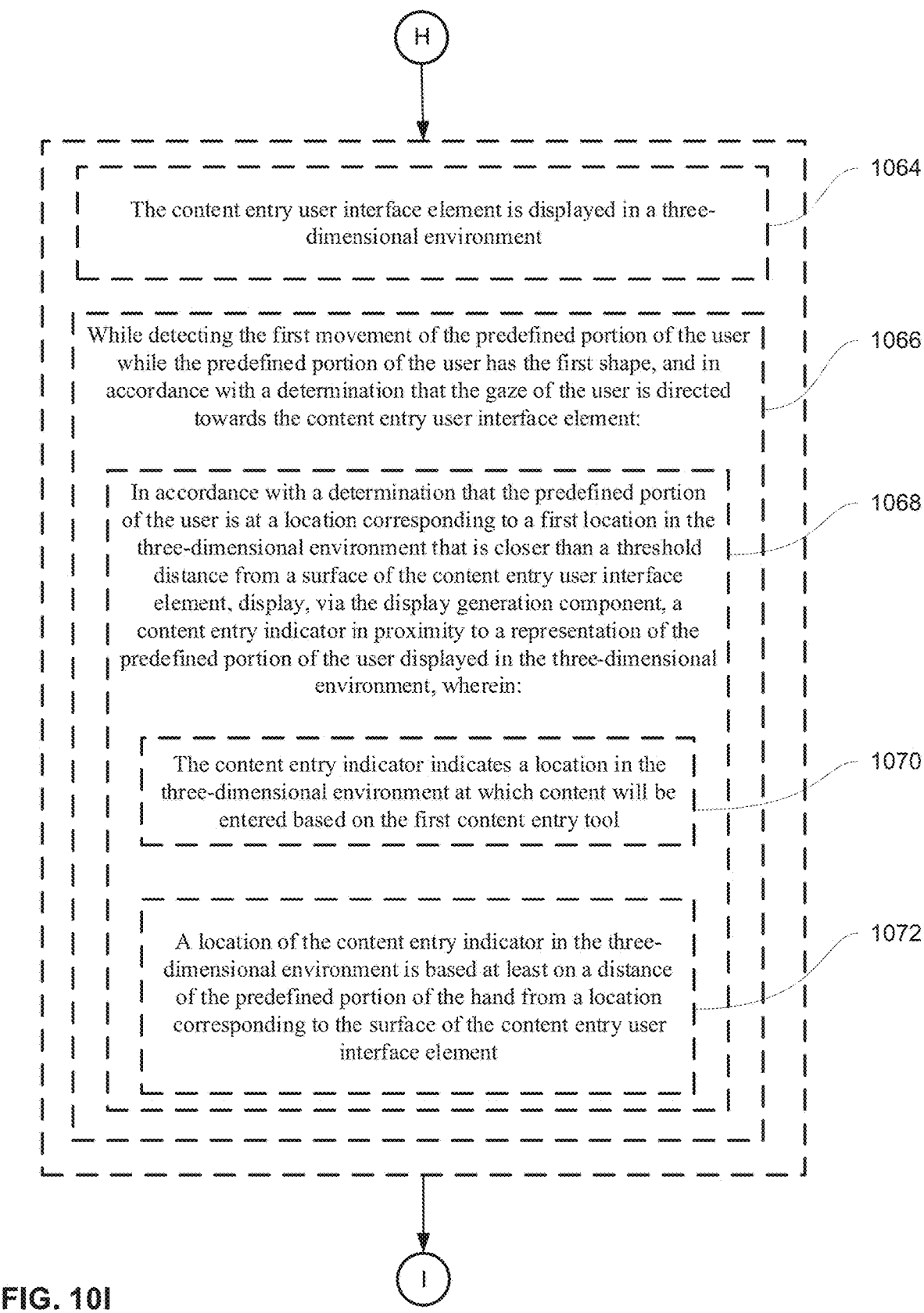
Figure 10J:
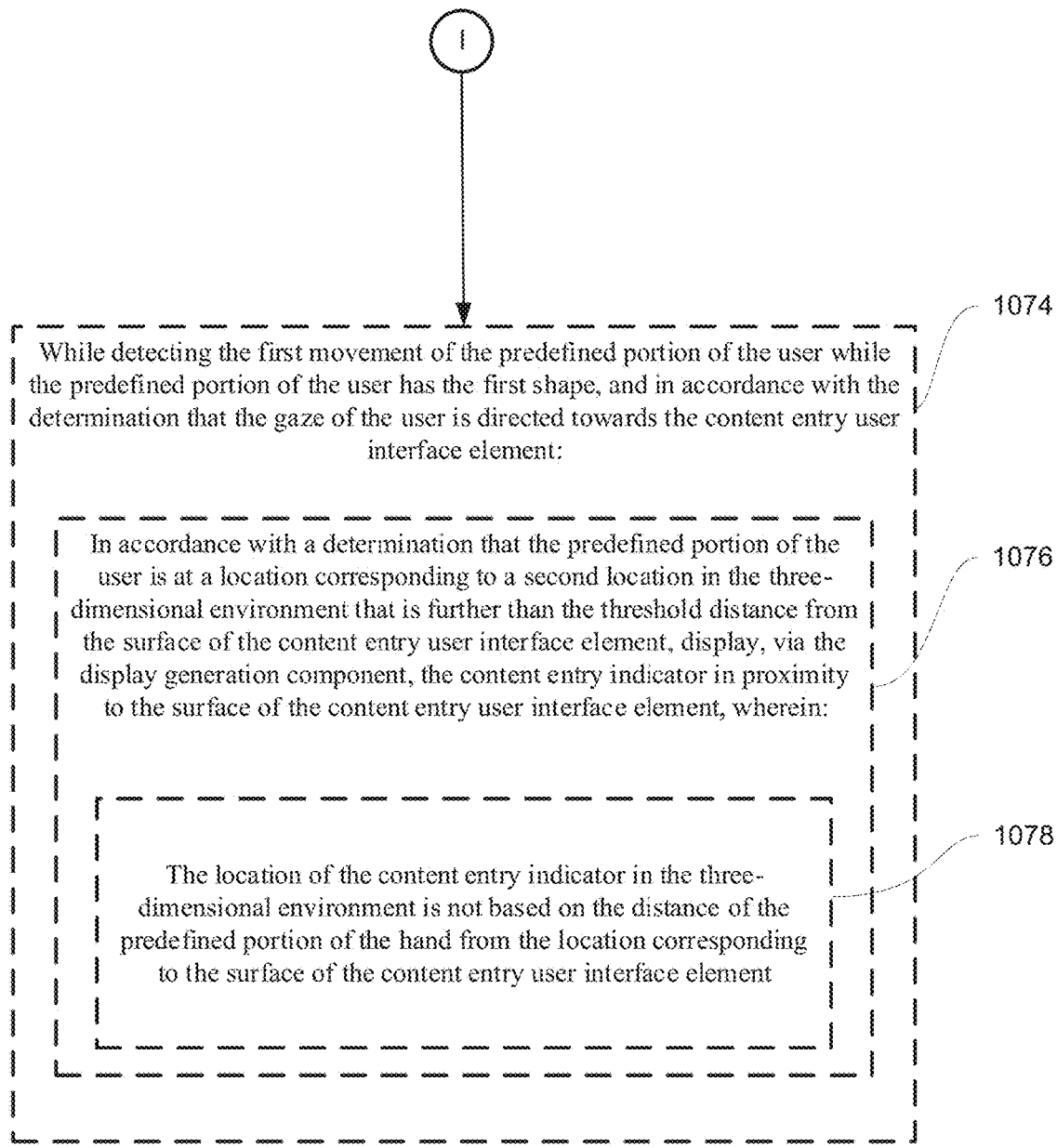

In some embodiments, representations 932-1 to 932-3 are displayed adjacent to or near representation 920 and are selectable (e.g., by hand 916) to change the currently active content entry tool from the tool associated with representation 920 to the tool associated with the selected representation. For example, in FIG. 9E, while displaying representations 932-1 to 932-3 and representation 920, device 101 detects a movement of hand 916 to, and a selection input (e.g., pinch by two fingers of the hand) directed to, representation 932-2 (e.g., a pinch on a location associated with representation 932-2 or a pinch while gaze 914 is directed to representation 932-2). As shown in FIG. 9E, while displaying representations 932-1 to 932-3 and representation 920, hand 916 is able to move around without causing dismissal of representations 932-1 to 932-3 and representation 920 (e.g., and while representations 920 and 932-1 to 932-3 remain at their locations in the three-dimensional environment 904). Thus, a user is able to move his or her hand to the respective location to select the respective desired content entry tool. In some embodiments, a user is able to perform a selection input directed to representation 920 and/or perform a selection input that is not directed at representations 932-1 to 932-3 to keep the same content entry tool as the active content entry tool and/or cause representations 932-1 to 932-3 to be dismissed (e.g., be no longer displayed). In some embodiments, in response to detecting the selection input, the selected content entry tool is set as the active content entry tool. As discussed above, the active content entry tool is the content entry tool used to insert content (e.g., "draw" content) in three-dimensional environment 904 and/or on visual clipboard 908 (e.g., or on objects on visual clipboard 908). In some embodiments, the active content entry tool defines the visual characteristics of the content that is drawn. For example, the highlighter tool optionally inserts a partially transparent yellow mark, a pen tool optionally inserts a thin mark, and a marker (or calligraphy) tool optionally inserts a thick mark when drawn in certain directions but a thin mark when drawn in other directions.

FIGS. 10A-10J is a flowchart illustrating a method 1000 of displaying indications of a content entry tool in accordance with some embodiments. In some embodiments, method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In the method 1000, in some embodiments, an electronic device (e.g., computer system 101 in FIG. 1) in communication with a display generation component and one or more input devices, including a hand tracking device (e.g., a mobile device (e.g., a tablet, a smartphone, a media player, or a wearable device), or a computer) while displaying, via the display generation component, a content entry user interface element (e.g., a user interface element on which a user is able to insert content) and while a first content entry tool is selected (e.g., while the first content entry tool is active such that drawing inputs cause drawings having a respective characteristic based on the first content entry tool), detects (1002), via the hand tracking device, a first movement of a predefined portion of a user (e.g., one or more hands of the user) of the electronic device while the predefined portion of the user has a first shape, such as the movement of first hand 916 in FIG. 9B while maintaining a pinch gesture (e.g., while the hand is maintaining a respective pose, detecting a movement of the hand).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor and/or a motion sensor (e.g., a hand tracking sensor, a hand motion sensor), etc. In some embodiments, a hand tracking device includes a visual light sensor (e.g., camera) and/or a depth sensor that is capable of detecting and/or tracking the movement of one or more hands of the user and/or the gestures being performed by the one or more hands of the user.

For example, a sketch pad, a note taking UI, etc. into which the user is able to enter text, draw content, insert objects, insert figures, etc. In some embodiments, the content entry user interface element is displayed in a three-dimensional environment (e.g., the content entry user interface element is the three-dimensional environment and/or is displayed within a three-dimensional environment) that is generated, displayed, or otherwise caused to be viewable by the device (e.g., a computer-generated reality (CGR) environment such as a virtual reality (VR) environment, a mixed reality (MR) environment, or an augmented reality (AR) environment, etc.

For example, the first content entry tool is a pencil tool, a marker tool, a pen tool, a highlighter tool, etc. In some embodiments, the first shape and/or respective pose corresponds to a request to enter content using the first content entry tool or corresponds to a request to change the active content entry tool, depending on the location of the gaze of the user. For example, the first shape is a pinch gesture performed by the hand.

In some embodiments, in response to detecting the first movement of the predefined portion of the user (e.g., hand) while the predefined portion of the user has the first shape (1004), in accordance with a determination that a gaze of the user was directed toward the content entry user interface element when the first movement of the predefined portion of the user was detected, the electronic device enters (1006) first content, based on the first content entry tool, corresponding to the first movement of the predefined portion of the user into the content entry user interface element, such as in FIG. 9B (e.g., such as described with reference to method 1200 and/or without changing the content entry tool). In some embodiments, if the user's gaze is directed to the content entry user interface element, then in response to the first movement while the hand has the first shape (e.g., pinch gesture), content is entered into the content entry user interface element (e.g., as if the user is drawing into the content entry user interface element using the first content entry tool).

In some embodiments, in accordance with a determination that the gaze of the user was directed toward a menu user interface element when the first movement of the predefined portion of the user was detected, the electronic device selects (1008) a second content entry tool, different from the first content entry tool, for entering content into the content entry user interface element, such as in FIG. 9D (e.g., based on the movement of the hand, and without entering content into the content entry user interface element).

In some embodiments, if the user's gaze is directed to a menu user interface element (e.g., that is optionally associated with content entry tools), then in response to the first movement of the hand while the hand has the first shape, a different content entry tool is selected. In some embodiments, if the user's gaze is directed to a menu user interface element (and optionally while a hand of the user is performing a respective gesture and/or has the first shape), one or more representations of content entry tools are displayed (e.g., a content entry palette that includes representations of content entry tools) and moving the hand causes a respective content entry tool of the displayed content entry tools to be selected as the active content entry tool.

The above-described manner of entering content or changing the content entry tool (e.g., based on whether the gaze of the user is directed to the content entry user interface element or a menu user interface element) provides for quick and efficient method of changing the content entry tool while entering content (e.g., by using the same gesture to enter content or change the content entry tool), which simplifies the interaction between the user and the electronic device and enhances the operability of the electronic device and makes the user-device interface more efficient (e.g., without requiring the user to perform different or additional inputs to change content entry tools while drawing content), which additionally reduces power usage and improves battery life of the electronic device by enabling the user to use the electronic device more quickly and efficiency, while reducing errors in usage.

In some embodiments, before detecting the predefined portion of the user having the first shape, the electronic device detects (1010), via the hand tracking device, that the predefined portion of the user has a respective shape, such as first hand 916 performing a pre-pinch gesture in FIG. 9A (e.g., before the hand of the user performs a pinch gesture, detecting that the hand is in a position to perform a pinch gesture). For example, the thumb and index finger of the hand forms a pre-pinch shape where two or more of the fingers (e.g., a thumb and one or more other fingers such as an index finger or middle finger) of the hand have moved close to each other and is ready to perform a pinch while the two or more fingers are not touching (e.g., before the two fingers touch or optionally after the fingers release the pinch gesture). In some embodiments, the pre-pinch shape formed by the thumb and index finger is a beginning of a movement that includes (e.g., terminates at) a pinch gesture.

In some embodiments, in response to detecting that the predefined portion of the user has the respective shape (1012), in accordance with a determination that the respective shape is part of a gesture that ends with the predefined portion of the user having the first shape (e.g., the respective shape is an intermediate shape that the hand performs in the process of achieving the first shape), the electronic device displays (1014), via the display generation component, a visual indication of the first content entry tool in proximity to a representation of the predefined portion of the user displayed via the display generation component, such as representation 920 in FIG. 9A (e.g., displaying a representation of the content entry tool that is currently active that controls how and/or what type of content is entered (e.g., drawn) when the hand performs the pinch gesture).

For example, the respective shape is a pre-pinch shape created by the thumb and the index finger before the thumb and index finger complete the pinch gesture and make contact. In some embodiments, the representation of the content entry tool is a tool tip, such as a pencil tip, a pen tip, a marker tip, etc. In some embodiments, the representation is displayed between the thumb and index finger (e.g., the location that the thumb and index finger will pinch). In some embodiments, additionally or alternatively to the visual indication of the first content entry tool, the device displays an indication of the shape of the content that will be drawn with the first content entry tool. For example, a pencil tool optionally draws content using a round tip, a marker tool optionally draws content using a flat tip (e.g., rectangular), etc.

In some embodiments, in accordance with a determination that the respective shape is not part of a gesture that ends with the predefined portion of the user having the first shape, the electronic device forgoes (1016) displaying, via the display generation component, the visual indication of the first content entry tool, such as not displaying representation 920 if the gesture performed by first hand 916 is not a pre-pinch gesture (e.g., if the hand is not performing the pre-pinch shape, then do not displaying the representation of the content entry tool).

In some embodiments, while the hand of the user is performing the pre-pinch shape and while displaying the visual indication of the first content entry tool, if the device detects that the hand stops performing the pre-pinch shape (e.g., and optionally that the hand is not performing a pinch gesture), then the visual indication is no longer displayed. In some embodiments, while displaying the visual indication of the first content entry tool, if the device detects that the hand has begun performing the pinch gesture (e.g., and no longer performing the pre-pinch shape), then display of the visual indication is optionally maintained (e.g., to indicate the content entry tool that is currently active and drawing).

The above-described manner of displaying a visual indication of a content entry tool (e.g., in response to detecting that the hand of the user has a shape consistent with performing a pinch gesture, such as by having a pre-pinch shape created between the thumb and index finger) provides for quick and efficient method of indicating the writing tool that will be used to insert content (e.g., by displaying the visual indication of the content entry tool when the hands of the user indicates a likelihood that a content entry input will be performed), which simplifies the interaction between the user and the electronic device and enhances the operability of the electronic device and makes the user-device interface more efficient (e.g., without requiring the user to perform additional inputs to determine the content entry tool that is currently active), which additionally reduces power usage and improves battery life of the electronic device by enabling the user to use the electronic device more quickly and efficiency, while reducing errors in usage.

In some embodiments, while displaying, via the display generation component, the visual indication of the first content entry tool, the electronic device detects (1018), via the one or more input devices, that the gaze of the user is directed toward the menu user interface element, such as in FIG. 9C (e.g., detecting that the user has looked away from the content entry user interface element and has looked at a menu, options in a menu, etc.).

Optionally, detecting that the user has looked away from the content entry user interface element, without regard to what the gaze is directed toward after moving away from the content entry user interface element. In some embodiments, the menu user interface element is displayed at a location in the three-dimensional environment near the representation of the user's hand. In some embodiments, the menu user interface element is displayed near the content entry user interface element. In some embodiments, the menu user interface element is displayed near the edge of the display area of the device. In some embodiments, the menu user interface element is associated with content entry for the content entry user interface element and includes one or more affordances for performing one or more functions with respect to interacting with the content entry user interface element. For example, the menu user interface element is optionally a content entry palette that includes one or more affordances for changing the content entry tool.

In some embodiments, in response to detecting that the gaze of the user is directed toward the menu user interface element, the electronic device ceases (1020) display, via the display generation component, the visual indication of the first content entry tool, such as removing display of representation 920 in FIG. 9C (e.g., removing display of the visual indication of the currently active content entry tool). In some embodiments, if the gaze of the user is directed at the menu user interface element, then pinch inputs optionally cause a selection of a menu element from the menu user interface element and optionally do not cause content to be drawn into the content entry user interface element. In such embodiments, the visual indication of the active content entry tool is removed from display to indicate that content will not be inserted into the content entry user interface element in response to a pinch input.

The above-described manner of ceasing display of a visual indication of a content entry tool (e.g., in response to detecting that the user's gaze has shifted away from the content entry user interface element and toward the menu user interface element) provides for quick and efficient method of removing display of the visual indication of the content entry tool when not necessary (e.g., when the user is not looking at the content entry user interface element and likely will not be entering content using the content entry tool), which simplifies the interaction between the user and the electronic device and enhances the operability of the electronic device and makes the user-device interface more efficient (e.g., by automatically reducing display clutter, without requiring the user to perform additional inputs to remove display of the visual indication), which additionally reduces power usage and improves battery life of the electronic device by enabling the user to use the electronic device more quickly and efficiency, while reducing errors in usage.

In some embodiments, the visual indication of the first content entry tool is displayed while (e.g., further in accordance with a determination that) the gaze of the user is directed toward the content entry user interface element when the predefined portion of the user has the respective shape (1022), such as in FIG. 9A (e.g., the visual indication is displayed when the hand is performing the pre-pinch gesture and while the gaze of the user is looking at the content entry user interface element (and/or optionally while the user is looking at the visual indication)).

In some embodiments, while displaying, via the display generation component, the visual indication of the first content entry tool, the electronic device detects (1024), via the one or more input devices, that the gaze of the user is not directed toward the content entry user interface element, such as in FIG. 9C (e.g., detecting that the user has looked away from the content entry user interface element, optionally without regard to what the gaze is now directed toward).

In some embodiments, in response to detecting that the gaze of the user is not directed toward the content entry user interface element (e.g., while the predefined portion of the user has the respective shape or without regard to whether or not the predefined portion of the user has the respective shape), the electronic device ceases (1026) display, via the display generation component, the visual indication of the first content entry tool, such as ceasing display of representation 920 in FIG. 9C (e.g., removing display of the visual indication of the currently active content entry tool). In some embodiments, if the gaze of the user is not directed at the content entry user interface element, then pinch inputs do not cause content to be drawn into the content entry user interface element. In such embodiments, the visual indication of the active content entry tool is removed from display to indicate that content will not be inserted into the content entry user interface element in response to a pinch input.

The above-described manner of ceasing display of a visual indication of a content entry tool (e.g., in response to detecting that the user's gaze has shifted away from the content entry user interface element) provides for quick and efficient method of removing display of the visual indication of the content entry tool when not necessary (e.g., when the user is not looking at the content entry user interface element and likely will not be entering content using the content entry tool), which simplifies the interaction between the user and the electronic device and enhances the operability of the electronic device and makes the user-device interface more efficient (e.g., by automatically reducing display clutter, without requiring the user to perform additional inputs to remove display of the visual indication), which additionally reduces power usage and improves battery life of the electronic device by enabling the user to use the electronic device more quickly and efficiency, while reducing errors in usage (e.g., by avoiding accidental inputs if the user is not looking towards the content entry user interface element).

In some embodiments, before detecting the first movement of the predefined portion of the user while the predefined portion of the user has the first shape, the electronic device detects (1028), via the hand tracking device, a gesture performed by the predefined portion of the user that ends with the predefined portion of the user having the first shape, such as in FIG. 9A (e.g., detecting that the hand of the user is performing a pinch gesture, which transiently includes (e.g., at the beginning of or during) performing the pre-pinch shape by the thumb and forefinger before the thumb and forefinger make contact in a pinch). In some embodiments, the pre-pinch shape is assumed while performing a pinch gesture. In some embodiments, the pre-pinch shape is performed while releasing the pinch gesture. In some embodiments, the pre-pinch shape is assumed while the hand performing the pre-pinch shape is within a threshold distance from the content entry user interface element (e.g., within 6 inches, 1 foot, 2 feet, 3 feet, etc.).

In some embodiments, in response to detecting the gesture performed by the predefined portion of the user (1030), in accordance with a determination that the gaze of the user is directed toward the menu user interface element when the gesture performed by the predefined portion of the user is detected, such as in FIG. 9C (e.g., if the user is looking at a selectable option of the menu user interface element when the pinch gesture is performed. In some embodiments, the user is looking at an option associated with displaying more content entry tools (e.g., the "more" option, the "more tools" option, etc.). In some embodiments, the user is looking at an option associated with the currently active tool on the menu user interface element), the electronic device displays (1032), via the display generation component, a plurality of visual indications of a plurality of available content entry tools for entering content into the content entry user interface element, such as in FIG. 9D (e.g., displaying multiple representations of multiple content entry tools that are selectable to change the currently active content entry tool to the selected content entry tool).

For example, the displayed tools include a pencil tool, a pen tool, a marker tool, a highlighter tool, etc. In some embodiments, the different content entry tools optionally cause content to be inserted (e.g., drawn) into the content entry user interface element (e.g., via a pinch gesture and a movement while maintaining the pinch gesture) with different visual characteristics. In some embodiments, the visual indications of the multiple available content entry tools are a similar size as the visual indication of the currently active entry tool and are optionally displayed adjacent to the visual indication of the currently active content entry tool. In some embodiments, the visual indications are selectable by moving the hand to a respective position and pinching on the respective visual indication. In some embodiments, in accordance with a determination that the gaze of the user is not directed toward the menu user interface element when the gesture performed by the predetermined portion of the user is detected, forgo displaying the plurality of visual indications of the plurality of available content entry tools. In some embodiments, while displaying the visual indications of the plurality of available content entry tools, if the device detects that the gaze has moved away from the menu user interface element, remove display of the visual indications of the plurality of available content entry tools.

The above-described manner of displaying multiple visual indications of available content entry tools (e.g., in response to detecting a pinch gesture while the gaze of the user is directed at a respective menu user interface element) provides for quick and efficient method of displaying and selecting amongst available content entry tools, which simplifies the interaction between the user and the electronic device and enhances the operability of the electronic device and makes the user-device interface more efficient (e.g., without requiring additional inputs for the user to navigate through multiple user interfaces to change content entry tools), which additionally reduces power usage and improves battery life of the electronic device by enabling the user to use the electronic device more quickly and efficiency, while reducing errors in usage.

In some embodiments, the first movement of the predefined portion of the user while the predefined portion of the user has the first shape was detected while the plurality of visual indications of the plurality of available content entry tools was displayed, and the first movement of the predefined portion of the user corresponds to movement from a first visual indication of the plurality of visual indications corresponding to the first content entry tool to a second visual indication of the plurality of visual indications corresponding to the second content entry tool (1034), such as in FIG. 9E (e.g., while the multiple visual indications of the available tools are displayed, detecting that the hand of the user has moved towards and/or within a threshold distance of (e.g., 0.1, 0.2, 0.5, 1, 2, 5 inch of) a respective visual indication while maintaining a pinch gesture (and optionally detecting the termination of the pinch gesture (e.g., release of the pinch) when the hand is at the location of the respective visual indication)). In some embodiments, in response, the electronic device selects the respective content entry tool associated with the respective visual indication as the active content entry tool (e.g., for use when inserting into the content entry user interface element).

The above-described manner of selecting content entry tools (e.g., while displaying multiple visual indications of multiple content entry tools, detecting a movement of the hand to a respective content entry tool while maintaining a pinch gesture) provides for quick and efficient method of selecting amongst available content entry tools, which simplifies the interaction between the user and the electronic device and enhances the operability of the electronic device and makes the user-device interface more efficient (e.g., without requiring additional inputs for the user to navigate through multiple user interfaces to change content entry tools), which additionally reduces power usage and improves battery life of the electronic device by enabling the user to use the electronic device more quickly and efficiency, while reducing errors in usage.

In some embodiments, while displaying the plurality of visual indications of the plurality of available content entry tools, the electronic device detects (1036), via the one or more input devices, a first input including second movement of the predefined portion of the user while the predefined portion of the user does not have the first shape followed by a gesture performed by the predefined portion of the user that ends with the predefined portion of the user having the first shape, such as in FIG. 9E (e.g., while the multiple visual indications are displayed, detecting that the hand of the user has moved towards a respective visual indication (e.g., within a threshold distance of, such as 0.1, 0.2, 0.5, 1, 2, 5 inch of) and performed a pinch gesture directed to the respective visual indication).

In some embodiments, in response to detecting the second input (1038), in accordance with a determination that the second movement corresponds to movement from a first visual indication of the plurality of visual indications corresponding to the first content entry tool to a second visual indication of the plurality of visual indications corresponding to the second content entry tool, the electronic device selects (1040) the second content entry tool for entering content into the content entry user interface element, such as selecting the content entry tool associated with representation 932-2 in FIG. 9E in response to detecting a selection gesture by hand 916 (e.g., selecting the respective content entry tool associated with the respective visual indication as the active content entry tool (e.g., for use when inserting into the content entry user interface element)).

If the hand moves to the location associated with the second content entry tool and while at the second content entry tool, the hand performs a pinch gesture, then the second content entry tool is optionally selected as the active content entry tool. If the hand moves to (e.g., within a threshold distance of, such as 0.1, 0.2, 0.5, 1, 2, 5 inch of) the location associated with the third content entry tool (e.g., as opposed to the location of the second content entry tool) and while at (e.g., within a threshold distance of, such as 0.1, 0.2, 0.5, 1, 2, 5 inch of) the third content entry tool, the hand performs a pinch gesture, then the third content entry tool is optionally selected as the active content entry tool.

The above-described manner of selecting content entry tools (e.g., while displaying multiple visual indications of multiple content entry tools, detecting a pinch gesture directed to a respective content entry tool) provides for quick and efficient method of selecting amongst available content entry tools, which simplifies the interaction between the user and the electronic device and enhances the operability of the electronic device and makes the user-device interface more efficient (e.g., without requiring additional inputs for the user to navigate through multiple user interfaces to change content entry tools), which additionally reduces power usage and improves battery life of the electronic device by enabling the user to use the electronic device more quickly and efficiency, while reducing errors in usage.

In some embodiments, the plurality of visual indications of the plurality of available content entry tools are displayed at different respective locations in a three-dimensional environment that includes the content entry user interface element and the plurality of visual indications of the plurality of available content entry tools (1042), such as in FIG. 9D (e.g., the plurality of visual indications are arranged along a line, in a row, in a column, in a grid, etc.).

In some embodiments, while displaying the plurality of visual indications of the plurality of available content entry tools, the electronic device detects (1044), via the one or more input devices, second movement of the predefined portion of the user, such as in FIG. 9E (e.g., detecting a movement of the hand moving along the line of visual indications).

In some embodiments, in response to detecting the second movement of the predefined portion of the user (1046), in accordance with a determination that the predefined portion of the user has moved to a location corresponding to a respective location in the three-dimensional environment of a second visual indication of the plurality of visual indications corresponding to the second content entry tool, the electronic device selects (1048) the second content entry tool for entering content into the content entry user interface element, such as selecting the content entry tool associated with representation 932-2 in FIG. 9E in response to detecting a selection gesture by hand 916 (e.g., selecting the visual indication associated with the location of the hand when the selection input (e.g., pinch gesture, unpinch gesture, etc.) is received).

For example, if the hand moved to (e.g., within a threshold distance of, such as 0.1, 0.2, 0.5, 1, 2, 5 inch of) the location of the second content entry tool, then in response to detecting a pinch gesture (e.g., if the hand is not maintaining the pinch gesture) or unpinch gesture (e.g., if the hand is maintaining the pinch gesture), then selecting the second content entry tool. If the hand moved to (e.g., within a threshold distance of, such as 0.1, 0.2, 0.5, 1, 2, 5 inch of) the location of the third content entry tool, then selecting the third content entry tool.

The above-described manner of selecting content entry tools (e.g., while displaying multiple visual indications of multiple content entry tools, detecting a pinch gesture directed to a respective content entry tool) provides for quick and efficient method of selecting amongst available content entry tools, which simplifies the interaction between the user and the electronic device and enhances the operability of the electronic device and makes the user-device interface more efficient (e.g., without requiring additional inputs for the user to navigate through multiple user interfaces to change content entry tools), which additionally reduces power usage and improves battery life of the electronic device by enabling the user to use the electronic device more quickly and efficiency, while reducing errors in usage.

In some embodiments, while displaying the plurality of visual indications of the plurality of available content entry tools, the electronic device detects (1050), via the one or more input devices, a first input including the gaze of the user directed toward a respective visual indication of the plurality of visual indications followed by a gesture performed by the predefined portion of the user that ends with the predefined portion of the user having the first shape while the gaze of the user is directed toward the respective visual indication, such as detecting a selection input by hand 916 while gaze 914 is directed to one of representations 932-1 to 932-3 in FIG. 9E (e.g., optionally without detecting a movement of the hand of the user or without movement of the hand of the user to (e.g., within a threshold distance of, such as 0.1, 0.2, 0.5, 1, 2, 5 inch of) the respective visual indication, detecting that the gaze of the user is directed to the respective visual indication and while the gaze is directed to the respective visual indication, detecting a pinch gesture performed by the hand of the user).

In some embodiments, in response to detecting the first input (1052), in accordance with a determination that the respective visual indication, toward which the gaze of the user is directed, is a visual indication of the plurality of visual indications corresponding to the second content entry tool, the electronic device selects (1054) the second content entry tool for entering content into the content entry user interface element (e.g., if the user's gaze is looking at the second content entry tool when the pinch occurred, then select the second content entry tool as the currently active tool).

In some embodiments, in accordance with a determination that the respective visual indication, toward which the gaze of the user is directed, is a visual indication of the plurality of visual indications corresponding to a third content entry tool, the electronic device selects (1056) the third content entry tool for entering content into the content entry user interface element (e.g., if the user's gaze is looking at the third content entry tool when the pinch occurred, then select the third content entry tool as the currently active tool).

The above-described manner of selecting content entry tools (e.g., while displaying multiple visual indications of multiple content entry tools, detecting a pinch gesture while the gaze of the user is directed to a respective content entry tool) provides for quick and efficient method of selecting amongst available content entry tools, which simplifies the interaction between the user and the electronic device and enhances the operability of the electronic device and makes the user-device interface more efficient (e.g., without requiring additional inputs for the user to navigate through multiple user interfaces to change content entry tools), which additionally reduces power usage and improves battery life of the electronic device by enabling the user to use the electronic device more quickly and efficiency, while reducing errors in usage.

In some embodiments, while detecting, via the hand tracking device, a respective input provided by the pre-defined portion of the user (e.g., while detecting a pinch gesture or a pre-pinch position by one hand of the user, such as if the one hand of the user is maintaining a pinch hand shape while moving) and in response to detecting the respective input (1058), in accordance with a determination that a second predefined portion, different from the first predefined portion, of the user is not providing a second respective input, the electronic device performs (1060) a first action with respect to the content entry user interface element in accordance with the respective input, such as if third hand 930 is not performing an input, performing a drawing function in FIG. 9B (e.g., if the second hand of the user is not performing a gesture or is not performing a particular gesture, then perform a first action associated with the gesture being performed by the first hand).

For example, if the first hand is performing a pinch gesture (e.g., plus motion) to cause insertion of content into the content entry region, and the second hand is not performing any gestures or is not performing a gesture predetermined to correspond to a rotation and/or resizing gesture (e.g., or any other gesture that is performed using two hands), then insert content into the content entry region according to the gesture being performed by the first hand.

In some embodiments, in accordance with a determination that the second predefined portion of the user is providing the second respective input, the electronic device performs (1062) a second action, different from the first action, with respect to the content entry user interface element in accordance with the respective input and the second respective input, such as if third hand 930 is performing an input, performing a resizing and/or rotation function in FIG. 9B (e.g., if the first hand is performing a pinch gesture, but the second hand is also performing a pinch gesture, then instead of inserting content, perform a rotation or resizing operation (e.g., based on whether the hands are moving away from each other or closer to each other, or in a rotational manner around a center point, respectively) on a respective object (e.g., the marks that were made by the first hand of the user before the second hand of the user provided the second respective input).

The above-described manner of adjusting action performed by a first hand based on a second hand (e.g., by using a second hand to begin rotating or resizing the object), provides for a quick and efficient method of performing different functions using one or more hands (e.g., without requiring the user to perform additional inputs to switch from content insertion mode to rotation or resizing mode), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the content entry user interface element is displayed in a three-dimensional environment (1064). In some embodiments, while detecting the first movement of the predefined portion of the user while the predefined portion of the user has the first shape, and in accordance with a determination that the gaze of the user is directed towards the content entry user interface element (1066) (e.g., while detecting that the user is looking at the content entry user interface element and the hand of the user is holding a pre-pinch shape indicative of a potential or imminent pinch gesture), in accordance with a determination that the predefined portion of the user is at a location corresponding to a first location in the three-dimensional environment that is closer than a threshold distance from a surface of the content entry user interface element (e.g., if the hand is within a threshold distance from the content entry user interface (e.g., 1 inch, 3 inches, 6 inches, 12 inches, etc.)), the electronic device displays (1068), via the display generation component, a content entry indicator in proximity to a representation of the predefined portion of the user displayed in the three-dimensional environment, such as content entry indicator 928 displayed near second hand 918 in FIG. 9B (e.g., displaying a visual indicator near the location of the hand to indicate the location in the three-dimensional environment (e.g., not necessarily on or near the surface of the content entry user interface element) at which content will be inserted in response to detecting a pinch gesture by the hand (e.g., at the anticipated pinch location, 0.5 inches away from the anticipated pinch location, 1 inch away, 3 inches away, etc.)).

In some embodiments, the threshold distance corresponds to the distance further than which user inputs are interpreted as indirect inputs (e.g., in which the location with which the user is interacting is at least partially based on the gaze of the user), and closer than which user inputs are interpreted as direct inputs (e.g., in which the location with which the user is interacting is based on the position of the hand and optionally not based on the gaze of the user).

In some embodiments, the content entry indicator indicates a location in the three-dimensional environment at which content will be entered based on the first content entry tool (1070) (e.g., the visual indicator is optionally displayed in space at the location where content will be inserted and the visual indicator is based at least in part on the location of the hand (e.g., x, y, and z position)).

For example, in response to detecting a pinch gesture while the content entry indicator is displayed, content is inserted (e.g., drawn) at the location of the content entry indicator (e.g., at the x, y, and z position). In some embodiments, the visual indicator is displayed in a space between the forefinger and the thumb that is creating the pre-pinch shape. In some embodiments, the visual indicator is displayed at the location where the forefinger and thumb meet when performing the pinch gesture.

In some embodiments, a location of the content entry indicator in the three-dimensional environment is based at least on a distance of the predefined portion of the hand from a location corresponding to the surface of the content entry user interface element (1072), such as the location of content entry indicator 928 being based on the position of second hand 918 in FIG. 9B (e.g., the position of the visual indicator is based on the position of the hand). For example, while in indirect manipulation mode, the location of the content entry indicator is located at or near the hand (e.g., at the location of a potential pinch) and thus if the user moves his or her hand toward or farther away from the content entry user interface element, the visual indicator moves closer or farther away from the content entry user interface element in accordance with the movement of the hand. In some embodiments, if the user moves his or her hand laterally (e.g., to the left or right), the visual indicator moves to the left or right with the movement of the hand.

The above-described manner of displaying a content entry indicator (e.g., at a location near the hand of the user if the hand of the user is within a threshold distance of a content entry user interface element), provides for a quick and efficient method of indicating the location at which content will be entered (e.g., without requiring the user to perform additional inputs of trial and error to determine at where content will be drawn), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while detecting the first movement of the predefined portion of the user while the predefined portion of the user has the first shape, and in accordance with the determination that the gaze of the user is directed towards the content entry user interface element (1074) (e.g., while detecting that the user is looking at the content entry user interface element and the hand of the user is holding a pre-pinch shape indicative of a potential or imminent pinch gesture), in accordance with a determination that the predefined portion of the user is at a location corresponding to a second location in the three-dimensional environment that is further than the threshold distance from the surface of the content entry user interface element (e.g., if the hand is farther than the threshold distance from the content entry user interface (e.g., 1 inch, 3 inches, 6 inches, 12 inches, etc.)), the electronic device displays (1076), via the display generation component, the content entry indicator in proximity to the surface of the content entry user interface element, such as content entry indicator 924 being displayed on the surface of visual clipboard 908 (e.g., displaying a visual indicator on or near the content entry user interface, indicating the location on the content entry user interface element on which at which content will be inserted in response to detecting a pinch gesture by the hand). For example, because the hand is farther than the threshold distance, the user's interactions using the hand are interpreted as an indirect manipulation interaction in which the gaze of the user at least partially determines where the content is inserted.

In some embodiments, the location of the content entry indicator in the three-dimensional environment is not based on the distance of the predefined portion of the hand from the location corresponding to the surface of the content entry user interface element (1078), for example in FIG. 9B, the location of content entry indicator 924 is not based on the distance of hand 916 from visual clipboard 908 (e.g., the content entry indicator is attached to the content entry user interface element (e.g., has a location that is on the surface of the content entry user interface element)).

In some embodiments, the lateral location of the content entry indicator on the surface of the content entry user interface element is based on the gaze of the user, the position of the hand, and/or both. In some embodiments, if the user moves his or her hand laterally (e.g., to the left or right), the visual indicator moves to the left or right with the movement of the hand.

The above-described manner of displaying a content entry indicator (e.g., at a location on or near the content entry user interface element), provides for a quick and efficient method of indicating the location at which content will be entered (e.g., without requiring the user to perform additional inputs of trial and error to determine at where content will be drawn), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

FIGS. 11A-11F illustrate examples of method for providing for interactions with virtual objects in a three-dimensional environment in accordance with some embodiments.

Figure 11A:
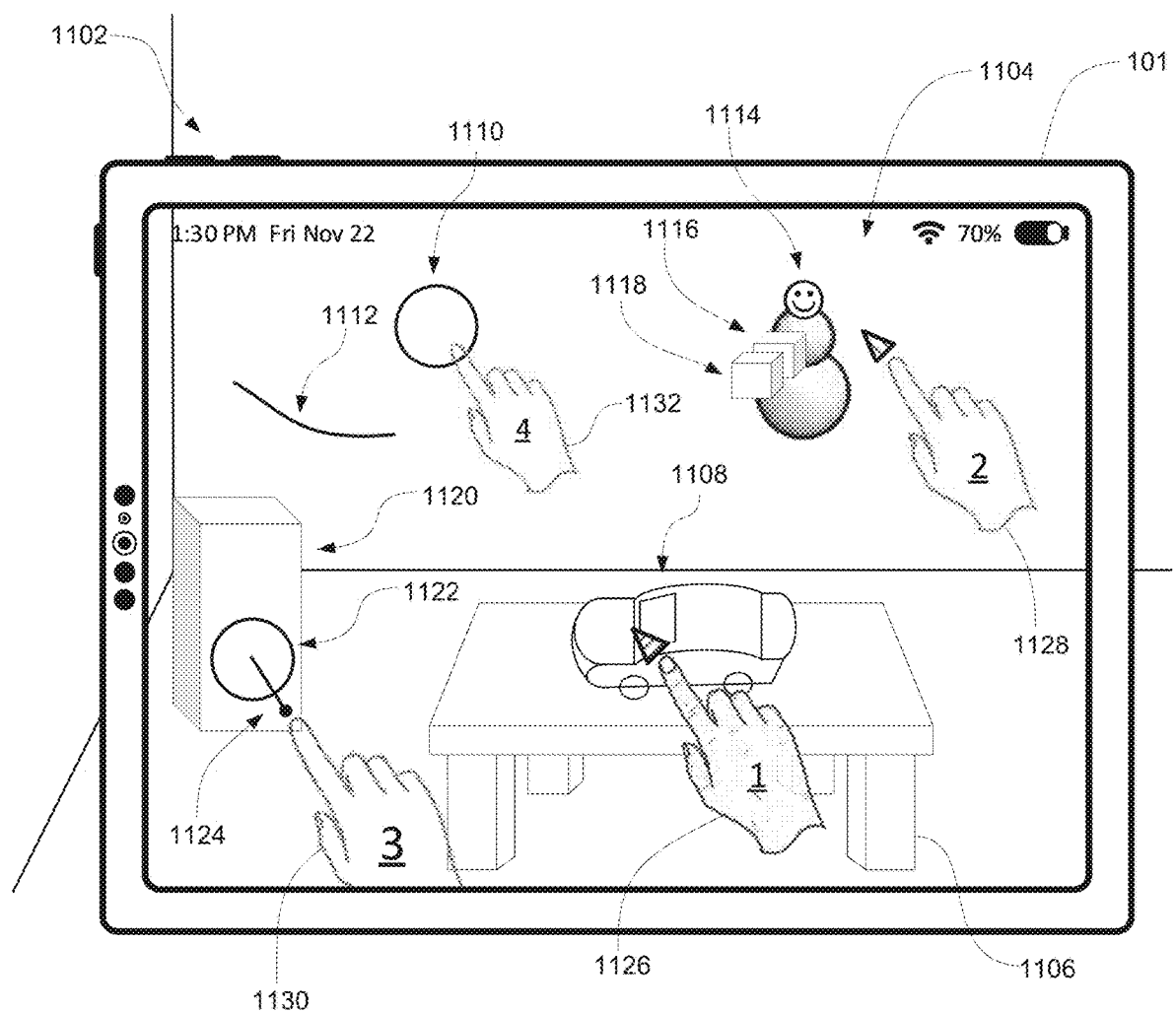
FIGS. 11A-11F illustrate examples of a method for providing for interactions with virtual objects in a three-dimensional environment in accordance with some embodiments.

FIG. 11A illustrates an electronic device 101 displaying, via a display generation component (e.g., display generation component 120 of FIG. 1), a three-dimensional environment 1104 on a user interface. As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

As shown in FIG. 11A, device 101 captures one or more images of the real world environment 1102 around device 101 (e.g., operating environment 100), including one or more objects in the real world environment 1102 around device 101. In some embodiments, device 101 displays representations of the real world environment in three-dimensional environment 1104. For example, three-dimensional environment 1104 includes a back corner of a room and a representation of table 1106. As shown in FIG. 11A, table 1106 is a real object in real world environment 902 which has been captured by the one or more sensors of device 101, representation of which is included in three-dimensional environment 1104 (e.g., photorealistic representation, simplified representation, cartoon, caricature, etc.). In FIG. 11A, three-dimensional environment 1104 includes representation 1108 of a car located on the top surface of table 1106, representation 1114 of a snowman, representation 1116 of a first cube in front of representation 1114 of the snowman, representation 1118 of a second cube in front of representation 1116 of the first cube, and representation 1120 of a rectangular box. FIG. 11A additionally includes circle 1110 and line 1112 that optionally have been drawn by the user (e.g., in a manner similar to described above with respect to method 1000), and circle 1122 which optionally has been drawn onto the front surface of representation 1120 of the rectangular box by the user.

In some embodiments, three-dimensional environment 1104 includes one or more representations of one or more hands of the user detected (e.g., captured) by the sensors of device 101. For example, in FIG. 11A, three-dimensional environment 1104 includes first hand 1126, second hand 1128, third hand 1130, and fourth hand 1132 of the user interacting with device 101. In some embodiments, first hand 1126, second hand 1128, third hand 1130, and fourth hand 1132 interact with device 101 at different times. In some embodiments, first hand 1126, second hand 1128, third hand 1130, and/or fourth hand 1132 interact with device 101 at the same time (e.g., concurrently).

In FIG. 11A, first hand 1126 is performing a direct manipulation content entry input directed to representation 1108 of a car. As discussed above, direct manipulation content entry input directed to representation 1108 optionally includes a pinch gesture performed by first hand 1126 while first hand 1126 is within a threshold distance from representation 1108 (e.g., within 0.1 inches, 0.5 inches, 1 inch, 5 inches, 10 inches, etc.) and while a content entry tool is currently active. In FIG. 11A, second hand 1128 is performing a selection input while a selection tool is the currently active tool. In some embodiments, third hand 1130 is at a location near circle 1122 drawn on representation 1120 of the rectangular box, and fourth hand 1132 is performing a selection input directed to circle. Interactions of first hand 1126, second hand 1128, and fourth hand 1132 will be discussed in further detail below with respect to FIG. 11B.

In some embodiments, in accordance with a determination that third hand 1130 is within a threshold distance from circle 1122 (and/or in accordance with a determination that the gaze of the user is directed to circle 1122, optionally when third hand 1130 is performing a pre-pinch gesture), device 101 optionally displays an extrusion affordance 1124. In some embodiments, extrusion affordance 1124 is a selectable element that is selectable to perform an extrusion function on circle 1122, as will be described in further detail below with respect to FIG. 11B.

Figure 11B:
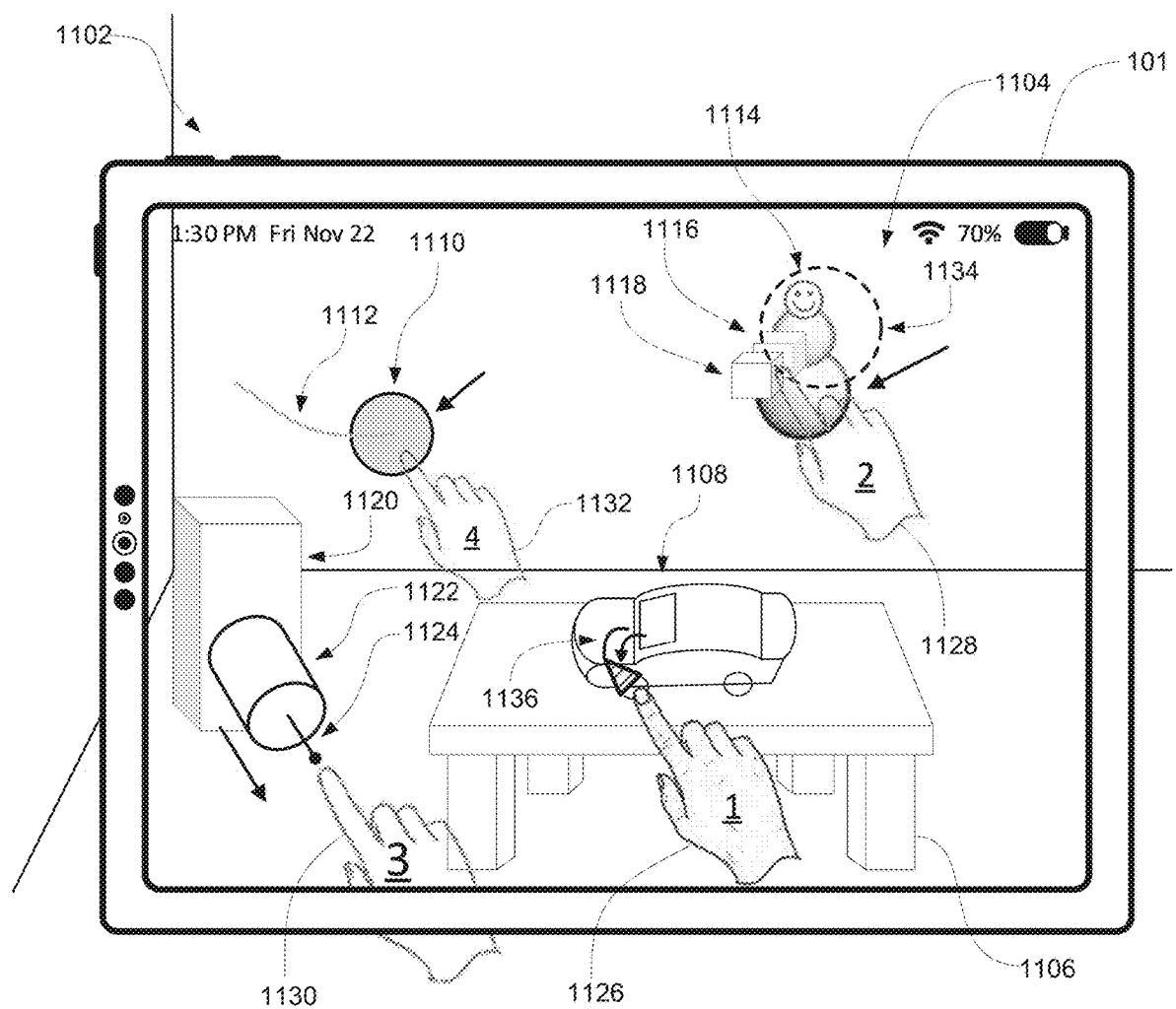

In FIG. 11B, device 101 detects a movement of first hand 1126 while maintaining the content entry input (e.g., a movement in the −x direction (e.g., leftwards from the perspective of the user) followed by a movement in the −z direction (e.g., towards the perspective of the user)). In some embodiments, in response to detecting the movement of first hand 1126 while maintaining the content entry input, mark 1136 is inserted (e.g., drawn) on representation 1108. In some embodiments, representation 1108 is a three-dimensional model of a car and as a result, mark 1136 is drawn on the surface of the hood portion of representation 1108 and follows the contours of the surface of the hood portion of representation 1108. For example, mark 1136 optionally curves leftwards (e.g., in the −x direction) and then toward the viewpoint of the user (e.g., in the −z direction). In some embodiments, as will be discussed in further detail below with respect to FIG. 11E, marks drawn on representation 1108 move and rotate with the movement and rotation of representation 1108. In some embodiments, because first hand 1126 is performing a direct manipulation content entry input, mark 1136 is drawn at a location in space based on the location of first hand 1126. For example, if first hand 1126 was located such that the content entry tool is floating an inch above representation 1108, then the marks will be inserted an inch above representation 1108. Thus, when performing a direct manipulation content entry input, a user is able to control not only the lateral position of the mark (e.g., left-right and up-down position of the mark from the viewpoint of the user), but also the depth position of the mark (e.g., distance from the viewpoint of the user).

Figure 11C:
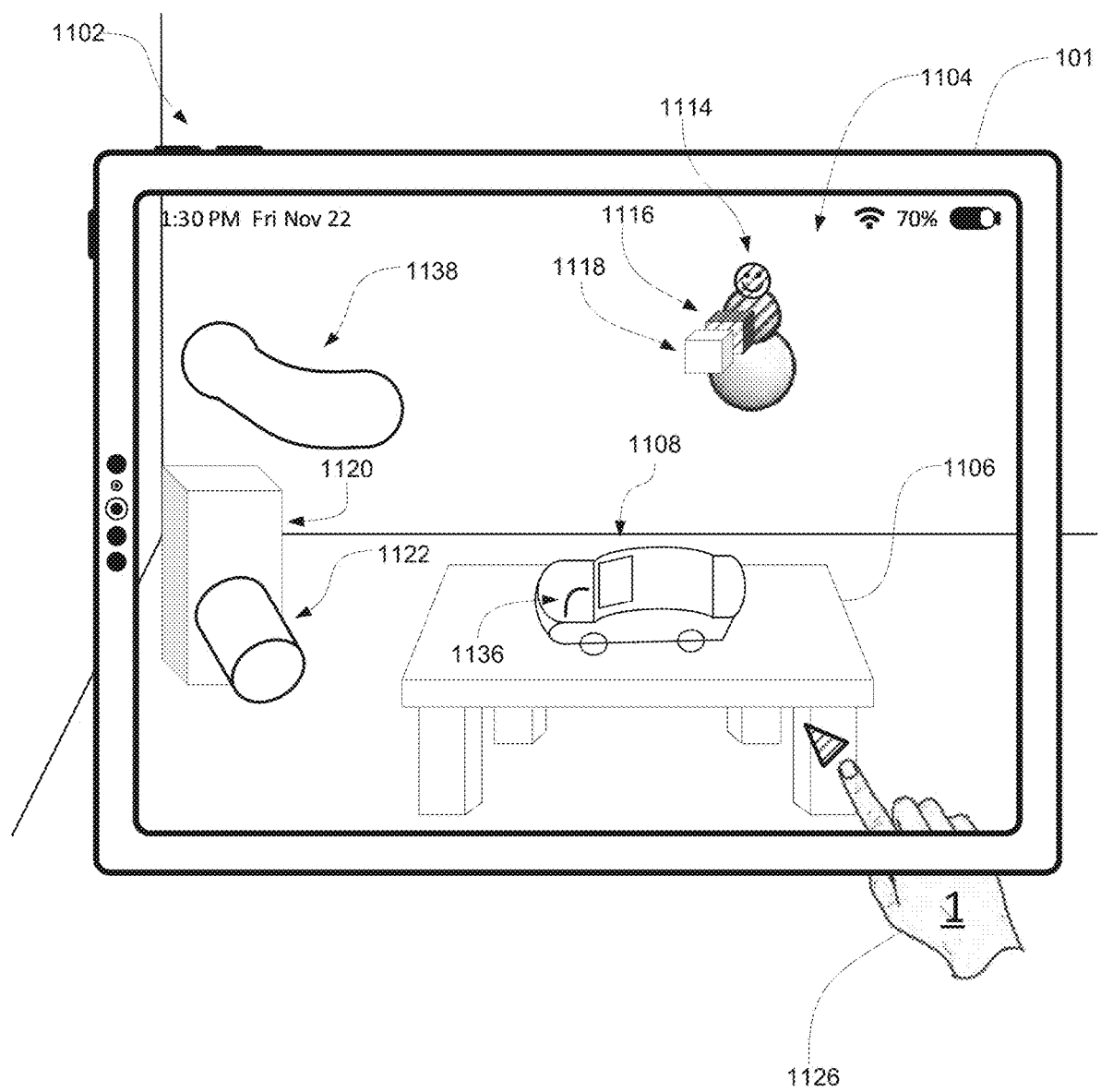

In FIG. 11B, device 101 detects a movement of second hand 1128 while maintaining the selection input while the selection tool is active. In some embodiments, in response to detecting the movement of second hand 1128 while maintaining the selection input, device 101 displays a selection indicator 1114. In some embodiments, selection indicator 1114 is a three-dimensional spherical indicator that has a diameter or radius based on the movement of second hand 1128 away from the location that second hand 1128 was at when the selection input was detected. In some embodiments, objects in three-dimensional environment 1104 that fall within the boundary of selection indicator 1114 are selected for input (e.g., if the objects fall fully within the boundary or if the objects fall partially within the boundary). For example, in FIG. 11B, second hand 1128 started at a location behind representation 1114 and has moved in the −z direction (e.g., toward the viewpoint of the user), thus increasing the size of selection indicator 1134 such that representation 1116 is within the boundary of selection indicator 1134 (e.g., or at least partially within the boundary of selection indicator 1134), and the top two sections of representation 1114 are within the boundary of selection indicator 1134 (e.g., or at least partially within the boundary of selection indicator 1134) and representation 1118 is not within the boundary of selection indicator 1134 and the bottom section of representation 1114 is not within the boundary of selection indicator 1134. In some embodiments, in accordance with representation 1116 and the top two sections of representation 1114 falling within the boundary of selection indicator 1134, representation 1116 and the top two sections of representation 1114 are selected for input, but representation 1118 and the bottom section of representation 1114 are not selected for input, as shown in FIG. 11C. In some embodiments, representation 1116 and the top two sections of representation 1114 are selected for input after detecting the termination of the selection input by second hand 1128. In some embodiments, selecting representation 1116 and the top two sections of representation 1114 for input includes changing a visual characteristic of representation 1116 and the top two sections of representation 1114, such as by highlighting and/or changing a shading, color, transparency, etc. of representation 1116 and the top two sections of representation 1114. As shown in FIG. 11B-11C, objects are able to be separated into sub-sections, each of which are able to be selected separately from other sections of the object. In some embodiments, objects are not separated into sub-sections and the entire object is either selected or not selected (e.g., portions of the object cannot be selected separate from other portions of the same object).

In FIG. 11B, device 101 detects a selection input performed by third hand 1130 directed at extrusion affordance 1124 and while maintaining the selection input, a movement by third hand 1130 in a direction perpendicular to the surface of representation 1120 on which circle 1122 was drawn (e.g., or in a direction that includes a movement component that is perpendicular to the surface of representation 1120 on which circle 1122 was drawn). In some embodiments, in response to detecting the movement of third hand 1130 while maintaining the selection input, circle 1122 is extruded outwards (e.g., perpendicularly from the surface of representation 1120 on which circle 1122 was drawn) by an amount based on the amount of movement of third hand 1130, as shown in FIG. 11B. In some embodiments, performing an extrusion function includes creating a three-dimensional object from a two-dimensional shape by using the two-dimensional shape as the cross-sectional shape of the resulting three-dimensional object. For example, an extrusion of a circle is a cylinder, an extrusion of a square is a cube (or three-dimensional rectangle), etc. In some embodiments, while maintaining the selection input, a user is able to lengthen the size of the cylinder by further pulling extrusion affordance 1124 away from the surface of representation 1120 on which circle 1122 was drawn or shorten the length of the cylinder by pushing extrusion affordance 1124 back towards the surface of representation 1120 on which circle 1122 was drawn. In some embodiments, upon detecting a release of the selection input by third hand 1130, the extrusion function is completed and circle 1122 is converted into the extruded shape (e.g., the shape of the object is set).

In FIG. 11B, device 101 detects a selection input performed by fourth hand 1132 directed at circle 1110 and while maintaining the selection input, a movement by fourth hand 1132 moving circle 1110 towards line 1112. In some embodiments, circle 1110 moves in accordance with the movement of fourth hand 1132. In some embodiments, in accordance with a determination that circle 1110 has moved to within a threshold distance of line 1112, device 101 modifies the visual characteristics of circle 1110 and/or line 1112 to indicate that, in response to detecting a termination of the selection input, circle 1110 will be extruded along the path defined by 1112, as shown in FIG. 11C. In some embodiments, modifying the visual characteristics of circle 1110 and/or line 1112 includes highlighting, changing a shading, color, transparency, etc. of circle 1110 and/or line 1112. In FIG. 11C, in response to detecting the termination of the selection input by fourth hand 1132, an extrusion function is performed by extruding circle 1110 along the path defined by line 1112, resulting in shape 1138. In some embodiments, shape 1138 is a three-dimensional shape that has a cross-sectional shape that is the same or similar to circle 1110 and has a lateral shape that is the same or similar to line 1112 (e.g., shape 1138 is a curved cylinder with a radius defined by circle 1110 and a curvature defined by line 1112).

Figure 11D:
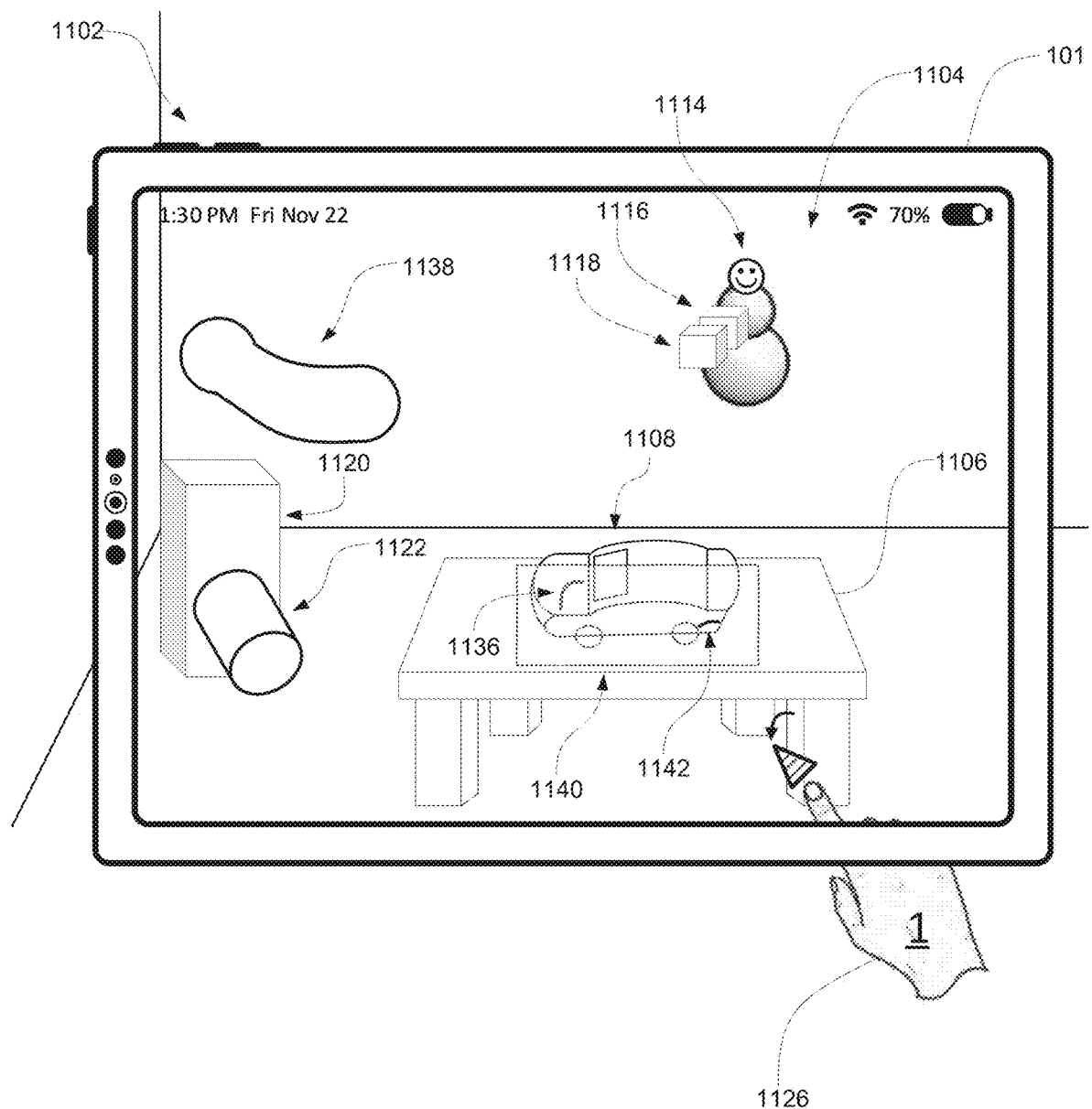

In FIG. 11C, first hand 1126 is performing an indirect manipulation content entry input directed to representation 1108 of a car. As discussed above, an indirect manipulation content entry input is a content entry input that is performed by first hand 1126 when first hand 1126 is more than a threshold distance from representation 1108 (e.g., more than 6 inches, 12 inches, 3 feet, 10 feet, etc.). In FIG. 11D, while maintaining the indirect manipulation content entry input, device 101 detects a movement of first hand 1126 in a manner similar to (or the same as) the movement of first hand 1126 in FIG. 11B. In some embodiments, because first hand 1126 is performing an indirect manipulation input, mark 1142 is not drawn on the surface of representation 1108 and is, instead, drawn on planar surface 1140 placed in front of representation 1108, as shown in FIG. 11D. In some embodiments, because planar surface 1140 is planar, the movement of first hand 1126 in the −z direction (e.g., toward the viewpoint of the user) does not cause a similar three-dimensional mark that curves toward the viewpoint of the user. In some embodiments, because mark 1142 is "drawn" on planar surface 1140, mark 1142 is a two-dimensional mark (e.g., a planar mark) that has a shape that is based on the lateral movement of first hand 1126 (e.g., the x- and y-axis movements). In some embodiments, movements of first hand 1126 along the z-axis are ignored and do not cause a respective mark in the z direction. In some embodiments, planar surface 1140 is a surface (e.g., optionally an invisible surface) (e.g., such as a whiteboard) placed a predetermined distance in front of representation 1108 (e.g., 1 inch, 5 inches, 10 inches, 20 inches, etc. away from representation 1108, and between the viewpoint of the user and representation 1108, optionally perpendicular to the orientation of the viewpoint of the user into the three-dimensional environment 1104) and is optionally parallel to the closest surface of representation 1108. Thus, in some embodiments, when performing an indirect manipulation, drawings (e.g., annotations) are drawn on a plane placed in front of the object that the input is directed to instead of being drawn on the object itself, optionally with marks in a direction that is perpendicular to the plane being flattened into the plane.

Figure 11E:
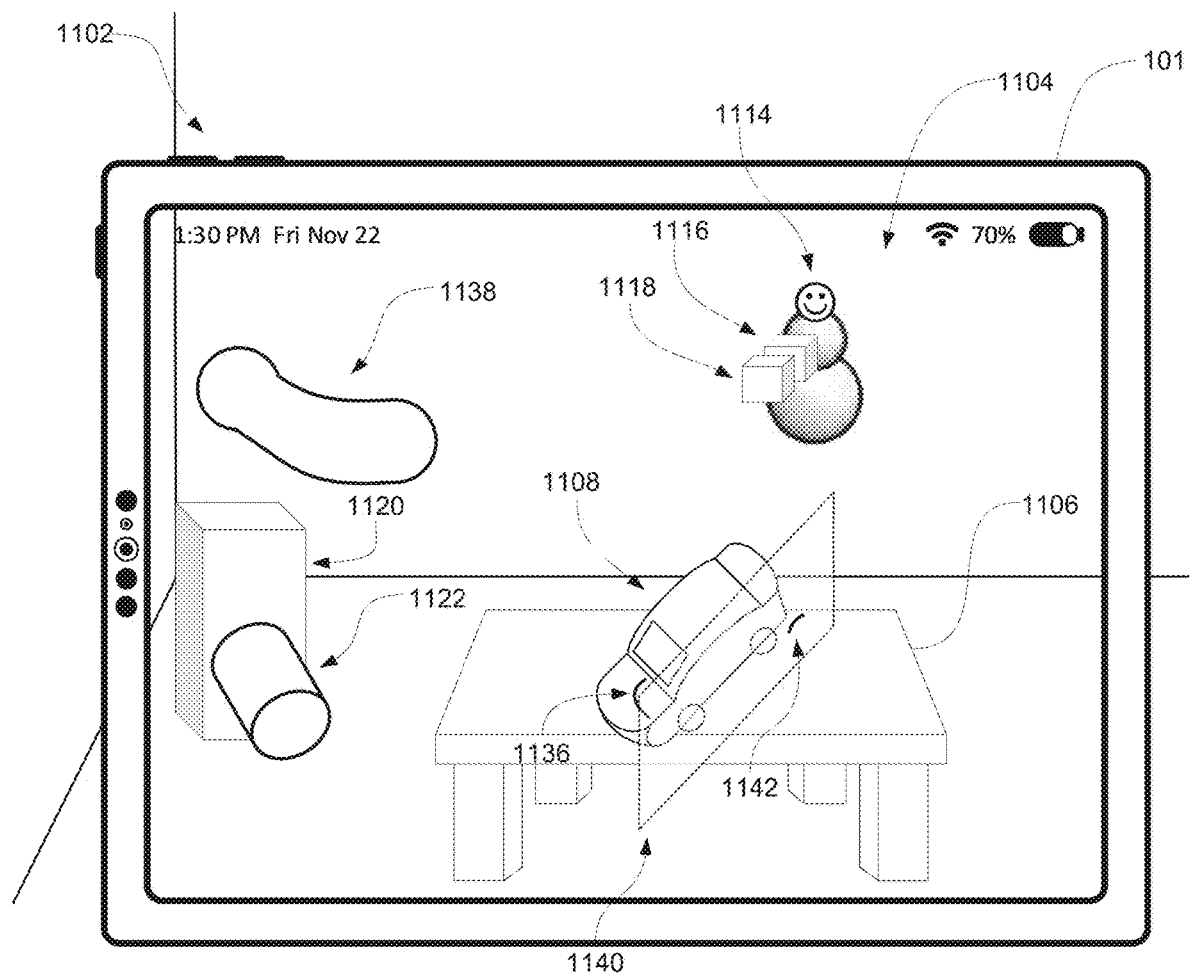

In FIG. 11E, a user input is detected rotating representation 1108. In some embodiments, in response to the user input, representation 1108 is rotated within three-dimensional environment 1104 in accordance with the user input. As shown in FIG. 11E, representation 1108 has been rotated about the y-axis such that the left portion of representation 1108 is now facing diagonally toward the user and to the left and the right portion of representation 1108 is now facing diagonally away and to the right. In some embodiments, in response to the rotation of representation 1108, mark 1136 rotates with the rotation of representation 1108 in a manner that preserves the relative position and orientation of mark 1136 with respect to representation 1108. For example, because the hood portion of representation 1108 has been rotated to face further forward (e.g., instead of directly left), mark 1136 is now curved diagonally forward and to the left, and then diagonally forward and to the right, as shown in FIG. 11E. Thus, the portion of mark 1136 that was previously right-to-left is now oriented back-right-to-front-left and the portion of mark 1136 that was previously back-to-front is now oriented back-right-to-front-right. Thus, as shown in FIG. 11E, mark 1136 remains on the surface of representation 1108 and moves and/or rotates with representation 1108 as if it were a part of representation 1108.

In some embodiments, in response to the rotation of representation 1108, planar surface 1140 rotates with the rotation of representation 1108 such that planar surface 1140 remains parallel to the same surface that it was parallel to before (e.g., the driver side of representation 1108). In some embodiments, planar surface 1140 rotates about the same pivot point as the rotation of representation 1108. As shown in FIG. 11E, mark 1142 rotates with the rotation of planar surface 1140 such that mark 1142 remains at the same location on planar surface 1140 and has the same orientation with respect to planar surface 1140. Thus, mark 1142 rotates from being a right-to-left mark to now being a back-right-to-front-left mark. As shown in FIG. 11E, mark 1142 remains as a planar object that is restricted to the plane of planar surface 1140 while mark 1136 is three-dimensional mark that follows the curvature of representation 1136 without being restricted to a planar surface (e.g., unless the surface on which mark 1136 was made is planar).

Figure 11F:
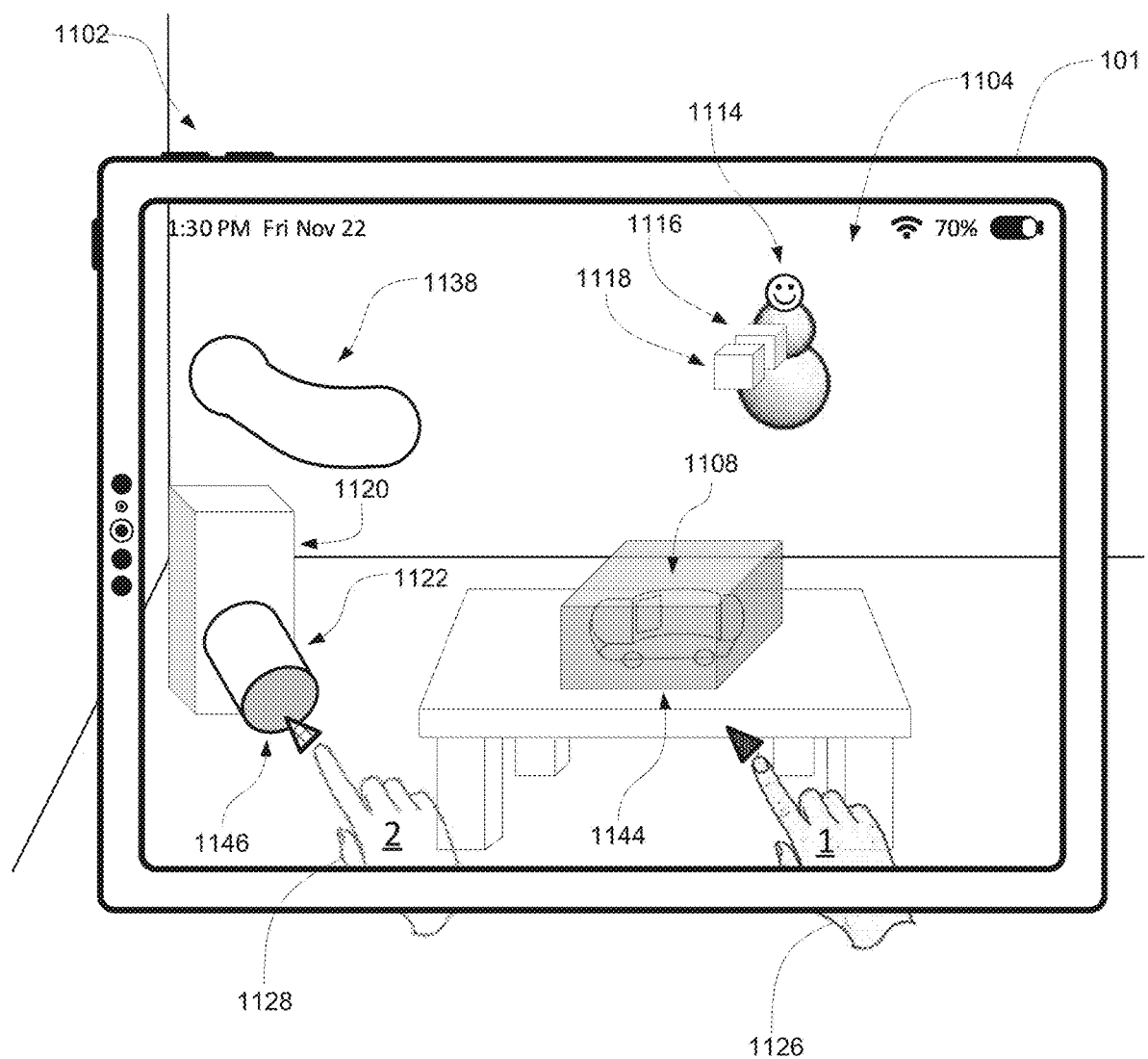
Figure 12B:
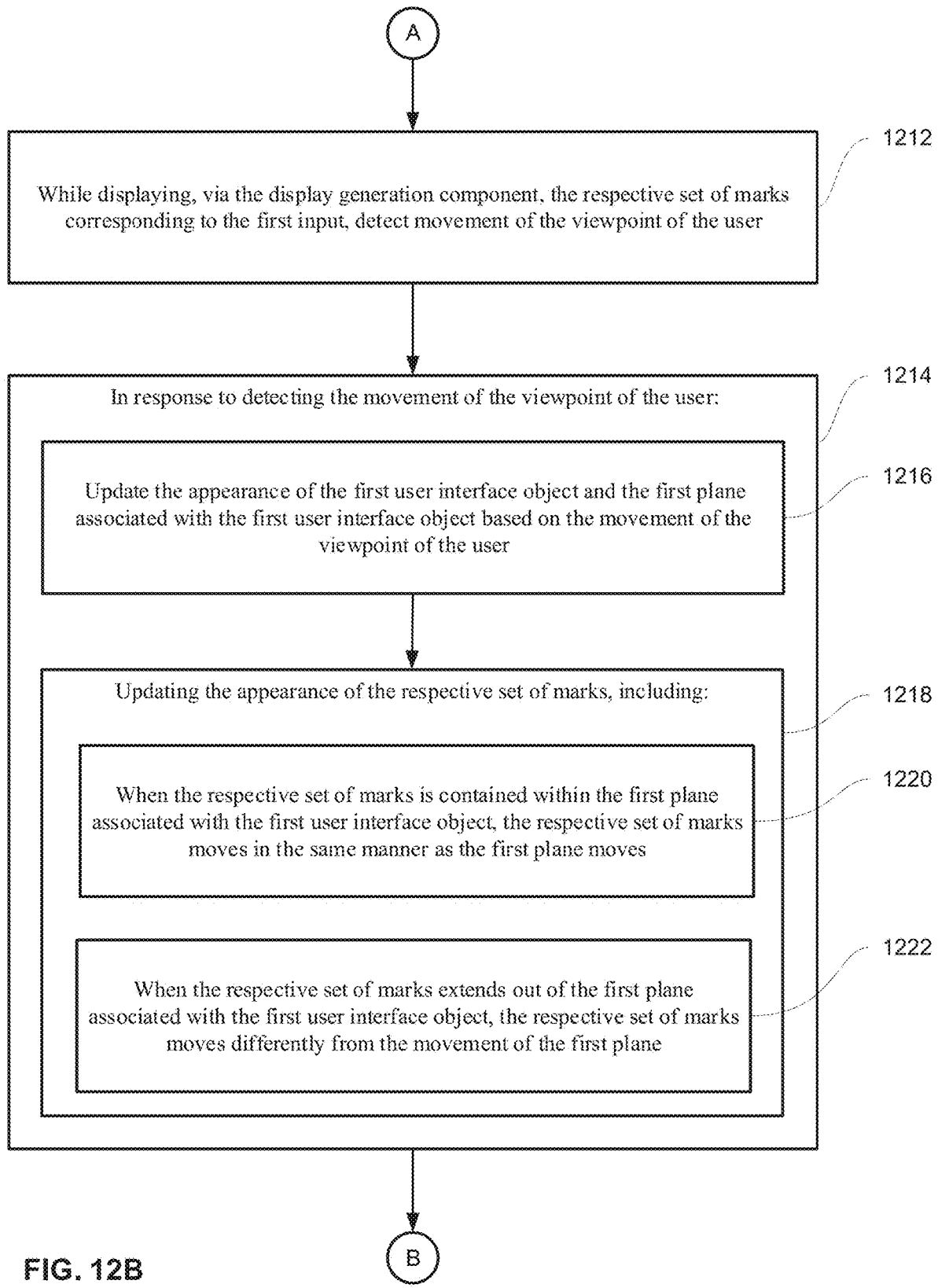
Figure 12C:
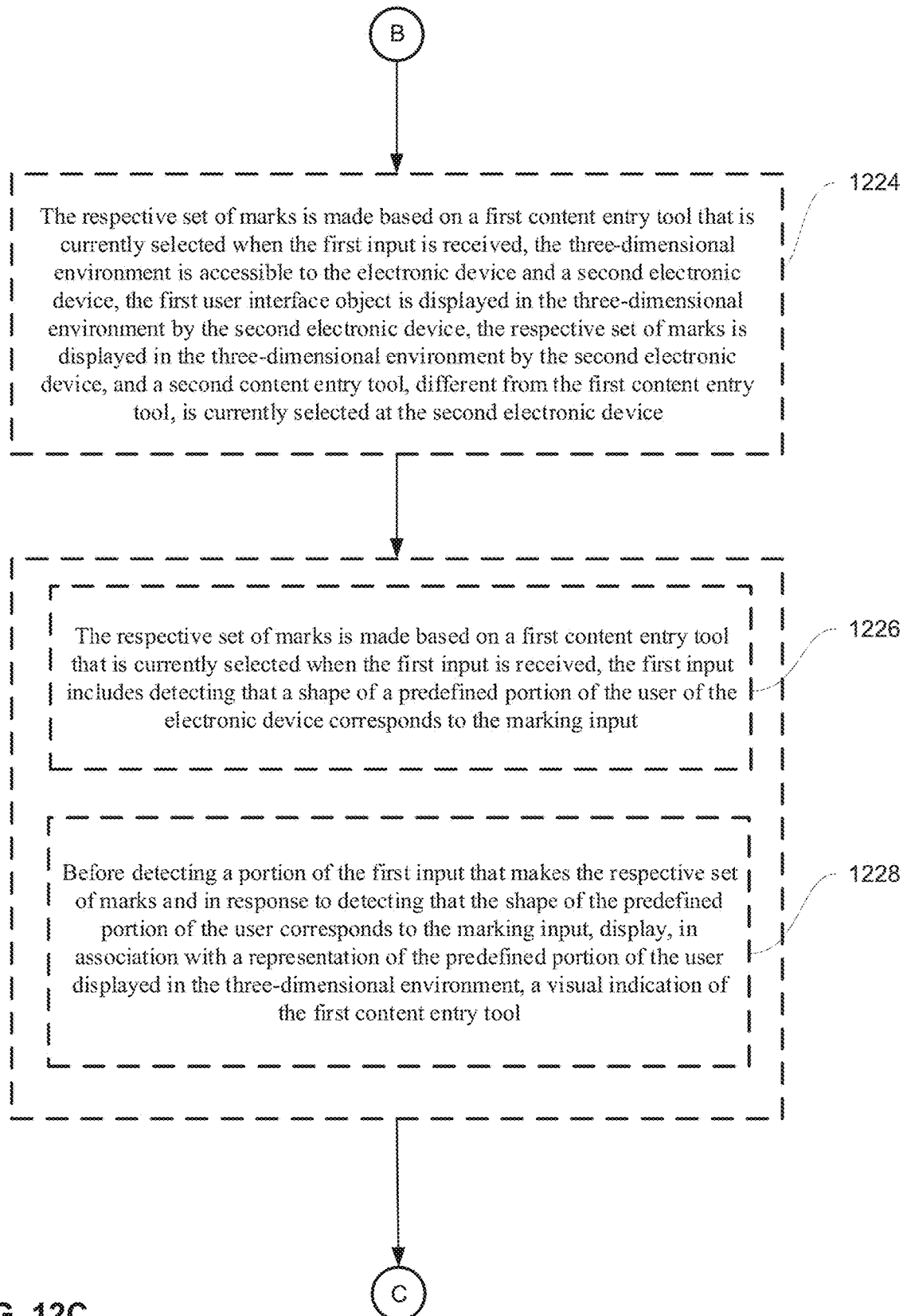
Figure 12D:
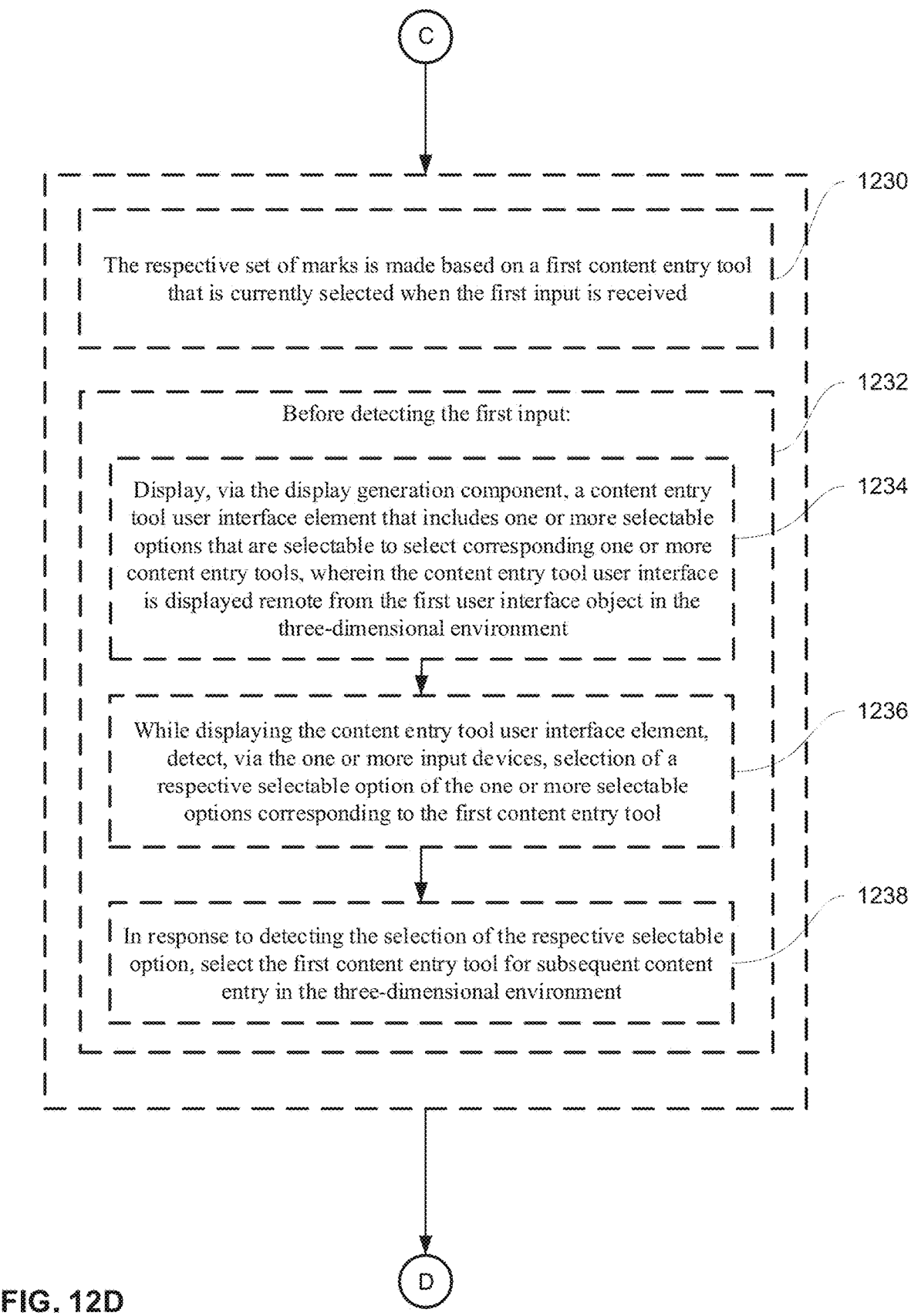
Figure 12E:
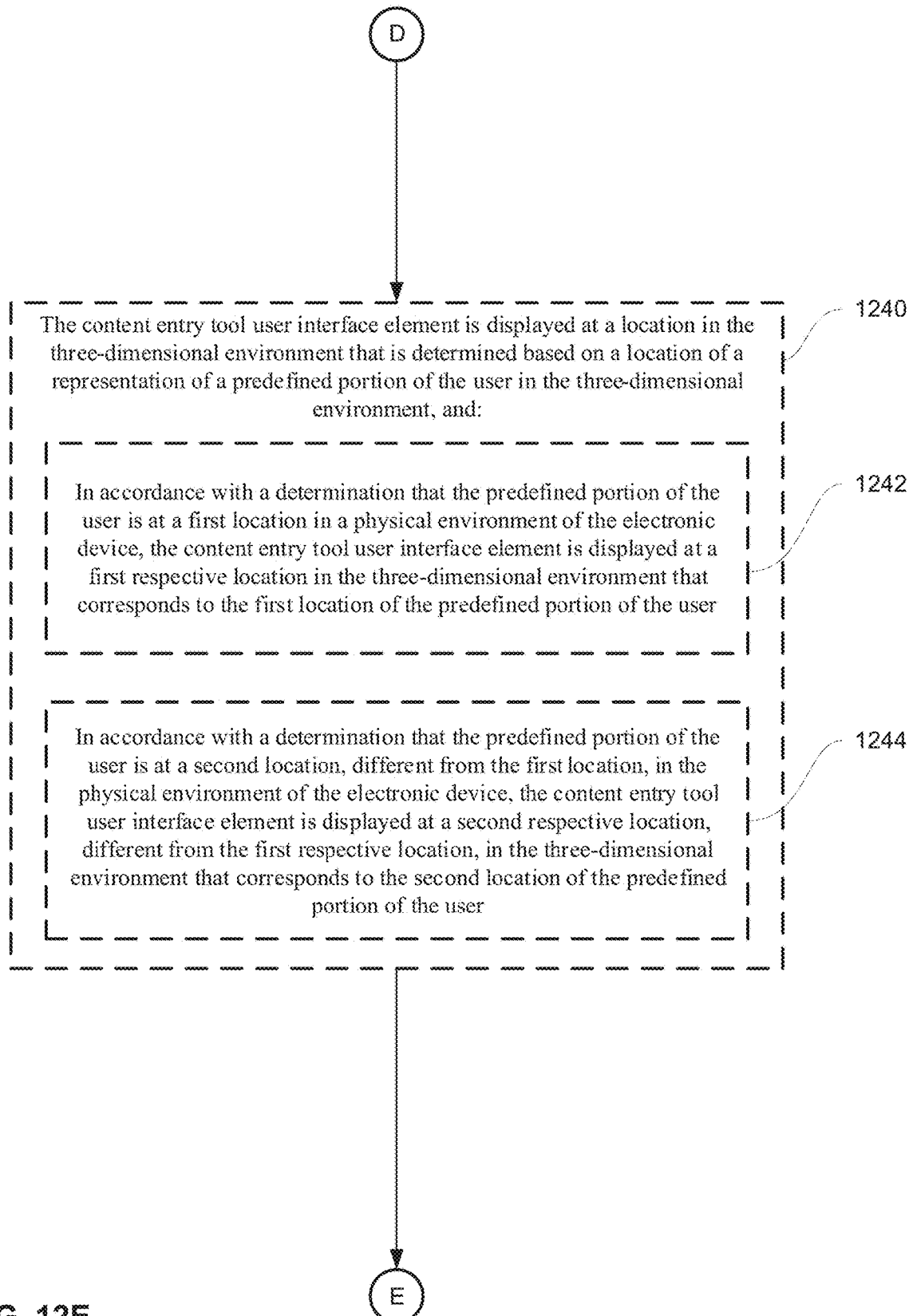
Figure 12F:
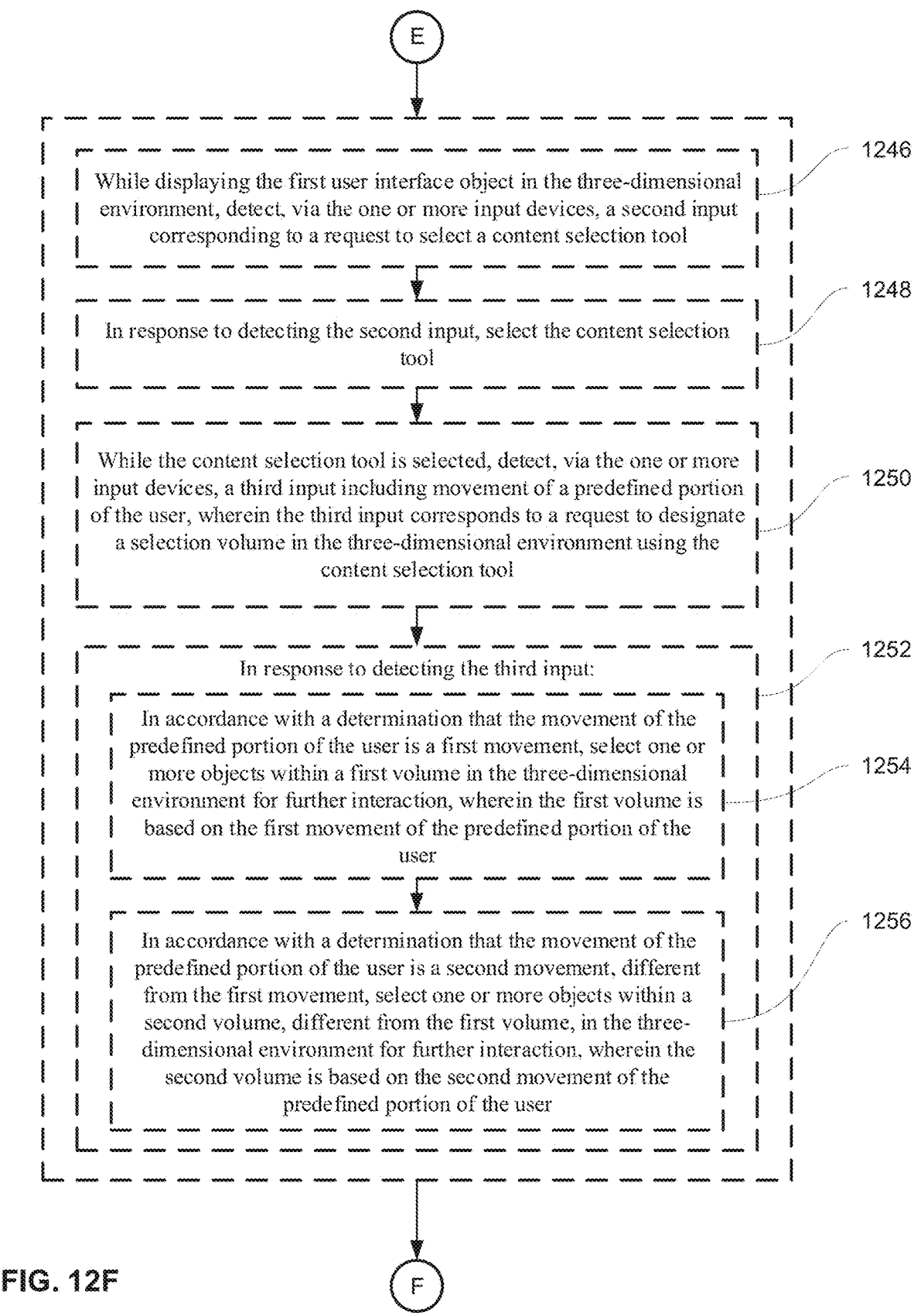
Figure 12G:
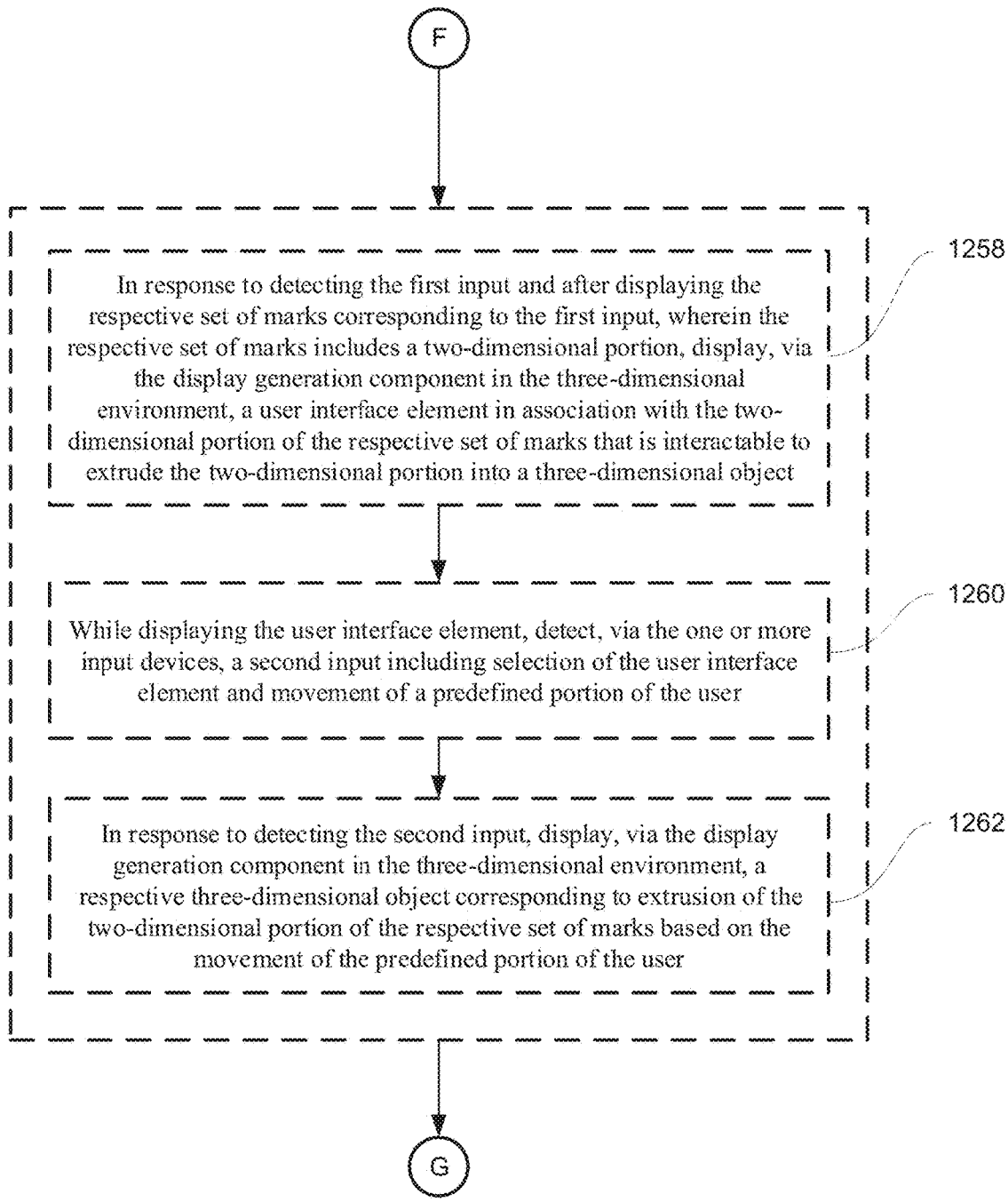
Figure 12H:
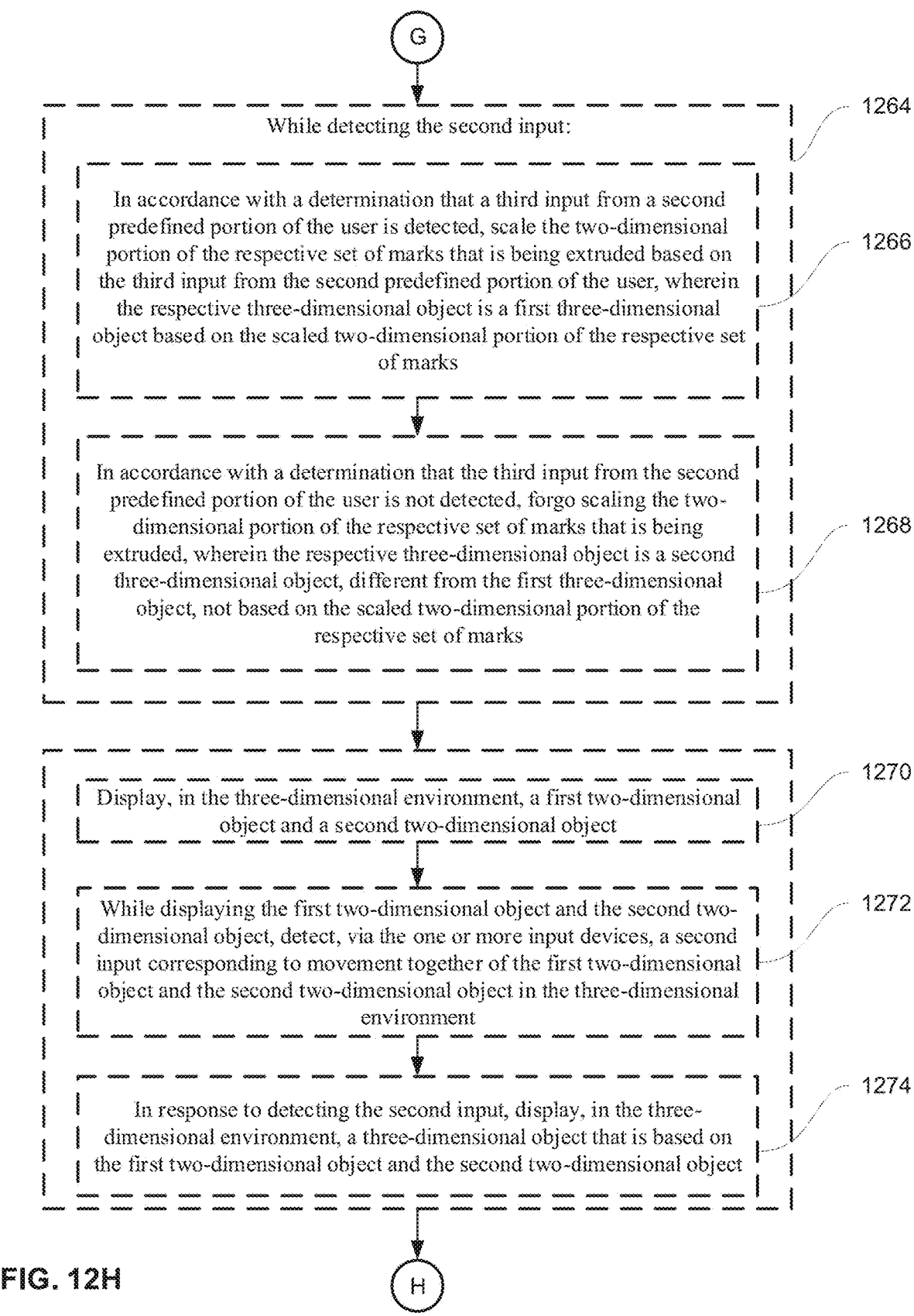
Figure 12I:
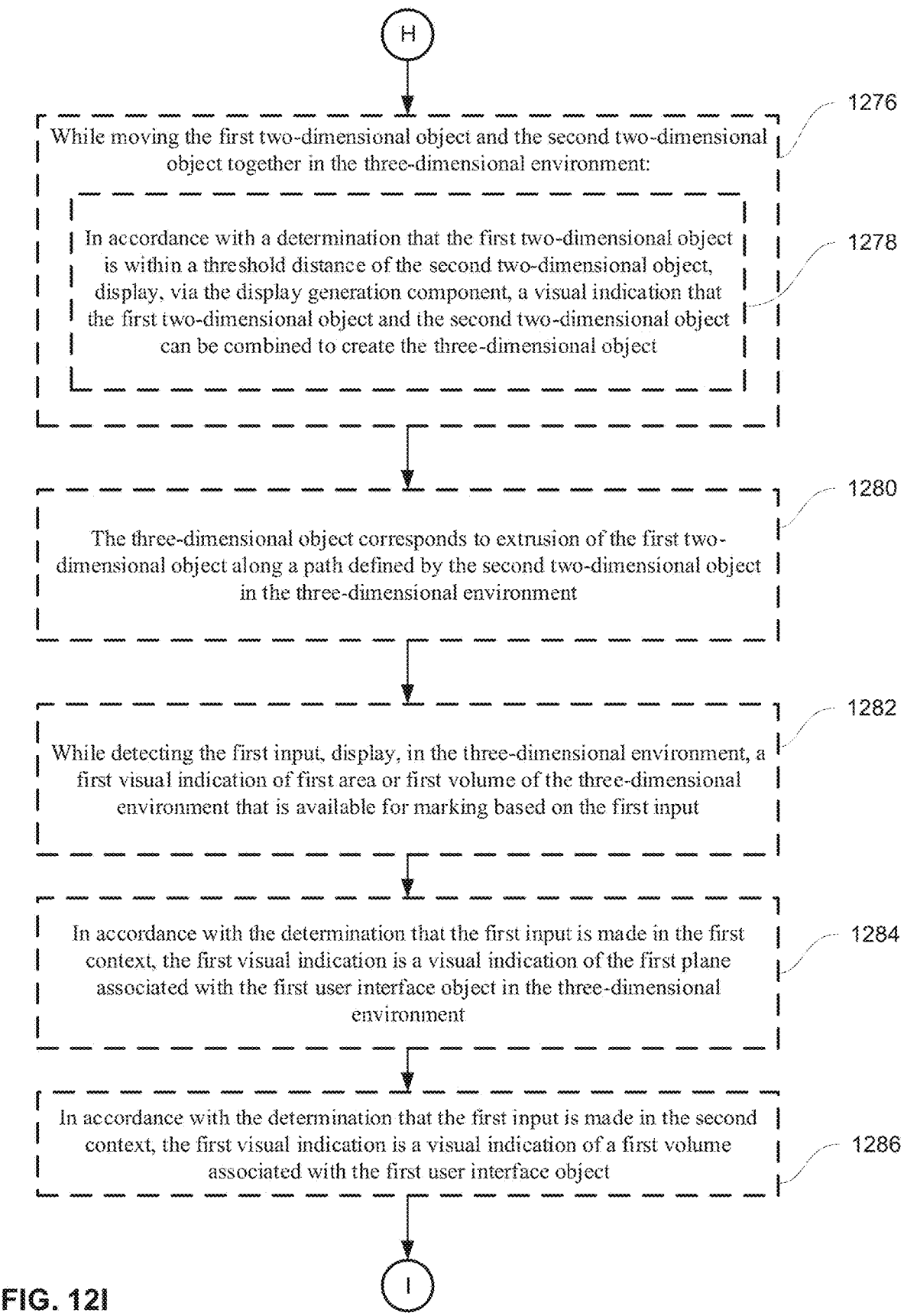
Figure 12J:
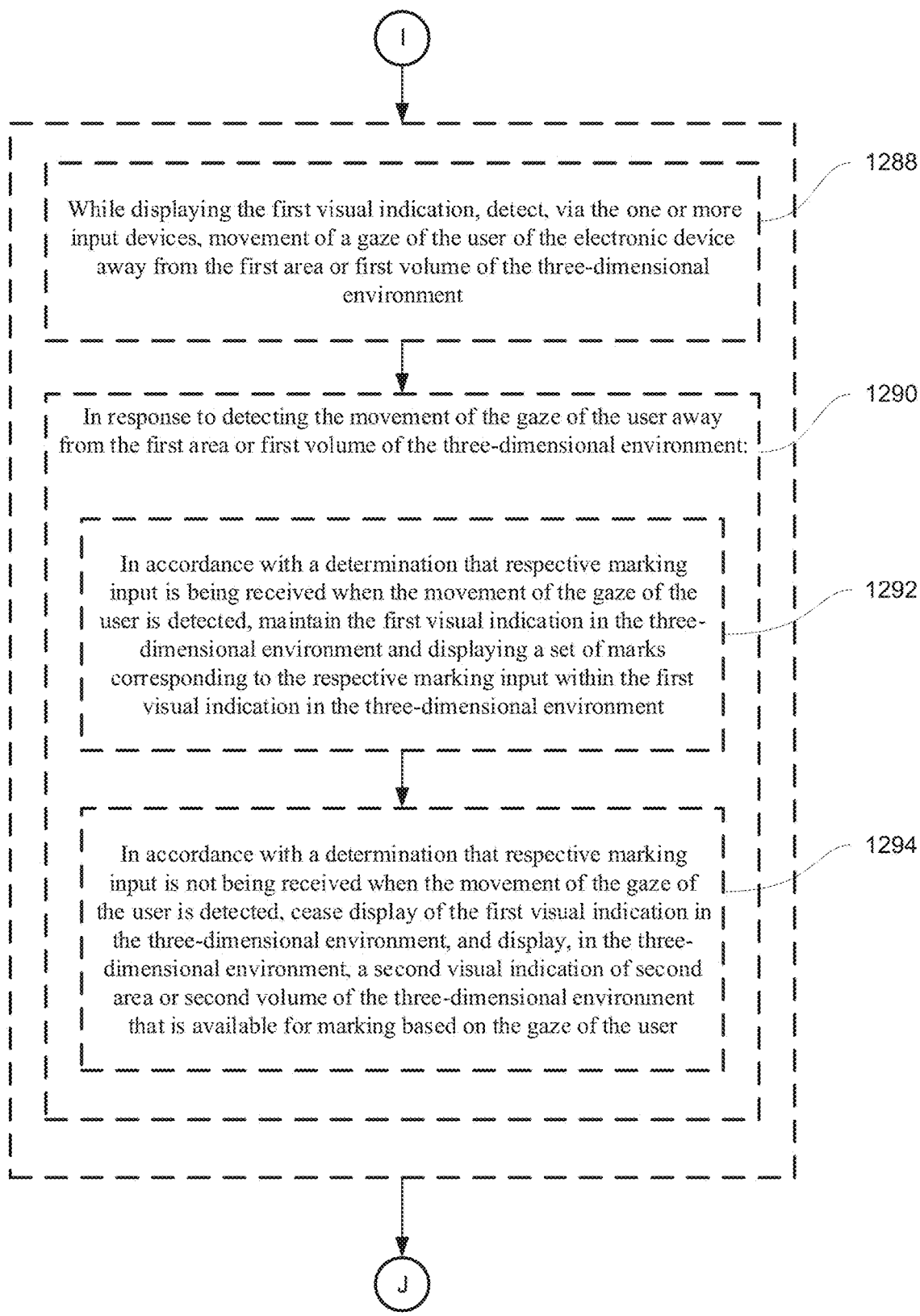
Figure 12K:
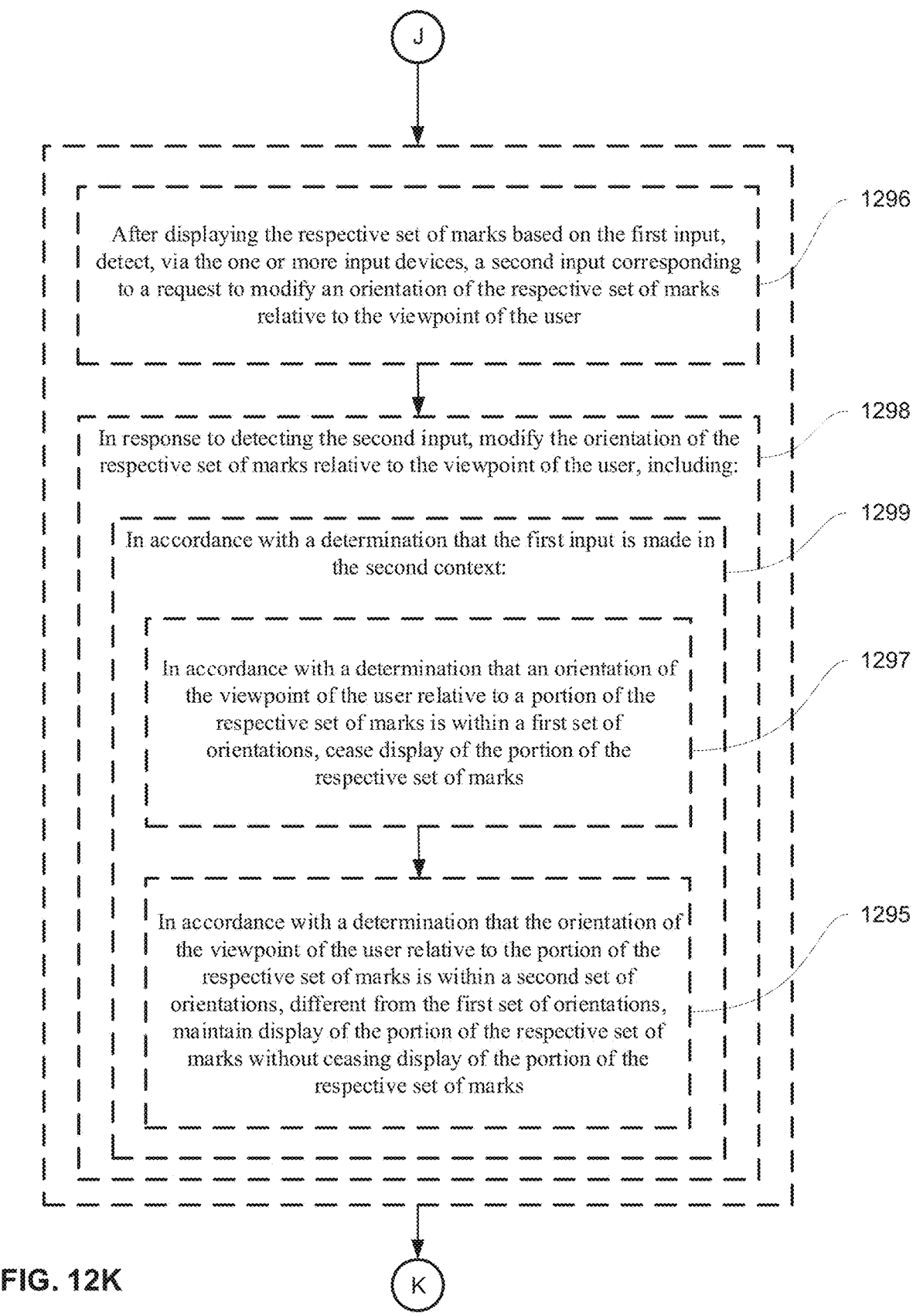
Figure 12L:
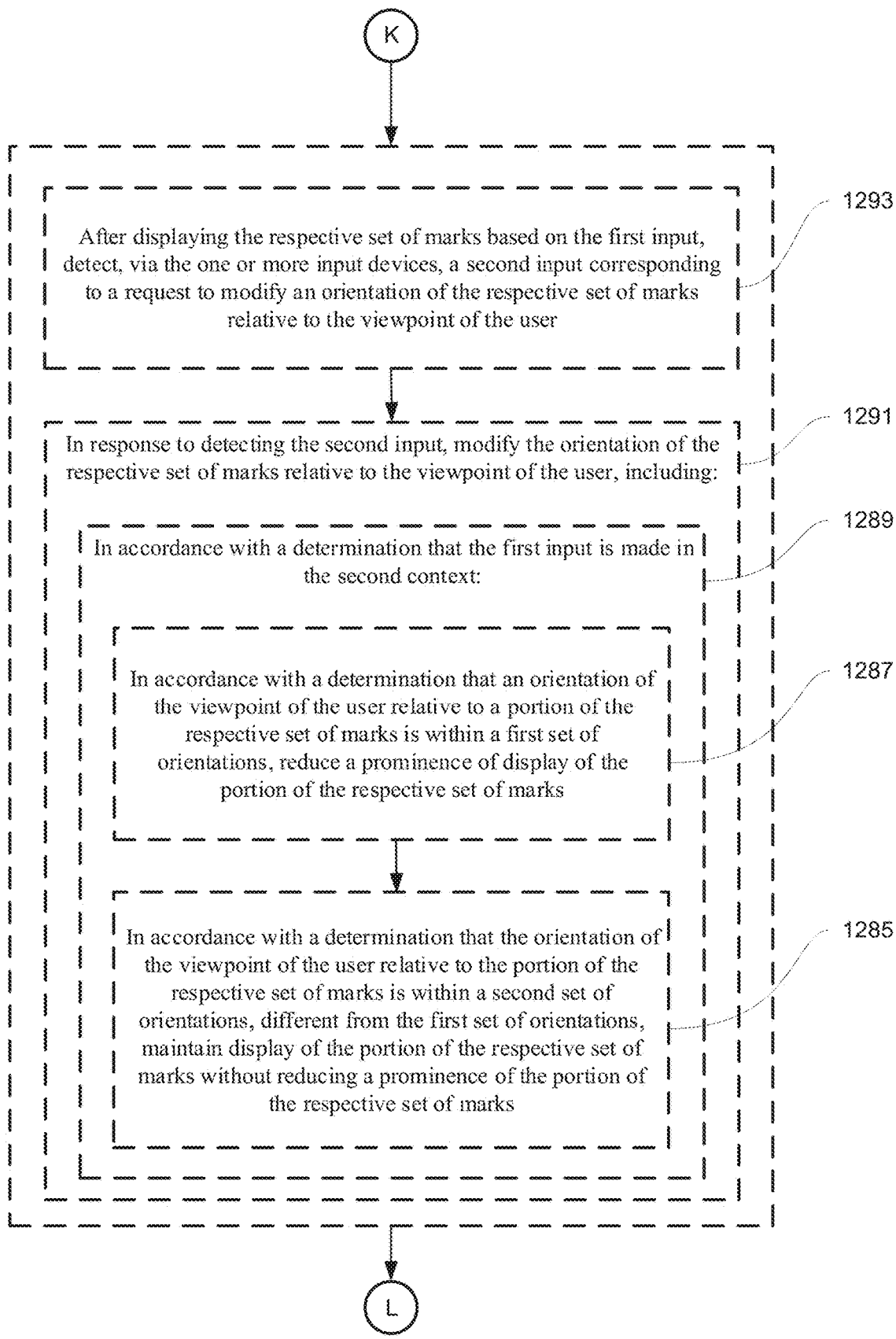
Figure 12M:
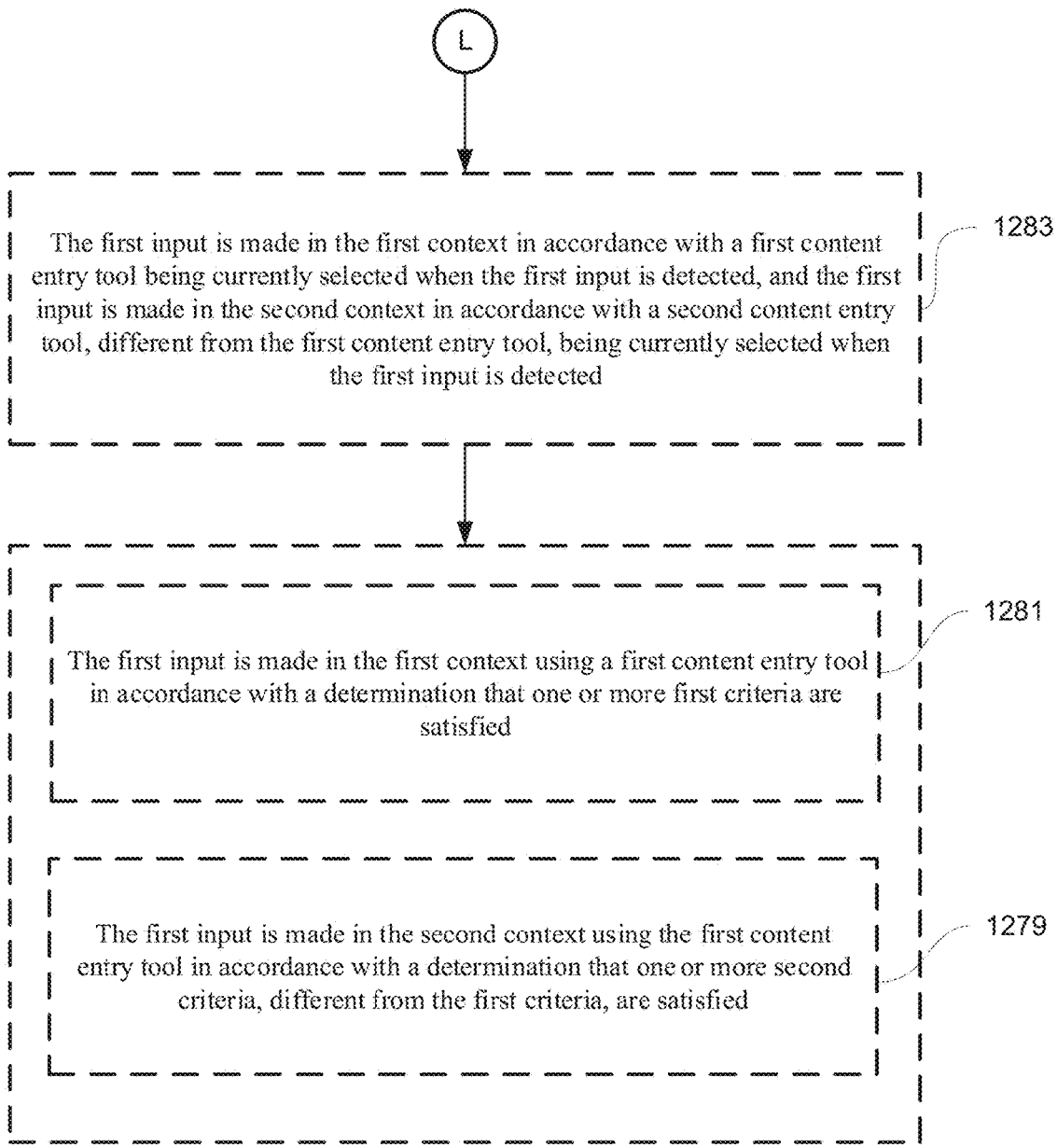

FIG. 11F illustrates embodiments in which the area or volume within which a mark is able to be made is visually indicated. In FIG. 11F, first hand 1126 is performing a pre-pinch gesture while a three-dimensional annotation tool is active. In some embodiments, a three-dimensional annotation tool is any content entry tool that is compatible with three-dimensional drawings. In some embodiments, a three-dimensional annotation tool is a dedicated tool for drawing three-dimensional annotations. In some embodiments, three-dimensional annotation is active (e.g., as opposed to a three-dimensional annotation tool being active) if the user is performing a direct manipulation interaction (e.g., in which three-dimensional marks can be drawn, as discussed above with respect to FIGS. 11B-11E). In some embodiments, when the three-dimensional annotation tool is active, a user is able to draw three-dimensional annotations within a volume of space (e.g., a three-dimensional volume of space) in three-dimensional environment 1104. In some embodiments, the volume within which the user is able to draw is optionally based on the gaze of the user (e.g., if the interaction is an indirect manipulation interaction) and/or the position of first hand 1126 (e.g., if the interaction is a direct manipulation interaction). In some embodiments, in response to detecting a trigger event, device 101 displays three-dimensional volume 1144 around representation 1108 indicating the three-dimensional volume within which the user is able to draw marks. In some embodiments, the trigger event includes detecting that a content entry tool (or marking tool) is currently active and/or that the user is performing a pre-selection gesture with a hand while the user is posed to perform a direct manipulation content entry input and/or an indirect manipulation content entry input directed at the volume indicated by three-dimensional volume 1144 (e.g., and/or directed at representation 1108). In some embodiments, a pre-selection gesture includes a pre-pinch gesture (e.g., in the embodiment in which a pinch gesture is interpreted as a selection gesture and/or a content entry gesture). In some embodiments, the user is posed to perform a direct manipulation content entry input directed at the volume indicated by three-dimensional volume 1144 (e.g., and/or directed at representation 1108) if the hand of the user is within a threshold distance from representation 1108 (e.g., within 0.1 inches, 1 inch, 6 inches, 1 foot, 3 feet, etc.) when performing the pre-selection gesture. In some embodiments, the user is posed to perform an indirect manipulation content entry input directed at the volume indicated by three-dimensional volume 1144 (e.g., and/or directed at representation 1108) if the hand of the user is not within the threshold distance from representation 1108 when performing the pre-selection gesture, but the gaze of the user is directed to representation 1108.

For example, in FIG. 11F, the gaze of the user is directed at representation 1108 and in response, the volume within which the user is able to draw using the currently active content entry tool is three-dimensional volume 1144 around representation 1108. In some embodiments, three-dimensional volume 1144 is a bounding box around representation 1108 and has a size that is based on the size of representation 1108 (e.g., is 10% larger than representation 1108, 20%, 30%, 50%, 100%, etc.). In some embodiments, three-dimensional volume 1144 is not a virtual object in three-dimensional environment 1104, but rather is a graphical indication of the volume within which marks are able to be drawn. In some embodiments, three-dimensional volume 1144 is partially transparent, has a respective color, and/or has a respective shading, thus highlighting or otherwise visually distinguishing the volume bounded by three-dimensional volume 1144 as the space within which marks are able to be drawn.

In FIG. 11F, second hand 1128 is performing a pre-pinch gesture while a two-dimensional annotation tool is active. In some embodiments, a two-dimensional annotation tool is a content entry tool that is compatible with two-dimensional drawings, but not three-dimensional drawings. In some embodiments, a two-dimensional annotation tool is a dedicated tool for drawing two-dimensional annotations. In some embodiments, two-dimensional annotation is active (e.g., as opposed to a two-dimensional annotation tool being active) if the user is performing an indirect manipulation interaction (e.g., in which three-dimensional marks cannot be drawn, as discussed above with respect to FIGS. 11B-11E). In some embodiments, when the two-dimensional annotation tool is active, a user is able to draw two-dimensional annotations within a two-dimensional area in three-dimensional environment 1104. In some embodiments, the area within which the user is able to draw is optionally based on the gaze of the user (e.g., if the interaction is an indirect manipulation interaction) and/or the position of second hand 1128 (e.g., if the interaction is a direct manipulation interaction). For example, in FIG. 11F, second hand 1128 is positioned near and oriented towards the front surface of extruded circle 1122 (e.g., within 0.1 inches, 1 inch, 3 inches, 6 inches, 1 foot, 3 feet, etc.) and is interpreted as being directed to the front surface of extruded circle 1122 and in accordance with a determination that second hand 1128 is directed to the front surface of extruded circle 1122, the area within which the user is able to draw is two-dimensional surface 1146 on the front surface of extruded circle 1122. In some embodiments, two-dimensional surface 1146 has a size that is based on the size of the surface of extruded circle 1122 (e.g., the same size as the surface of extruded circle). In some embodiments, two-dimensional surface 1146 is not a virtual object in three-dimensional environment 1104, but rather is a graphical indication of the area within which marks are able to be drawn. In some embodiments, two-dimensional surface 1146 is partially transparent, has a respective color, and/or has a respective shading, thus highlighting or otherwise visually distinguishing the area indicated by two-dimensional surface 1146 as the area within which marks are able to be drawn. As described above, three-dimensional volume 1144 optionally highlights a volume of space around an object in three-dimensional environment 1104 (e.g., the boundary of which optionally does not make contact with the object) while two-dimensional surface 1146 highlights a surface of an existing object.

FIGS. 12A-12M is a flowchart illustrating a method 1200 of providing for interactions with virtual objects in a three-dimensional environment in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In the method 1200, in some embodiments, an electronic device (e.g., computer system 101 in FIG. 1) in communication with a display generation component and one or more input devices (e.g., a mobile device (e.g., a tablet, a smartphone, a media player, or a wearable device), or a computer) displays (1202), via the display generation component, a first user interface object in a three-dimensional environment, wherein the first user interface object changes in appearance as a viewpoint of a user changes relative to a location of the first user interface object in the three-dimensional environment, such as representation 1108 in FIG. 11A (e.g., a 3D object, a 2D object, etc. in a three-dimensional environment).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor and/or a motion sensor (e.g., a hand tracking sensor, a hand motion sensor), etc.

In some embodiments, the first user interface object is displayed on a virtual whiteboard or sandbox element, such as the first user interface element described with reference to method 800. In some embodiments, the first user interface object is displayed in space, unassociated with a virtual whiteboard or sandbox element. In some embodiments, the first user interface object is displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.). In some embodiments, the first user interface object is a virtual object. In some embodiments, the first user interface object is based on a physical object in the physical world around the device. For example, the first user interface object is a representation of a physical object in the physical around the device (e.g., a photorealistic depiction, a simplified representation, a caricature, etc.), which is optionally captured by one or more sensors of the device.

In some embodiments, while displaying the first user interface object in the three-dimensional environment, the electronic device detects (1204), via the one or more input devices, a first input corresponding to a marking input associated with the first user interface object, such as the user input performed by first hand 1126 in FIGS. 11A-11B (e.g., detecting and/or receiving an input corresponding to a request to draw on or near and/or annotate the first user interface object). In some embodiments, the first input includes detecting that one or more hands of the user has a respective pose. In some embodiments a pose of a hand refers to one or more of a position, shape, and/or orientation of the hand. In some embodiments, the input includes a pinch gesture performed by a hand of the user while a marking tool is the currently active tool. In some embodiments, the first input is an input such as described with reference to method 1000 (e.g., for entering content).

In some embodiments, in response to detecting the first input, the electronic device displays (1206), via the display generation component, a respective set of marks corresponding to the first input, such as mark 1136 in FIG. 11B (e.g., a set of marks or annotations drawn by the first input, such as if the user is drawing the marks or annotations using a pen, marker, etc.).

In some embodiments, in accordance with a determination that the first input is made in a first context, the respective set of marks is contained within a first plane associated with the first user interface object (1208), such as mark 1142 in FIG. 11D (e.g., if the first input by the hand of the user is performed while the hand (or a portion of the hand, such as a finger tip or pinch point between a forefinger and other finger of the hand) of the user is farther than a threshold distance from the first user interface object (e.g., 1 foot, 3 feet, 6 feet, 12 feet, etc.), then a first set of marks associated with the first input is drawn and/or displayed on a virtual plane (e.g., a virtual surface)).

In some embodiments, the first input is made in the first context if the hand has a first shape and/or first pose (e.g., have a particular pose, have a particular orientation, a particular shape, or be at a particular location, etc.). Thus, the first input is made in the first context if the hand of the user is farther than the threshold distance from the first user interface object (e.g., the drawing is performed via an indirect manipulation interaction). For example, if the hand of the user is farther than the threshold distance, then marks drawn via the hand are drawn on a transparent surface/plane located in front of the first user interface object (e.g., 1 inch in front, 3 inches in front, 6 inches in front, 12 inches in front, etc.), between the first user interface object and a viewpoint of the user of the electronic device from which the three-dimensional environment is displayed. In some embodiments, the marks appear as if drawn on a glass window placed in front of the first user interface object (e.g., the marks float in space). In some embodiments, the marks appear on the same plane even if the hand moves closer or farther away from the first user interface object while performing the first input. In some embodiments, the location of the first plane is based on the location of the user's hand when the first input is first performed. In some embodiments, the first plane is located a respective distance away from the first user interface object (e.g., optionally algorithmically determined based on one or more factors such as the size and/or shape of the first user interface object), without regard to the location of the user's hand when the first input is performed (e.g., the z-components of the movement of the user's hand is optionally ignored as long as the first input is made in the first context). In some embodiments, multiple marks drawn via multiple user inputs made in the first context are drawn on the same plane in front of the first user interface object. In some embodiments, a first part of the first input is performed while in the first context (e.g., while the hand is farther than the threshold distance) and a second part of the first input is performed while in the second context (e.g., the hand moves closer than the threshold distance) and in response, the set of marks due to the first part of the first input and the second part of the first input are both contained within the first plane. For example, if the first input begins in the first context, the marks as a result of the first input are contained within the first plane, even if the first input changes to being in the second context (e.g., even though the hand changes depth to be closer to first user interface object). In some embodiments, marks displayed in response to the first part of the first input are contained within the first plane while marks displayed in response to the second part of the first input are not contained in the first plane.

In some embodiments, in accordance with a determination that the first input is made in a second context, the respective set of marks extends out of the first plane associated with the first user interface object (1210), such as mark 1136 in FIG. 11B (e.g., if the first input by the hand of the user is performed while the hand (or a portion of the hand, such as a finger tip or pinch point between a forefinger and other finger of the hand) of the user is closer than the threshold distance from the first user interface object (e.g., 1 foot, 3 feet, 6 feet, 12 feet, etc.), then the set of marks associated with the first input is drawn in three-dimensional space and/or on the first user interface object, based on the three-dimensional location of the hand (or a portion of the hand, such as a finger tip or pinch point between a forefinger and other finger of the hand).

Thus, the first input is made in the second context if the hand of the user is closer than the threshold distance from the first user interface object (e.g., the drawing is performed via a direct manipulation interaction). For example, if the hand of the user is closer than the threshold distance, then marks drawn via the hand are drawn at a location in space based on the current location of the hand, such as a location just in front of the hand as if the user is drawing in space using a marker. For example, if the hand is at a first distance from the first user interface object (e.g., optionally making contact with the first user interface object, while in the second context), marks are drawn directly on the first user interface object (e.g., as if the user is drawing on the first user interface object with a marker), but if the hand is a second distance from the first user interface object, but not making contact with the first user interface object (e.g., such as 1 inch above the first user interface object), marks are drawn in space at the second distance away from the first user interface object (e.g., marks are drawn in space 1 inch above the first user interface object). Thus, a user is able to draw marks at different depths (e.g., different z positions) by changing the depth of the hand relative to the first user interface object (e.g., while remaining in the second context). In some embodiments, because the depth of the hand optionally determines the z position of the marks, a user is able to begin the first input at a first depth and while continuing to perform the first input, change to a second depth and the marks that are displayed in response to the first input reflect the change in depth. Thus, unlike marks inserted while in the first context, marks inserted while in the second context are not restricted to a plane (e.g., restricted to a particular depth) and are able to change depth based on the changing depth of the first input. In some embodiments, a first part of the first input is performed while in the second context (e.g., while the hand is closer than the threshold distance) and a second part of the first input is performed while in the first context (e.g., the hand moves farther than the threshold distance) and in response, the set of marks due to the first part of the first input and the second part of the first input are both not contained within the first plane (e.g., change depth based on the changing depth of the hand). For example, if the first input begins in the second context, the marks as a result of the first input are not contained within the first plane, even if the first input changes to being in the first context. In some embodiments, marks displayed in response to the first part of the first input are not contained within the first plane while marks displayed in response to the second part of the first input are contained in the first plane.

In some embodiments, while displaying, via the display generation component, the respective set of marks corresponding to the first input, the electronic device detects (1212) movement of the viewpoint of the user, such as if the user changed the perspective of device 101 in FIG. 11E instead of rotating representation 1108 (e.g., detecting that the perspective of the three-dimensional environment has changed). For example, the user of the device has moved the device such that the device is at a new location and facing the same area from the new location.

In some embodiments, in response to detecting the movement of the viewpoint of the user (1214), the electronic device updates (1216) the appearance of the first user interface object and the first plane associated with the first user interface object based on the movement of the viewpoint of the user (e.g., updating the display of the three-dimensional environment, which includes the first user interface object and the first plane, to reflect the new perspective view of the three-dimensional environment). For example, if the device is moved slightly to the left, then the user is able to see more of the left side of three-dimensional objects in the environment (e.g., the viewpoint of the user has shifted leftwards).

In some embodiments, the electronic device updates (1218) the appearance of the respective set of marks, such as in FIG. 11E. In some embodiments, when the respective set of marks is contained within the first plane associated with the first user interface object, the respective set of marks moves in the same manner as the first plane moves (1220), such as mark 1142 in FIG. 11E (e.g., if the respective set of marks is constrained to the first plane, then the respective set of marks moves with the movement of the first plane, which moves according to the change in the viewpoint of the user). For example, when the respective set of marks is constrained to the first plane, the respective set of marks appear to be drawn on the first plane itself and thus when the viewpoint of the user changes, the user's view of the first plane changes and thus the user's view of the respective set of marks changes accordingly while the respective set of marks remains on the first plane.

In some embodiments, when the respective set of marks extends out of the first plane associated with the first user interface object, the respective set of marks moves differently from the movement of the first plane (1222), such as mark 1136 in FIG. 11E (e.g., if the respective set of marks are not constrained to the first plane and are drawn in space based on the location of the first user input, then in response to the change in the viewpoint of the user, the user's perspective of the respective set of marks changes accordingly, which optionally allows the user to see the changes in depth in the respective set of marks (e.g., due to now viewing the respective set of marks from the side as compared to before).

The above-described manner of providing for marking with respect to an object (e.g., by drawing marks or annotations on a plane or not on a plane based on the context in which the drawing input was made) provides for quick and efficient method of annotating objects at different distances from a viewpoint of the user (e.g., by snapping markings to a plane if the user's hand is far away, but marking locations indicated by the user's hand if the user's hand is close), which simplifies the interaction between the user and the electronic device and enhances the operability of the electronic device and makes the user-device interface more efficient (e.g., without requiring the user to perform additional inputs to switch from a planar marking mode to a non-planar marking mode), which additionally reduces power usage and improves battery life of the electronic device by enabling the user to use the electronic device more quickly and efficiency, while reducing errors in usage.

In some embodiments, the respective set of marks is made based on a first content entry tool that is currently selected when the first input is received (e.g., the respective set of marks is drawn by the user of the electronic device, such as described with reference to method 1000), the three-dimensional environment is accessible to the electronic device and a second electronic device (e.g., the environment is shared by the user of the electronic device and a user of a second electronic device), the first user interface object is displayed in the three-dimensional environment by the second electronic device (e.g., the first user interface object is viewable in the three-dimensional environment by both the user of the electronic device and the user of the second electronic device), the respective set of marks is displayed in the three-dimensional environment by the second electronic device (e.g., the set of marks drawn by the user of the electronic device is viewable by the user of the second electronic device), and a second content entry tool, different from the first content entry tool, is currently selected at the second electronic device (1224) (e.g., the user of the second electronic device has a different content entry tool selected than the user of the first electronic device).

For example, the three-dimensional environment is an environment of a shared multiplayer or multi-user session with the second electronic device or user in which the user of the electronic device is able to see the three-dimensional environment from a first perspective (e.g., as if the user is located in the three-dimensional environment) and the user of the second electronic device is also able to see the three-dimensional environment, optionally from a second perspective (e.g., as if the user of the second electronic device is also located in the three-dimensional environment, optionally at a different location than the user of the electronic device). In some embodiments, the electronic device and the second electronic device are in different physical locations.

For example, the first user interface object is a shared element that is enabled to be viewable to more than one (e.g., some, all, etc.) participants in the multiplayer or multi-user session. In some embodiments, the first user interface object is, or is included in, a content entry user interface element such as described with reference to method 1000. For example, the set of marks drawn by a user is a shared element that is enabled to be viewable to more than one (e.g., some, all, etc.) participants in the multiplayer or multi-user session.

Thus, in some embodiments, different users are able to have different active content entry tools to enter content into the three-dimensional environment. In some embodiments, multiple users are able to concurrently draw marks in the three-dimensional environment. In some embodiments, a drawing palette that includes one or more options for controlling the content that is inserted and/or changing the content entry tool that is active is local to each user and is optionally not visible to other users. For example, if the user of the electronic device performs an input and causes display of a drawing palette, the user of the second electronic device cannot see (e.g., the second electronic device does not display) that the user of the electronic device is interacting with a drawing palette. In some embodiments, the user of the second electronic device can see (e.g., the second electronic device displays) the preview of the content entry tool (e.g., as discussed above with respect to method 1000) in the representation of the hand of the user of the electronic device (e.g., the user of the electronic device can see which content entry tool is active for the user of the electronic device). In some embodiments, the user of the second electronic device cannot see (e.g., the second electronic device does not display) the preview of the content entry tool in the representation of the hand of the user of the electronic device.

The above-described manner of sharing elements of a three-dimensional environment with other users that are present in the three-dimensional environment (e.g., by sharing the first user interface object and the marks that are drawn on the first user interface object, but optionally not sharing the tool palette that a user uses to select the content entry tool to draw marks) provides for quick and efficient method of sharing a three-dimensional environment (e.g., by sharing objects and elements that exist in the three-dimensional environment, but not menus or options that are local to how a respective user interacts with the three-dimensional environment), which simplifies the interaction between the user and the electronic device and enhances the operability of the electronic device and makes the user-device interface more efficient (e.g., by automatically avoiding cluttering the user interface of other users, without requiring users to perform additional inputs to turn on or off the sharing of user interface elements that are not relevant to other users), which additionally reduces power usage and improves battery life of the electronic device by enabling the user to use the electronic device more quickly and efficiency, while reducing errors in usage.

In some embodiments, the respective set of marks is made based on a first content entry tool that is currently selected when the first input is received, the first input includes detecting that a shape of a predefined portion of the user of the electronic device corresponds to the marking input (1226), such as in FIGS. 11A-11B (e.g., the respective set of marks is drawn in response to the user performing a pinch gesture using two or more fingers of a hand of the user).

In some embodiments, the respective set of marks has one or more visual characteristics based on the content entry tool that is currently active. For example, marks drawn using a pencil tool look as if they were drawn by a pencil, marks drawn by a marker tool look as if they were drawn by a marker, etc. In some embodiments, the shape of the predefined portion of the user includes a hand of the user assuming a pre-pinch shape with a thumb and index finger, for example, before or after performing a pinch gesture. In some embodiments, the shape of the predefined portion of the user includes the hand having a shape that is assumed before making a shape associated with a selection input (optionally including the shape associated with the selection input).

In some embodiments, before detecting a portion of the first input that makes the respective set of marks (e.g., before detecting movement of the hand of the user while in the pinch hand shape, and in some embodiments, before detecting the pinch gesture and/or hand shape) and in response to detecting that the shape of the predefined portion of the user corresponds to the marking input, the electronic device displays (1228), in association with a representation of the predefined portion of the user displayed in the three-dimensional environment, a visual indication of the first content entry tool, such as representation 920 in FIG. 9A (e.g., displaying a preview of the content entry tool that is currently active that controls how and what type of content is entered when the hand performs the pinch gesture (e.g., followed by movement of the hand while the pinch gesture is maintained), similar to the visual indication of the first content entry tool described above with respect to method 1000).

The above-described manner of displaying an indication of the content entry tool that will be used to insert content (e.g., in response to detecting that the hand of the user has a shape indicative that the hand will imminently perform a pinch gesture for inserting content) provides for quick and efficient method of indicating the currently active content entry tool, which simplifies the interaction between the user and the electronic device and enhances the operability of the electronic device and makes the user-device interface more efficient (e.g., without requiring users to perform additional inputs to determine which content entry tool is active), which additionally reduces power usage and improves battery life of the electronic device by enabling the user to use the electronic device more quickly and efficiency, while reducing errors in usage.

In some embodiments, the respective set of marks is made based on a first content entry tool that is currently selected when the first input is received (1230) (e.g., the respective set of marks is inserted while the first content entry tool is active and has one or more visual characteristics based on the first content entry tool).

In some embodiments, before detecting the first input (1232), the electronic device displays (1234), via the display generation component, a content entry tool user interface element that includes one or more selectable options that are selectable to select corresponding one or more content entry tools, wherein the content entry tool user interface is displayed remote from the first user interface object in the three-dimensional environment, such as if a content entry palette were displayed in three-dimensional environment 1104 (e.g., the user interface includes a palette that includes one or more content entry tools and/or one or more options that control how content is inserted or how the inserted content looks).

In some embodiments, the palette is displayed in response to a user input requesting display of the palette, such as the selection of a respective affordance, detecting the performance of a respective gesture performed by one or more hands of the user (e.g., a pre-pinch hand shape while the gaze of the user is directed toward the first user interface object/area in which content is to be entered), etc. In some embodiments, the palette is displayed as a visually separate object from the first user interface object and/or content entry user interface on which the first user interface object is optionally located. For example, the palette is a separate user interface element than either the first user interface object or the content entry user interface. In some embodiments, the palette is able to be moved around the three-dimensional environment independently of the first user interface object and the content entry user interface.

In some embodiments, while displaying the content entry tool user interface element, the electronic device detects (1236), via the one or more input devices, selection of a respective selectable option of the one or more selectable options corresponding to the first content entry tool (e.g., detecting a user selection of an option associated with the first content entry tool). In some embodiments, the palette includes one or more selectable options associated with one or more content entry tools (e.g., pencil, pen, marker, highlighter, eraser, etc.) that are selectable to set the respective tool as the active content entry tool. In some embodiments, the one or more selectable options are representations of the respective content entry tools (e.g., a representation of a pencil, a representation of a pen, etc.).

In some embodiments, in response to detecting the selection of the respective selectable option, the electronic device selects (1238) the first content entry tool for subsequent content entry in the three-dimensional environment, similar to the selection of one of representations 932-1 to 932-3 in FIG. 9E (e.g., setting the content entry tool associated with the respective selectable option as the active content entry tool). In some embodiments, the active content entry tool controls how content is inserted into a content entry user interface and/or how inserted content looks.

The above-described manner of displaying an indication of the content entry tool that will be used to insert content (e.g., in response to detecting that the hand of the user has a shape indicative that the hand will imminently perform a pinch gesture for inserting content) provides for quick and efficient method of indicating the currently active content entry tool, which simplifies the interaction between the user and the electronic device and enhances the operability of the electronic device and makes the user-device interface more efficient (e.g., without requiring users to perform additional inputs to determine which content entry tool is active), which additionally reduces power usage and improves battery life of the electronic device by enabling the user to use the electronic device more quickly and efficiency, while reducing errors in usage.

In some embodiments, the content entry tool user interface element is displayed at a location in the three-dimensional environment that is determined based on a location of a representation of a predefined portion of the user in the three-dimensional environment (1240) (e.g., the palette is positionally associated with the hand of the user such that the position of the palette in three-dimensional space depends at least in part on the position of the hand of the user). In some embodiments, the palette is floating in space near the location of the hand (e.g., at a distance of 0.5 inches, 1 inch, 3 inches, 10 inches, etc. from the hand of the user), such that the hand is able to reach out and select an option from the palette without moving too far. In some embodiments, the palette is attached to the hand as if the hand is holding the palette (e.g., and optionally the other hand of the user is used to select an option from the palette).

In some embodiments, in accordance with a determination that the predefined portion of the user is at a first location in a physical environment of the electronic device, the content entry tool user interface element is displayed at a first respective location in the three-dimensional environment that corresponds to the first location of the predefined portion of the user (1242) (e.g., if the hand is at a first location, the palette is located at a first respective location based on the first hand being at the first location). In some embodiments, the first respective location is near the first location (e.g., within 1 inch, 3 inches, 6 inches, 12 inches, etc.).

In some embodiments, in accordance with a determination that the predefined portion of the user is at a second location, different from the first location, in the physical environment of the electronic device, the content entry tool user interface element is displayed at a second respective location, different from the first respective location, in the three-dimensional environment that corresponds to the second location of the predefined portion of the user (1244) (e.g., if the hand is at a second location, the palette is located at a second respective location based on the first hand being at the first location).

In some embodiments, the second respective location is near the second location (e.g., within 1 inch, 3 inches, 6 inches, 12 inches, etc.). Thus, as the hand moves from one location to another location, the palette will optionally move accordingly. In some embodiments, the palette lags the movement of the hand. For example, if the hand moves rightwards by 1 foot, the palette optionally moves rightwards by 1 foot after a delay of 3 seconds. In some embodiments, the movement of the palette exhibits acceleration and deceleration behaviors. For example, as the palette begins moving, it starts at a slow velocity, then increases to a maximum velocity and then slows down in velocity as it approaches and reaches its destination (e.g., the palette moves smoothly). In such embodiments, delaying and/or exhibiting acceleration and deceleration behaviors prevents the palette from having jerky and sudden movements.

The above-described manner of displaying an content entry tool user interface element (e.g., at a location based on the location of the hand of the user) provides for quick and efficient method of accessing content entry tools (e.g., by placing the content entry palette near the hand of the user), which simplifies the interaction between the user and the electronic device and enhances the operability of the electronic device and makes the user-device interface more efficient (e.g., without requiring users to perform additional and unnecessary movements and/or inputs to access the content entry palette), which additionally reduces power usage and improves battery life of the electronic device by enabling the user to use the electronic device more quickly and efficiency, while reducing errors in usage.

In some embodiments, while displaying the first user interface object in the three-dimensional environment, the electronic device detects (1246), via the one or more input devices, a second input corresponding to a request to select a content selection tool (e.g., a user input selecting, from the content entry palette for example, a content selection tool as the currently active tool). In some embodiments, the content selection tool is not a content entry tool because activation of the content selection tool (e.g., in response to a pinch gesture) does not cause content to be inserted, but instead, causes content to be selected. In some embodiments, selecting content enables the selected content to be manipulated, for example to resize, move, delete, copy to clipboard, etc.

In some embodiments, in response to detecting the second input, the electronic device selects (1248) the content selection tool. In some embodiments, while the content selection tool is selected, the electronic device detects (1250), via the one or more input devices, a third input including movement of a predefined portion of the user, wherein the third input corresponds to a request to designate a selection volume in the three-dimensional environment using the content selection tool, such as the user input by second hand 1128 in FIGS. 11A-11B (e.g., detecting a pinch input while the hand is at a first location and while maintaining the pinch input, a movement of the hand to a second location).

In some embodiments, the area between the first location and the second location defines the selection area such that selectable content within the selection area is selected (e.g., selected as soon as the content falls within the selection area or selected in response to detecting the termination of the pinch gesture). In some embodiments, the selection area is circular and the radius or diameter of the selection area is defined by the distance from the first location to the second location (e.g., any object within the circle is selected). In some embodiments, the selection area is a line between the first location and the second location (e.g., any object that the line contacts is selected). In some embodiments, the selection area is three-dimensional, such as a sphere, and the three-dimensional radius or diameter of the sphere is defined by the distance from the first location to the second location.

In some embodiments, in response to detecting the third input (1252), in accordance with a determination that the movement of the predefined portion of the user is a first movement, the electronic device selects (1254) one or more objects within a first volume in the three-dimensional environment for further interaction, wherein the first volume is based on the first movement of the predefined portion of the user, such as the selection of representation 1116 and portions of representation 1114 in FIG. 11B (e.g., any selectable objects within the sphere (e.g., which is optionally visible or optionally not visible) created between the first location (e.g., the location of the initial pinch) and the second location (e.g., the current location of the hand and/or the location that the hand was at when the pinch was released), is selected). In some embodiments, selecting an object causes the object to be displayed with a visual indication indicating that it is selected (e.g., highlighting, blinking, a dark border, a halo, an increase in size, etc.). In some embodiments, selecting an object causes one or more affordances to be displayed for interacting with and/or manipulating the selected object (e.g., cut/copy/paste affordances, delete affordance, change color affordance, change font affordance, etc.).

In some embodiments, in accordance with a determination that the movement of the predefined portion of the user is a second movement, different from the first movement, the electronic device selects (1256) one or more objects within a second volume, different from the first volume, in the three-dimensional environment for further interaction, wherein the second volume is based on the second movement of the predefined portion of the user, such as in FIG. 11B (e.g., if the hand moved to a third location, then a selection sphere is defined by the first location (e.g., the location of the initial pinch) and the third location (e.g., the current location of the hand and/or the location that the hand was at when the pinch was released) and any selectable objects within the selection sphere are selected).

The above-described manner of selecting objects (e.g., by creating a selection area using the hand of the user while the selection tool is active) provides for quick and efficient method of selecting objects (e.g., by selecting all objects within the defined selection area), which simplifies the interaction between the user and the electronic device and enhances the operability of the electronic device and makes the user-device interface more efficient (e.g., without requiring users to perform additional inputs to individually select each object), which additionally reduces power usage and improves battery life of the electronic device by enabling the user to use the electronic device more quickly and efficiency, while reducing errors in usage.

In some embodiments, in response to detecting the first input and after displaying the respective set of marks corresponding to the first input, wherein the respective set of marks includes a two-dimensional portion (e.g., after the user has inserted a set of content that, in combination, form a two-dimensional shape (e.g., optionally an enclosed shape), such as a circle, square, rectangle, triangle, etc.), the electronic device displays (1258), via the display generation component in the three-dimensional environment, a user interface element in association with the two-dimensional portion of the respective set of marks that is interactable to extrude the two-dimensional portion into a three-dimensional object, such as extrusion affordance 1124 in FIG. 11A (e.g., display an option to extrude the enclosed shape into a three-dimensional object based on the enclosed shape).

In some embodiments, the two-dimensional shape is not part of a three-dimensional object drawn by the user. In some embodiments, the two-dimensional shape is part of a three-dimensional object drawn by the user (e.g., a side or face of the three-dimensional object). In some embodiments, extruding the object includes extending the object in a certain direction to create a three-dimensional object that has a cross-sectional shape that is the same or similar to the original two-dimensional enclosed shape. For example, if the enclosed shape is a circle, extruding the circle in a direction perpendicular to the circle results in a cylinder whose cross-section is the same shape as the circle (e.g., if the initial circle is a perfect circle, the cross-section of the cylinder is a perfect circle with the same radius, and if the initial circle is an oblong circle, the cross-section of the cylinder is an oblong circle, etc.). In some embodiments, the option is a extrusion affordance that is selectable by the user to "pull" the two-dimensional shape in the direction of the extrusion. In some embodiments, the amount that the extrusion affordance is pulled (e.g., the amount of hand movement after selection of the affordance with a pinch gesture) determines the amount of extrusion. For example, if the extrusion affordance is pulled by three inches, the object is extruded by three inches (e.g., the cylinder in the example above has a height or length (as the case may be) of three inches).

In some embodiments, while displaying the user interface element, the electronic device detects (1260), via the one or more input devices, a second input including selection of the user interface element and movement of a predefined portion of the user, such as the selection of extrusion affordance 1124 and pulling movement by third hand 1130 in FIG. 11B (e.g., selecting the extrusion affordance (e.g., via a pinch gesture by the hand of the user directed at the extrusion affordance) and a movement of the hand while the user interface element remains selected (e.g., while maintaining the pinch hand shape)).

In some embodiments, in response to detecting the second input, the electronic device displays (1262), via the display generation component in the three-dimensional environment, a respective three-dimensional object corresponding to extrusion of the two-dimensional portion of the respective set of marks based on the movement of the predefined portion of the user, such as the extrusion of circle 1122 in FIG. 11B (e.g., extruding the two-dimensional object to create a three-dimensional object that has a shape in a respective dimension that is based on the two-dimensional object).

For example, the height of the three-dimensional object is determined by the amount of the extrusion, and the width and length of the three-dimensional object (e.g., the cross-sectional shape of the three-dimensional object) is the same or similar to the width and length of the two-dimensional object. In some embodiments, if the two-dimensional portion of the respective set of marks is attached to another object, then the resulting three-dimensional object that is the extrusion of the two-dimensional portion of the respective set of marks continues to be attached to the other object.

The above-described manner of creating a three-dimensional object from a two-dimensional drawing (e.g., by extruding the two-dimensional drawing) provides for quick and efficient method of creating three-dimensional objects (e.g., by drawing only the cross-sectional shape that is desired and extruding the cross-sectional shape to achieve a three-dimensional object with the desired cross-sectional shape), which simplifies the interaction between the user and the electronic device and enhances the operability of the electronic device and makes the user-device interface more efficient (e.g., without requiring users to perform additional inputs to draw a three-dimensional object), which additionally reduces power usage and improves battery life of the electronic device by enabling the user to use the electronic device more quickly and efficiency, while reducing errors in usage.

In some embodiments, while detecting the second input (1264) (and in response to detecting the second input) (e.g., while receiving the input that is interacting with the extrusion affordance and optionally causing the two-dimensional object to be extruded into a three-dimensional object, such as while a first hand of the user is holding the pinch hand shape after having selected the extrusion affordance, and optionally while the first hand of the user is moving/extruding the object), in accordance with a determination that a third input from a second predefined portion of the user is detected (e.g., receiving a user input from the other hand performing a pinch gesture and optionally moving while performing the pinch gesture), the electronic device scales (1266) the two-dimensional portion of the respective set of marks that is being extruded based on the third input from the second predefined portion of the user, wherein the respective three-dimensional object is a first three-dimensional object based on the scaled two-dimensional portion of the respective set of marks, such as if another hand performed a resizing input on circle 1122 while the extrusion function is being performed in FIG. 11B (e.g., increasing or decreasing the size of the two-dimensional object that is used to extrude into the three-dimensional object).

In some embodiments, the other hand of the user must be within 0.1, 1, 2, 5, 10 inches of the first hand for the input from the other hand to adjust the extrusion performed by the first hand. In some embodiments, changing the size of the two-dimensional object while performing the extrusion operation causes the extrusion to adapt to the new size. For example, if the user extrudes a two-dimensional object by half an inch, then performs the third input to increase the size of the two-dimensional object by 50%, then the user continues extruding by another half inch, then the first half inch has a cross-sectional shape with the original size of the two-dimensional object and the second half inch has a cross-sectional shape with the 50% larger size due to the 50% increased size of the two-dimensional object. Thus, a user is able to create a three-dimensional object using a two-dimensional object to control the shape of the cross-section of the three-dimensional object, but vary the size of the cross-section of the three-dimensional object (e.g., by changing the scale of the two-dimensional object while extruding).

In some embodiments, in accordance with a determination that the third input from the second predefined portion of the user is not detected, the electronic device forgoes (1268) scaling the two-dimensional portion of the respective set of marks that is being extruded, wherein the respective three-dimensional object is a second three-dimensional object, different from the first three-dimensional object, not based on the scaled two-dimensional portion of the respective set of marks (e.g., if the device does not detect that the second hand is performing a pinch gesture (or if the pinch performed by the second hand is too far away from the first hand), do not scale the two-dimensional object and maintain the same cross-sectional size of the three-dimensional environment as the object is being extruded).

The above-described manner of creating a variable sized three-dimensional object from a two-dimensional drawing (e.g., by changing the size of the two-dimensional object on which the extrusion is based while performing the extrusion) provides for quick and efficient method of creating three-dimensional objects, which simplifies the interaction between the user and the electronic device and enhances the operability of the electronic device and makes the user-device interface more efficient (e.g., without requiring users to perform additional inputs to draw three-dimensional objects with different sized cross-sections), which additionally reduces power usage and improves battery life of the electronic device by enabling the user to use the electronic device more quickly and efficiency, while reducing errors in usage.

In some embodiments, the electronic device displays (1270), in the three-dimensional environment, a first two-dimensional object and a second two-dimensional object, such as in FIG. 11A (e.g., the three-dimensional environment includes two two-dimensional objects). In some embodiments, one or both of the objects were drawn by the user. In some embodiments, one or both of the objects were not drawn by the user (e.g., are system generated objects, such as objects that are part of a virtual environment displayed by the electronic device).

In some embodiments, while displaying the first two-dimensional object and the second two-dimensional object, the electronic device detects (1272), via the one or more input devices, a second input corresponding to movement together of the first two-dimensional object and the second two-dimensional object in the three-dimensional environment, such as the movement of circle 1110 towards line 1112 in FIG. 11A (e.g., the device detects an input from a hand moving one of the two-dimensional objects to the other of the two-dimensional objects (or within a threshold distance, such as 1 inch, 3 inches, 6 inches, 1 foot, 3 feet, etc.).

In some embodiments, in response to detecting the second input, the electronic device displays (1274), in the three-dimensional environment, a three-dimensional object that is based on the first two-dimensional object and the second two-dimensional object, such as shape 1138 in FIG. 11C (e.g., performing an extrusion operation based on a combination of the attributes of the two objects).

In some embodiments, the first two-dimensional object is a non-enclosed shape, such as a line, a curved line, etc. In some embodiments, the first two-dimensional object is an enclosed shape, such as a circle or oval. In some embodiments, the second two-dimensional object is an enclosed shape, such as a circle, square, rectangle, triangle, etc. In some embodiments, performing the extrusion operation includes extruding the enclosed shape along the path of the non-enclosed (enclosed) shape. For example, if the first shape is a two inch long straight line, and the second shape is a perfect circle, the result is a two-inch tall cylinder with a cross-sectional shape that is a perfect circle that is the same or similar to the second shape (e.g., taking the second shape and extruding it by the amount defined by the first shape and in a direction defined by the path of the first shape). In some embodiments, if the first shape is a one inch long straight line with a 90 degree bend connected to another one inch long straight line and the second shape is a perfect circle, then the resulting three-dimensional object is a two inch long pipe that is bent by 90 degrees in the center (e.g., the perfect circle extruded along the first one inch long straight line, then turned by the 90 degrees defined by the first shape, and extruded by another inch that is perpendicular to the original inch).

The above-described manner of creating a three-dimensional object using a first two-dimensional object to define the cross-sectional shape of the three-dimensional object and a second shape to define the extrusion path (e.g., by moving the first two-dimensional object to the second two-dimensional object) provides for quick and efficient method of creating three-dimensional objects, which simplifies the interaction between the user and the electronic device and enhances the operability of the electronic device and makes the user-device interface more efficient (e.g., without requiring users to perform additional inputs to manually draw a three-dimensional object), which additionally reduces power usage and improves battery life of the electronic device by enabling the user to use the electronic device more quickly and efficiency, while reducing errors in usage.

In some embodiments, while moving the first two-dimensional object and the second two-dimensional object together in the three-dimensional environment (1276) (e.g., while moving the first two-dimensional object towards the two-dimensional object, for example, to perform an extrusion operation based on the two two-dimensional objects), in accordance with a determination that the first two-dimensional object is within a threshold distance of the second two-dimensional object (e.g., within 1 inch, 3 inches, 6 inches, 1 foot, 3 feet, etc.), the electronic device displays (1278), via the display generation component, a visual indication that the first two-dimensional object and the second two-dimensional object can be combined to create the three-dimensional object, such as displaying circle 1110 with a grey color in FIG. 11B (e.g., display an indication that in response to detecting a termination of the pinch gesture (e.g., release of the pinch hand shape) moving one two-dimensional object onto the other two-dimensional object, an extrusion operation will be performed). In some embodiments, the visual indication includes highlighting the first and/or the second two-dimensional object. In some embodiments, the visual indication includes displaying a preview of the resulting three-dimensional object (e.g., as a transparent or partially transparent object, a shadow object, etc.).

The above-described manner of indicating that a three-dimensional object will be created by extruding a first object along the path of a second object (e.g., by display a visual indication that the extrusion will be performed when the first object is moved near the second object such that releasing the pinch gesture that is holding the first object will perform the extrusion operation) provides for quick and efficient method of creating three-dimensional objects, which simplifies the interaction between the user and the electronic device and enhances the operability of the electronic device and makes the user-device interface more efficient (e.g., without requiring users to perform test inputs to determine whether an extrusion operation will be performed), which additionally reduces power usage and improves battery life of the electronic device by enabling the user to use the electronic device more quickly and efficiency, while reducing errors in usage.

In some embodiments, the three-dimensional object corresponds to extrusion of the first two-dimensional object along a path defined by the second two-dimensional object in the three-dimensional environment (1280), such as shape 1138 in FIG. 11C (e.g., the resulting three-dimensional object is a result of performing an extrusion operation using the first two-dimensional object and extruding along the path of the second two-dimensional object).

For example, the three-dimensional object has a cross-sectional shape and size that is based on (e.g., the same or similar as) the first two-dimensional object and the height (e.g., or length, as the case may be, depending on the orientation of the object) has a length and shape based on the second two-dimensional object. In some embodiments, the extrusion operation is only available if the first two-dimensional object is an enclosed object (e.g., circle, square, rectangle, triangle, etc.). In some embodiments, the extrusion operation is only available if the second two-dimensional object is an unenclosed object (e.g., line, curved line, etc.). In some embodiments, the extrusion operation is available if the first and second two-dimensional objects are enclosed objects.

The above-described manner of creating a three-dimensional object using a first two-dimensional object to define the cross-sectional shape of the three-dimensional object and a second shape to define the extrusion path (e.g., by extruding the first two-dimensional object along the path of the second two-dimensional object) provides for quick and efficient method of creating three-dimensional objects, which simplifies the interaction between the user and the electronic device and enhances the operability of the electronic device and makes the user-device interface more efficient (e.g., without requiring users to perform additional inputs to manually draw a three-dimensional object), which additionally reduces power usage and improves battery life of the electronic device by enabling the user to use the electronic device more quickly and efficiency, while reducing errors in usage.

In some embodiments, while detecting the first input, the electronic device displays (1282), in the three-dimensional environment, a first visual indication of first area or first volume of the three-dimensional environment that is available for marking based on the first input, such as three-dimensional volume 1144 in FIG. 11F (e.g., while detecting the input for drawing the respective set of marks (e.g., optionally before the marks are drawn), displaying an indication of the area and/or volume within the marks will be drawn).

For example, if the marks are able to be drawn anywhere within a three-dimensional volume, the respective three-dimensional volume is displayed with a respective visual indication and if the marks are able to be drawn on the surface of an object, the surface is displayed with a respective visual indication. In some embodiments, the visual indication is a highlighting of the area or volume. In some embodiments, the visual indication is a border (e.g., two dimensional or three dimensional boundary, as the case may be) indicating the space within which marks can be made. In some embodiments, the movement of the hand of the user while inserting the respective set of marks is mapped to the area or volume defined by the first visual indication. For example, if the hand moves from the right-most position to the left-most position while drawing content, the content is drawn from the right-most position in the marked area or volume to the left-most position in the marked area or volume. In some embodiments, the visual indication indicates and/or encompasses a content entry user interface element such as described with reference to method 1000.

The above-described manner of indicating the space within which a mark is able to be drawn (e.g., by displaying a visual indication of the space that the mark is able to be drawn in while the user is performing the input for drawing marks), which simplifies the interaction between the user and the electronic device and enhances the operability of the electronic device and makes the user-device interface more efficient (e.g., without requiring users to perform unnecessary inputs to determine whether the user is able to draw marks at respective locations), which additionally reduces power usage and improves battery life of the electronic device by enabling the user to use the electronic device more quickly and efficiency, while reducing errors in usage.

In some embodiments, in accordance with the determination that the first input is made in the first context, the first visual indication is a visual indication of the first plane associated with the first user interface object in the three-dimensional environment (1284), such as two-dimensional surface 1146 in FIG. 11F (e.g., if the currently active content entry tool is a two-dimensional marking tool (e.g., as opposed to a three-dimensional marking tool) and/or if the hand that is performing the mark is farther than the threshold distance from the first user interface object (e.g., toward which the gaze of the user is directed), then the marks are drawn on a two-dimensional surface).

In such embodiments, because the user is able to draw on a two-dimensional surface but is optionally not able to draw in three dimensions (e.g., only able to draw in two dimensions), the visual indication is on or of the planar surface (e.g., a rectangle or a circle) on which the user is able to draw. In some embodiments, the planar surface is selected such that the first user interface object (e.g., toward which the gaze of the user is directed) fits within the planar boundaries of the planar surface—which is optionally located between the first user interface object and the viewpoint of the user—when displayed from the viewpoint of the user in the three-dimensional environment.

The above-described manner of indicating the two-dimensional space within which a mark is able to be drawn (e.g., by displaying a visual indication on the plane on which the marks are able to be drawn when the first input is performed while in the first context), which simplifies the interaction between the user and the electronic device and enhances the operability of the electronic device and makes the user-device interface more efficient (e.g., without requiring users to perform unnecessary inputs to determine whether the user is able to draw marks at respective locations), which additionally reduces power usage and improves battery life of the electronic device by enabling the user to use the electronic device more quickly and efficiency, while reducing errors in usage.

In some embodiments, in accordance with the determination that the first input is made in the second context, the first visual indication is a visual indication of a first volume associated with the first user interface object (1286), such as three-dimensional volume 1144 in FIG. 11F (e.g., if the currently active content entry tool is a three-dimensional marking tool (e.g., as opposed to a two-dimensional marking tool) and/or if the hand that is performing the mark is closer than the threshold distance from the first user interface object, then the marks are able to be drawn in three-dimensional space (e.g., as opposed to being limited to a planar surface)).

In such embodiments, because the user is able to draw in a three-dimensional space, the visual indication highlights the volume of space in which the user is able to draw. In some embodiments, the volume or space (e.g., cube or sphere) encompasses the first user interface object (e.g., toward which the gaze of the user is directed).

The above-described manner of indicating the three-dimensional space within which a mark is able to be drawn (e.g., by displaying a visual indication encompassing the volume in which the marks are able to be drawn when the first input is performed while in the second context), which simplifies the interaction between the user and the electronic device and enhances the operability of the electronic device and makes the user-device interface more efficient (e.g., without requiring users to perform unnecessary inputs to determine whether the user is able to draw marks at respective locations), which additionally reduces power usage and improves battery life of the electronic device by enabling the user to use the electronic device more quickly and efficiency, while reducing errors in usage.

In some embodiments, while displaying the first visual indication, the electronic device detects (1288), via the one or more input devices, movement of a gaze of the user of the electronic device away from the first area or first volume of the three-dimensional environment, such as if the gaze of the user moved away from looking at three-dimensional volume 1144 in FIG. 11F (e.g., while displaying the indication of the space in which the user is able to draw marks, detecting that the gaze of the user has moved from looking toward the space indicated by the first visual indication to looking at a location outside of the space indicated by the first visual indication).

In some embodiments, in response to detecting the movement of the gaze of the user away from the first area or first volume of the three-dimensional environment (1290), in accordance with a determination that respective marking input is being received when the movement of the gaze of the user is detected (e.g., a user input is being received for drawing marks when the gaze moves away from the space indicated by the first visual indication, such as the hand of the user still maintaining a pinch hand shape and/or still moving), the electronic device maintains (1292) the first visual indication in the three-dimensional environment and displaying a set of marks corresponding to the respective marking input within the first visual indication in the three-dimensional environment, such as if the user is currently inserting content into three-dimensional volume 1144, maintaining display of there-dimensional volume 1144 at its current location in FIG. 11F (e.g., maintain display of the first visual indication and maintain the space indicated by the first visual indication as the space within which marks can be drawn).

Thus, if the user is in the middle of drawing into the space indicated by the first visual indication, the device allows the user to continue drawing into that space even if the gaze of the user is no longer directed toward that space. In some embodiments, if the gaze of the user does not return to the space indicated by the first visual indication and the respective marking input is terminated, then the first visual indication is optionally ceased to be displayed and a new visual indication is displayed at a new location based on the location of the gaze (e.g., and the space within which the user is able to mark moves to the new location).

In some embodiments, in accordance with a determination that respective marking input is not being received when the movement of the gaze of the user is detected (e.g., if an input for drawing a mark is not being received when the gaze moves away from the space indicated by the first visual indication, such as the hand of the user is no longer maintaining the pinch hand shape), the electronic device ceases (1294) display of the first visual indication in the three-dimensional environment, and displaying, in the three-dimensional environment, a second visual indication of second area or second volume of the three-dimensional environment that is available for marking based on the gaze of the user, such as if three-dimensional volume 1144 were moved to the new location indicated by the new location of the user's gaze in FIG. 11F (e.g., removing the first visual indication and displaying a second visual indication (e.g., with characteristics optionally similar to the first visual indication) at a new location that is based on the location to which the gaze of the user is directed).

In some embodiments, the new location is the new location within which the user is able to draw marks and the space indicated by the first visual indication is no longer able to accept drawn marks. Thus, a user is able to move or shift the space within which the user is able to draw by moving the user's gaze to the desired location. In some embodiments, in response to moving the user's gaze to a new location and/or a trigger event, the space within which the user is able to draw is moved to a new location. For example, the trigger event includes the movement of the user's gaze by more than a threshold distance from the original location (e.g., more than 3 inches, 6 inches, 1 foot, 3 feet, 6 feet, etc.). In some embodiments, the trigger event includes the movement of the user's gaze and a predetermined gesture, such as the hand of the user assuming a ready position (e.g., the pre-pinch shape) or the hand selecting an affordance for resetting and/or moving the location of the visual indication.

The above-described manner of moving the visual indication of the space within which the user is able to draw marks (e.g., in response to the gaze of the user moving if the device is not receiving an input for drawing marks, but not moving the visual indication if the device is currently receiving an input for drawing marks) provides for a quick and efficient method of drawing marks at a new location (e.g., automatically, based on the gaze of the user, without requiring the user to perform additional inputs to move the space within which to draw marks), which simplifies the interaction between the user and the electronic device and enhances the operability of the electronic device and makes the user-device interface more efficient (e.g., if the user is not performing a marking input, which prevents the space from moving to a new location when the user is in the middle of drawing a mark, thus reducing unexpected behavior or unintentional marks), which additionally reduces power usage and improves battery life of the electronic device by enabling the user to use the electronic device more quickly and efficiency, while reducing errors in usage.

In some embodiments, after displaying the respective set of marks based on the first input, the electronic device detects (1296), via the one or more input devices, a second input corresponding to a request to modify an orientation of the respective set of marks relative to the viewpoint of the user, such as in FIG. 11E (e.g., receiving a user input rotating the set of marks and/or rotating the object on which the marks are drawn). For example, if the respective set of marks is drawn on the first user interface object and/or on a plane in front of the first user interface object that is associated with the first user interface object, the user is able to modify the orientation of the first user interface object, which optionally concurrently modifies the orientation of the respective set of marks according to the change in orientation of the first user interface object.

In some embodiments, in response to detecting the second input, the electronic device modifies (1298) the orientation of the respective set of marks relative to the viewpoint of the user, such as in FIG. 11E (e.g., moving and/or rotating the respective set of marks according to the request to rotate the respective set of marks and/or the first user interface object).

In some embodiments, in accordance with a determination that the first input is made in the second context (1299) (e.g., if the marks were made when the hand was less than the threshold distance such that the marks are made on the first user interface object or in space near the first user interface object, not confined on the first plane), in accordance with a determination that an orientation of the viewpoint of the user relative to a portion of the respective set of marks is within a first set of orientations, the electronic device ceases (1297) display of the portion of the respective set of marks, such as in FIG. 11E (e.g., if the respective set of marks is rotated such that the "front" of the set of marks (e.g., the side of the set of marks that is viewable by the user's perspective when the marks were first drawn) is no longer viewable by the user (e.g., the marks have rotated more than 90 degrees such that no part of the "front" of the set of marks is viewable by the user), then cease display of the mark (e.g., automatically, without a user input for doing so)).

In some embodiments, automatically ceasing display of the mark if the front of the mark is no longer viewable by the user simplifies the display and removes clutter from the three-dimensional environment that is otherwise not properly viewable by the user. In some embodiments, if the first user interface object (e.g., and the respective set of marks) is rotated such that the "front" of the set of marks would otherwise be visible (e.g., if it were displayed, for example, if the marks were rotated from being more than 90 degrees from its original orientation to being less than 90 degrees from its original orientation), then the set of marks are restored (e.g., re-displayed).

In some embodiments, in accordance with a determination that the orientation of the viewpoint of the user relative to the portion of the respective set of marks is within a second set of orientations, different from the first set of orientations, the electronic device maintains (1295) display of the portion of the respective set of marks without ceasing display of the portion of the respective set of marks, such as in FIG. 11E (e.g., if the respective set of marks is rotated such that the "front" of the set of marks is still viewable by the user (e.g., the set of marks have rotated less than 90 degrees), then maintain the display of the marks).

In some embodiments, display or non-display of the set of marks exhibits similar behavior when made in the first context. For example, if a set of marks is displayed on the first plane, then in response to rotating the first user interface object, the first plane rotates by the same amount as the rotation of the first user interface object (e.g., the first plane remains at the same location relative to the first user interface object and parallel to the same portion of the first user interface object). In such embodiments, marks drawn on the first plane also move and rotate with the first plane (e.g., due to being "drawn" on the first plane) and if the front of the marks are no longer visible (e.g., the plane rotates more than 90 degrees), display of the marks are ceased, but if the front of the marks are still visible (e.g., the plane rotates less than 90 degrees), display of the marks is maintained. In some embodiments, marks made in the first context and marks made in the second context have different behaviors with respect to whether they cease to be displayed in response to a change in orientation. For example, marks made in the first context optionally remain visible even if the object on which they are drawn is rotated in such a way that the "front" of the mark is no longer visible to the user. In some embodiments, three-dimensional marks and two-dimensional marks have different behaviors with respect to whether they cease to be displayed in response to a change in orientation. For example, two-dimensional marks optionally remain visible even if the object on which they are drawn is rotated in such a way that the "front" of the mark is no longer visible to the user.

The above-described manner of displaying the marks as the marks are rotated (e.g., by ceasing display of the marks if the marks are rotated to a certain orientation, but maintaining display if the marks are rotated to another set of orientations) provides for a quick and efficient method of displaying content in the three-dimensional environment (e.g., by automatically removing display of objects that have orientations that cause the object to not be properly viewable by the user), which simplifies the interaction between the user and the electronic device and enhances the operability of the electronic device and makes the user-device interface more efficient (e.g., without requiring the user to perform additional inputs to disable display of certain marks), which additionally reduces power usage and improves battery life of the electronic device by enabling the user to use the electronic device more quickly and efficiently, while reducing errors in usage.

In some embodiments, after displaying the respective set of marks based on the first input, the electronic device detects (1293), via the one or more input devices, a second input corresponding to a request to modify an orientation of the respective set of marks relative to the viewpoint of the user, such as in FIG. 11E (e.g., receiving a user input rotating the set of marks and/or rotating the object on which the marks are drawn). For example, if the respective set of marks is drawn on the first user interface object and/or on a plane in front of the first user interface object that is associated with the first user interface object, the user is able to modify the orientation of the first user interface object, which optionally concurrently modifies the orientation of the respective set of marks according to the change in orientation of the first user interface object.

In some embodiments, in response to detecting the second input, the electronic device modifies (1291) the orientation of the respective set of marks relative to the viewpoint of the user, such as in FIG. 11E (e.g., moving and/or rotating the respective set of marks according to the request to rotate the respective set of marks and/or the first user interface object).

In some embodiments, in accordance with a determination that the first input is made in the second context (1289) (e.g., if the marks were made when the hand was less than the threshold distance such that the marks are made on the first user interface object or in space near the first user interface object, not confined on the first plane), in accordance with a determination that an orientation of the viewpoint of the user relative to a portion of the respective set of marks is within a first set of orientations, the electronic device reduces (1287) a prominence of display of the portion of the respective set of marks, such as in FIG. 11E (e.g., if the respective set of marks is rotated such that the "front" of the set of marks (e.g., the side of the set of marks that is viewable by the user's perspective when the marks were first drawn) is no longer viewable by the user (e.g., the marks have rotated more than 90 degrees such that no part of the "front" of the set of marks is viewable by the user), then the mark is modified to be less visually prominent (e.g., automatically, without a user input for doing so)).

In some embodiments, reducing the visual prominence of the mark includes fading the mark, making the mark more transparent, reducing the size of the mark, etc. In some embodiments, automatically ceasing display of the mark if the front of the mark is no longer viewable by the user simplifies the display and removes clutter from the three-dimensional environment that is otherwise not properly viewable by the user. In some embodiments, the respective set of marks become less prominent as the respective set of marks are rotated (e.g., gradually become less prominent, such as becoming more faded, becoming more transparent, etc.). For example, when the "front" of the respective set of marks is no longer viewable by the user, the prominence of the respective set of marks is such that the respective set of marks is no longer visible (e.g., fully faded, fully transparent, etc.), but before reaching the rotational position such that the respective set of marks is no longer visible, the respective set of marks have a reduced prominence but is still visible (e.g., partially faded, partially transparent, etc.). In some embodiments, as the "front" of the respective set of marks rotates away from facing the user and/or as the respective set of marks moves farther away from the user (e.g., whether due to the object rotating or the object being moved farther away), the prominence of the set of marks is gradually reduced (e.g., reduced based on the amount that the marks are rotated away or moved away). In some embodiments, if the first user interface object (e.g., and the respective set of marks) is rotated such that the "front" of the set of marks would otherwise be visible (e.g., if it were displayed, for example, if the marks were rotated from being more than 90 degrees from its original orientation to being less than 90 degrees from its original orientation), then the set of marks are restored to their original prominence.

In some embodiments, in accordance with a determination that the orientation of the viewpoint of the user relative to the portion of the respective set of marks is within a second set of orientations, different from the first set of orientations, the electronic device maintains (1285) display of the portion of the respective set of marks without reducing a prominence of the portion of the respective set of marks, such as in FIG. 11E (e.g., if the respective set of marks is rotated such that the "front" of the set of marks is still viewable by the user (e.g., the set of marks have rotated less than 90 degrees), then do not reduce the prominence of the marks (e.g., maintain display of the marks)).

In some embodiments, display or non-display of the set of marks exhibits similar behavior when made in the first context. For example, if a set of marks is displayed on the first plane, then in response to rotating the first user interface object, the first plane rotates by the same amount as the rotation of the first user interface object (e.g., the first plane remains at the same location relative to the first user interface object and parallel to the same portion of the first user interface object). In such embodiments, marks drawn on the first plane also move and rotate with the first plane (e.g., due to being "drawn" on the first plane) and if the front of the marks are no longer visible (e.g., the plane rotates more than 90 degrees), display of the marks are ceased, but if the front of the marks are still visible (e.g., the plane rotates less than 90 degrees), the prominence of the marks is maintained. In some embodiments, marks made in the first context and marks made in the second context have different behaviors with respect to whether they cease to be displayed in response to a change in orientation. For example, marks made in the first context optionally are not reduced in prominence even if the object on which they are drawn is rotated in such a way that the "front" of the mark is no longer visible to the user. In some embodiments, three-dimensional marks and two-dimensional marks have different behaviors with respect to whether they cease to be displayed in response to a change in orientation. For example, two-dimensional marks optionally remain fully visible even if the object on which they are drawn is rotated in such a way that the "front" of the mark is no longer visible to the user.

The above-described manner of displaying the marks as the marks are rotated (e.g., by ceasing display of the marks if the marks are rotated to a certain orientation, but maintaining display if the marks are rotated to another set of orientations) provides for a quick and efficient method of displaying content in the three-dimensional environment (e.g., by automatically removing display of objects that have orientations that cause the object to not be properly viewable by the user), which simplifies the interaction between the user and the electronic device and enhances the operability of the electronic device and makes the user-device interface more efficient (e.g., without requiring the user to perform additional inputs to disable display of certain marks), which additionally reduces power usage and improves battery life of the electronic device by enabling the user to use the electronic device more quickly and efficiency, while reducing errors in usage.

In some embodiments, the first input is made in the first context in accordance with a first content entry tool being currently selected when the first input is detected, and the first input is made in the second context in accordance with a second content entry tool, different from the first content entry tool, being currently selected when the first input is detected (1283), such as in FIG. 11F (e.g., the marks are drawn within the first plane if a two-dimensional marking tool is the active content entry tool when the marks were made and the marks extend out of the first plane if a three-dimensional marking tool is the active content entry tool).

In some embodiments, the two-dimensional marking tool and three-dimensional marking tool are separate tools that are selectable from a content entry user interface element (e.g., a content entry palette). In some embodiments, whether the drawn marks are two-dimensional or three-dimensional is based on whether the two-dimensional or three-dimensional tool is selected and optionally not based on whether the marks are drawn when the hand drawing the mark is closer or farther than a threshold distance from the object on which the mark is to be drawn. In some embodiments, the two-dimensional or three-dimensional tool is automatically selected based on whether the hand drawing the mark is closer (e.g., three-dimensional tool) or farther (e.g., two-dimensional tool) than the threshold distance from the object on which the mark is to be drawn (e.g., automatically switching from the two-dimensional tool to the three-dimensional tool and vice versa if the hand moves from being farther than the threshold distance to closer, or vice versa, respectively).

The above-described manner of drawing marks on a user interface object (e.g., by drawing two-dimensional marks if the two-dimensional marking tool is active, or by drawing three-dimensional marks if the three-dimensional marking tool is active) provides for a quick and efficient method of selecting between two-dimensional or three-dimensional marks, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the first input is made in the first context using a first content entry tool in accordance with a determination that one or more first criteria are satisfied (1281), such as in FIG. 11F (e.g., the first input is made in the first context while the marking tool is active).

In some embodiments, the first input is made in the second context using the first content entry tool in accordance with a determination that one or more second criteria, different from the first criteria, are satisfied (1279), such as in FIG. 11F (e.g., the first input is made in the second context while the same marking tool as when the first input of the first context is made). In some embodiments, whether the marks are performed in the first or second context is based not on the marking tool (e.g., because it is the same tool used for marking in the first and second context) and is based at least on other criteria, such as the content that is being marked up on (e.g., whether the content to which the gaze of the user is directed while providing the marking input is two-dimensional (e.g., resulting in the first context) or three-dimensional (e.g., resulting in the second context)) and/or whether the hand of the user is more than or less than a threshold distance from the content while making the marks.

The above-described manner of drawing marks on a user interface object (e.g., by using the same drawing tool to draw either two-dimensional marks or three-dimensional marks based on certain criteria) provides for a quick and efficient method of selecting between two-dimensional or three-dimensional marks (e.g., automatically, without requiring the user to perform additional inputs to switch between a two-dimensional drawing mode and a three-dimensional drawing mode), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

FIGS. 13A-13D illustrate examples of an electronic device facilitating marking input associated with a three-dimensional object in accordance with some embodiments.

Figure 13A:
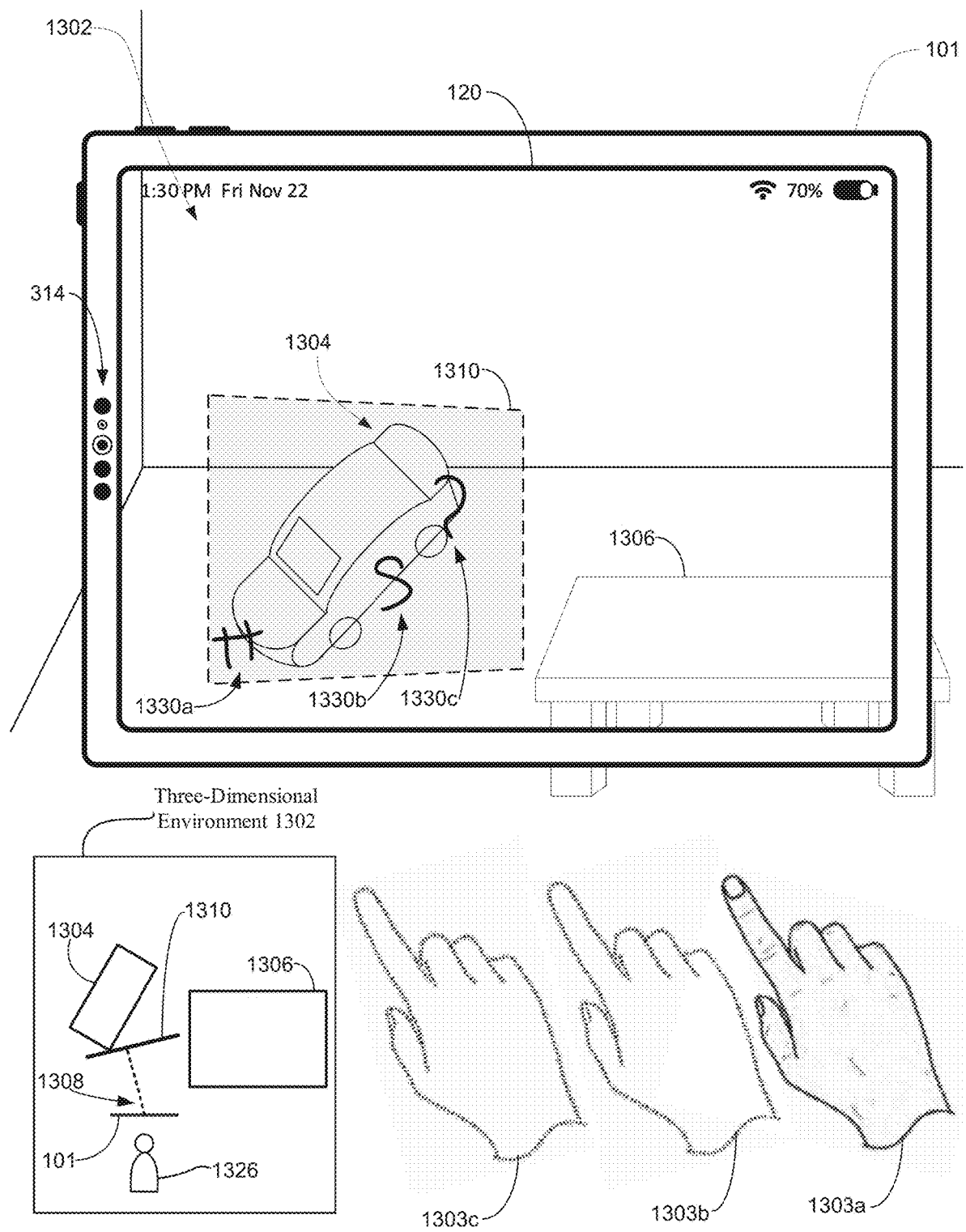

FIG. 13A illustrates an electronic device 101 displaying, via a display generation component (e.g., display generation component 120 of FIG. 1), a three-dimensional environment 1302 from a viewpoint of the user 1326 illustrated in the overhead view of the three-dimensional environment 1302 (e.g., facing the back wall of the physical environment in which device 101 is located). As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user (e.g., one or more hands of the user) while the user interacts with the electronic device 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 13A, device 101 captures one or more images of the physical environment around device 101 (e.g., operating environment 100), including one or more objects in the physical environment around device 101. In some embodiments, device 101 displays representations of the physical environment in three-dimensional environment 1302. For example, three-dimensional environment 1302 includes a representation 1306 of a table, which is optionally a representation of a physical table in the physical environment. Three-dimensional environment 1302 also includes a representation of the back and side walls, as well as the floor, of the physical environment.

In FIG. 13A, three-dimensional environment 1302 also includes virtual object 1304. Virtual object 1304 is a three-dimensional object in FIG. 13A—in particular, a three-dimensional model of an automobile. In some embodiments, object 1304 is a two-dimensional object, or a different three-dimensional object. In some embodiments, object 1304 is a two- or three-dimensional representation of an object in the physical environment of device 101.

In some embodiments, device 101 facilitates marking inputs directed to objects in three-dimensional environment 1302, such as marking inputs described with reference to methods 1000, 1200, 1400 and/or 1600. For example, while a marking tool or mode is currently active at device 101 (e.g., as described with reference to methods 1000, 1200, 1400 and/or 1600), in response to detecting a hand of the user in a particular hand shape (e.g., in a pinch hand shape in which the thumb and the tip of the index finger are touching) followed by movement of the hand in the particular hand shape, device 101 creates marks corresponding to the movement of the hand in the three-dimensional environment 1302. In some embodiments, the location of the marks is based on the location to which the gaze of the user is directed when the marking input is detected, or the location of a cursor for creating the marks, as will be described below. Additional details about marking inputs are described with reference to methods 1000, 1200, 1400 and/or 1600.

In FIG. 13A, hands 1303a, 1303b and 1303c are illustrated as providing marking inputs associated with and/or directed to object 1304 (e.g., while the gaze of the user is directed to a region of three-dimensional environment 1302 that includes object 1304). It should be understood that while multiple hands and corresponding inputs are illustrated in FIGS. 13A-13D, such hands and inputs need not be detected by device 101 concurrently; rather, in some embodiments, device 101 independently responds to the hands and/or inputs illustrated and described in response to detecting such hands and/or inputs independently. For example, hand 1303a has provided (and is continuing to provide) marking input corresponding to marks 1330a, hand 1303b has provided (and is continuing to provide) marking input corresponding to marks 1330b, and hand 1303c has provided (and is continuing to provide) marking input corresponding to marks 1303c. As described with reference to method 1400, in some embodiments, the marking inputs from hands 1303a, 1303b and/or 1303c are air gestures. For example, device 101 detects, while a gaze of the user is directed to object 1304, hand 1303b performing a pinch gesture in which two or more of the user's fingers move closer together (e.g., and are detected as touching), followed by movement of the hand 1303b with those fingers having come together; in response, device 101 optionally generates a mark having a length and/or direction corresponding to the amount and/or direction of the movement of the hand 1303b. Therefore, in the case of hand 1303b in FIG. 13A, hand 1303*b* has moved in an "S"-shaped movement, and device 101 has correspondingly created mark 1330*b* having the "S" shape. The remaining marks described with reference to FIGS. 13A-13D are optionally generated by device 101 in response to analogous inputs from corresponding hands providing the marking inputs.

In some embodiments, while one or more marks that are part of the same collection of marks are being created, device 101 displays those marks in a region or plane that is between the viewpoint of user 1326 and object 1304. For example, in FIG. 13A, input for marks 1330*a-c* is still being provided and marks 1330*a*-1330*c* are correspondingly being created in three-dimensional environment 1302 (e.g., because hands 1303*a*-1303*c* are still providing marking input associated with marks 1330*a-c*); therefore, marks 1330*a*-1330*c* are displayed on or in plane 1310. Plane 1310 is optionally located in three-dimensional environment 1302 between the viewpoint of user 1326 and object 1304. Plane 1310 or an indication of plane 1310 is optionally not displayed in three-dimensional environment 1302; however, in some embodiments, plane 1310 or an indication of plane 1310 (e.g., outline of plane 1310, shading of the surface of plane 1310, etc.) is displayed in three-dimensional environment 1302. In some embodiments, plane 1310 is normal to the viewpoint 1308 and/or gaze of the user 1326. Further, plane 1310 is optionally located as close to object 1304 as possible without intersecting with and/or making contact with object 1304. For example, plane 1310 is optionally tangent to one or more points on the surface of object 1304 without intersecting object 1304 (e.g., tangent to the front left fender of object 1304). In some embodiments, the position and/or orientation of plane 1310 are established when a marking input is initiated (e.g., upon detecting contact of the thumb and the tip of the index finger of the hand of the user that is providing the marking input), and are maintained through the end of the marking input (e.g., upon detecting separation of the thumb and the tip of the index finger of the hand of the user that is providing the marking input).

In FIG. 13B, device 101 has detected the continuations and ends of the marking inputs provided by hands 1303*a-c*. For example, hand 1303*a* has completed the marking input corresponding to marks 1330*a* (corresponding to "#hi"), hand 1303*b* has completed the marking input corresponding to marks 1330*b* (corresponding to "$"), and hand 1303*c* has completed the marking input corresponding to marks 1330*c* (corresponding to "?"). In some embodiments, device 101 determines that multiple individual marks are part of the same collection of marks based on the collective context of those individual marks. For example, with respect to marks 1330*b*, device 101 optionally determines that the mark corresponding to the "S" shape of the dollar sign, and the mark corresponding to the "|" line through the center of the "S" shape correspond to the same collection of marks corresponding to a dollar sign. Similar with marks 1330*c* corresponding to a question mark. Additionally or alternatively, device 101 determines that multiple individual marks are part of the same collection of marks based on the timing between receiving the inputs corresponding to the marks. For example, with respect to marks 1330*a*, device optionally determines that the marks corresponding to the "#" symbol and the letters "h" and "i" correspond to the same collection of marks (e.g., corresponding to "#hi"), because the inputs for creating the "#" marks, the "h" marks and the "i" marks were detected within a time threshold (e.g., 0.05, 0.1, 0.3, 0.5, 1, 2, 3, 5, 10, or 20 seconds) of one another. Additional details related to device 101 determining whether one or more marks belong to the same or different collections of marks are described with reference to method 1400.

After device 101 detects an end of marking input corresponding to a mark or marks corresponding to the same collection of marks, in some embodiments device 101 projects or moves that mark or collection of marks back towards object 1304, and in some embodiments device 101 maintains that mark or collection of marks on plane 1310. For example, in FIG. 13B, device 101 has maintained marks 1330*a* on plane 1310 after the marking input corresponding to marks 1330*a* has ended. However, as an alternative in FIG. 13B, device 101 has moved marks 1330*b* and 1330*c* back towards object 1304 after the marking inputs corresponding to marks 1330*b* and 1330*c* have ended.

Marks 1330*b* are optionally moved back towards object 1304 by device 101 while remaining contained within a local region or plane 1331*b* that moves back towards object 1304 and away from plane 1310. Plane 1331*b* or an indication of plane 1331*b* is optionally not displayed in three-dimensional environment 1302; however, in some embodiments, plane 1331*b* or an indication of plane 1331*b* (e.g., outline of plane 1331*b*, shading of the surface of plane 1331*b*, etc.) is displayed in three-dimensional environment 1302. Plane 1331*b* optionally has a size based on the size of marks 1330*b* (e.g., the more area consumed by marks 1330*b* and/or the outer boundary of marks 1330*b*, the larger plane 1331*b*, and the less area consumed by marks 1330*b* and/or the outer boundary of marks 1330*b*, the smaller plane 1331*b*), and is optionally different from the size of plane 1310 (e.g., is smaller than plane 1310). In some embodiments, plane 1331*b* is parallel to plane 1310, and marks 1330*b* are moved further from the viewpoint of user 1326 than plane 1310. In some embodiments, the size of marks 1330*b* in three-dimensional environment 1302 is maintained as marks 1330*b* move away from the viewpoint of user 1326; thus, marks 1330*b* are optionally displayed at a smaller size via device 101 because they have moved further from the viewpoint of user 1326. In some embodiments, device 101 moves marks 1330*b* as far back towards object 1304 as possible until plane 1331*b* touches or collides with object 1304 (e.g., without intersecting with object 1304) and/or until marks 1330*b* touch or collide with object 1304 (e.g., without intersecting with object 1304).

Different marks that are created on plane 1310 are optionally projected or moved back towards object 1304 by different distances and/or to different positions in three-dimensional environment 1302 depending on their positions relative to object 1304. For example, marks 1330*c* are optionally moved back towards object 1304 by a greater amount than marks 1330*b* are moved back towards object 1304, because the distance between the location on plane 1310 on which marks 1330*c* were created and the surface of object 1304 (e.g., distance perpendicular to plane 1310) is greater than the distance between the location on plane 1310 on which marks 1330*b* were created and the surface of object 1304 (e.g., distance perpendicular to plane 1310). Similar to marks 1330*b*, marks 1330*c* are optionally moved back towards object 1304 by device 101 while remaining contained within a local region or plane 1331*c* that moves back towards object 1304 and away from plane 1310. Plane 1331*c* or an indication of plane 1331*c* is optionally not displayed in three-dimensional environment 1302; however, in some embodiments, plane 1331*c* or an indication of plane 1331*c* (e.g., outline of plane 1331*c*, shading of the surface of plane 1331*c*, etc.) is displayed in three-dimensional environment 1302. Plane 1331*c* optionally has a size based on the size of marks 1330*c* (e.g., the more area consumed by marks 1330c and/or the outer boundary of marks 1330c, the larger plane 1331c, and the less area consumed by marks 1330c and/or the outer boundary of marks 1330c, the smaller plane 1331c), and is optionally different from the size of plane 1310 (e.g., is smaller than plane 1310). In some embodiments, plane 1331c is parallel to plane 1310, and marks 1330c are moved further from the viewpoint of user 1326 than plane 1310. In some embodiments, the size of marks 1330c in three-dimensional environment 1302 is maintained as marks 1330c move away from the viewpoint of user 1326; thus, marks 1330c are optionally displayed at a smaller size via device 101 because they have moved further from the viewpoint of user 1326. In some embodiments, device 101 moves marks 1330c as far back towards object 1304 as possible until plane 1331c touches or collides with object 1304 (e.g., without intersecting with object 1304) and/or until marks 1330c touch or collide with object 1304 (e.g., without intersecting with object 1304).

Figure 13C:
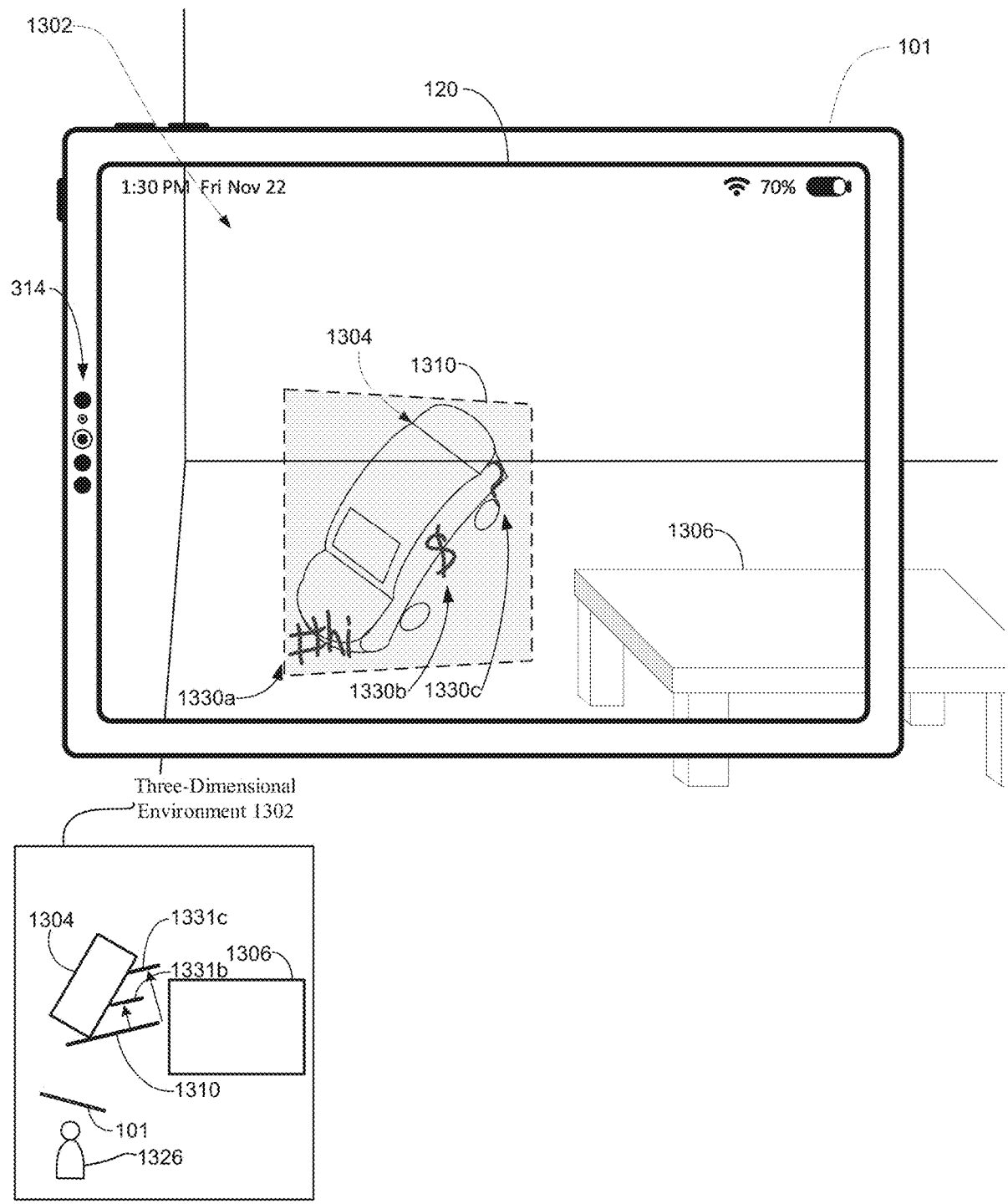

In some embodiments, as the viewpoint of the user 1326 changes as compared with the original viewpoint from which marks were created, device 101 modifies the visual appearance of the marks. In some embodiments, device 101 modifies the appearance of the marks more the greater the deviation from that original viewpoint. For example, in FIG. 13C, device 101 has detected an input to move the viewpoint of user 1326 in the three-dimensional environment 1302 corresponding to a leftward movement relative to object 1304. In some embodiments, the input to move the viewpoint of user 1326 corresponds to movement of the user leftward in the physical environment and is detected by device 101, which updates the viewpoint of user 1326 of three-dimensional environment 1302 displayed by device 101, as shown in FIG. 13C. Marks 1330a-c optionally maintain their locations and/or orientations in three-dimensional environment 1302 and/or relative to object 1304 in three-dimensional environment 1302 during and in response to the movement of the viewpoint of user 1326. As shown in FIG. 13C, device 101 now displays marks 1330a, 1330b and/or 1330c with a different visual appearance than in FIG. 13B (e.g., more translucent, with less brightness, with less color, and/or with less intensity, etc.). Further, marks 1330a, 1330b and/or 1330c are optionally at different distances from the updated viewpoint of the user than they were in FIG. 13A due to the change in the position of the viewpoint of the user.

Figure 13D:
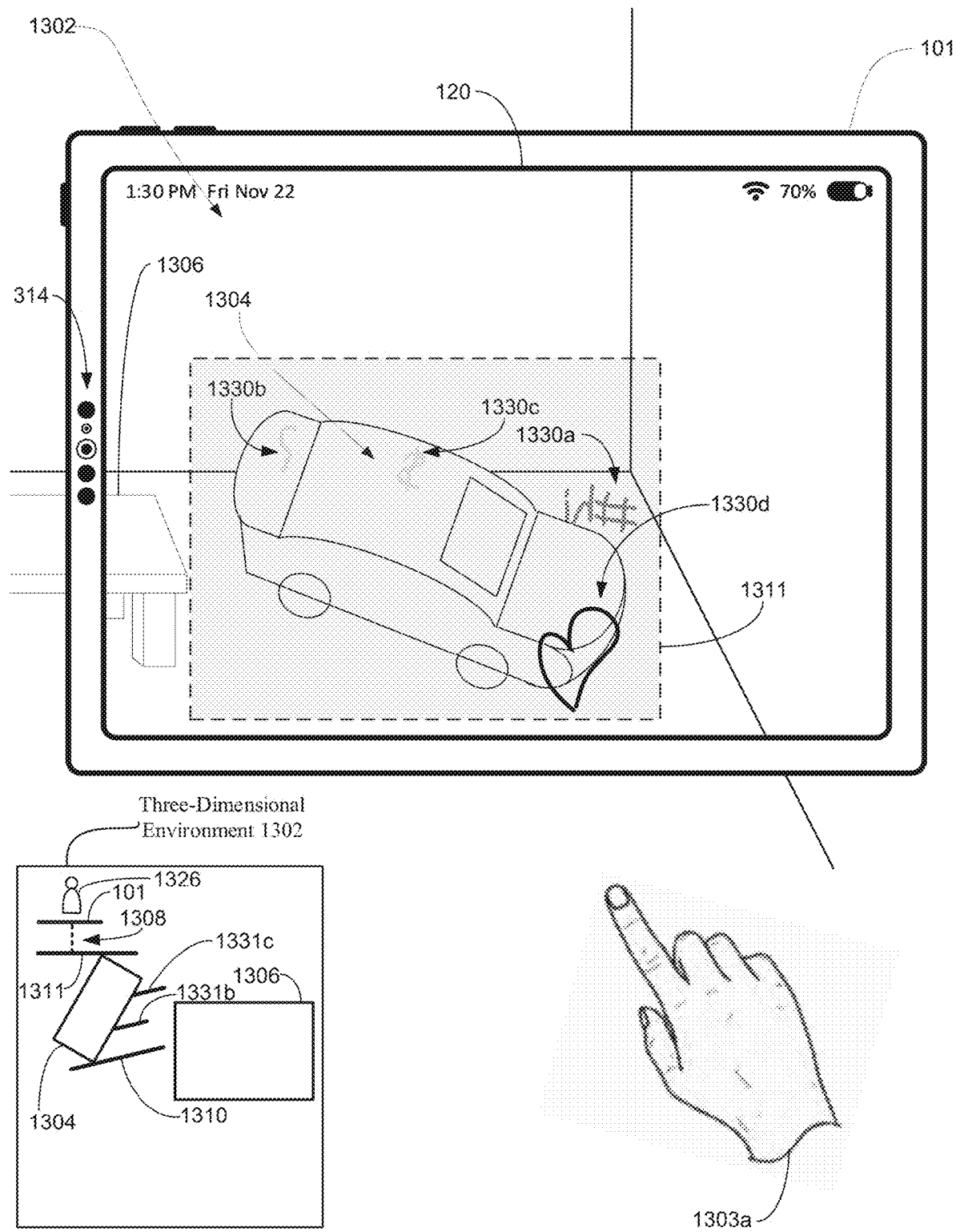
Figure 14A:
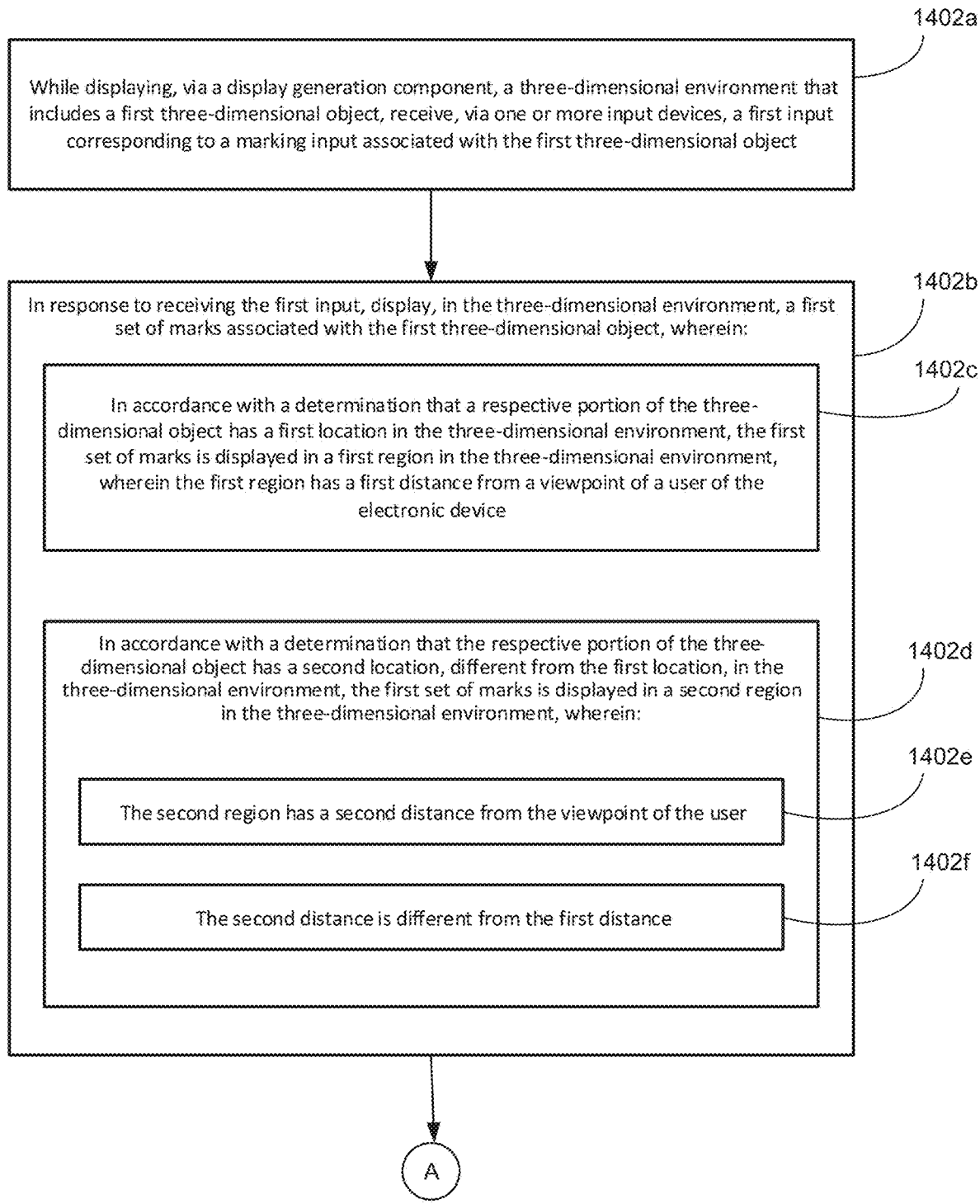
FIGS. 14A-14G is a flowchart illustrating a method for facilitating marking input associated with a three-dimensional object in accordance with some embodiments.
Figure 14B:
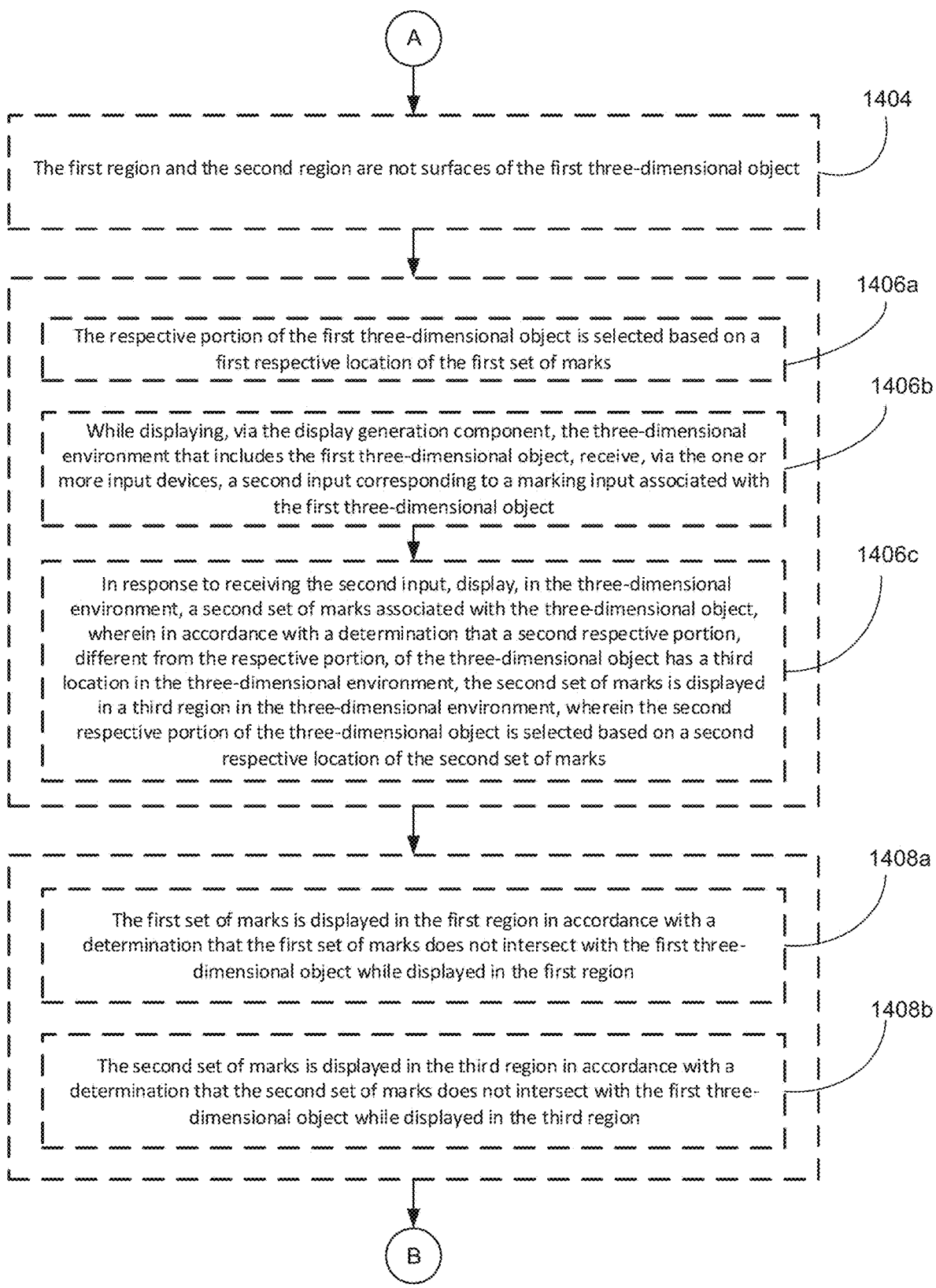
Figure 14C:
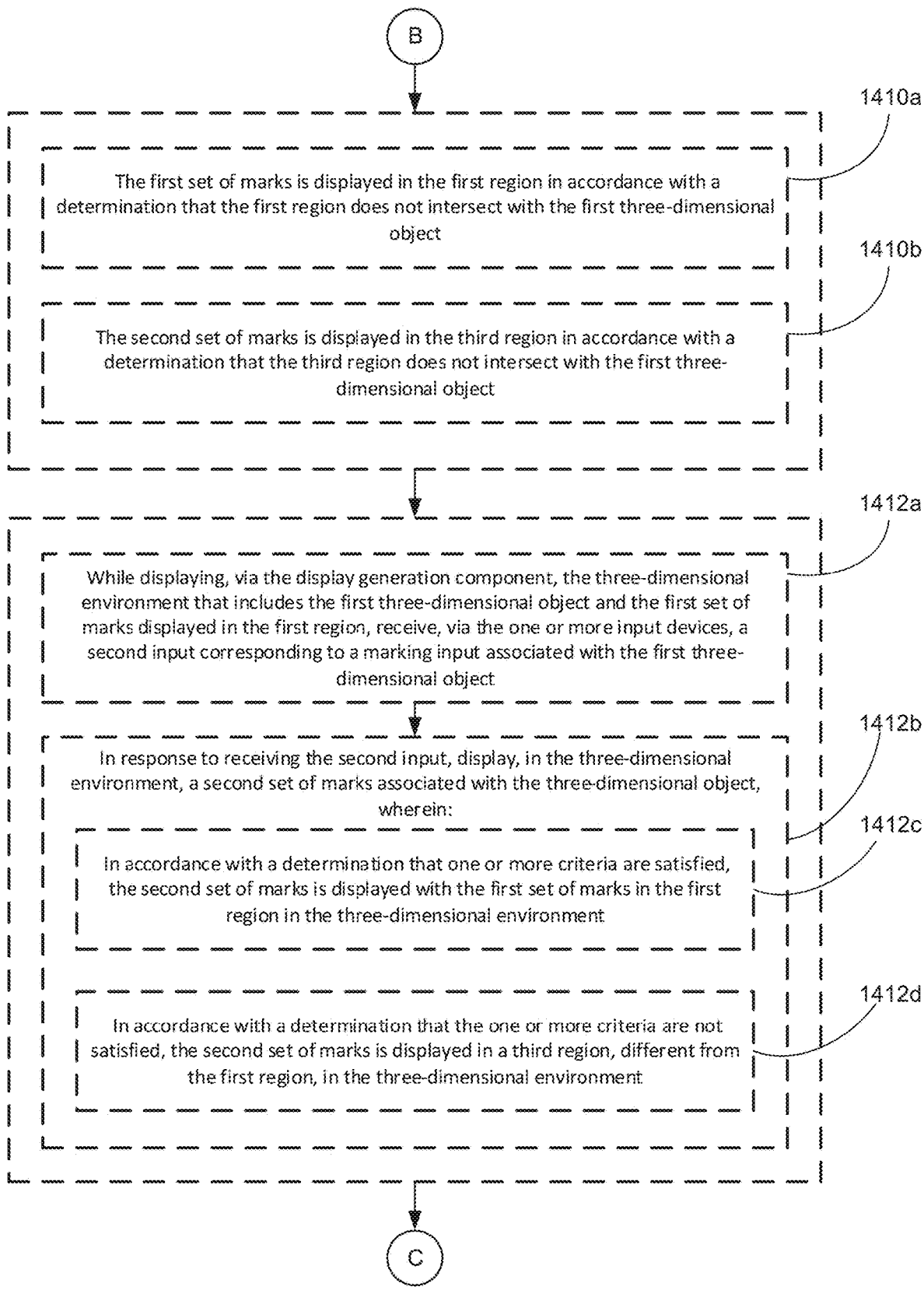
Figure 14D:
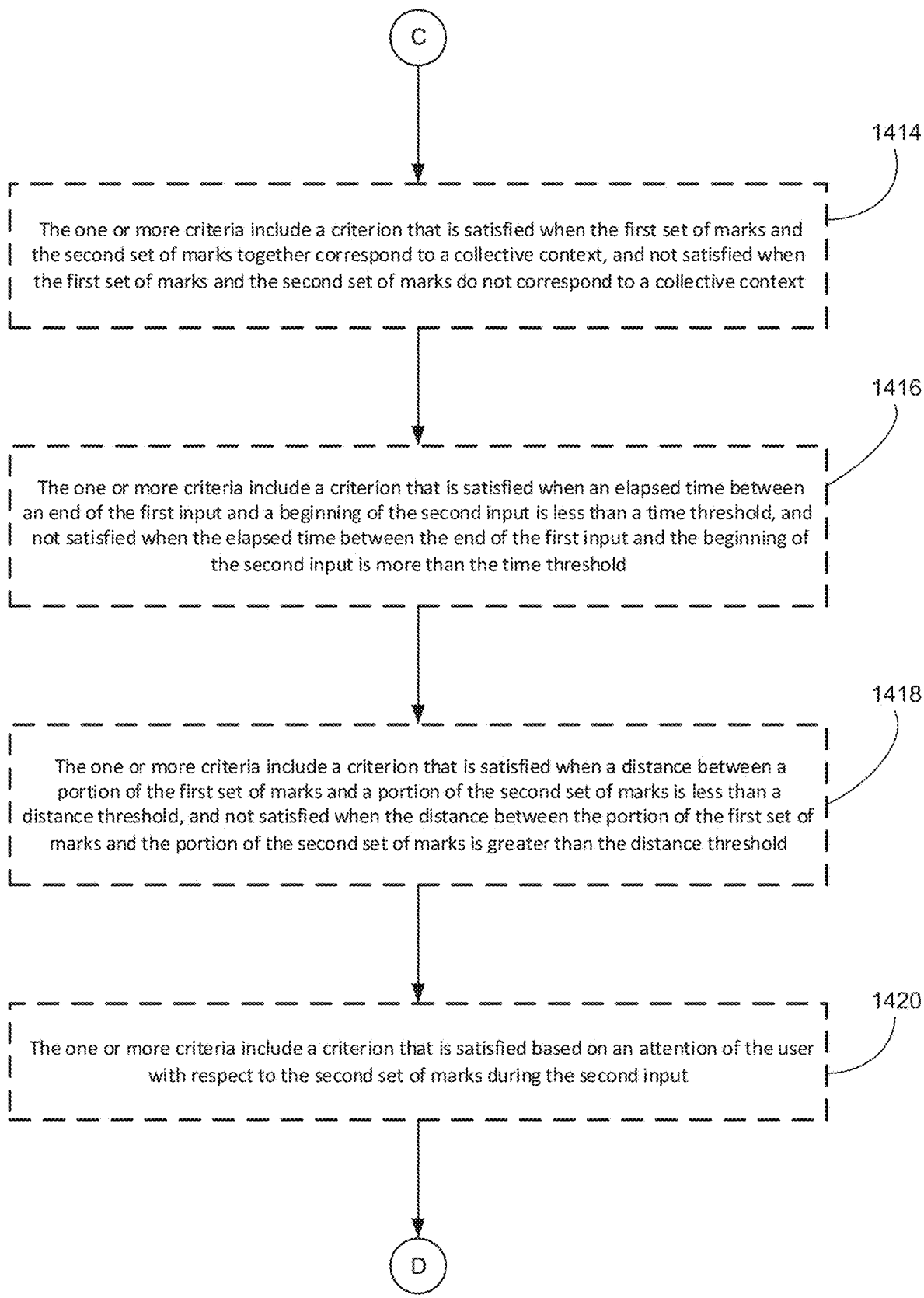
Figure 14E:
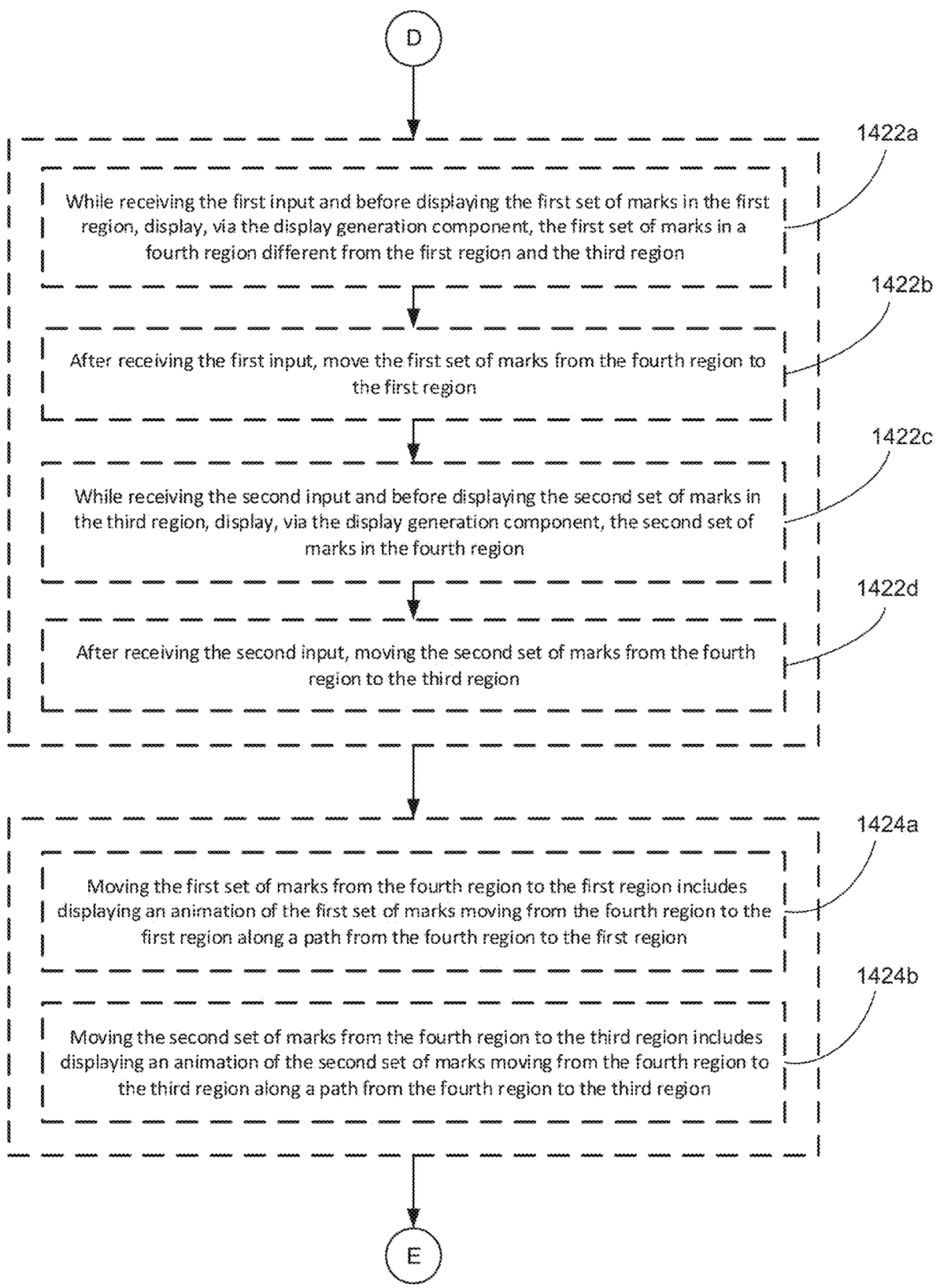
Figure 14F:
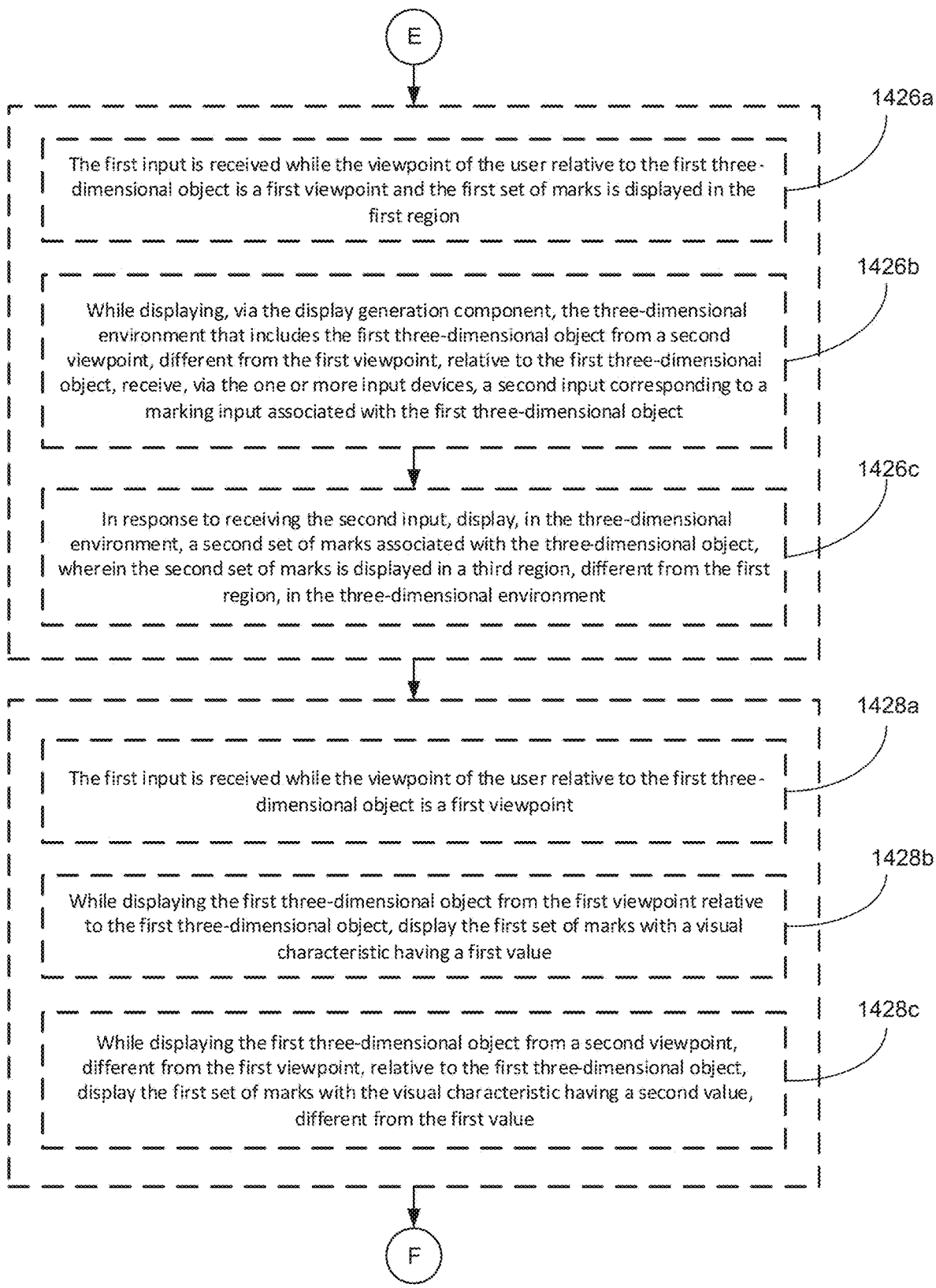
Figure 14G:
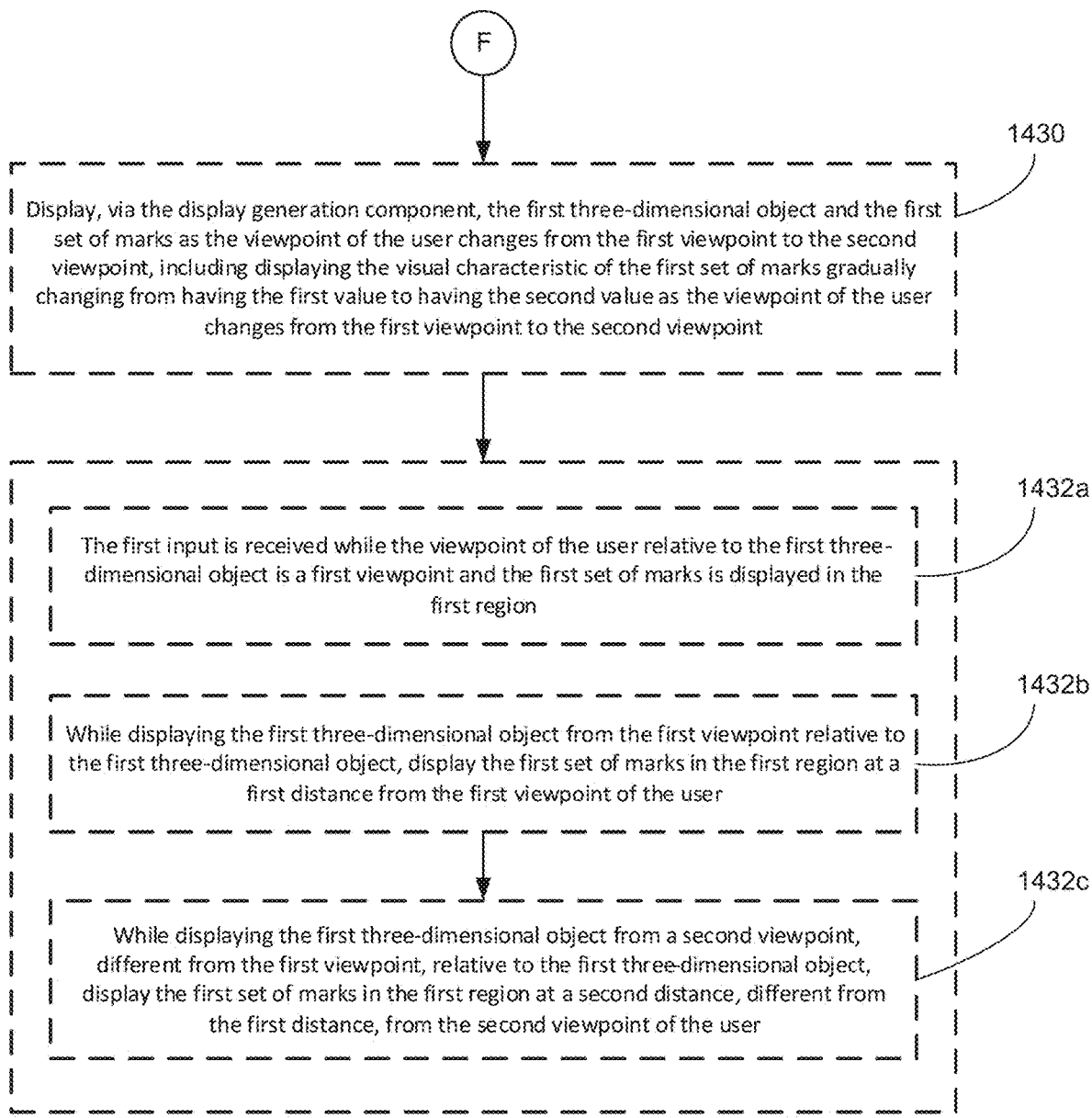

In FIG. 13D, device 101 has detected further input to further move the viewpoint of user 1326 in the three-dimensional environment 1302 corresponding to a movement of the viewpoint to a location behind object 1304 oriented back towards object 1304. In some embodiments, the input to move the viewpoint of user 1326 corresponds to movement of the user toward the rear left corner of the physical environment and rotation of the user away from the back wall in the physical environment, and is detected by device 101, which updates the viewpoint of user 1326 of three-dimensional environment 1302 displayed by device 101 as shown in FIG. 13D (e.g., to display a back side of object 1304). Marks 1330a-c optionally maintain their locations and/or orientations in three-dimensional environment 1302 and/or relative to object 1304 in three-dimensional environment 1302 during and in response to the movement of the viewpoint of user 1326. As shown in FIG. 13D, device 101 now displays marks 1330a with even more of a different visual appearance than in FIG. 13B as compared with FIG. 13C (e.g., even more translucent, with even less brightness, with even less color, and/or with even less intensity, etc.). In some embodiments, device 101 ceases display of marks 1330a because viewpoint is oriented towards the back side of marks 1330a. In some embodiments, device 101 displays marks 1330b and/or 1330c or an indication of marks 1330b and/or 1330c (e.g., a shadow, ghost, outline, etc. of marks 1330b and/or 1330c) through object 1304—in some embodiments, device 101 does not display marks 1330b and/or 1330c, because they are occluded by object 1304.

In some embodiments, device 101 creates marks in different regions and/or planes in three-dimensional environment 1302 when those marks are associated with marking inputs directed to object 1304 from different viewpoints. For example, in FIG. 13D while the orientation of the viewpoint 1308 of the user relative to object 1304 is different from the orientation of viewpoint 1308 of the user relative to object 1304 in FIG. 13A, device 101 detects marking input from hand 1303a directed to object 1304. In response, device 101 displays marks 1330d on or in plane 1311. Plane 1311 is optionally located in three-dimensional environment 1302 between the viewpoint of user 1326 and object 1304. Plane 1311 or an indication of plane 1311 is optionally not displayed in three-dimensional environment 1302; however, in some embodiments, plane 1311 or an indication of plane 1311 (e.g., outline of plane 1311, shading of the surface of plane 1311, etc.) is displayed in three-dimensional environment 1302. In some embodiments, plane 1311 is normal to the viewpoint 1308 and/or gaze of the user 1326. Further, plane 1311 is optionally located as close to object 1304 as possible without intersecting with and/or making contact with object 1304. For example, plane 1311 is optionally tangent to one or more points on the surface of object 1304 without intersecting object 1304 (e.g., tangent to the rear right fender of object 1304). In some embodiments, the position and/or orientation of plane 1311 are established when a marking input is initiated (e.g., upon detecting contact of the thumb and the tip of the index finger of the hand of the user that is providing the marking input), and are maintained through the end of the marking input (e.g., upon detecting separation of the thumb and the tip of the index finger of the hand of the user that is providing the marking input). As shown in FIG. 13D, the location of plane 1311 in three-dimensional environment 1302 is different from plane 1310.

FIGS. 14A-14G is a flowchart illustrating a method 1400 of facilitating marking input associated with a three-dimensional object in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In some embodiments, method 1400 is performed at an electronic device (e.g., 101) in communication with a display generation component (e.g., 120) and one or more input devices (e.g., 314). For example, a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, while displaying, via the display generation component, a three-dimensional environment that includes a first three-dimensional object (e.g., a three-dimensional object such as a three-dimensional representation of a car, a box, a ball, a statue, etc. In some embodiments, the first three-dimensional object is displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.)), the electronic device receives (1402a), via the one or more input devices, a first input corresponding to a marking input associated with the first three-dimensional object, such as shown in FIG. 13A (e.g., detecting and/or receiving an input corresponding to a request to draw on or near and/or annotate the first three-dimensional object). In some embodiments, the input includes a pinch gesture performed by a hand of the user while a marking tool is the currently active tool, followed by movement of the hand while maintaining a pinch hand shape, which optionally defines the mark(s) created by the marking input. In some embodiments, the first input is an input such as described with reference to method 1000 (e.g., for entering content). In some embodiments, the first input and/or other (e.g., marking) inputs described in method 1400 are air gestures. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, in response to receiving the first input, the electronic device displays (1402b), in the three-dimensional environment, a first set of marks associated with the first three-dimensional object, such as marks 1330a, 1330b or 1330c in FIG. 13B (e.g., marks defined by and corresponding to the movement of the hand in the first input. For example, if the hand movement while maintaining the pinch hand shape has a profile corresponding to a question mark ("?"), the first set of marks are marks having the shape and/or placement and/or appearance of a question mark), wherein, in accordance with a determination that a respective portion of the three-dimensional object has a first location in the three-dimensional environment, the first set of marks is displayed in a first region (e.g., two-dimensional plane) in the three-dimensional environment, wherein the first region has a first distance from a viewpoint of a user of the electronic device (1402c), such as region 1331b in FIG. 13B (e.g., that is determined based on the first location).

In some embodiments, in accordance with a determination that the respective portion of the three-dimensional object has a second location, different from the first location, in the three-dimensional environment, the first set of marks is displayed in a second region (e.g., two-dimensional plane) in the three-dimensional environment (1402d), wherein the second region has a second distance from the viewpoint of the user (1402e), such as region 1331c in FIG. 13B (e.g., that is determined based on the second location).

In some embodiments, the second distance is different from (e.g., greater than or less than) the first distance (14020, such as shown with respect to regions 1331b and 1331c in FIG. 13B. In some embodiments, the region or plane in which the first set of marks is displayed is different depending on the shape of the outer surface of the first three-dimensional object. For example, if the point on the surface of the three-dimensional object that is closest to the viewpoint of the user is at a first location in the three-dimensional environment, the plane or region in which the first set of marks is displayed is optionally defined by that first location. In contrast, if the point on the surface of the three-dimensional object that is closest to the viewpoint of the user is at a second location in the three-dimensional environment, the plane or region in which the first set of marks is displayed is optionally defined by that second location and not the first location. Thus, in some embodiments, the characteristics of the (e.g., outer) surface of the three-dimensional object to which the marking input is directed define the plane or region in which the marks corresponding to the marking input are displayed. Displaying marks in different regions in the three-dimensional environment depending on the spatial features of the three-dimensional object provides for effective marking of objects having different three-dimensional shapes and/or orientations relative to the viewpoint of the user, thereby reducing errors in usage and improving user-device interaction.

In some embodiments, the first region and the second region are not surfaces of the first three-dimensional object (1404), such as shown with respect to regions 1331b and 1331c in FIG. 13B. In some embodiments, the first set of marks is not displayed on a surface of the first three-dimensional object. Rather, in some embodiments, the first region and second region are planes that are tangent to respective points on the first three-dimensional object. For example, the first region (and/or the second region) is optionally a plane that is normal to the viewpoint of the user of the electronic device, and is tangent to a point (and not intersecting with) the first three-dimensional object. In some embodiments, the first region (and/or the second region) is a plane that is normal to the viewpoint of the user of the electronic device, and is between the viewpoint of the user and the first three-dimensional object without being in contact with the first three-dimensional object. Displaying marks in regions other than on surfaces of the three-dimensional object provides for effective marking of objects having different three-dimensional shapes and/or orientations relative to the viewpoint of the user, thereby reducing errors in usage and improving user-device interaction.

In some embodiments, the respective portion of the first three-dimensional object is selected based on a first respective location of the first set of marks (1406a), such as region 1331b being selected based on the location of marks 1330b in FIG. 13B (e.g., the respective portion of the first three-dimensional object that controls the location of the first and/or second regions is optionally the portion of the first three-dimensional object that is closest to the first set of marks (e.g., along the dimension normal to the plane in which the marks are located when initially created, away from the viewpoint of the user from the plane). Thus, if the first set of marks is created closer to a different portion of the first three-dimensional object, the first set of marks is optionally displayed in a different region based on the location of the different portion of the first three-dimensional environment).

In some embodiments, while displaying, via the display generation component, the three-dimensional environment that includes the first three-dimensional object, the electronic device receives (1406b), via the one or more input devices, a second input corresponding to a marking input associated with the first three-dimensional object, such as the input corresponding to marks 1330c in FIG. 13A. For example, detecting and/or receiving an input corresponding to a request to draw on or near and/or annotate the first three-dimensional object. In some embodiments, the input includes a pinch gesture performed by a hand of the user while a marking tool is the currently active tool, followed by movement of the hand while maintaining a pinch hand shape, which optionally defines the mark(s) created by the marking input. In some embodiments, the first input is an input such as described with reference to method 1000 (e.g., for entering content).

In some embodiments, in response to receiving the second input, the electronic device displays (1406c), in the three-dimensional environment, a second set of marks associated with the three-dimensional object, such as marks 1330c in FIG. 13B (e.g., marks defined by and corresponding to the movement of the hand in the second input. For example, if the hand movement while maintaining the pinch hand shape has a profile corresponding to a dollar sign ("$"), the second set of marks are marks having the shape and/or placement and/or appearance of a dollar sign), wherein in accordance with a determination that a second respective portion, different from the respective portion, of the three-dimensional object has a third location in the three-dimensional environment, the second set of marks is displayed in a third region in the three-dimensional environment, wherein the second respective portion of the three-dimensional object is selected based on a second respective location of the second set of marks, such as region 1331c being selected based on the location of marks 1330c in FIG. 13B. For example, because the second set of marks is created closest to the second respective portion of the three-dimensional object, and not closest to the respective portion of the three-dimensional object, the region in which the second set of marks is displayed is based on the second respective portion of the three-dimensional object (e.g., and not based on the respective portion of the three-dimensional object). Displaying marks in different regions based on different parts of the three-dimensional object based on the location of the marks allows for marking to be suited to the relative location of the marks relative to the three-dimensional object, thereby reducing errors in usage and improving user-device interaction.

In some embodiments, the first set of marks is displayed in the first region in accordance with a determination that the first set of marks does not intersect with the first three-dimensional object while displayed in the first region (1408a). In some embodiments, the second set of marks is displayed in the third region in accordance with a determination that the second set of marks does not intersect with the first three-dimensional object while displayed in the third region (1408b), such as shown with respect to regions 1331b and 1331c in FIG. 13B. In some embodiments, the electronic device determines the region and/or plane in which to display the marks resulting from marking inputs such that the marks do not intersect with the three-dimensional object when displayed in those regions/planes. For example, the electronic device optionally displays a given set of marks in a plane that is normal to the viewpoint of the user when the input(s) for the marks was detected, the plane disposed as far as possible from the viewpoint of the user (e.g., towards the three-dimensional object) without the marks intersecting and/or making contact with the three-dimensional object. Displaying marks in a region selected to avoid intersection of the marks with the three-dimensional object ensures that marks are clearly displayed in the three-dimensional environment, thereby reducing errors in usage and improving user-device interaction.

In some embodiments, the first set of marks is displayed in the first region in accordance with a determination that the first region does not intersect with the first three-dimensional object (1410a). In some embodiments, the second set of marks is displayed in the third region in accordance with a determination that the third region does not intersect with the first three-dimensional object (1410b), such as shown with respect to regions 1331b and 1331c in FIG. 13B. In some embodiments, the electronic device determines the region and/or plane in which to display the marks resulting from marking inputs such that the region and/or plane do not intersect with the three-dimensional object. For example, the electronic device optionally displays a given set of marks in a plane that is normal to the viewpoint of the user when the input(s) for the marks was detected, the plane disposed as far as possible from the viewpoint of the user (e.g., towards the three-dimensional object) without the plane intersecting with the three-dimensional object. In some embodiments, the plane is tangent to a single (or more) point on the surface of the three-dimensional object, without intersecting with the three-dimensional object. Displaying marks in a region selected to avoid intersection of the region with the three-dimensional object ensures that marks are clearly displayed in the three-dimensional environment, thereby reducing errors in usage and improving user-device interaction.

In some embodiments, while displaying, via the display generation component, the three-dimensional environment that includes the first three-dimensional object and the first set of marks displayed in the first region, such as the portion of marks 1330b shown in FIG. 13A, the electronic device receives (1412a), via the one or more input devices, a second input corresponding to a marking input associated with the first three-dimensional object, such as the input for completing marks 1330*b* in FIG. 13B. For example, detecting and/or receiving an input corresponding to a request to draw on or near and/or annotate the first three-dimensional object. In some embodiments, the input includes a pinch gesture performed by a hand of the user while a marking tool is the currently active tool, followed by movement of the hand while maintaining a pinch hand shape, which optionally defines the mark(s) created by the marking input. In some embodiments, the first input is an input such as described with reference to method 1000 (e.g., for entering content).

In some embodiments, in response to receiving the second input, the electronic device displays (1412*b*), in the three-dimensional environment, a second set of marks associated with the three-dimensional object, such as the portion of marks 1330*b* completed in FIG. 13B (e.g., marks defined by and corresponding to the movement of the hand in the second input. For example, if the hand movement while maintaining the pinch hand shape has a profile corresponding to a dollar sign ("$"), the second set of marks are marks having the shape and/or placement and/or appearance of a dollar sign), wherein, in accordance with a determination that one or more criteria are satisfied (e.g., if the second set of marks is part of the same group of marks including the first set of marks. For example, if the first set of marks is the "S" portion of a dollar sign, and the second set of marks is the "|" portion of the dollar sign that goes through the middle of the "S" portion of the dollar sign), the second set of marks is displayed with the first set of marks in the first region in the three-dimensional environment (1412*c*), such as the portion of marks 1330*b* in FIG. 13A and the portion of marks 1330*b* completed in FIG. 13B being displayed together in region 1331*b* (e.g., both the first and second set of marks are displayed in the same plane).

In some embodiments, in accordance with a determination that the one or more criteria are not satisfied (e.g., if the second set of marks is not part of the same group of marks including the first set of marks. For example, if the first set of marks is a dollar sign "S", and the second set of marks is an outline of a heart shape), the second set of marks is displayed in a third region, different from the first region, in the three-dimensional environment (1412*d*), such as if the "|" portion of marks 1330*b* in FIG. 13B were displayed in a region other than region 1331*b* in FIG. 13B (e.g., the first set of marks is displayed in one plane, and the second set of marks is displayed in a different plane, in the three-dimensional environment). Displaying different groups of marks in different regions ensures that marks that are part of different groups are not displayed in a manner that indicates that the marks are part of the same group, thereby reducing errors in usage and improving user-device interaction.

In some embodiments, the one or more criteria include a criterion that is satisfied when the first set of marks and the second set of marks together correspond to a collective context, and not satisfied when the first set of marks and the second set of marks do not correspond to a collective context (1414), such as the "S" and "|" portions of marks 1330*b* collectively corresponding to a dollar sign. For example, if the first and second set of marks, together, have a meaning, then the criterion is satisfied. As an example, the two strokes of a question mark (e.g., corresponding to the first and second set of marks, respectively), together, have a meaning. As another example, the "S" portion of a dollar sign (e.g., corresponding to the first set of marks) and the "|" portion of the dollar sign (e.g., corresponding to the second set of marks), together, have a meaning. In these scenarios, the criterion is optionally satisfied. However, a first set of marks corresponding to a "%" symbol and a second set of marks corresponding to all or a portion of the letter "E", together, optionally do not have a meaning. In such a scenario, the criterion is optionally not satisfied. Determining groups of marks based on collective context provides an effective manner of determining the relationship between marks, thereby reducing errors in usage and improving user-device interaction.

In some embodiments, the one or more criteria include a criterion that is satisfied when an elapsed time between an end of the first input (e.g., when the pinch of the thumb and tip of the index finger of the hand of the user providing the first input is released, thus no longer creating marks in the three-dimensional environment in accordance with the movement of the hand) and a beginning of the second input (e.g., when the pinch of the thumb and tip of the index finger of the hand of the user providing the second input is established (e.g., the thumb touching the tip of the index finger), thus causing marks to be created in the three-dimensional environment in accordance with the movement of the hand) is less than a time threshold (e.g., 0.1, 0.3, 0.5, 1, 2, 3, 5, or 10 seconds), and not satisfied when the elapsed time between the end of the first input and the beginning of the second input is more than the time threshold (1416), such as the time between the "S" and "|" portions of marks 1330*b*. For example, in some embodiments determining whether the two sets of marks are part of the same group of marks is additionally or alternatively based on the length of time between the end of the first input and the beginning of the second input. In some embodiments, the longer the length of time, the less likely the marks are determined to be part of the same group of marks, and the shorter the length of time, the more likely the marks are determined to be part of the same group of marks. Determining groups of marks based on elapsed time between marks provides an effective manner of determining the relationship between marks, thereby reducing errors in usage and improving user-device interaction.

In some embodiments, the one or more criteria include a criterion that is satisfied when a distance between a portion of the first set of marks (e.g., any portion of the first set of marks, a portion of the first set of marks created in response to an end of the first input (e.g., based on the last 1%, 3%, 5%, 10%, 20%, 30%, 50%, or 75% of the movement in the first input). In some embodiments, the end of the first input occurs when the pinch of the thumb and tip of the index finger of the hand of the user providing the first input is released, thus no longer creating marks in the three-dimensional environment in accordance with the movement of the hand) and a portion of the second set of marks (e.g., any portion of the second set of marks, a portion of the second set of marks created in response to a beginning of the second input (e.g., based on the first 1%, 3%, 5%, 10%, 20%, 30%, 50%, or 75% of the movement in the second input). In some embodiments, the beginning of the second input occurs when the pinch of the thumb and tip of the index finger of the hand of the user providing the second input is established (e.g., the thumb touching the tip of the index finger), thus causing marks to be created in the three-dimensional environment in accordance with the movement of the hand) is less than a distance threshold (e.g., 0.1, 0.3, 0.5, 1, 2, 3, 5, 10, 20, 30, 50 or 100 inches), and not satisfied when the distance between the portion of the first set of marks and the portion of the second set of marks is greater than the distance threshold (1418), such as the distance between marks 1330*b* and 1330*c*. For example, in some embodiments determining whether the two sets of marks are part of the same group of marks is additionally or alternatively based on the distance between the end (or other portion) of the first input and the beginning (or other portion) of the second input. In some embodiments, the longer the distance, the less likely the marks are determined to be part of the same group of marks, and the shorter the distance, the more likely the marks are determined to be part of the same group of marks. In some embodiments, the distance between the sets of marks is a two-dimensional distance (e.g., the distance within the plane in which the marks are being created), because the marks are optionally confined to a plane while being created. In some embodiments, the distance between the sets of marks is a two-dimensional distance (e.g., the distance within the plane in which the marks are being created), because the distance in the third dimension (e.g., towards or away from the viewpoint of the user) is determined automatically and/or corresponds to the location of the hand of the user that is creating the marks. Determining groups of marks based on distance between marks provides an effective manner of determining the relationship between marks, thereby reducing errors in usage and improving user-device interaction.

In some embodiments, the one or more criteria include a criterion that is satisfied based on an attention of the user with respect to the second set of marks during the second input (1420). In some embodiments, the attention of the user is based on the gaze of the user. For example, the attention of the user is optionally directed to the second set of marks when the gaze of the user is directed to the second set of marks, and the attention of the user is optionally directed to the first set of marks when the gaze of the user is directed to the first set of marks. In some embodiments, determining whether the two sets of marks are part of the same group of marks is additionally or alternatively based on the attention of the user. If there is a break in attention of the user directed to the first and/or second set of marks (e.g., if the attention of the user is not directed to the second set of marks after the first set of marks is created until after a time threshold such as 0.1, 0.3, 0.5, 1, 2, 3, 5, or 10 seconds), then the criterion is not satisfied and/or is less likely to be satisfied. If there is not a break in attention of the user (e.g., if the attention of the user is directed to the second set of marks after the first set of marks is created within the time threshold), then the criterion is satisfied and/or is more likely to be satisfied. If the attention of the user was directed to marks within the second set of marks during the second input in a manner that is consistent with the attention of the user directed to marks within the first set of strokes during the first input, the more likely the marks are determined to be part of the same group of marks, and if the attention of the user was directed to marks within the second set of marks during the second input in a manner that is not consistent with the attention of the user directed to marks within the first set of strokes during the first input, the less likely the marks are determined to be part of the same group of marks. Attention consistency optionally includes one or more of the attention of the user moving with similar speed, acceleration, distance from mark to mark within the first set of marks, within the second set of marks and/or from a mark in the first set of marks to a mark in the second set of marks. In some embodiments, if the attention of the user remains within a threshold distance (e.g., 0.1, 0.5, 1, 3, 5, 10, 20, 30, or 50 inches) of the first and/or second set of marks between the first input and the second input, the criterion is optionally satisfied. In some embodiments, if the attention of the user moves further than the threshold distance of the first and/or second set of marks between the first input and the second input, the criterion is optionally not satisfied. Determining groups of marks based on attention provides an effective manner of determining the relationship between marks, thereby reducing errors in usage and improving user-device interaction.

In some embodiments, while receiving the first input and before displaying the first set of marks in the first region, the electronic device displays (1422*a*), via the display generation component, the first set of marks in a fourth region different from the first region and the third region, such as displaying marks 1330*b* in region 1310 while the marks are being created. In some embodiments, when the first set of marks are being created in response to the first input, the first set of marks are initially displayed in an initial plane that is between the first three-dimensional object and the viewpoint of the user, optionally normal to the viewpoint of the user.

In some embodiments, after receiving the first input, the electronic device moves (1422*b*) the first set of marks from the fourth region to the first region, such as moving marks 1330*b* away from region 1310 into region 1331*b* in FIG. 13B. For example, subsequent to and/or in response to detecting the end of the first input (e.g., when the pinch of the thumb and tip of the index finger of the hand of the user providing the first input is released, thus no longer creating marks in the three-dimensional environment in accordance with the movement of the hand), the electronic device optionally projects/moves the marks back towards the first three-dimensional object (e.g., away from the viewpoint of the user) into the first region.

In some embodiments, while receiving the second input and before displaying the second set of marks in the third region, the electronic device displays (1422*c*), via the display generation component, the second set of marks in the fourth region, such as displaying marks 1330*c* in region 1310 while the marks are being created. In some embodiments, when the second set of marks are being created in response to the second input, the second set of marks are initially displayed in the same initial plane that is between the first three-dimensional object and the viewpoint of the user, optionally normal to the viewpoint of the user, in which the first set of marks were created.

In some embodiments, after receiving the second input, the electronic device moves (1422*d*) the second set of marks from the fourth region to the third region, such as moving marks 1330*c* away from region 1310 into region 1331*c* in FIG. 13B. For example, subsequent to and/or in response to detecting the end of the second input (e.g., when the pinch of the thumb and tip of the index finger of the hand of the user providing the first input is released, thus no longer creating marks in the three-dimensional environment in accordance with the movement of the hand), the electronic device optionally projects/moves the marks back towards the first three-dimensional object (e.g., away from the viewpoint of the user) into the third region. In some embodiments, the electronic device projects/moves the marks back towards the first three-dimensional object (e.g., away from the viewpoint of the user) into the first region after and/or in response to detecting the end of the second input, and after determining that the first and second set of marks are not part of the same group of marks. If the first and second set of marks were determined to be part of the same group of marks, the electronic device would optionally project/move the first and second set of marks together back towards the first three-dimensional object (e.g., away from the viewpoint of the user) into the same region/plane. Initially displaying marks in the same region provides consistent of interaction with the user, thereby reducing errors in usage and improving user-device interaction.

In some embodiments, moving the first set of marks from the fourth region to the first region includes displaying an animation of the first set of marks moving from the fourth region to the first region along a path from the fourth region to the first region (1424*a*), such as an animation of marks 1330*b* moving away from the viewpoint of the user in FIG. 13B. In some embodiments, moving the second set of marks from the fourth region to the third region includes displaying an animation of the second set of marks moving from the fourth region to the third region along a path from the fourth region to the third region (1424*b*), such as an animation of marks 1330*c* moving away from the viewpoint of the user in FIG. 13B. In some embodiments, the electronic device displays the first and/or second sets of marks moving backwards in space in the three-dimensional environment (e.g., away from the viewpoint of the user, towards the first three-dimensional object). In some embodiments, the first and/or second set of marks are shown as moving backwards via a change in stereoscopic depths of the first and/or second set of marks relative to the viewpoint of the user. In some embodiments, the electronic device maintains the size(s) of the first and/or second sets of marks in the three-dimensional environment as the first and/or second set of marks are moved backwards in the three-dimensional environment. However, in some embodiments, the portions of the field of view of the user from the viewpoint of the user occupied by the first and/or second sets of marks decreases as the first and/or second sets of marks move backwards in the three-dimensional environment. Displaying an animation of the movement of the marks in the three-dimensional environment clearly conveys the changes that are resulting from operations performed by the electronic device in the three-dimensional environment, thereby reducing errors in usage and improving user-device interaction.

In some embodiments, the first input is received while the viewpoint of the user relative to the first three-dimensional object is a first viewpoint and the first set of marks is displayed in the first region (1426*a*), such as the viewpoint shown in FIGS. 13A and 13B (e.g., the orientation of the first viewpoint relative to the first three-dimensional object is a first orientation, such as the first viewpoint being oriented towards a front portion of the first three-dimensional object (e.g., the first three-dimensional object having a front portion, a left side portion, a right side portion, a rear portion, a top portion, and/or a bottom portion)).

In some embodiments, while displaying, via the display generation component, the three-dimensional environment that includes the first three-dimensional object from a second viewpoint, different from the first viewpoint, relative to the first three-dimensional object, such as the viewpoint shown in FIG. 13D (e.g., the electronic device has received user input for moving the viewpoint of the user relative to the first three-dimensional object to be oriented towards a different portion of the first three-dimensional object, such as being oriented towards a left side portion of the first three-dimensional object, and in response is displaying the three-dimensional environment and/or the first three-dimensional object from the updated viewpoint of the user), the electronic device receives (1426*b*), via the one or more input devices, a second input corresponding to a marking input associated with the first three-dimensional object, such as the input from hand 1303*a* in FIG. 13D. For example, detecting and/or receiving an input corresponding to a request to draw on or near and/or annotate the first three-dimensional object from a different angle/orientation than the first input. In some embodiments, the input includes a pinch gesture performed by a hand of the user while a marking tool is the currently active tool, followed by movement of the hand while maintaining a pinch hand shape, which optionally defines the mark(s) created by the marking input. In some embodiments, the second input is an input such as described with reference to method 1000 (e.g., for entering content). In some embodiments, the second input and/or the second set of marks has the same size, duration, shape, profile, etc. as the first input and/or the first set of marks, and in some embodiments, the second input and/or the second set of marks has a different size, duration, shape, profile, etc. than the first input.

In some embodiments, in response to receiving the second input, the electronic device displays (1426*c*), in the three-dimensional environment, a second set of marks associated with the three-dimensional object, wherein the second set of marks is displayed in a third region (e.g., two-dimensional plane), different from the first region, in the three-dimensional environment, such as marks 1330*d* being displayed in region 1311 in FIG. 13D. In some embodiments, the region or plane in which the second set of marks is displayed is different from the first region, because the orientation of the second viewpoint of the user relative to the first three-dimensional object is different from the orientation of the first viewpoint of the user relative to the first three-dimensional object. In some embodiments, the third region is normal to the second viewpoint of the user, and the first region is normal to the first viewpoint of the user. Displaying marks in different regions in the three-dimensional environment depending on the viewpoint of the user provides for effective marking of objects from different directions, thereby reducing errors in usage and improving user-device interaction.

In some embodiments, the first input is received while the viewpoint of the user relative to the first three-dimensional object is a first viewpoint (1428*a*), such as the viewpoint shown in FIGS. 13A and 13B (e.g., the orientation of the first viewpoint relative to the first three-dimensional object is a first orientation, such as the first viewpoint being oriented towards a front portion of the first three-dimensional object (e.g., the first three-dimensional object having a front portion, a left side portion, a right side portion, a rear portion, a top portion, and/or a bottom portion)).

In some embodiments, while displaying the first three-dimensional object from the first viewpoint relative to the first three-dimensional object, the electronic device displays (1428*b*) the first set of marks with a visual characteristic having a first value, such as the display of marks 1330*a*, 1330*b*, 1330*c* in FIGS. 13A and 13B. For example, the first set of marks is displayed with a color, transparency, brightness, boldness/thickness, etc. (e.g., a visual characteristic other than a visual characteristic associated with a size/area/volume of the first set of marks in the three-dimensional environment) having the first value.

In some embodiments, while displaying the first three-dimensional object from a second viewpoint, different from the first viewpoint, such as the viewpoint shown in FIG. 13C (e.g., the electronic device has received user input for moving the viewpoint of the user relative to the first three-dimensional object to be oriented towards a different portion of the first three-dimensional object, such as being oriented towards a left side portion of the first three-dimensional object, and in response is displaying the three-dimensional environment and/or the first three-dimensional object from the updated viewpoint of the user), relative to the first three-dimensional object, the electronic device displays (1428*c*) the first set of marks with the visual characteristic having a second value, different from the first value, such as the display of marks 1330*a*, 1330*b*, 1330*c* in FIG. 13C. For example, the first set of marks is displayed with a color, transparency, brightness, boldness/thickness, etc. (e.g., a visual characteristic other than a visual characteristic associated with a size/area/volume of the first set of marks in the three-dimensional environment) having the second value. The difference in the visual characteristic between the first and second viewpoints is optionally other than due to any differences in distance between the first set of marks and the first and second viewpoints, and is optionally other than differences in display of the profiles/shapes of the first set of marks due to being displayed from a different angle. For example, the first set of marks is optionally displayed as faded out from the second viewpoint as compared with being displayed from the first viewpoint, potentially in addition to being displayed larger due to the second viewpoint being closer to the first set of marks and/or being distorted due to the second viewpoint displaying the first set of marks from a different angle than the first viewpoint. Displaying marks differently from different viewpoints conveys information about the arrangement of the marks relative to the three-dimensional object and differentiates those marks from marks associated with the current viewpoint of the user, thereby reducing errors in usage and improving user-device interaction.

In some embodiments, the electronic device displays (1430), via the display generation component, the first three-dimensional object and the first set of marks as the viewpoint of the user changes from the first viewpoint to the second viewpoint (e.g., while the input for changing the viewpoint of the user is being received), including displaying the visual characteristic of the first set of marks gradually changing from having the first value to having the second value as the viewpoint of the user changes from the first viewpoint to the second viewpoint, such as while changing the viewpoint from the viewpoint of FIG. 13B to the viewpoint of FIG. 13C. Thus, in some embodiments, as the orientation of the viewpoint of the user changes relative to the viewpoint at which the first set of marks was created, the electronic device optionally gradually modifies the display of the first set of marks (e.g., as a function of the change in the orientation of the viewpoint). For example, the electronic device displays the first set of marks as gradually fading out (e.g., becoming more transparent) as the viewpoint of the user deviates from the first viewpoint. Displaying the visual characteristic of the marks gradually changing clearly conveys the changes that are resulting from operations performed by the electronic device in the three-dimensional environment, thereby reducing errors in usage and improving user-device interaction.

In some embodiments, the first input is received while the viewpoint of the user relative to the first three-dimensional object is a first viewpoint and the first set of marks is displayed in the first region (1432*a*), such as the viewpoint shown in FIGS. 13A and 13B (e.g., the orientation of the first viewpoint relative to the first three-dimensional object is a first orientation, such as the first viewpoint being oriented towards a front portion of the first three-dimensional object (e.g., the first three-dimensional object having a front portion, a left side portion, a right side portion, a rear portion, a top portion, and/or a bottom portion)).

In some embodiments, while displaying the first three-dimensional object from the first viewpoint relative to the first three-dimensional object, the electronic device displays (1432*b*) the first set of marks in the first region at a first distance from the first viewpoint of the user, such as marks 1330*b* at the first distance from the viewpoint in FIG. 13B. For example, the first set of marks is displayed at the first distance via stereoscopic display of the marks.

In some embodiments, while displaying the first three-dimensional object from a second viewpoint, different from the first viewpoint, such as the viewpoints shown in FIG. 13C or 13D (e.g., the electronic device has received user input for moving the viewpoint of the user relative to the first three-dimensional object to be oriented towards a different portion of the first three-dimensional object, such as being oriented towards a left side portion of the first three-dimensional object, and in response is displaying the three-dimensional environment and/or the first three-dimensional object from the updated viewpoint of the user), relative to the first three-dimensional object, the electronic device displays (1432*c*) the first set of marks in the first region at a second distance, different from the first distance, from the second viewpoint of the user, such as marks 1330*b* at the second distance from the viewpoint in FIG. 13C or 13D. For example, the first set of marks is displayed at the second distance via stereoscopic display of the marks. The first set of marks is optionally displayed at the second distance from the second viewpoint, because the second viewpoint is closer to or further away from the first region, optionally in addition to being at an angle relative to the first region as previously described. In some embodiments, because the first region is closer to or further away from the second viewpoint, the first set of marks is optionally displayed larger or smaller, respectively, due to the second viewpoint being closer to or further away from the first set of marks and/or is distorted due to the second viewpoint displaying the first set of marks from a different angle than the first viewpoint. Displaying marks at different distances from different viewpoints conveys information about the arrangement of the marks relative to the three-dimensional object and differentiates those marks from marks associated with different viewpoints, thereby reducing errors in usage and improving user-device interaction.

FIGS. 15A-15F illustrate examples of an electronic device indicating a boundary of a marking canvas or volume for creating marks associated with an object in a three-dimensional environment in accordance with some embodiments.

Figure 15A:
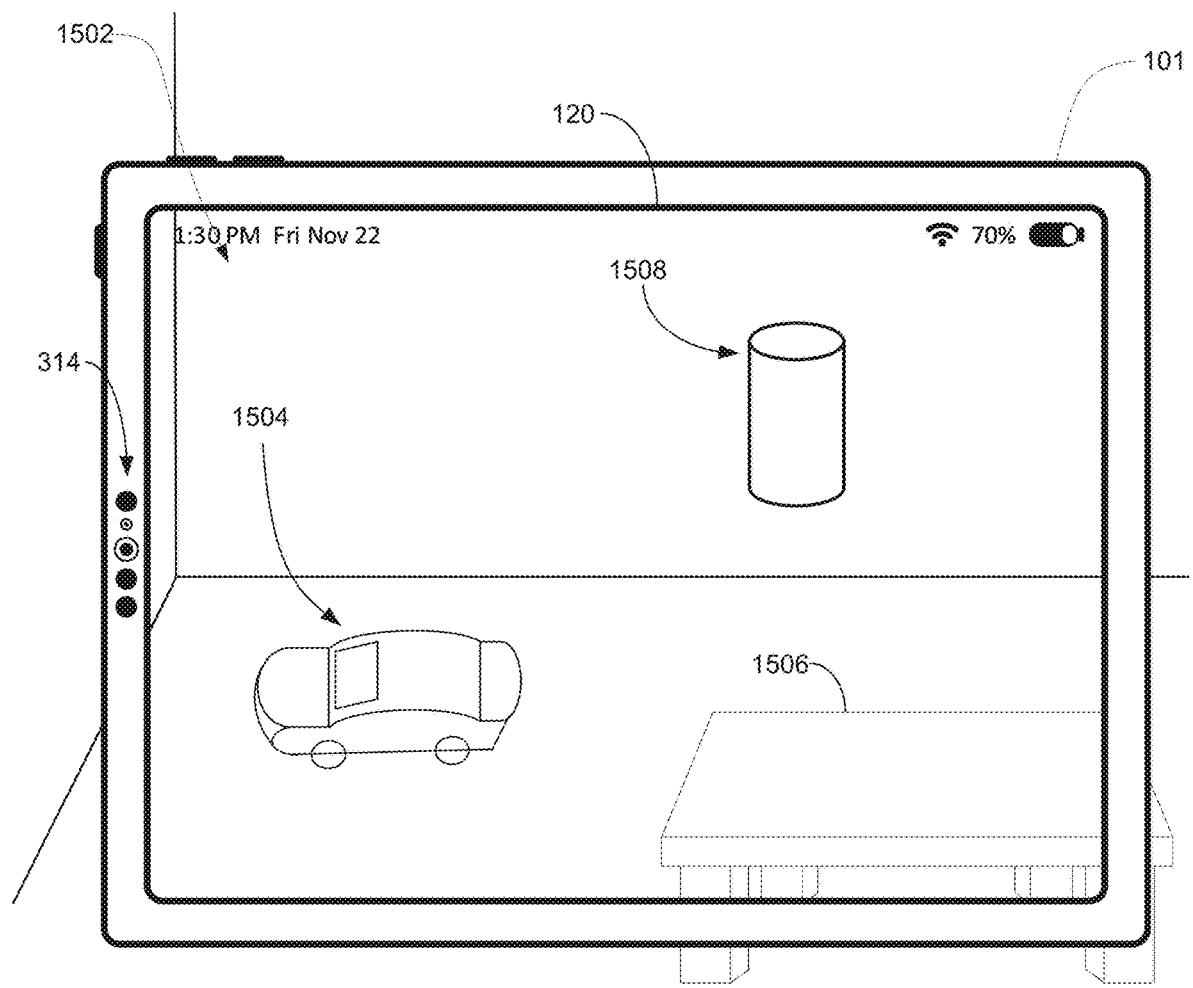
FIGS. 15A-15F illustrate examples of an electronic device indicating a boundary of a marking canvas or volume for creating marks associated with an object in a three-dimensional environment in accordance with some embodiments.

FIG. 15A illustrates an electronic device 101 displaying, via a display generation component (e.g., display generation component 120 of FIG. 1), a three-dimensional environment 1502 from a viewpoint of a user (e.g., facing the back wall of the physical environment in which device 101 is located). As described above with reference to FIGS. 1-6, the electronic device 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the electronic device 101 would be able to use to capture one or more images of a user or a part of the user (e.g., one or more hands of the user) while the user interacts with the electronic device 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 15A, device 101 captures one or more images of the physical environment around device 101 (e.g., operating environment 100), including one or more objects in the physical environment around device 101. In some embodiments, device 101 displays representations of the physical environment in three-dimensional environment 1502. For example, three-dimensional environment 1502 includes a representation 1506 of a table, which is optionally a representation of a physical table in the physical environment. Three-dimensional environment 1502 also includes a representation of the back and side walls, as well as the floor, of the physical environment.

In FIG. 15A, three-dimensional environment 1502 also includes virtual objects 1504 and 1508. Virtual object 1504 is a three-dimensional object in FIG. 15A—in particular, a three-dimensional model of an automobile. Virtual object 1508 is also a three-dimensional object in FIG. 15A—in particular, a cylinder. In some embodiments, objects 1504 and/or 1508 are two-dimensional objects, or different three-dimensional objects. In some embodiments, objects 1504 and/or 1508 are two- or three-dimensional representations of objects in the physical environment of device 101.

In some embodiments, device 101 facilitates marking inputs directed to objects in three-dimensional environment 1502, such as marking inputs described with reference to methods 1000, 1200, 1400 and/or 1600. For example, while a marking tool or mode is currently active at device 101 (e.g., as described with reference to methods 1000, 1200, 1400 and/or 1600), in response to detecting a hand of the user in a particular hand shape (e.g., in a pinch hand shape in which the thumb and the tip of the index finger are touching) followed by movement of the hand in the particular hand shape, device 101 creates marks corresponding to the movement of the hand in the three-dimensional environment 1502. In some embodiments, the location of the marks is based on the location of a cursor that is controlled by the hand of the user when the marking input is detected, further details of which will be described below. Additional details about marking inputs are described with reference to methods 1000, 1200, 1400 and/or 1600. It is understood that while FIGS. 15A-15F illustrate marking inputs directed to two objects in three-dimensional environment 1502, the described inputs and responses of device 101 optionally occur with respect to one object in three-dimensional environment 1502 and/or three or more objects in three-dimensional environment 1502.

Figure 15B:
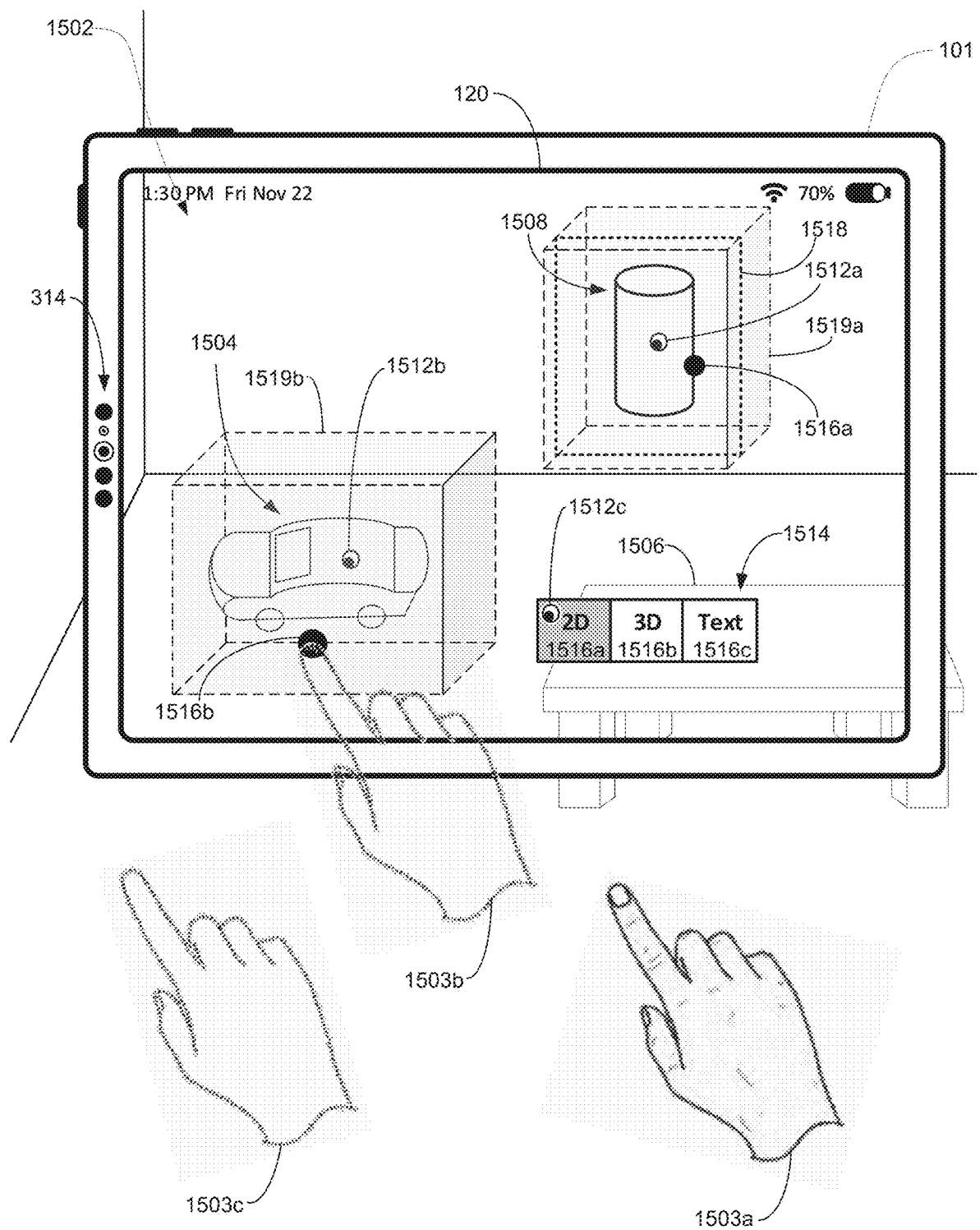

In FIG. 15B, device 101 detects gaze 1512a of the user directed to object 1508, and gaze 1512b of the user directed to object 1504. Further, device 101 detects hand 1503a (e.g., providing input directed to object 1508 and associated with gaze 1512a) in a respective pose—for example, in a pre-pinch hand shape in which the thumb and tip of the index finger of hand 1503a curled towards each other, but not touching each other. Hand 1503a and/or the viewpoint of the user is optionally further than a threshold distance (e.g., 0.5, 1, 2, 3, 5, 10, 20, 50, 100, 200, 500, or 1000 inches) from object 1508 (e.g., corresponding to indirect marking input as described with reference to methods 1000, 1200, 1400 and/or 1600). Alternatively, device 101 detects hand 1503b and/or the viewpoint of the user optionally closer than the threshold distance to object 1504 (e.g., corresponding to a direct marking input as described with reference to methods 1000, 1200, 1400 and/or 1600) and in the respective pose or a different pose, such as with the index finger of hand 1503b extended towards object 1504, and the remaining fingers of hand 1503b curled towards the palm of hand 1503b. It should be understood that while multiple hands, gazes and corresponding inputs are illustrated in FIGS. 15A-15F, such hands, gazes and inputs need not be detected by device 101 concurrently; rather, in some embodiments, device 101 independently responds to the hands, gazes and/or inputs illustrated and described in response to detecting such hands, gazes and/or inputs independently.

In response to detecting one or more of hands 1503a and/or 1503b and/or gazes 1512a and 1512b as described above, device displays cursor 1516a associated with creating marks associated with object 1508, and cursor 1516b associated with creating marks associated with object 1504, as shown in FIG. 15B. Device 101 optionally displays cursor 1516a within a bounding volume 1519a that defines the volume within which marks directed to object 1508 will be confined. For example, cursor 1516a is optionally confined to movement within volume 1519a. As shown in FIG. 15B, bounding volume 1519a includes object 1508, and is optionally 1, 3, 5, 10, 20, 30, 50, 75, 100, or 150 percent larger than object 1508. Similarly, device 101 optionally displays cursor 1516b within a bounding volume 1519b that defines the volume within which marks directed to object 1504 will be confined. For example, cursor 1516b is optionally confined to movement within volume 1519b. As shown in FIG. 15B, bounding volume 1519b includes object 1504, and is optionally 1, 3, 5, 10, 20, 30, 50, 75, 100, or 150 percent larger than object 1504.

In some embodiments, in addition to displaying cursors 1516a and/or 1516b in response to detecting one or more of hands 1503a and/or 1503b and/or gazes 1512a and 1512b as described above, device 101 displays an indication of volume 1519a and/or volume 1519b. For example, device 101 optionally displays outlines of volumes 1519a and/or 1519b, highlighting of the space within volumes 1519a and/or 1519b, etc. In some embodiments, device 101 does not display an indication of volumes 1519a and/or 1519b.

As previously mentioned, cursors 1516a and/or 1516b are optionally associated with creating marks associated with objects 1508 and 1504, respectively. For example, when hand 1503a associated with cursor 1516a provides a marking input (e.g., hand 1503a performs a gesture moving from the pre-pinch hand shape to a pinch hand shape in which the tip of the index finger and the thumb are touching, and holds the pinch hand shape), device 101 optionally creates marks associated with object 1508 at the location of cursor 1516a in accordance with the position and/or movement of hand 1503a. Similarly, when hand 1503b associated with cursor 1516b provides marking inputs (e.g., as described above and/or with reference to methods 1000, 1200, 1400 and/or 1600), device 101 optionally creates marks associated with object 1504 at the location of cursor 1516b in accordance with the position and/or movement of hand 1503b. The location of cursor 1516a is optionally controlled by the position and/or movement of hand 1503a, and the location of cursor 1516b is optionally controlled by the position and/or movement of hand 1503b.

In some embodiments, the marks associated with a cursor are two-dimensional marks, and in some embodiments the marks associated with a cursor are three-dimensional marks (e.g., as described in more detail with reference to methods 1000, 1200, 1400 and/or 1600). For example, with reference to object 1504, if the viewpoint of the user and/or the hand providing the marking input is closer than a threshold distance (e.g., 1, 3, 5, 10, 20, 30, 50, 100, 200, or 500 inches) to object 1504, the marks created by cursor 1516b are optionally three-dimensional marks if a three-dimensional marking mode or tool is currently active, or two-dimensional marks if a two-dimensional marking mode or tool is currently active. For three-dimensional marks, cursor 1516b—and therefore marks created by cursor 1516b—is optionally able to move both laterally with respect to the viewpoint of the user (and/or object 1504) in accordance with lateral movements of hand 1503b, as well as towards and/or away from the viewpoint of the user in accordance with movements of hand 1503b towards and/or away from the viewpoint of the user. In FIG. 15B, cursor 1516b is creating three-dimensional marks associated with object 1504.

With reference to object 1508, if the viewpoint of the user and/or the hand providing the marking input is further than the threshold distance from object 1508, the marks created by cursor 1516a are optionally two-dimensional marks, and three-dimensional marking is optionally not available. For two-dimensional marks, cursor 1516a—and therefore marks created by cursor 1516a—is optionally able to move laterally with respect to the viewpoint of the user in accordance with lateral movements of hand 1503a (e.g., within a plane 1518 contained within volume 1519a), but not towards and/or away from the viewpoint of the user (and/or object 1508) in accordance with movements of hand 1503a towards and/or away from the viewpoint of the user during the marking input. In FIG. 15B, cursor 1516a is creating two-dimensional marks associated with object 1508. In some embodiments, plane 1518 within which cursor 1516a is placed is determined at the moment that device 101 detects hand 1503a initiating a marking input (e.g., hand 1503a transitioning from the pre-pinch hand shape to the pinch hand shape, such as described with reference to method 1400). Before hand 1503a initiates the marking input, and while hand 1503a is in the pre-pinch hand shape, device 101 optionally moves cursor 1516a towards and/or away from the viewpoint of the user in accordance with the movement of hand 1503a towards and/or away from the viewpoint of the user. Upon detecting hand 1503a initiate the marking input, device 101 optionally locks cursor 1516a to movement within the cross-sectional plane of volume 1519a on which cursor 1516a is located when the initiation of the marking input is detected (e.g., plane 1518 in FIG. 15B). In some embodiments, device 101 displays an indication of plane 1518. For example, device 101 optionally displays an outline of plane 1518, highlights the area within plane 1518, etc. In some embodiments, device 101 does not display an indication of plane 1518.

In some embodiments, device 101 displays a palette 1514 of marking tools in three-dimensional environment 1502, as shown in FIG. 15B. For example, palette 1514 optionally includes an option 1516a that is selectable to activate a two-dimensional marking tool (e.g., to cause cursors 1516a and/or 1516b to create two-dimensional marks), an option 1516b that is selectable to activate a three-dimensional marking tool (e.g., to cause cursor 1516b to create three-dimensional marks), and/or an option 1516c that is selectable to activate a mark-to-text tool (e.g., to cause marks generated by cursors 1516a and/or 1516b to be converted, by device 101, to corresponding font-based text in three-dimensional environment 1502). Options 1516a, 1516b and/or 1516c are optionally selectable in response to a gaze of the user being directed to one of the options while hand 1503c performs a pinching gesture (e.g., in which the tip of the index finger and thumb are detected as coming together and touching each other, and then moving apart), or an extended index finger of hand 1503c moving to and touching one of the options.

Figure 15C:
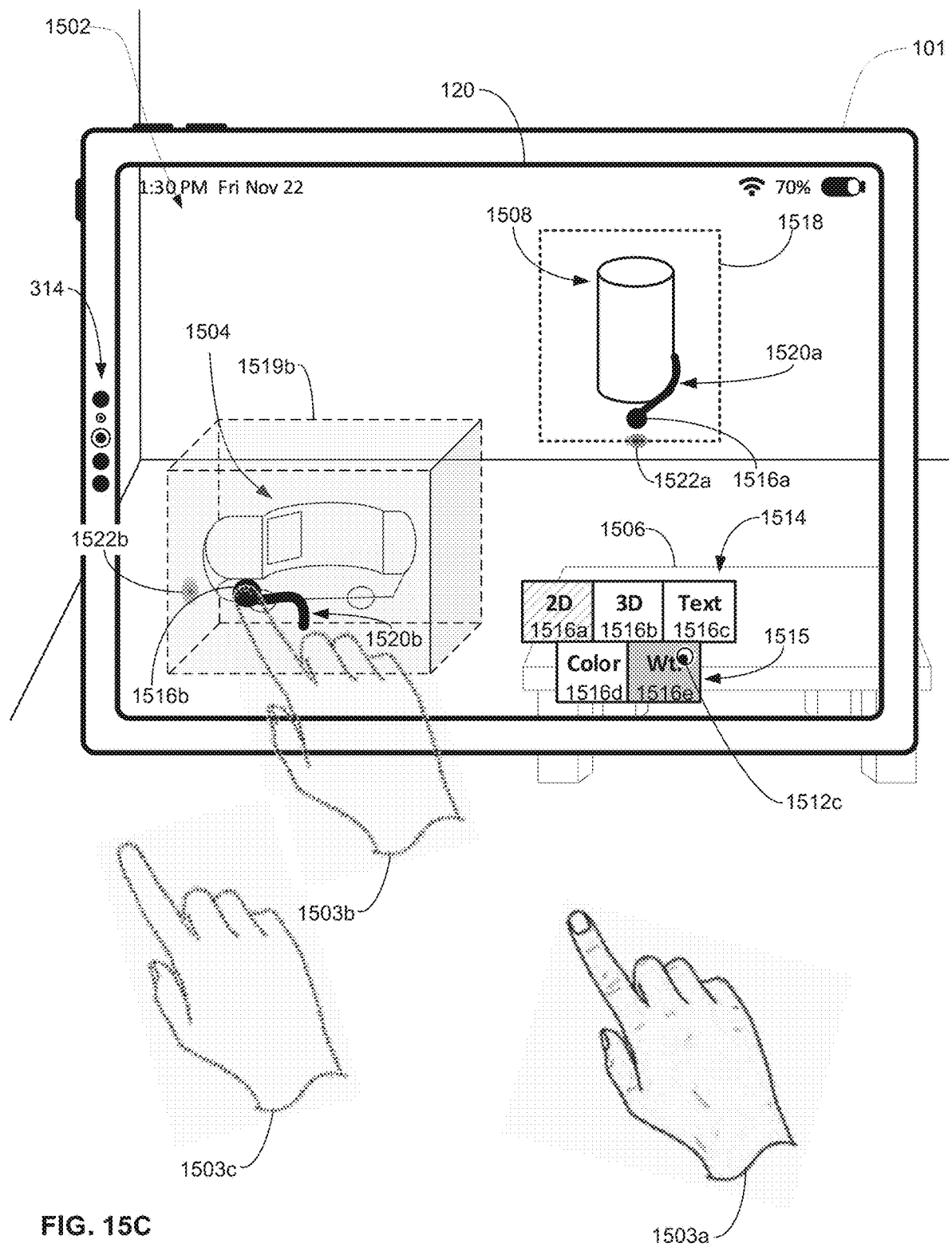

In FIG. 15B, option 1516a is currently selected as an active tool, and because gaze 1512c of the user is directed to option 1516a and because hand 1503c is in the pre-pinch hand shape, device 101 highlights option 1516a (e.g., to indicate that upon device 101 detecting a selection input from hand 1503c, option 1516a will be further selected). In FIG. 15C, device 101 has detected a selection input from hand 1503c while gaze 1512c was directed to option 1516a, and in response has displayed options 1516d and 1516e for adjusting characteristics of the two-dimensional marks created by cursors 1516a and/or 1516b. For example, option 1516d is selectable to adjust the color of the marks, and option 1516e is selectable to adjust the width and/or fineness of the marks. Like options 1516a, 1516b and 1516c, options 1516d and 1516e are selectable using the selection inputs described above. In FIG. 15C, because gaze 1512c of the user is directed to option 1516e and because hand 1503c is in the pre-pinch hand shape, device 101 highlights option 1516e (e.g., to indicate that upon device 101 detecting a selection input from hand 1503c, option 1516e will be further selected). If options 1516b and/or 1516c are further selected while already being selected as described with reference to option 1516a, device 101 optionally analogously displays options for adjusting characteristics of the marks generated by those corresponding tools.

Returning to FIG. 15B, cursor 1516a is optionally further than a threshold distance (e.g., 0.1, 0.2, 0.5, 1, 2, 5, 10, or 20 inches) from the boundary of plane 1518, and cursor 1516b is optionally further than the threshold distance from the boundary of volume 1519b. Therefore, in FIG. 15B, device 101 is optionally not displaying an indication associated with the boundaries of plane 1518 and/or volume 1519b. In FIG. 15C, device 101 detects hand 1503b, while providing a marking input, move upward and then leftward. In response, device 101 moves cursor 1516b upward and then leftward and creates mark 1520b corresponding to the movement of cursor 1516b within volume 1519b. In FIG. 15C, device 101 also detects hand 1503a move downward and leftward. In response, device 101 moves cursor 1516a downward and to the left and creates mark 1520a corresponding to the movement of cursor 1516a within plane 1518. As described with reference to method 1600, in some embodiments, the inputs from hands 1503a and/or 1503b are air gestures. For example, device 101 detects, while a gaze of the user is directed to object 1508, hand 1503a performing a pinch gesture in which two or more of the user's fingers move closer together (e.g., and are detected as touching), followed by movement of the hand 1503a with those fingers having come together; in response, device 101 optionally moves cursor 1516a an amount and/or direction and/or generates a mark 1520a having a length and/or direction corresponding to the amount and/or direction of the movement of the hand 1503a. Therefore, in the case of hand 1503a in FIG. 15C, hand 1503a has moved in a downward, leftward curved movement, and device 101 has correspondingly created mark 1520a having the downward, leftward curved shape. The remaining cursor movements and/or marks described with reference to FIGS. 15A-15F are optionally produced by device 101 in response to analogous inputs from corresponding hands providing the inputs.

In FIG. 15C, cursors 1516a and 1516b are both within the above-described threshold distance of the boundaries of plane 1518 and volume 1519b, respectively. With respect to cursor 1516a, in response to cursor 1516a moving to within the threshold distance of the boundary of plane 1518, device 101 displays an indication 1522a indicating the existence of the boundary of plane 1518, as shown in FIG. 15C. Indication 1522a is optionally displayed on the boundary with respect to which cursor 1516a is within the threshold distance (e.g., the lower boundary), and is not displayed on other boundaries of plane 1518 (e.g., the upper and side boundaries). Indication 1522*a* optionally has a visual appearance as if it is light shining from cursor 1516*a* onto the boundary of plane 1518. For example, indication 1522*a* optionally increases in size as cursor 1516*a* moves closer to the lower boundary of plane 1518, decreases in size as cursor 1516*a* moves further from the lower boundary of plane 1518, increases in brightness/intensity/color/etc. as cursor 1516*a* moves closer to the lower boundary of plane 1518, and/or decreases in brightness/intensity/color/etc. as cursor 1516*a* moves further from the lower boundary of plane 1518. Additional details of the appearance of indication 1522*a* are provided with reference to method 1600.

Similar to cursor 1516*a*, in FIG. 15C, in response to cursor 1516*b* moving to within the threshold distance of the boundary of volume 1519*b*, device 101 displays an indication 1522*b* indicating the existence of the boundary of volume 1519*b*, as shown in FIG. 15C. Indication 1522*b* is optionally displayed on the boundary with respect to which cursor 1516*b* is within the threshold distance (e.g., the left boundary), and is not displayed on other boundaries of volume 1519*b* (e.g., the front, top, bottom, rear and right boundaries). Indication 1522*b* optionally has a visual appearance as if it is light shining from cursor 1516*b* onto the boundary of volume 1519*b*. For example, indication 1522*b* optionally increases in size as cursor 1516*b* moves closer to the left boundary of volume 1519*b*, decreases in size as cursor 1516*b* moves further from the left boundary of volume 1519*b*, increases in brightness/intensity/color/etc. as cursor 1516*b* moves closer to the left boundary of volume 1519*b*, and/or decreases in brightness/intensity/color/etc. as cursor 1516*b* moves further from the left boundary of volume 1519*b*. Additional details of the appearance of indication 1522*b* are provided with reference to method 1600.

Figure 15D:
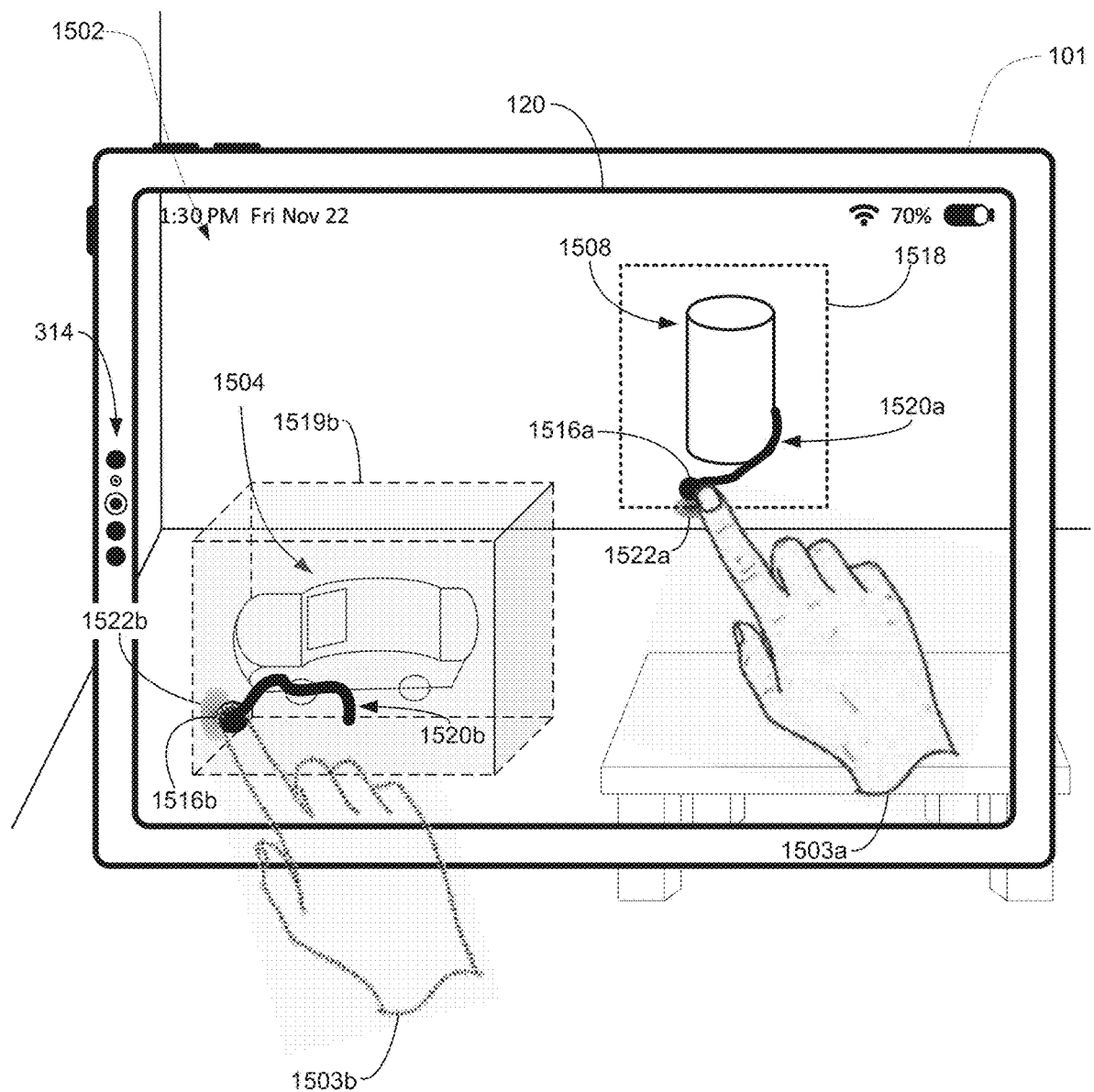

In FIG. 15D, device 101 detects hand 1503*a* move further downward and leftward, and hand 1503*b* move downward, leftward and towards the viewpoint of the user. In response, device 101 moves cursor 1516*a* downward and leftward and continues mark 1520*a* corresponding to the movement of cursor 1516*a* within plane 1518. Device also moves cursor 1516*b* downward, leftward and towards the viewpoint of the user and continues mark 1520*b* corresponding to the movement of cursor 1516*b* within volume 1519*b*. With reference to cursor 1516*a*, it is now closer to the lower boundary of plane 1518. Therefore, device 101 displays indication 1522*a* at an increased size and/or with increased brightness/intensity/color/etc. as compared with indication 1522*a* in FIG. 15C. Further, cursor 1516*a* is closest to a different portion of the lower boundary of plane 1518 in FIG. 15D than in FIG. 15C; therefore, device 101 updates the location of indication 1522*a* along the lower boundary of plane 1518 to correspond to the location on the lower boundary that has the shortest perpendicular distance to cursor 1516*a*.

Similarly with reference to cursor 1516*b*, it is now closer to the left boundary of volume 1519*b*. Therefore, device 101 displays indication 1522*b* at an increased size and/or with increased brightness/intensity/color/etc. as compared with indication 1522*b* in FIG. 15C. Further, cursor 1516*b* is closest to a different portion of the left boundary of volume 1519*b* in FIG. 15D than in FIG. 15C; therefore, device 101 updates the location of indication 1522*b* along the left boundary of volume 1519*b* to correspond to the location on the left boundary that has the shortest perpendicular distance to cursor 1516*b*.

Further in FIG. 15D, hand 1503*a* and/or the viewpoint of the user has moved closer than the threshold distance (e.g., 1, 3, 5, 10, 20, 30, 50, 100, 200, or 500 inches) to object 1508 during the marking input corresponding to mark 1520*a*. However, cursor 1516*a* is still creating two-dimensional marks associated with object 1508, because the type of marking input created by cursor 1516*a* (e.g., two-dimensional or three-dimensional) is optionally locked in at the start of a marking input (e.g., and lasts through the end of the marking input) such that subsequent changes in distance between hand 1503*a* and/or the viewpoint of the user and object 1508 optionally do not cause the type of marking input created by cursor 1516*a* to change—even if the current distance between hand 1503*a* and/or the viewpoint of the user and object 1508 would have resulted in the other type of marking input had the marking input been initiated at the current distance.

Figure 15E:
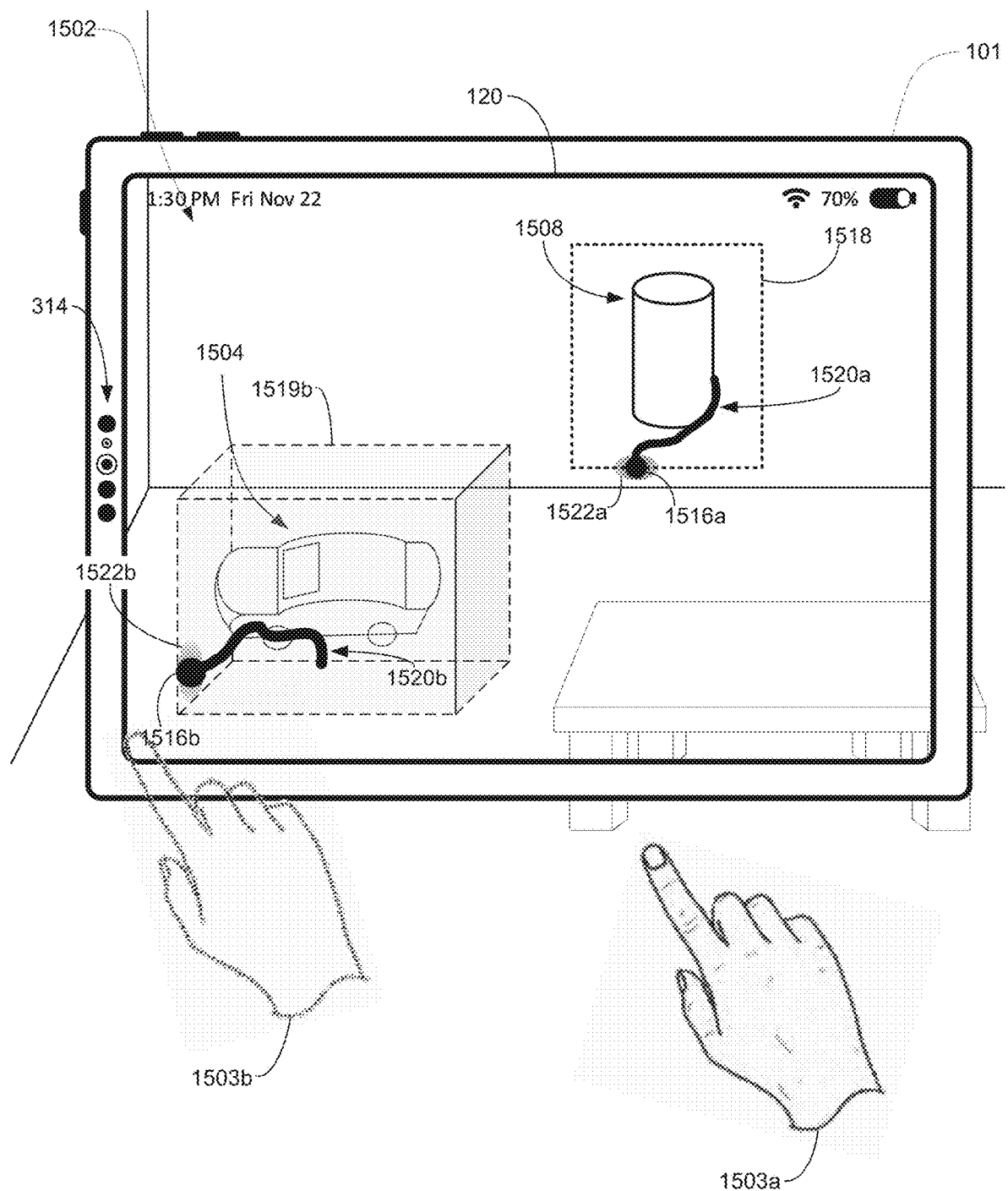

In FIG. 15E, device 101 detects hand 1503*a* move further downward, and hand 1503*b* move further leftward and towards the viewpoint of the user. In some embodiments, the movement of hand 1503*a* corresponds to an amount of movement for moving cursor 1516*a* below the lower boundary of plane 1518, and the movement of hand 1503*b* corresponds to an amount of movement for moving cursor 1516*b* to the left of the left boundary of volume 1519*b*. In response, device 101 moves cursor 1516*a* downward and continues mark 1520*a*, but only to the point of reaching the lower boundary of plane 1518—after cursor 1516*a* reaches the lower boundary of plane 1518, device 101 ceases movement of cursor 1516*a* at the boundary despite detecting further downward movement of hand 1503*a*. Similarly, device also moves cursor 1516*b* leftward and towards the viewpoint of the user and continues mark 1520*b*, but only to the point of reaching the left boundary of volume 1519*b*—after cursor 1516*b* reaches the left boundary of volume 1519*b*, device 101 ceases movement of cursor 1516*b* at the boundary despite detecting further leftward movement of hand 1503*b*. Device 101 also updates the location, size, brightness, intensity, and/or color, etc. of indications 1522*a* and 1522*b* as previously described, as shown in FIG. 15E.

Figure 15F:
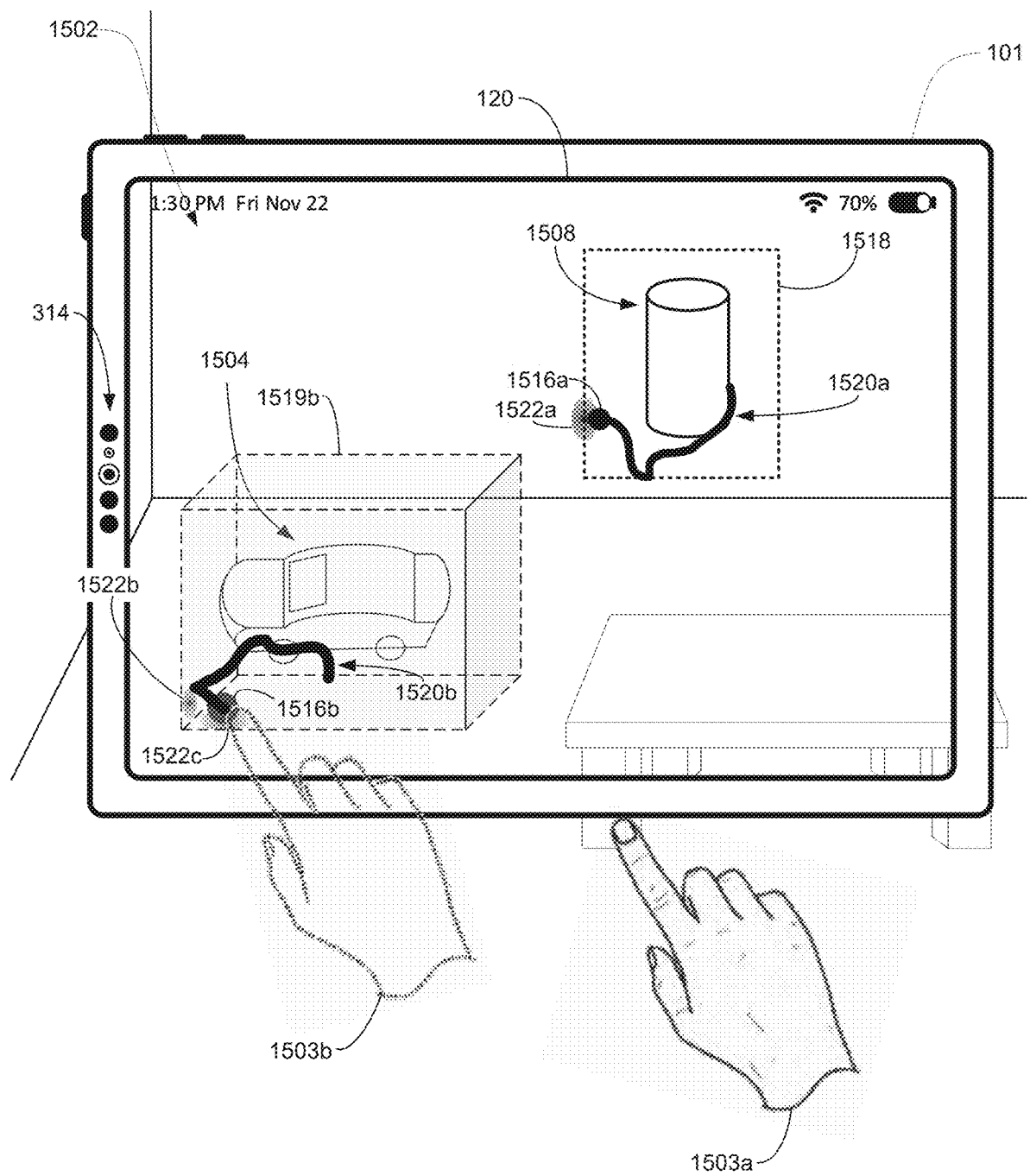
Figure 16B:
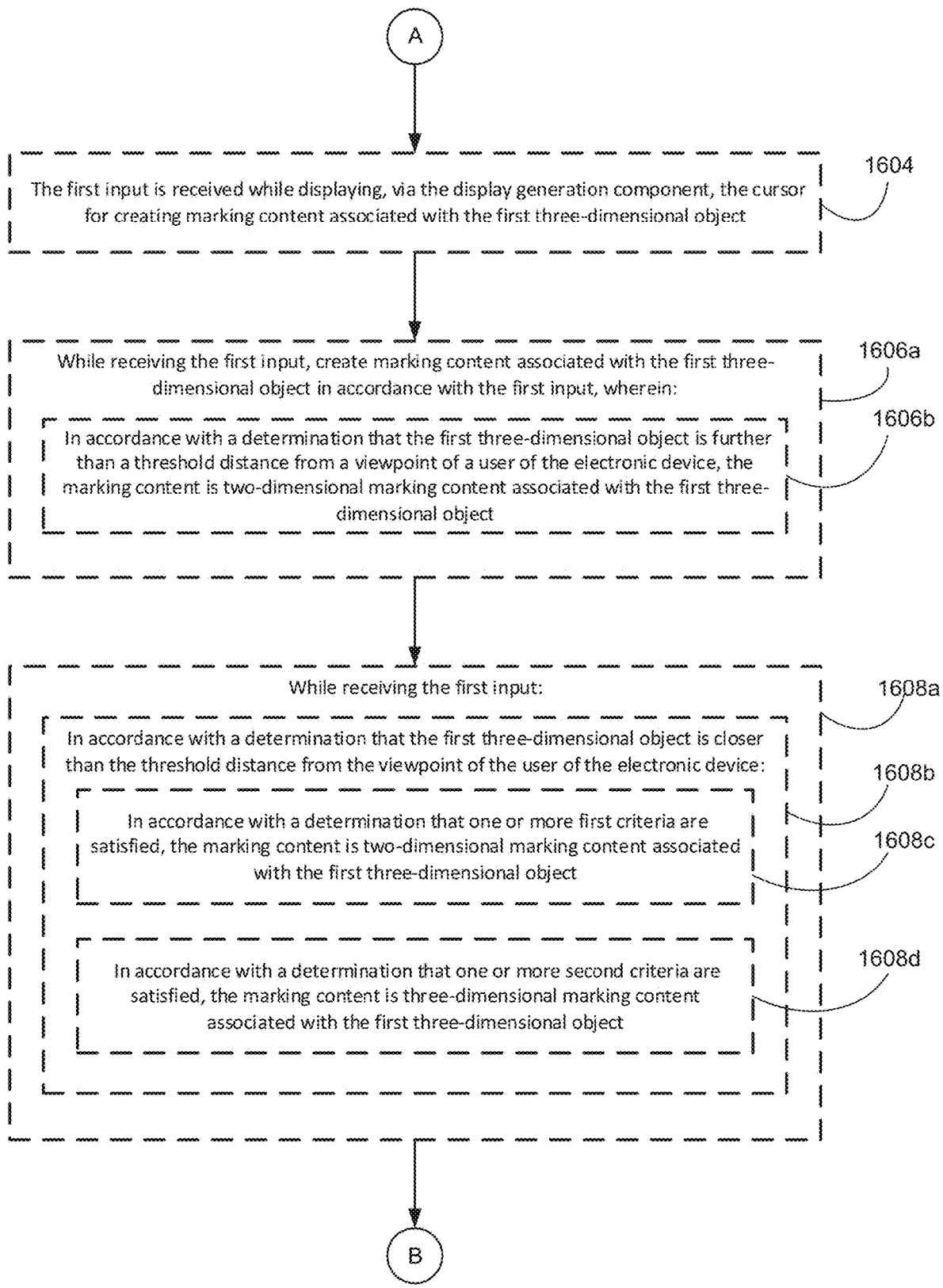
Figure 16C:
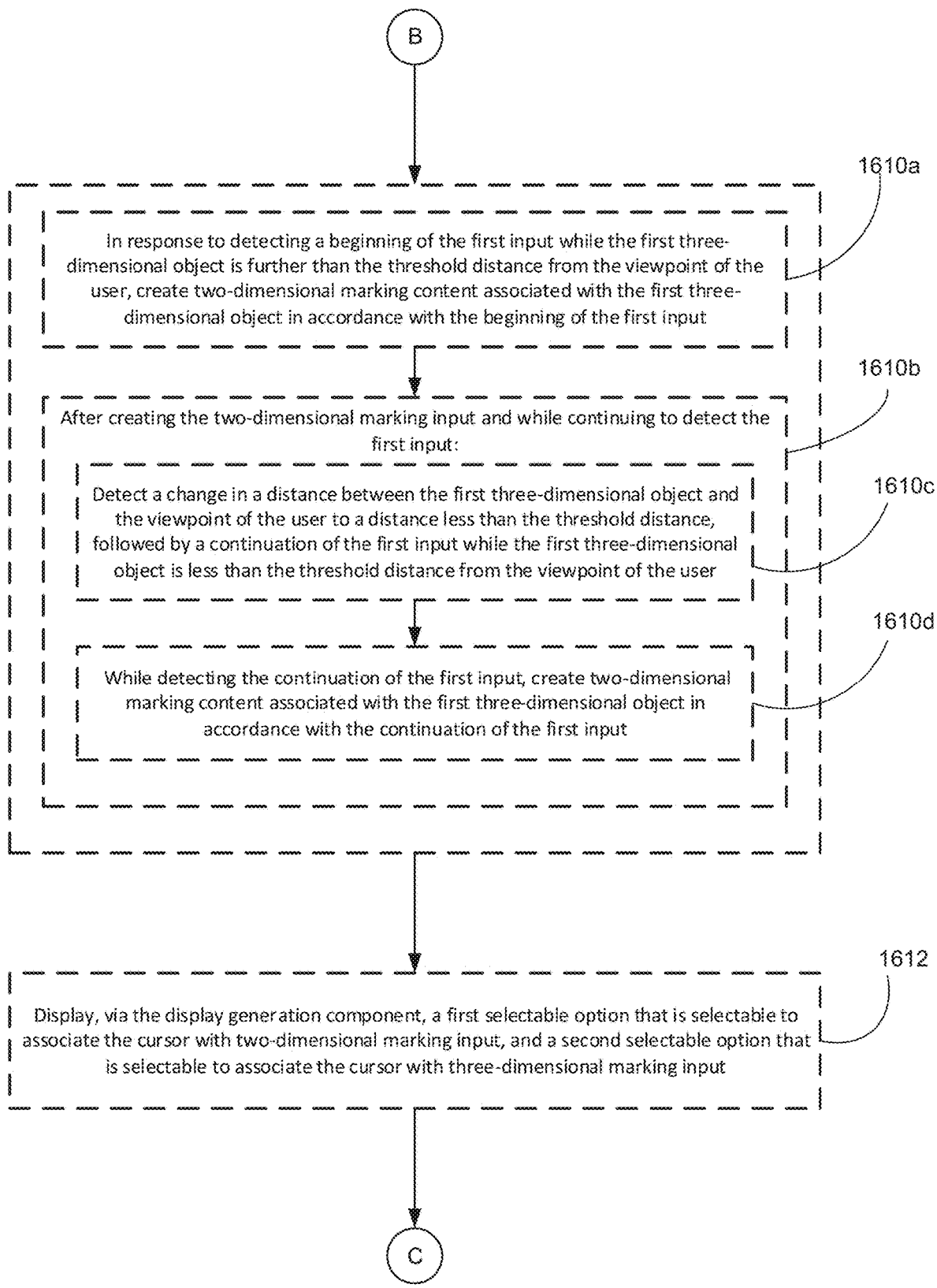
Figure 16D:
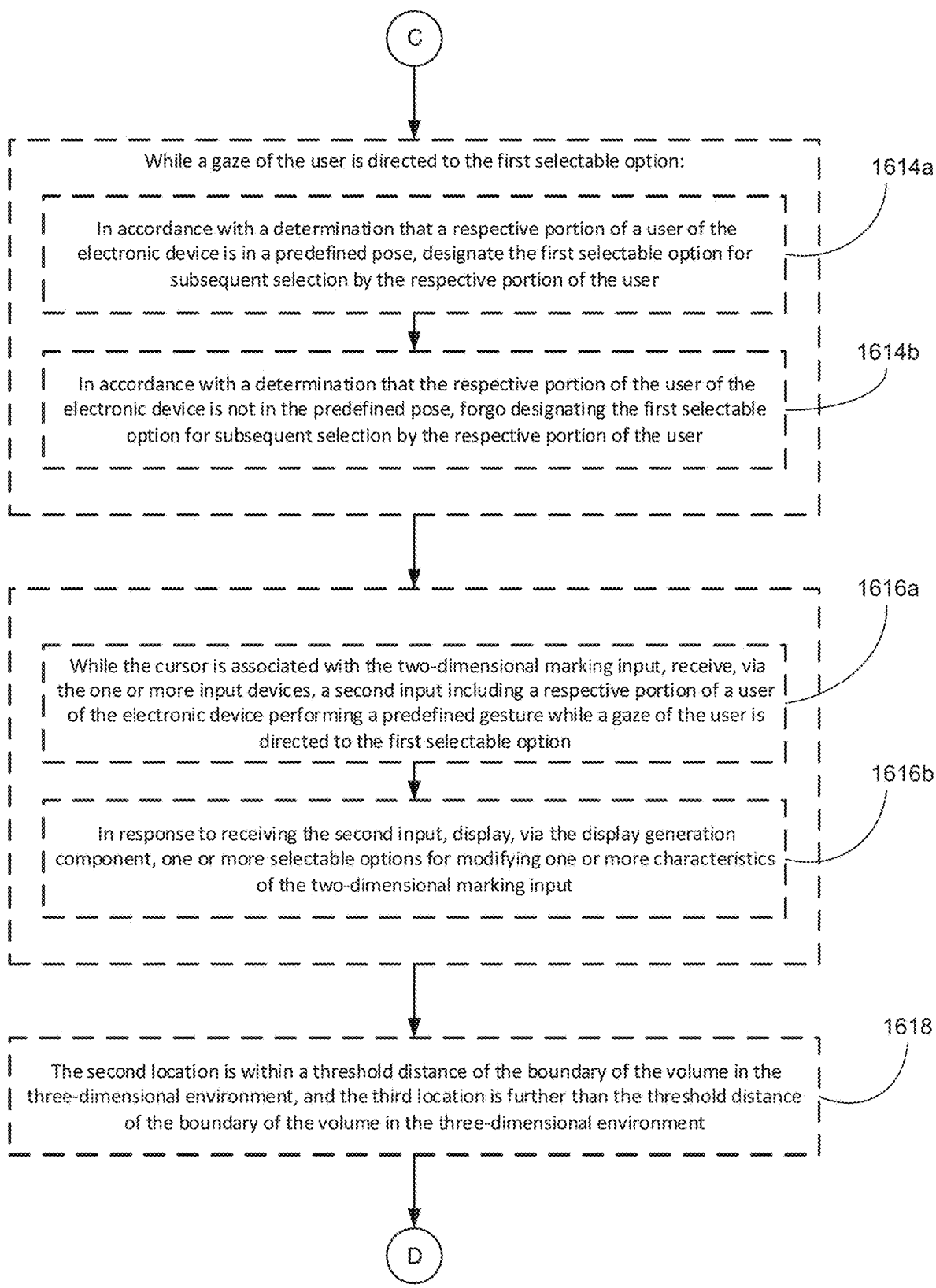
Figure 16E:
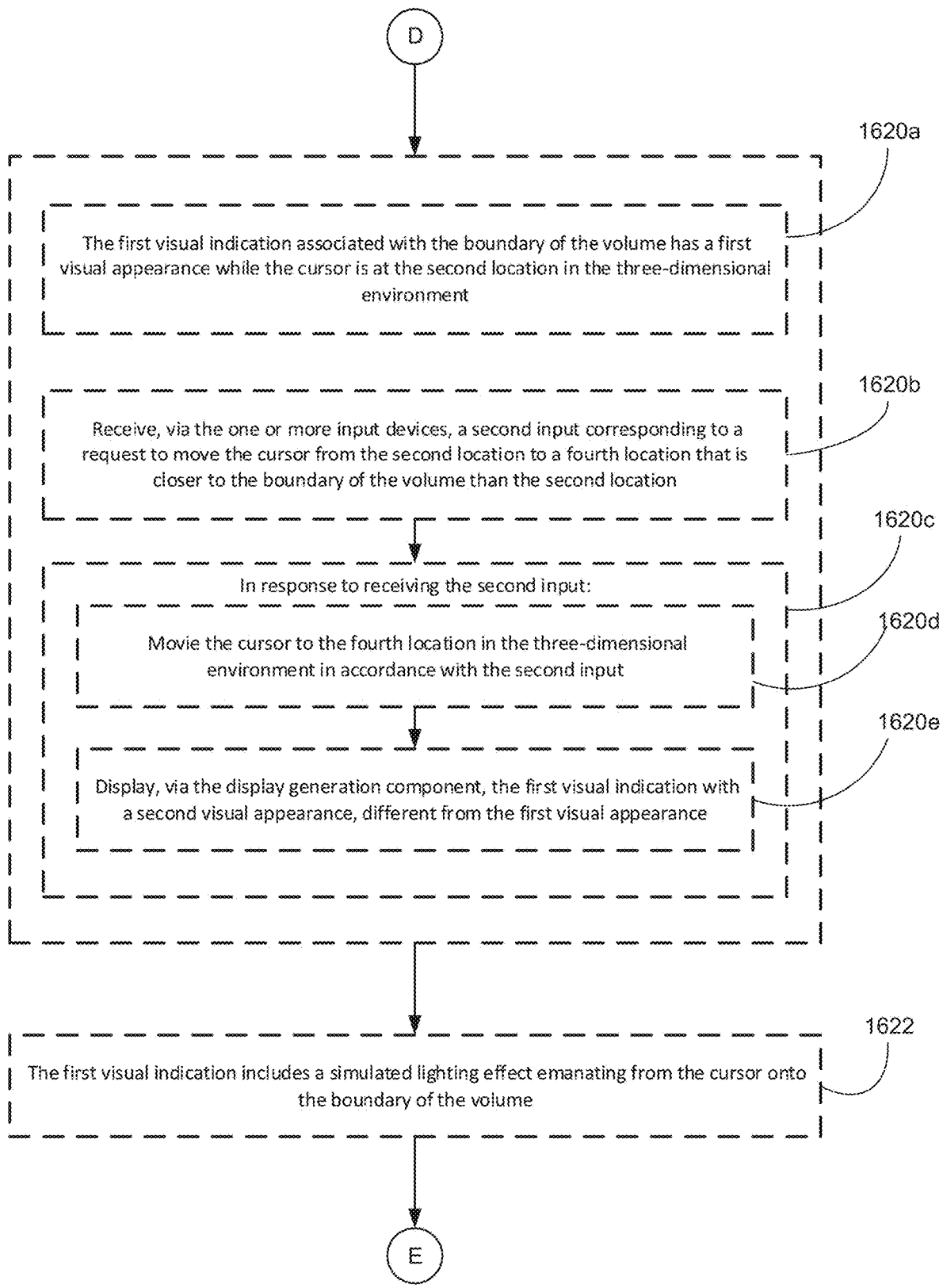
Figure 16F:
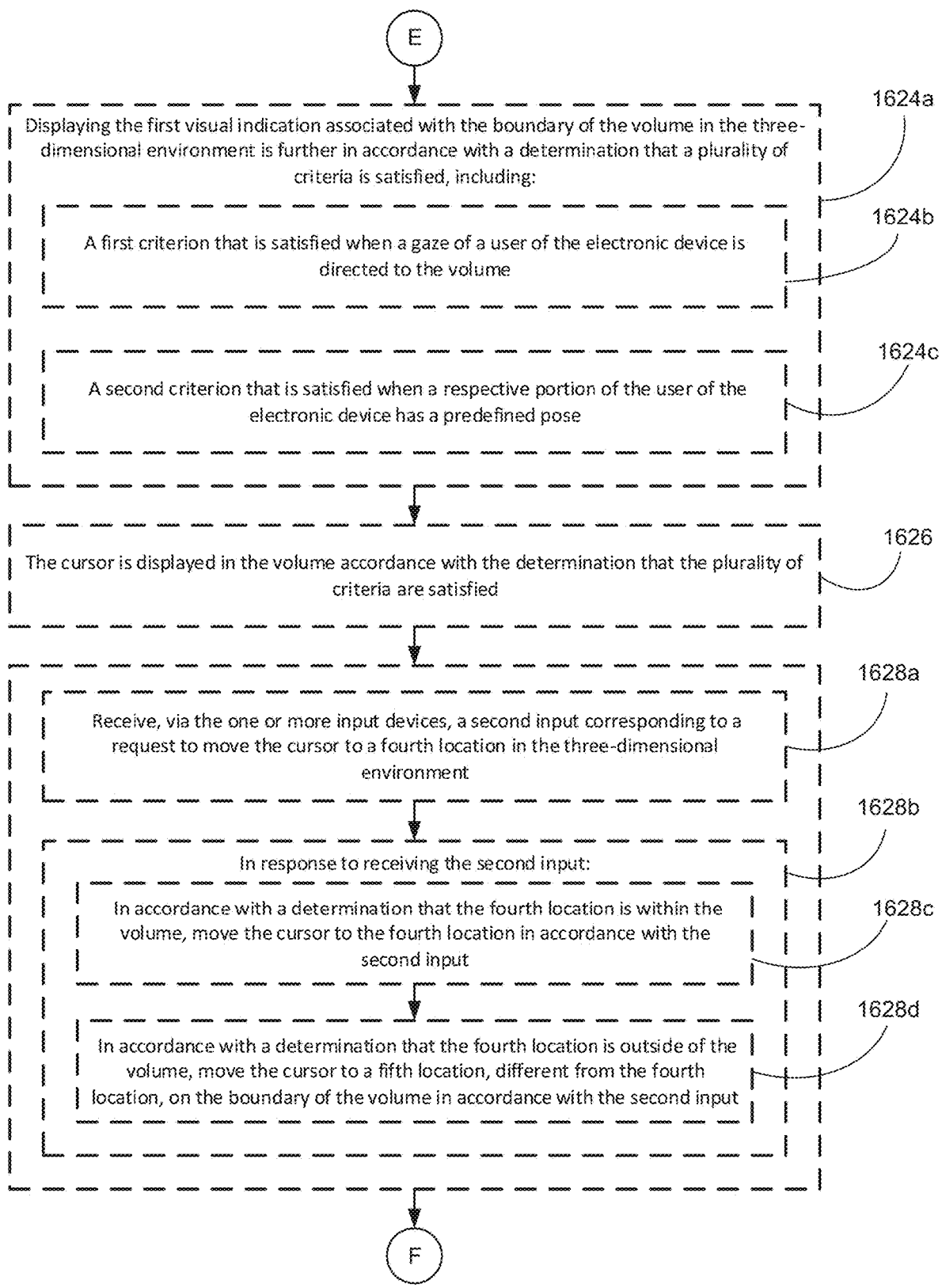
Figure 16G:
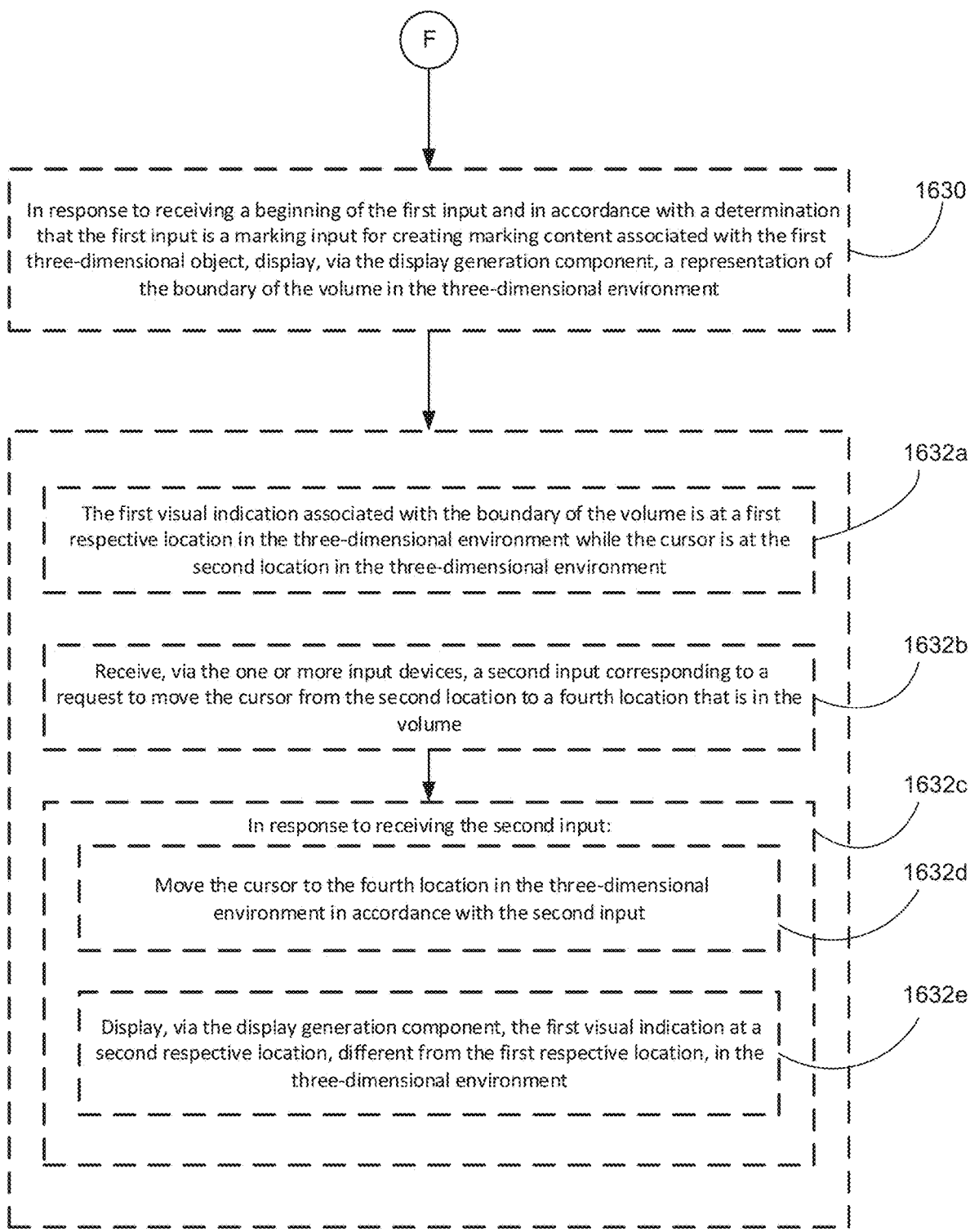

In FIG. 15F, device 101 detects hand 1503*a* move upward and to the left, and hand 1503*b* move rightward and downward. In response, device 101 moves cursor 1516*a* upward and to the left and continues mark 1520*a*. Cursor 1516*a* is now within the threshold distance of the left boundary of plane 1518 rather than within the threshold distance of the lower boundary of plane 1518. Therefore, device 101 ceases display of indication 1522*a* on the lower boundary of plane 1518, and displays indication 1522*a* on the left boundary of plane 1518. The location, size, brightness, intensity, and/or color, etc. of indication 1522*a* on the left boundary of plane 1518 is optionally based on the perpendicular distance of cursor 1516*a* from the left boundary of plane 1518, as previously described. Similarly, device also moves cursor 1516*b* rightward and downward and continues mark 1520*b*. Cursor 1516*b* is now within the threshold distance of both the left boundary of volume 1519*b* and the lower boundary of volume 1519*b*. Therefore, device 101 displays indication 1522*b* on the left boundary of volume 1519*b*, and concurrently displays indication 1522*c* on the lower boundary of volume 1519*b*. The location, size, brightness, intensity, and/or color, etc. of indication 1522*b* on the left boundary of volume 1519*b* is optionally based on the perpendicular distance of cursor 1516*b* from the left boundary of volume 1519*b*, as previously described. The location, size, brightness, intensity, and/or color, etc. of indication 1522*c* on the lower boundary of volume 1519*b* is optionally based on the perpendicular distance of cursor 1516*b* from the lower boundary of volume 1519*b*, as previously described.

FIGS. 16A-16G is a flowchart illustrating a method 1600 of indicating a boundary of a marking canvas or volume for creating marks associated with an object in a three-dimensional environment in accordance with some embodiments. In some embodiments, the method 1600 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1600 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1600 are, optionally, combined and/or the order of some operations is, optionally, changed.

In some embodiments, method 1600 is performed at an electronic device (e.g., 101) in communication with a display generation component (e.g., 120) and one or more input devices (e.g., 314). For example, a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, while displaying, via the display generation component, a three-dimensional environment that includes a first three-dimensional object (e.g., a three-dimensional object such as a three-dimensional representation of a car, a box, a ball, a statue, etc. In some embodiments, the first three-dimensional object is displayed in a three-dimensional environment that is generated, displayed, or otherwise caused to be viewable by the device (e.g., a computer-generated reality (CGR) environment such as a virtual reality (VR) environment, a mixed reality (MR) environment, or an augmented reality (AR) environment, etc.)), the electronic device receives (1602a), via the one or more input devices, a first input corresponding to a request to move a cursor from a first location to a respective location, different from the first location, in the three-dimensional environment, wherein a location of the cursor in the three-dimensional environment indicates a location at which content associated with the first three-dimensional object in the three-dimensional environment will be modified in response to user inputs, such as cursor 1516a and/or 1516b (e.g., marking or editing inputs). For example, the cursor is for providing a marking input such as described with reference to method 800, such as an input corresponding to a request to draw on or near and/or annotate the first three-dimensional object (e.g., a cursor movement input, whether or not the cursor is engaged to actually create marks in the three-dimensional environment). In some embodiments, the input includes a pinch gesture performed by a hand of the user while a marking tool is the currently active tool, followed by movement of the hand while maintaining a pinch hand shape, which optionally moves the cursor in accordance with the movement of the hand and creates mark(s) corresponding to the marking input at the locations of the cursor in the three-dimensional environment as it moves. In some embodiments, the input includes a pre-pinch hand shape of the hand of the user in which the index finger and thumb are not touching but are within a threshold distance (e.g., 0.1, 0.2, 0.5, 1, 2, 5, 10, or 20 inches) of one another, followed by movement of the hand in the pre-pinch hand shape, which optionally moves the cursor in the three-dimensional environment in accordance with the movement of the hand without creating marks in accordance with that movement. In some embodiments, the first input is an input such as described with reference to method 800 (e.g., for entering content). In some embodiments, the first input and/or other inputs described with reference to method 1600 are air gesture inputs, such as described with reference to method 1400.

In some embodiments, in response to receiving the first input (1602b), the electronic device moves (1602c) the cursor to the respective location in the three-dimensional environment in accordance with the first input, such as shown with cursors 1516a and 1516b in FIG. 15C (e.g., with or without creating marks in the three-dimensional environment in accordance with the movement depending on the first input).

In some embodiments, in accordance with a determination that the respective location is a second location in the three-dimensional environment, the electronic device displays (1602d), via the display generation component, a first visual indication associated with a boundary of a volume in the three-dimensional environment for modifying content associated with the first three-dimensional object, such as indication 1522a or 1522b in FIG. 15C. For example, the electronic device optionally defines a volume (e.g., cubic or rectangular prism, sized based on the size of the first three-dimensional object) surrounding the first three-dimensional object in the three-dimensional environment that defines the boundaries within which marking input associated with the three-dimensional object is permitted—marking input outside of the boundary of that volume is optionally not permitted (e.g., the cursor movement is limited to areas within the volume, and the cursor cannot move outside of the volume). In some embodiments, if the cursor is located within a threshold distance (e.g., 0.1, 0.2, 0.5, 1, 2, 5, 10, or 20 inches) of (e.g. any portion of) the boundary of the volume, the electronic device displays a visual indication of the existence and/or location of the boundary of the volume to indicate to the user that the user is close to the boundary of the volume. In some embodiments, the visual indication is displayed at the position/portion of the boundary that is closest to the cursor (e.g., and not outside of that portion of the boundary). In some embodiments, the visual indication is a glowing effect, a simulated light shine effect as if the cursor were casting light onto the portion of the boundary of the volume and/or a simulated particle effect as if the cursor were emitting particles onto the portion of the boundary of the volume (e.g., and not outside of that portion of the boundary, including not within the volume of the boundary).

In some embodiments, in accordance with a determination that the respective location is a third location, different from the second location, the electronic device forgoes (1602e) displaying the first visual indication in the three-dimensional environment, such as if the location is the location of cursor 1516a or 1516b in FIG. 15B. In some embodiments, if the cursor is located further than the threshold distance (e.g., 0.1, 0.2, 0.5, 1, 2, 5, 10, or 20 inches) of (e.g. any portion of) the boundary of the volume, the electronic device does not display the (e.g., any) visual indication of the existence and/or location of the boundary of the volume, which optionally includes to the user that the cursor is relatively far from the boundary of the volume. Selectively displaying an indication of the boundary of a marking volume for an object conveys information about the boundary when needed, but otherwise does not consume space in the three-dimensional environment, thereby reducing errors in usage and improving user-device interaction.

In some embodiments, the first input is received while displaying, via the display generation component, the cursor for creating marking content associated with the first three-dimensional object (1604), such as cursors 1516a and/or 1516b. In some embodiments, the cursor creates a mark at a current location of the cursor in the three-dimensional environment. In some embodiments, as the cursor moves (e.g., in accordance with hand movement) while creating the mark, a continuous mark based on the movement of the cursor is created in the three-dimensional environment. In some embodiments, the cursor creates such marks if the hand that is controlling the cursor is in a pinch hand shape (e.g., thumb touching the tip of the index finger), but does not create such marks if the hand that is controlling the cursor is not in the pinch hand shape. Additional details about cursor-based marking are provided with reference to methods 1000, 1200 and/or 1400. Providing for marking input using the cursor provides a convenient manner of creating marking input in the three-dimensional environment, thereby reducing errors in usage and improving user-device interaction.

In some embodiments, while receiving the first input, the electronic device creates (1606a) marking content associated with the first three-dimensional object in accordance with the first input, such as marks 1520a or 1520b (e.g., lines, curves, etc. in accordance with the movement of the hand that is controlling the cursor, such as marking content described with reference to method 1400), wherein, in accordance with a determination that the first three-dimensional object is further than a threshold distance (e.g., 1, 3, 5, 10, 20, 30, 50, 100, 200, or 500 inches) from a viewpoint of a user of the electronic device (e.g., the viewpoint from which the electronic device is displaying the three-dimensional environment), the marking content is two-dimensional marking content associated with the first three-dimensional object (1606b), such as marks 1520a. For example, the marking content includes marks that are contained within a two-dimensional plane or region, and do not extend outside of that plane or region, even if the hand of the user that is controlling the cursor moves closer to or further away from the three-dimensional object while creating the marking content. Additional details about such two-dimensional marking content are provided with reference to methods 1200 and/or 1400. Thus, in some embodiments, only two-dimensional marking and not three-dimensional marking (as will be described in more detail below) is available for marking (e.g., three-dimensional) objects that are further than the threshold distance from the viewpoint of the user. Creating two-dimensional marking content for objects that are relatively far from the viewpoint of the user avoids imprecise placement of marking content due to imprecise movement of the hand of the user, thereby reducing errors in usage and improving user-device interaction.

In some embodiments, while receiving the first input (1608a), in accordance with a determination that the first three-dimensional object is closer than the threshold distance (e.g., 1, 3, 5, 10, 20, 30, 50, 100, 200, or 500 inches) from the viewpoint of the user of the electronic device (1608b) (e.g., the viewpoint from which the electronic device is displaying the three-dimensional environment), in accordance with a determination that one or more first criteria are satisfied (e.g., a two-dimensional marking tool is currently selected, such as described with reference to methods 1000 and/or 1200), the marking content is two-dimensional marking content associated with the first three-dimensional object (1608c), such as marks 1520a.

In some embodiments, in accordance with a determination that one or more second criteria are satisfied (e.g., a three-dimensional marking tool is currently selected, such as described with reference to methods 1000 and/or 1200), the marking content is three-dimensional marking content associated with the first three-dimensional object (1608d), such as marks 1520b. Two-dimensional marking content was previously described. Three-dimensional marking content optionally includes marks that are not confined to a two-dimensional plane or region and extend beyond such a plane or region. Three-dimensional marks optionally extend towards and/or away from the three-dimensional object in accordance with the movement of the hand of the user that is controlling the cursor towards or away from the three-dimensional object, respectively. Additional details about such three-dimensional marking content are provided with reference to methods 1200 and/or 1400. Thus, in some embodiments, both two-dimensional marking and three-dimensional marking are available for marking (e.g., three-dimensional) objects that are closer than the threshold distance to the viewpoint of the user. Allowing for two-dimensional or three-dimensional marking content for objects that are close to the viewpoint of the user provides flexibility to the user in creating marking content, thereby improving user-device interaction.

In some embodiments, in response to detecting a beginning of the first input (e.g., detecting the tip of the index finger coming to and touching and remaining in contact with the thumb of the hand of the user that is controlling the cursor, optionally before detecting movement of the hand of the user) while the first three-dimensional object is further than the threshold distance (e.g., 1, 3, 5, 10, 20, 30, 50, 100, 200, or 500 inches) from the viewpoint of the user, the electronic device creates (1610a) two-dimensional marking content associated with the first three-dimensional object in accordance with the beginning of the first input, such as with respect to hand 1503a and marks 1520a in FIG. 15C. For example, because the marking input was initiated while the viewpoint of the user was further than the threshold distance from the three-dimensional object, the marking input is designated by the electronic device as a two-dimensional marking input.

In some embodiments, after creating the two-dimensional marking input and while continuing to detect the first input (1610b) (e.g., while the tip of the index finger and the thumb of the hand of the user that is controlling the cursor remain in contact with one another), the electronic device detects (1610c) a change in a distance between the first three-dimensional object and the viewpoint of the user to a distance less than the threshold distance, such as with respect to hand 1503a in FIG. 15D (e.g., detecting user input for moving the viewpoint and/or hand of the user to closer than the threshold distance from the three-dimensional object while continuing to detect the tip of the index finger and the thumb of the hand of the user that is controlling the cursor remaining in contact with one another), followed by a continuation of the first input while the first three-dimensional object is less than the threshold distance from the viewpoint of the user, such as with respect to hand 1503a in FIG. 15D (e.g., detecting continued movement of the hand that is controlling the cursor).

In some embodiments, while detecting the continuation of the first input, the electronic device creates (1610d) two-dimensional marking content associated with the first three-dimensional object in accordance with the continuation of the first input, such as shown with marks 1520a in FIG. 15D. For example, even though the current distance between the viewpoint of the user and the three-dimensional object is a distance at which three-dimensional marking input is possible, the marking input remains two-dimensional marking input, because it was initiated as a two-dimensional marking input. Thus, in some embodiments, the marking input is locked into two-dimensional or three-dimensional marking mode at the initial pinch down of the thumb and index finger of the user, even when the hand and/or viewpoint of the user subsequently moves to distance that would otherwise correspond to and/or allow for the opposite marking mode. Locking the marking mode in at the beginning of the marking input ensures consistent response by the electronic device irrespective of changes in distance, thereby reducing errors in usage and improving user-device interaction.

In some embodiments, the electronic device displays (1612), via the display generation component, a first selectable option that is selectable to associate the cursor with two-dimensional marking input, and a second selectable option that is selectable to associate the cursor with three-dimensional marking input, such as options 1516a and 1516b in FIG. 15B. In some embodiments, the electronic device displays, in the three-dimensional environment, a palette of marking tools that are selectable to activate the selected tool. The palette optionally includes a tool for generating two-dimensional marking input (e.g., the cursor will create two-dimensional marking content when this tool is active), and a tool for generating three-dimensional marking input (e.g., the cursor will create three-dimensional marking content when this tool is active). In some embodiments, the tool for generating three-dimensional marking input is not displayed when the hand and/or viewpoint of the user is closer than the previously-described distance threshold from the three-dimensional object. In some embodiments, the palette is displayed whenever the cursor is displayed. In some embodiments, the palette is displayed in response to a separate input to display the palette (e.g., in response to detecting an end of a marking input). Additional details about the palette of tools are described with reference to methods 1000 and/or 1200. Including two-dimensional and three-dimensional marking tools in a palette provides easy access to tools for creating different types of marking input, thereby reducing errors in usage and improving user-device interaction.

In some embodiments, while a gaze of the user is directed to the first selectable option (1614a), in accordance with a determination that a respective portion (e.g., hand) of a user of the electronic device is in a predefined pose (e.g., the hand of the user is in a ready hand position and/or shape in which the hand of the user is raised in front of the viewpoint of the user and/or the index finger and thumb are not touching each other, but are in a pre-pinch hand shape such that the thumb and index finger are within a threshold distance (e.g., 0.3, 0.5, 1, 2, 3, 5, or 10 inches) of touching each other), the electronic device designates (1614b) the first selectable option for subsequent selection by the respective portion of the user, such as gaze 1512c being directed to option 1516a while hand 1503a is in the predefined pose in FIG. 15B, which causes device 101 to highlight option 1516a. For example, highlighting the first tool when the gaze of the user is directed to the first tool and the hand of the user is in the ready hand position and/or shape. In some embodiments, while the first tool is highlighted, detecting that hand of the user performing a pinch gesture (e.g., when the thumb and index finger come together and touch each other) causes the first tool to become active, thus controlling the type of marking input subsequently created by the cursor.

In some embodiments, in accordance with a determination that the respective portion of the user of the electronic device is not in the predefined pose (e.g., the hand of the user is not in the ready hand shape and/or position), the electronic device forgoes (1614c) designating the first selectable option for subsequent selection by the respective portion of the user, such as if hand 1503a in FIG. 15B were not in the predefined pose. In some embodiments, a pinch gesture performed by the hand of the user while the first selectable option is not designated for subsequent selection does not result in the first tool becoming active—in some embodiments, such an input causes marking input to be created based on the marking tool that is currently active (e.g., different from the first tool corresponding to the first selectable option). In some embodiments, the tools in the palette only become highlighted for subsequent selection based on gaze when the hand of the user is in the ready hand shape and/or position. In some embodiments, the second selectable option would respond similarly to the above described with reference to the first selectable option. Requiring both gaze and pose for tools in the palette to respond avoids accidental selection of marking tools, thereby reducing errors in usage and improving user-device interaction.

In some embodiments, while the cursor is associated with the two-dimensional marking input, the electronic device receives (1616a), via the one or more input devices, a second input including a respective portion of a user of the electronic device performing a predefined gesture (e.g., a hand of the user performing a pinch gesture) while a gaze of the user is directed to the first selectable option, such as the selection input of option 1516a in FIG. 15B (e.g., the option in the palette corresponding to the two-dimensional marking tool. Thus, in some embodiments, the second input is detected while the first selectable option is already selected/active).

In some embodiments, in response to receiving the second input, the electronic device displays (1616b), via the display generation component, one or more selectable options for modifying one or more characteristics of the two-dimensional marking input, such as options 1516d and 1516e in FIG. 15C (e.g., options for changing mark color, mark thickness, mark style, mark transparency, etc. for the two-dimensional marks that will be subsequently created). Thus, in some embodiments, a gaze and selection of a tool while that tool is already selected causes the electronic device to display one or more options for that tool. In some embodiments, the second selectable option would respond similarly to the above described with reference to the first selectable option. Displaying options for a tool in the above-described manner provides for customizability of palette tools while avoiding permanently occupying portions of the three-dimensional environment for such customizability, thereby improving user-device interaction.

In some embodiments, the second location is within a threshold distance (e.g., 0.1, 0.2, 0.3, 0.5, 1, 2, 3, 5, 10, 20, or 50 inches) of the boundary of the volume in the three-dimensional environment, and the third location is further than the threshold distance of the boundary of the volume in the three-dimensional environment (1618). In some embodiments, the distance of the cursor from the boundary is the perpendicular or shortest distance projection from the cursor to the boundary of the volume. Thus, if the cursor is within the threshold distance—using perpendicular or shortest distance projection—of the boundary of the volume, the electronic device optionally displays the visual indication associated with the boundary at that location on the boundary corresponding to the perpendicular or shortest distance projection from the cursor. Selectively displaying an indication of the boundary of a marking volume for an object based on distance of the cursor from the boundary conveys information about the boundary when needed, but otherwise does not consume space in the three-dimensional environment, thereby reducing errors in usage and improving user-device interaction.

In some embodiments, the first visual indication associated with the boundary of the volume has a first visual appearance (e.g., a first size, a first color, a first brightness, and/or a first translucency, etc. corresponding to the current distance—optionally using perpendicular or shortest distance projection—of the cursor from the boundary) while the cursor is at the second location in the three-dimensional environment (1620a), such as the visual appearance of indication 1522b in FIG. 15C.

In some embodiments, the electronic device receives (1620b), via the one or more input devices, a second input corresponding to a request to move the cursor from the second location to a fourth location that is closer to the boundary of the volume than the second location, such as the input for moving cursor 1516b in FIG. 15D (e.g., a cursor movement input, whether or not the cursor is engaged to actually create marks in the three-dimensional environment).

In some embodiments, in response to receiving the second input (1620c), the electronic device moves (1620d) the cursor to the fourth location in the three-dimensional environment in accordance with the second input, such as shown with cursor 1516b in FIG. 15D (e.g., with or without creating marks in the three-dimensional environment in accordance with the movement depending on the second input).

In some embodiments, the electronic device displays (1620e), via the display generation component, the first visual indication with a second visual appearance (e.g., a second size, a second color, a second brightness, and/or a second translucency, etc. corresponding to the updated distance—optionally using perpendicular or shortest distance projection—of the cursor from the boundary), different from the first visual appearance, such as the updated visual appearance of indication 1522b in FIG. 15D. Thus, in some embodiments, the indication of the boundary of the volume changes in appearance as the distance between the cursor and the boundary changes. In some embodiments, the indication becomes more emphasized (e.g., relative to other portions of the three-dimensional environment) the closer the cursor moves to the boundary, and less emphasized (e.g., relative to other portions of the three-dimensional environment) the further the cursor moves from the boundary. For example, the indication becomes larger, brighter, and/or more opaque the closer the cursor moves to the boundary, and smaller, dimmer and/or more translucent the further the cursor moves from the boundary. Changing the visual appearance of the indication of the boundary depending on the distance of the cursor from the boundary conveys how close the cursor is to the boundary, thereby reducing errors in usage and improving user-device interaction.

In some embodiments, the first visual indication includes a simulated lighting effect emanating from the cursor onto the boundary of the volume (1622), such as described with reference to indications 1522a and 1522b. For example, the cursor is optionally treated as a simulated light source, and the indication of the boundary is optionally the casting of the simulated light from the cursor onto the boundary. Thus, in some embodiments, the size, intensity, etc. of the indication corresponds to simulated casting of light onto the boundary. Because in some embodiments the boundary of the volume is transparent or mostly transparent, the casting of the light from the cursor onto the boundary and/or the reflection of such light from the boundary is optionally the primary indication of where the boundary is located in the three-dimensional environment. Indicating the boundary of the volume using simulated casting of light efficiently conveys how close the cursor is to the boundary, thereby reducing errors in usage and improving user-device interaction.

In some embodiments, displaying the first visual indication associated with the boundary of the volume in the three-dimensional environment is further in accordance with a determination that a plurality of criteria is satisfied (1624a), including a first criterion that is satisfied when a gaze of a user of the electronic device is directed to the volume (1624b). For example, the gaze of the user is directed to any location within the volume. In some embodiments, the first criterion is not satisfied if the gaze of the user is directed to a location outside of the volume—and therefore, the first visual indication is optionally not displayed.

In some embodiments, the plurality of criteria includes a second criterion that is satisfied when a respective portion of the user (e.g., a hand) of the electronic device has a predefined pose (1624c), such as hands 1503a and 1503b in FIG. 15B having the predefined pose (e.g., the hand of the user is in the ready hand position and/or shape, as previously described). In some embodiments, the second criterion is not satisfied if the respective portion of the user is not in the predefined pose—and therefore, the first visual indication is optionally not displayed. Requiring both gaze and pose for the indication of the boundary to be displayed avoids accidental occlusion of parts of the three-dimensional environment, thereby reducing errors in usage and improving user-device interaction.

In some embodiments, the cursor is displayed in the volume in accordance with the determination that the plurality of criteria are satisfied (1626), such as display of cursors 1516a and 1516b in FIG. 15B. Thus, in some embodiments, the cursor is displayed within the volume by the electronic device in response to determining that the same criteria for displaying the indication of the boundary are satisfied. If those criteria are not satisfied, the electronic device optionally does not display the cursor in the volume. Requiring both gaze and pose for the cursor to be displayed avoids accidental marking input in the three-dimensional environment, thereby reducing errors in usage and improving user-device interaction.

In some embodiments, the electronic device receives (1628a), via the one or more input devices, a second input corresponding to a request to move the cursor to a fourth location in the three-dimensional environment, such as the cursor movement inputs in FIG. 15D (e.g., a cursor movement input, whether or not the cursor is engaged to actually create marks in the three-dimensional environment).

In some embodiments, in response to receiving the second input (1628b), in accordance with a determination that the fourth location is within the volume (e.g., the magnitude of the second input (e.g., the magnitude of the hand movement in the second input) is sufficiently small and/or corresponds to movement of the cursor that is sufficiently small such that the movement of the cursor away from its current location in the volume in accordance with the magnitude would result in the cursor remaining within the volume), the electronic device moves (1628c) the cursor to the fourth location in accordance with the second input, such as the cursor movements in FIG. 15D (e.g., with or without creating marks in the three-dimensional environment in accordance with the movement depending on the second input).

In some embodiments, in accordance with a determination that the fourth location is outside of the volume, such as with respect to the cursor movement inputs in FIG. 15E (e.g., the magnitude of the second input (e.g., the magnitude of the hand movement in the second input) is sufficiently large and/or corresponds to movement of the cursor that is sufficiently large such that the movement of the cursor away from its current location in the volume in accordance with the magnitude would result in the cursor moving outside of the volume), the electronic device moves (1628d) the cursor to a fifth location, different from the fourth location, on the boundary of the volume in accordance with the second input, such as shown with cursors 1516a and 1516b in FIG. 15E (e.g., with or without creating marks in the three-dimensional environment in accordance with the movement depending on the first input). Thus, in some embodiments, the electronic device stops cursor movement when the cursor reaches the boundary of the volume (e.g., the cursor cannot move beyond the boundary of the volume). In such embodiments, the cursor optionally moves to location on the boundary of the volume that corresponds to the direction of the second input, on the same path the cursor would have traversed in response to the second input had the cursor been allowed to move beyond the volume. Confining the cursor to the volume associated with the three-dimensional object avoids marking inputs for the three-dimensional object from interfering with other objects or elements in the three-dimensional environment, thereby reducing errors in usage and improving user-device interaction.

In some embodiments, in response to receiving a beginning of the first input (e.g., detecting the tip of the index finger coming to and touching and remaining in contact with the thumb of the hand of the user that is controlling the cursor, optionally before detecting movement of the hand of the user) and in accordance with a determination that the first input is a marking input for creating marking content associated with the first three-dimensional object (e.g., the plurality of criteria previously described for displaying the cursor are satisfied), the electronic device displays (1630), via the display generation component, a representation of the boundary of the volume in the three-dimensional environment, such as displaying an outline of the boundaries of volume 1519b, volume 1519a and/or plane 1518 in FIG. 15B. For example, the electronic device optionally displays the boundary of the volume as an outline and/or shell of the volume, as a highlighted or otherwise visually distinguished volume of the three-dimensional environment, etc. In some embodiments, the electronic device continues to display the representation of the boundary of the volume for the duration of the first input. In some embodiments, the electronic device displays the representation of the boundary of the volume for a predetermined duration of time (e.g., 0.5, 1, 3, 5, 10, 20, or 30 seconds) after detecting the beginning of the first input, and then ceases displaying the representation of the boundary of the volume as the first input continues past that predetermined duration of time. In some embodiments, the electronic device displays the representation of the boundary in response to detecting the tip of the index finger coming to and touching and remaining in contact with the thumb of the hand of the user that is controlling the cursor before detecting the subsequent movement of the hand of the user—in some embodiments, the electronic device does not display the representation of the boundary until detecting the subsequent movement of the hand of the user. Displaying the representation of the boundary of the volume when the marking input begins effectively conveys information about the limits of the marking input, thereby reducing errors in usage and improving user-device interaction.

In some embodiments, the first visual indication associated with the boundary of the volume is at a first respective location (e.g., on the boundary of the volume, such as at the perpendicular or shortest distance projection from the cursor at the second location onto the boundary) in the three-dimensional environment while the cursor is at the second location in the three-dimensional environment (1632a), such as shown in FIG. 15C. In some embodiments, the electronic device receives (1632b), via the one or more input devices, a second input corresponding to a request to move the cursor from the second location to a fourth location that is in the volume, such as the cursor movement inputs in FIG. 15D (e.g., a cursor movement input, whether or not the cursor is engaged to actually create marks in the three-dimensional environment). In some embodiments, in response to receiving the second input (1632c), the electronic device moves (1632d) the cursor to the fourth location in the three-dimensional environment in accordance with the second input, such as shown with cursors 1516a and 1516b in FIG. 15D (e.g., with or without creating marks in the three-dimensional environment in accordance with the movement depending on the first input). In some embodiments, the electronic device displays (1632e), via the display generation component, the first visual indication at a second respective location (e.g., on the boundary of the volume, such as at the perpendicular or shortest distance projection from the cursor at the fourth location onto the boundary), different from the first respective location, in the three-dimensional environment, such as shown with indications 1522a and 1522b in FIG. 15D (e.g., and the first visual indication optionally additionally changes in visual appearance based on the distance between the cursor and the boundary, as previously described). Thus, in some embodiments, the visual indication of the boundary of the volume moves, as the cursor moves within the volume, to be displayed at the current location on the boundary of the volume that corresponds to the shortest distance or perpendicular projection from the current location of the cursor. In some embodiments, if the location of the shortest distance or perpendicular projection from the current location of the cursor onto the boundary does not change as a result of the second input, the visual indication of the boundary optionally remains at its location on the boundary before the second input, and optionally changes in appearance based on the distance between the cursor and the boundary (e.g., as previously described). In some embodiments, if the cursor moves to within the threshold distance of multiple surfaces of the boundary, the electronic device displays indications of those multiple surfaces according to the features described herein (e.g., for a first surface, the indication of the surface is displayed based on the distance of the cursor from the first surface, and for a second surface, the indication of the surface is displayed based on the distance of the cursor from the second surface). Thus, in some embodiments, the electronic device displays multiple indications (e.g., two, three, four, etc.) of multiple surfaces of the boundary concurrently (e.g., if the cursor approaches a corner of the boundary). Updating the location of the indication of the boundary as the cursor moves within the volume conveys updated information about the currently relevant portion of the boundary, thereby reducing errors in usage and improving user-device interaction.

In some embodiments, aspects/operations of methods 800, 1000, 1200, 1400 and 1600 may be interchanged, substituted, and/or added between these methods. For example, the marking inputs of methods 800, 1000, 1200, 1400 and 1600, the objects of methods 800, 1000, 1200, 1400 and 1600, the three-dimensional environments of methods 800, 1000, 1200, 1400 and 1600, the marking tools or palettes of methods 800, 1000, 1200, 1400 and 1600, and/or the marking modes or techniques of methods 800, 1000, 1200, 1400 and 1600 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:
at an electronic device in communication with a display generation component and one or more input devices, including a hand tracking device:
while displaying, via the display generation component, a content entry user interface element and while a first content entry tool is selected, detecting, via the hand tracking device, a first movement of a predefined portion of a user of the electronic device while the predefined portion of the user has a first shape; and
in response to detecting the first movement of the predefined portion of the user while the predefined portion of the user has the first shape:
in accordance with a determination that a gaze of the user was directed toward the content entry user interface element when the first movement of the predefined portion of the user was detected, entering first content, based on the first content entry tool, corresponding to the first movement of the predefined portion of the user into the content entry user interface element; and
in accordance with a determination that the gaze of the user was directed toward a menu user interface element when the first movement of the predefined portion of the user was detected, selecting a second content entry tool, different from the first content entry tool, for entering content into the content entry user interface element.

2. The method of claim 1, further comprising:
before detecting the predefined portion of the user having the first shape, detecting, via the hand tracking device, that the predefined portion of the user has a respective shape; and
in response to detecting that the predefined portion of the user has the respective shape:
in accordance with a determination that the respective shape is part of a gesture that ends with the predefined portion of the user having the first shape, displaying, via the display generation component, a visual indication of the first content entry tool in proximity to a representation of the predefined portion of the user displayed via the display generation component; and
in accordance with a determination that the respective shape is not part of a gesture that ends with the predefined portion of the user having the first shape, forgoing displaying, via the display generation component, the visual indication of the first content entry tool.

3. The method of claim 2, further comprising:
while displaying, via the display generation component, the visual indication of the first content entry tool, detecting, via the one or more input devices, that the gaze of the user is directed toward the menu user interface element; and
in response to detecting that the gaze of the user is directed toward the menu user interface element, ceasing display, via the display generation component, the visual indication of the first content entry tool.

4. The method of claim 2, wherein the visual indication of the first content entry tool is displayed while the gaze of the user is directed toward the content entry user interface element when the predefined portion of the user has the respective shape, the method further comprising:
while displaying, via the display generation component, the visual indication of the first content entry tool, detecting, via the one or more input devices, that the gaze of the user is not directed toward the content entry user interface element; and
in response to detecting that the gaze of the user is not directed toward the content entry user interface element, ceasing display, via the display generation component, the visual indication of the first content entry tool.

5. The method of claim 1, further comprising:
before detecting the first movement of the predefined portion of the user while the predefined portion of the user has the first shape, detecting, via the hand tracking device, a gesture performed by the predefined portion of the user that ends with the predefined portion of the user having the first shape; and
in response to detecting the gesture performed by the predefined portion of the user:
in accordance with a determination that the gaze of the user is directed toward the menu user interface element when the gesture performed by the predefined portion of the user is detected, displaying, via the display generation component, a plurality of visual indications of a plurality of available content entry tools for entering content into the content entry user interface element.

6. The method of claim 5, wherein the first movement of the predefined portion of the user while the predefined portion of the user has the first shape was detected while the plurality of visual indications of the plurality of available content entry tools was displayed, and the first movement of the predefined portion of the user corresponds to movement from a first visual indication of the plurality of visual indications corresponding to the first content entry tool to a second visual indication of the plurality of visual indications corresponding to the second content entry tool.

7. The method of claim 5, further comprising:
while displaying the plurality of visual indications of the plurality of available content entry tools, detecting, via the one or more input devices, a first input including second movement of the predefined portion of the user while the predefined portion of the user does not have the first shape followed by a gesture performed by the predefined portion of the user that ends with the predefined portion of the user having the first shape; and
in response to detecting the first input:
in accordance with a determination that the second movement corresponds to movement from a first visual indication of the plurality of visual indications corresponding to the first content entry tool to a second visual indication of the plurality of visual indications corresponding to the second content entry tool, selecting the second content entry tool for entering content into the content entry user interface element.

8. The method of claim 5, wherein the plurality of visual indications of the plurality of available content entry tools are displayed at different respective locations in a three-dimensional environment that includes the content entry user interface element and the plurality of visual indications of the plurality of available content entry tools, the method further comprising:
while displaying the plurality of visual indications of the plurality of available content entry tools, detecting, via the one or more input devices, second movement of the predefined portion of the user; and
in response to detecting the second movement of the predefined portion of the user:
in accordance with a determination that the predefined portion of the user has moved to a location corresponding to a respective location in the three-dimensional environment of a second visual indication of the plurality of visual indications corresponding to the second content entry tool, selecting the second content entry tool for entering content into the content entry user interface element.

9. The method of claim 5, further comprising:
while displaying the plurality of visual indications of the plurality of available content entry tools, detecting, via the one or more input devices, a first input including the gaze of the user directed toward a respective visual indication of the plurality of visual indications followed by a gesture performed by the predefined portion of the user that ends with the predefined portion of the user having the first shape while the gaze of the user is directed toward the respective visual indication; and
in response to detecting the first input:
in accordance with a determination that the respective visual indication, toward which the gaze of the user is directed, is a visual indication of the plurality of visual indications corresponding to the second content entry tool, selecting the second content entry tool for entering content into the content entry user interface element; and
in accordance with a determination that the respective visual indication, toward which the gaze of the user is directed, is a visual indication of the plurality of visual indications corresponding to a third content entry tool, selecting the third content entry tool for entering content into the content entry user interface element.

10. The method of claim 1, further comprising:
while detecting, via the hand tracking device, a respective input provided by the predefined portion of the user and in response to detecting the respective input:
in accordance with a determination that a second predefined portion, different from the predefined portion, of the user is not providing a second respective input, performing a first action with respect to the content entry user interface element in accordance with the respective input; and
in accordance with a determination that the second predefined portion of the user is providing the second respective input, performing a second action, different from the first action, with respect to the content entry user interface element in accordance with the respective input and the second respective input.

11. The method of claim 1, wherein the content entry user interface element is displayed in a three-dimensional environment, the method further comprising:
while detecting the first movement of the predefined portion of the user while the predefined portion of the user has the first shape, and in accordance with a determination that the gaze of the user is directed towards the content entry user interface element:
in accordance with a determination that the predefined portion of the user is at a location corresponding to a first location in the three-dimensional environment that is closer than a threshold distance from a surface of the content entry user interface element, displaying, via the display generation component, a content entry indicator in proximity to a representation of the predefined portion of the user displayed in the three-dimensional environment, wherein:
the content entry indicator indicates a location in the three-dimensional environment at which content will be entered based on the first content entry tool, and
a location of the content entry indicator in the three-dimensional environment is based at least on a distance of the predefined portion of the user from a location corresponding to the surface of the content entry user interface element.

12. The method of claim 11, further comprising:
while detecting the first movement of the predefined portion of the user while the predefined portion of the user has the first shape, and in accordance with the determination that the gaze of the user is directed towards the content entry user interface element:
in accordance with a determination that the predefined portion of the user is at a location corresponding to a second location in the three-dimensional environment that is further than the threshold distance from the surface of the content entry user interface element, displaying, via the display generation component, the content entry indicator in proximity to the surface of the content entry user interface element, wherein:
the location of the content entry indicator in the three-dimensional environment is not based on the distance of the predefined portion of the user from the location corresponding to the surface of the content entry user interface element.

13. An electronic device, comprising:
one or more processors;
memory; and
one or more programs, wherein the one or more programs are stored in the memory and configured to be executed by the one or more processors, the one or more programs including instructions for:
while displaying, via a display generation component, a content entry user interface element and while a first content entry tool is selected, detecting, via a hand tracking device of one or more input devices, a first movement of a predefined portion of a user of the electronic device while the predefined portion of the user has a first shape; and
in response to detecting the first movement of the predefined portion of the user while the predefined portion of the user has the first shape:
in accordance with a determination that a gaze of the user was directed toward the content entry user interface element when the first movement of the predefined portion of the user was detected, entering first content, based on the first content entry tool, corresponding to the first movement of the predefined portion of the user into the content entry user interface element; and in accordance with a determination that the gaze of the user was directed toward a menu user interface element when the first movement of the predefined portion of the user was detected, selecting a second content entry tool, different from the first content entry tool, for entering content into the content entry user interface element.

14. The device of claim 13, the one or more programs further including instructions for:

before detecting the predefined portion of the user having the first shape, detecting, via the hand tracking device, that the predefined portion of the user has a respective shape; and in response to detecting that the predefined portion of the user has the respective shape:

in accordance with a determination that the respective shape is part of a gesture that ends with the predefined portion of the user having the first shape, displaying, via the display generation component, a visual indication of the first content entry tool in proximity to a representation of the predefined portion of the user displayed via the display generation component; and in accordance with a determination that the respective shape is not part of a gesture that ends with the predefined portion of the user having the first shape, forgoing displaying, via the display generation component, the visual indication of the first content entry tool.

15. The device of claim 14, the one or more programs further including instructions for:

while displaying, via the display generation component, the visual indication of the first content entry tool, detecting, via the one or more input devices, that the gaze of the user is directed toward the menu user interface element; and in response to detecting that the gaze of the user is directed toward the menu user interface element, ceasing display, via the display generation component, the visual indication of the first content entry tool.

16. The device of claim 14, wherein the visual indication of the first content entry tool is displayed while the gaze of the user is directed toward the content entry user interface element when the predefined portion of the user has the respective shape, the one or more programs further including instructions for:

while displaying, via the display generation component, the visual indication of the first content entry tool, detecting, via the one or more input devices, that the gaze of the user is not directed toward the content entry user interface element; and in response to detecting that the gaze of the user is not directed toward the content entry user interface element, ceasing display, via the display generation component, the visual indication of the first content entry tool.

17. The device of claim 13, the one or more programs further including instructions for:

before detecting the first movement of the predefined portion of the user while the predefined portion of the user has the first shape, detecting, via the hand tracking device, a gesture performed by the predefined portion of the user that ends with the predefined portion of the user having the first shape; and in response to detecting the gesture performed by the predefined portion of the user:

in accordance with a determination that the gaze of the user is directed toward the menu user interface element when the gesture performed by the predefined portion of the user is detected, displaying, via the display generation component, a plurality of visual indications of a plurality of available content entry tools for entering content into the content entry user interface element.

18. The device of claim 17, wherein the first movement of the predefined portion of the user while the predefined portion of the user has the first shape was detected while the plurality of visual indications of the plurality of available content entry tools was displayed, and the first movement of the predefined portion of the user corresponds to movement from a first visual indication of the plurality of visual indications corresponding to the first content entry tool to a second visual indication of the plurality of visual indications corresponding to the second content entry tool.

19. The device of claim 17, the one or more programs further including instructions for:

while displaying the plurality of visual indications of the plurality of available content entry tools, detecting, via the one or more input devices, a first input including second movement of the predefined portion of the user while the predefined portion of the user does not have the first shape followed by a gesture performed by the predefined portion of the user that ends with the predefined portion of the user having the first shape; and in response to detecting the first input:

in accordance with a determination that the second movement corresponds to movement from a first visual indication of the plurality of visual indications corresponding to the first content entry tool to a second visual indication of the plurality of visual indications corresponding to the second content entry tool, selecting the second content entry tool for entering content into the content entry user interface element.

20. The device of claim 17, wherein the plurality of visual indications of the plurality of available content entry tools are displayed at different respective locations in a three-dimensional environment that includes the content entry user interface element and the plurality of visual indications of the plurality of available content entry tools, the one or more programs further including instructions for:

while displaying the plurality of visual indications of the plurality of available content entry tools, detecting, via the one or more input devices, second movement of the predefined portion of the user; and in response to detecting the second movement of the predefined portion of the user:

in accordance with a determination that the predefined portion of the user has moved to a location corresponding to a respective location in the three-dimensional environment of a second visual indication of the plurality of visual indications corresponding to the second content entry tool, selecting the second content entry tool for entering content into the content entry user interface element.

21. The device of claim 17, the one or more programs further including instructions for:

while displaying the plurality of visual indications of the plurality of available content entry tools, detecting, via the one or more input devices, a first input including the gaze of the user directed toward a respective visual indication of the plurality of visual indications followed by a gesture performed by the predefined portion of the user that ends with the predefined portion of the user having the first shape while the gaze of the user is directed toward the respective visual indication; and in response to detecting the first input:
in accordance with a determination that the respective visual indication, toward which the gaze of the user is directed, is a visual indication of the plurality of visual indications corresponding to the second content entry tool, selecting the second content entry tool for entering content into the content entry user interface element; and in accordance with a determination that the respective visual indication, toward which the gaze of the user is directed, is a visual indication of the plurality of visual indications corresponding to a third content entry tool, selecting the third content entry tool for entering content into the content entry user interface element.

22. The device of claim 13, the one or more programs further including instructions for:
while detecting, via the hand tracking device, a respective input provided by the predefined portion of the user and in response to detecting the respective input:
in accordance with a determination that a second predefined portion, different from the predefined portion, of the user is not providing a second respective input, performing a first action with respect to the content entry user interface element in accordance with the respective input; and
in accordance with a determination that the second predefined portion of the user is providing the second respective input, performing a second action, different from the first action, with respect to the content entry user interface element in accordance with the respective input and the second respective input.

23. The device of claim 13, wherein the content entry user interface element is displayed in a three-dimensional environment, the one or more programs further including instructions for:
while detecting the first movement of the predefined portion of the user while the predefined portion of the user has the first shape, and in accordance with a determination that the gaze of the user is directed towards the content entry user interface element:
in accordance with a determination that the predefined portion of the user is at a location corresponding to a first location in the three-dimensional environment that is closer than a threshold distance from a surface of the content entry user interface element, displaying, via the display generation component, a content entry indicator in proximity to a representation of the predefined portion of the user displayed in the three-dimensional environment, wherein:
the content entry indicator indicates a location in the three-dimensional environment at which content will be entered based on the first content entry tool, and
a location of the content entry indicator in the three-dimensional environment is based at least on a distance of the predefined portion of the user from a location corresponding to the surface of the content entry user interface element.

24. The device of claim 23, the one or more programs further including instructions for:
while detecting the first movement of the predefined portion of the user while the predefined portion of the user has the first shape, and in accordance with the determination that the gaze of the user is directed towards the content entry user interface element:
in accordance with a determination that the predefined portion of the user is at a location corresponding to a second location in the three-dimensional environment that is further than the threshold distance from the surface of the content entry user interface element, displaying, via the display generation component, the content entry indicator in proximity to the surface of the content entry user interface element, wherein:
the location of the content entry indicator in the three-dimensional environment is not based on the distance of the predefined portion of the user from the location corresponding to the surface of the content entry user interface element.

25. A non-transitory computer readable storage medium storing one or more programs, the one or more programs comprising instructions, which when executed by one or more processors of an electronic device, cause the electronic device to perform a method comprising:
while displaying, via a display generation component, a content entry user interface element and while a first content entry tool is selected, detecting, via a hand tracking device of one or more input devices, a first movement of a predefined portion of a user of the electronic device while the predefined portion of the user has a first shape; and
in response to detecting the first movement of the predefined portion of the user while the predefined portion of the user has the first shape:
in accordance with a determination that a gaze of the user was directed toward the content entry user interface element when the first movement of the predefined portion of the user was detected, entering first content, based on the first content entry tool, corresponding to the first movement of the predefined portion of the user into the content entry user interface element; and
in accordance with a determination that the gaze of the user was directed toward a menu user interface element when the first movement of the predefined portion of the user was detected, selecting a second content entry tool, different from the first content entry tool, for entering content into the content entry user interface element.

26. The non-transitory computer readable storage medium of claim 25, the method further comprising:
before detecting the predefined portion of the user having the first shape, detecting, via the hand tracking device, that the predefined portion of the user has a respective shape; and
in response to detecting that the predefined portion of the user has the respective shape:
in accordance with a determination that the respective shape is part of a gesture that ends with the predefined portion of the user having the first shape, displaying, via the display generation component, a visual indication of the first content entry tool in proximity to a representation of the predefined portion of the user displayed via the display generation component; and in accordance with a determination that the respective shape is not part of a gesture that ends with the predefined portion of the user having the first shape, forgoing displaying, via the display generation component, the visual indication of the first content entry tool.

27. The non-transitory computer readable storage medium of claim 26, the method further comprising:

while displaying, via the display generation component, the visual indication of the first content entry tool, detecting, via the one or more input devices, that the gaze of the user is directed toward the menu user interface element; and in response to detecting that the gaze of the user is directed toward the menu user interface element, ceasing displaying, via the display generation component, the visual indication of the first content entry tool.

28. The non-transitory computer readable storage medium of claim 26, wherein the visual indication of the first content entry tool is displayed while the gaze of the user is directed toward the content entry user interface element when the predefined portion of the user has the respective shape, the method further comprising:

while displaying, via the display generation component, the visual indication of the first content entry tool, detecting, via the one or more input devices, that the gaze of the user is not directed toward the content entry user interface element; and in response to detecting that the gaze of the user is not directed toward the content entry user interface element, ceasing displaying, via the display generation component, the visual indication of the first content entry tool.

29. The non-transitory computer readable storage medium of claim 25, the method further comprising:

before detecting the first movement of the predefined portion of the user while the predefined portion of the user has the first shape, detecting, via the hand tracking device, a gesture performed by the predefined portion of the user that ends with the predefined portion of the user having the first shape; and in response to detecting the gesture performed by the predefined portion of the user:

in accordance with a determination that the gaze of the user is directed toward the menu user interface element when the gesture performed by the predefined portion of the user is detected, displaying, via the display generation component, a plurality of visual indications of a plurality of available content entry tools for entering content into the content entry user interface element.

30. The non-transitory computer readable storage medium of claim 29, wherein the first movement of the predefined portion of the user while the predefined portion of the user has the first shape was detected while the plurality of visual indications of the plurality of available content entry tools was displayed, and the first movement of the predefined portion of the user corresponds to movement from a first visual indication of the plurality of visual indications corresponding to the first content entry tool to a second visual indication of the plurality of visual indications corresponding to the second content entry tool.

31. The non-transitory computer readable storage medium of claim 29, the method further comprising:

while displaying the plurality of visual indications of the plurality of available content entry tools, detecting, via the one or more input devices, a first input including second movement of the predefined portion of the user while the predefined portion of the user does not have the first shape followed by a gesture performed by the predefined portion of the user that ends with the predefined portion of the user having the first shape; and in response to detecting the first input:

in accordance with a determination that the second movement corresponds to movement from a first visual indication of the plurality of visual indications corresponding to the first content entry tool to a second visual indication of the plurality of visual indications corresponding to the second content entry tool, selecting the second content entry tool for entering content into the content entry user interface element.

32. The non-transitory computer readable storage medium of claim 29, wherein the plurality of visual indications of the plurality of available content entry tools are displayed at different respective locations in a three-dimensional environment that includes the content entry user interface element and the plurality of visual indications of the plurality of available content entry tools, the method further comprising:

while displaying the plurality of visual indications of the plurality of available content entry tools, detecting, via the one or more input devices, second movement of the predefined portion of the user; and in response to detecting the second movement of the predefined portion of the user:

in accordance with a determination that the predefined portion of the user has moved to a location corresponding to a respective location in the three-dimensional environment of a second visual indication of the plurality of visual indications corresponding to the second content entry tool, selecting the second content entry tool for entering content into the content entry user interface element.

33. The non-transitory computer readable storage medium of claim 29, the method further comprising:

while displaying the plurality of visual indications of the plurality of available content entry tools, detecting, via the one or more input devices, a first input including the gaze of the user directed toward a respective visual indication of the plurality of visual indications followed by a gesture performed by the predefined portion of the user that ends with the predefined portion of the user having the first shape while the gaze of the user is directed toward the respective visual indication; and in response to detecting the first input:

in accordance with a determination that the respective visual indication, toward which the gaze of the user is directed, is a visual indication of the plurality of visual indications corresponding to the second content entry tool, selecting the second content entry tool for entering content into the content entry user interface element; and in accordance with a determination that the respective visual indication, toward which the gaze of the user is directed, is a visual indication of the plurality of visual indications corresponding to a third content entry tool, selecting the third content entry tool for entering content into the content entry user interface element.

34. The non-transitory computer readable storage medium of claim 25, the method further comprising:

while detecting, via the hand tracking device, a respective input provided by the predefined portion of the user and in response to detecting the respective input:

in accordance with a determination that a second predefined portion, different from the predefined portion, of the user is not providing a second respective input, performing a first action with respect to the content entry user interface element in accordance with the respective input; and in accordance with a determination that the second predefined portion of the user is providing the second respective input, performing a second action, different from the first action, with respect to the content entry user interface element in accordance with the respective input and the second respective input.

35. The non-transitory computer readable storage medium of claim 25, wherein the content entry user interface element is displayed in a three-dimensional environment, the method further comprising:

while detecting the first movement of the predefined portion of the user while the predefined portion of the user has the first shape, and in accordance with a determination that the gaze of the user is directed towards the content entry user interface element:

in accordance with a determination that the predefined portion of the user is at a location corresponding to a first location in the three-dimensional environment that is closer than a threshold distance from a surface of the content entry user interface element, displaying, via the display generation component, a content entry indicator in proximity to a representation of the predefined portion of the user displayed in the three-dimensional environment, wherein:

the content entry indicator indicates a location in the three-dimensional environment at which content will be entered based on the first content entry tool, and a location of the content entry indicator in the three-dimensional environment is based at least on a distance of the predefined portion of the user from a location corresponding to the surface of the content entry user interface element.

36. The non-transitory computer readable storage medium of claim 35, the method further comprising:

while detecting the first movement of the predefined portion of the user while the predefined portion of the user has the first shape, and in accordance with the determination that the gaze of the user is directed towards the content entry user interface element:

in accordance with a determination that the predefined portion of the user is at a location corresponding to a second location in the three-dimensional environment that is further than the threshold distance from the surface of the content entry user interface element, displaying, via the display generation component, the content entry indicator in proximity to the surface of the content entry user interface element, wherein:

the location of the content entry indicator in the three-dimensional environment is not based on the distance of the predefined portion of the user from the location corresponding to the surface of the content entry user interface element.

\* \* \* \* \*